US011354723B2

(12) United States Patent
Shastry et al.

(10) Patent No.: US 11,354,723 B2
(45) Date of Patent: Jun. 7, 2022

(54) SMART SHOPPING CART WITH E-WALLET STORE INJECTION SEARCH

(71) Applicant: Visa International Service Association, San Francisco, CA (US)

(72) Inventors: Vishwanath Shastry, Mountain View, CA (US); Marc Blum, San Mateo, CA (US); Ayman Hammad, Pleasanton, CA (US); Edward Katzin, San Francisco, CA (US); Thomas Purves, San Francisco, CA (US); Julian Hua, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 133 days.

(21) Appl. No.: 16/245,777

(22) Filed: Jan. 11, 2019

(65) Prior Publication Data

US 2019/0147523 A1 May 16, 2019

Related U.S. Application Data

(63) Continuation of application No. 14/242,403, filed on Apr. 1, 2014, now Pat. No. 10,223,730, which is a (Continued)

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0631* (2013.01); *G06Q 30/0639* (2013.01)

(58) Field of Classification Search
CPC .......... G06Q 30/0633; G06Q 30/0639; G06Q 30/0631

(Continued)

(56) References Cited

U.S. PATENT DOCUMENTS

| | | | |
|---|---|---|---|
| 789,106 | A | 5/1905 | Seymour |
| 4,896,363 | A | 1/1990 | Taylor |

(Continued)

FOREIGN PATENT DOCUMENTS

| | | | |
|---|---|---|---|
| CN | 1841425 | A | 10/2006 |
| CN | 1922623 | A | 2/2007 |

(Continued)

OTHER PUBLICATIONS

Dragt, Bruce. "Universal Commerce: A Seamless, Personalized Purchase Experience for Today's Connected Consumers." A First Data White Paper (2012). (Year: 2012).*

(Continued)

*Primary Examiner* — Anand Loharikar
(74) *Attorney, Agent, or Firm* — Loeb & Loeb LLP

(57) ABSTRACT

The E-WALLET STORE INJECTION SEARCH APPARATUSES, METHODS AND SYSTEMS ("SIS") transform aggregated automated shopping lists and user location data using SIS components into automated shopping item availability messages and merchant location navigation responses. In some implementations, the disclosure provides a processor-implemented method of providing an automated store injection search service.

20 Claims, 52 Drawing Sheets

Related U.S. Application Data continuation of application No. 13/542,443, filed on Jul. 5, 2012, now Pat. No. 10,121,129, which is a continuation of application No. 13/520,481, filed as application No. PCT/US2012/026205 on Feb. 22, 2012, now Pat. No. 10,223,691, which is a continuation-in-part of application No. 13/398,817, filed on Feb. 16, 2012, now abandoned, which is a continuation-in-part of application No. 13/348,634, filed on Jan. 11, 2012, now abandoned.

(60) Provisional application No. 61/545,971, filed on Oct. 11, 2011, provisional application No. 61/539,969, filed on Sep. 27, 2011, provisional application No. 61/538,761, filed on Sep. 23, 2011.

(58) Field of Classification Search
USPC ................................................ 705/26.1–27.2
See application file for complete search history.

(56) References Cited

U.S. PATENT DOCUMENTS

| | | | |
|---|---|---|---|
| 5,177,342 | A | 1/1993 | Adams |
| 5,221,838 | A | 6/1993 | Gutman |
| 5,237,164 | A | 8/1993 | Takada |
| 5,311,594 | A | 5/1994 | Penzias |
| 5,383,113 | A | 1/1995 | Kight |
| 5,384,449 | A | 1/1995 | Peirce |
| 5,446,890 | A | 8/1995 | Renslo |
| 5,459,656 | A | 10/1995 | Fields |
| 5,500,513 | A | 3/1996 | Langhans |
| 5,510,777 | A | 4/1996 | Pilc |
| 5,521,362 | A | 5/1996 | Powers |
| 5,526,409 | A | 6/1996 | Conrow |
| 5,530,438 | A | 6/1996 | Bickham |
| 5,536,045 | A | 7/1996 | Adams |
| 5,590,038 | A | 12/1996 | Pitroda |
| 5,613,012 | A | 3/1997 | Hoffman |
| 5,615,110 | A | 3/1997 | Wong |
| 5,615,264 | A | 3/1997 | Kazmierczak |
| 5,621,201 | A | 4/1997 | Langhans |
| 5,640,193 | A | 6/1997 | Wellner |
| 5,649,118 | A | 7/1997 | Carlisle |
| 5,655,007 | A | 8/1997 | McAllister |
| 5,748,737 | A | 5/1998 | Daggar |
| 5,781,438 | A | 7/1998 | Lee |
| 5,796,832 | A | 8/1998 | Kawan |
| 5,815,657 | A | 9/1998 | Williams |
| 5,850,446 | A | 12/1998 | Berger |
| 5,878,337 | A | 3/1999 | Joao |
| 5,883,810 | A | 3/1999 | Franklin |
| 5,884,271 | A | 3/1999 | Pitroda |
| 5,892,838 | A | 4/1999 | Brady |
| 5,903,830 | A | 5/1999 | Joao |
| 5,914,472 | A | 6/1999 | Foladare |
| 5,943,624 | A | 8/1999 | Fox |
| 5,953,710 | A | 9/1999 | Fleming |
| 5,956,699 | A | 9/1999 | Wong |
| 5,963,924 | A | 10/1999 | Williams |
| 6,000,832 | A | 12/1999 | Franklin |
| 6,006,200 | A | 12/1999 | Boies |
| 6,014,635 | A | 1/2000 | Harris |
| 6,044,360 | A | 3/2000 | Picciallo |
| 6,052,675 | A | 4/2000 | Checchio |
| 6,064,990 | A | 5/2000 | Goldsmith |
| 6,092,053 | A | 7/2000 | Boesch |
| 6,160,903 | A | 12/2000 | Hamid |
| 6,161,130 | A | 12/2000 | Horvitz |
| 6,163,771 | A | 12/2000 | Walker |
| 6,164,533 | A | 12/2000 | Barton |
| 6,182,894 | B1 | 2/2001 | Hackett |
| 6,193,155 | B1 | 2/2001 | Walker |
| 6,195,447 | B1 | 2/2001 | Ross |
| 6,202,052 | B1 | 3/2001 | Miller |
| 6,202,933 | B1 | 3/2001 | Poore |
| 6,226,624 | B1 | 5/2001 | Watson |
| 6,227,447 | B1 | 5/2001 | Campisano |
| 6,236,981 | B1 | 5/2001 | Hill |
| 6,243,688 | B1 | 6/2001 | Kalina |
| 6,263,447 | B1 | 7/2001 | French |
| 6,267,292 | B1 | 7/2001 | Walker |
| 6,327,578 | B1 | 12/2001 | Linehan |
| 6,336,099 | B1 | 1/2002 | Barnett |
| 6,339,766 | B1 | 1/2002 | Gephart |
| 6,341,724 | B2 | 1/2002 | Campisano |
| 6,381,584 | B1 | 4/2002 | Ogram |
| 6,385,596 | B1 | 5/2002 | Wiser |
| 6,385,655 | B1 | 5/2002 | Smith |
| 6,422,462 | B1 | 7/2002 | Cohen |
| 6,425,523 | B1 | 7/2002 | Shem-Ur |
| 6,439,345 | B1 | 8/2002 | Recktenwald |
| 6,456,984 | B1 | 9/2002 | Demoff |
| 6,473,500 | B1 | 10/2002 | Risafi |
| 6,529,725 | B1 | 3/2003 | Joao |
| 6,535,855 | B1 | 3/2003 | Cahill |
| 6,560,581 | B1 | 5/2003 | Fox |
| 6,592,044 | B1 | 7/2003 | Wong |
| 6,601,761 | B1 | 8/2003 | Katis |
| 6,636,833 | B1 | 10/2003 | Flitcroft |
| 6,735,572 | B2 | 5/2004 | Landesmann |
| 6,748,367 | B1 | 6/2004 | Lee |
| 6,805,287 | B2 | 10/2004 | Bishop |
| 6,853,982 | B2 | 2/2005 | Smith |
| 6,857,073 | B2 | 2/2005 | French |
| 6,865,522 | B1 | 3/2005 | Gastiger |
| 6,873,974 | B1 | 3/2005 | Schutzer |
| 6,879,965 | B2 | 4/2005 | Fung |
| 6,891,953 | B1 | 5/2005 | DeMello |
| 6,898,598 | B2 | 5/2005 | Himmel |
| 6,901,387 | B2 | 5/2005 | Wells |
| 6,925,439 | B1 | 8/2005 | Pitroda |
| 6,931,382 | B2 | 8/2005 | Laage |
| 6,934,528 | B2 | 8/2005 | Loureiro |
| 6,938,019 | B1 | 8/2005 | Uzo |
| 6,941,285 | B2 | 9/2005 | Sarcanin |
| 6,944,595 | B1 | 9/2005 | Graser |
| 6,980,670 | B1 | 12/2005 | Hoffman |
| 6,990,470 | B2 | 1/2006 | Hogan |
| 6,991,157 | B2 | 1/2006 | Bishop |
| 6,999,943 | B1 | 2/2006 | Johnson |
| 7,024,383 | B1 | 4/2006 | Mancini |
| 7,028,052 | B2 | 4/2006 | Chapman |
| 7,047,041 | B2 | 5/2006 | Vanska |
| 7,051,002 | B2 | 5/2006 | Keresman, III |
| 7,051,929 | B2 | 5/2006 | Li |
| 7,069,249 | B2 | 6/2006 | Stolfo |
| 7,089,208 | B1 | 8/2006 | Levchin |
| 7,096,003 | B2 | 8/2006 | Joao |
| 7,103,576 | B2 | 9/2006 | Mann |
| 7,111,789 | B2 | 9/2006 | Rajasekaran |
| 7,113,930 | B2 | 9/2006 | Eccles |
| 7,117,172 | B1 | 10/2006 | Black |
| 7,136,835 | B1 | 11/2006 | Flitcroft |
| 7,155,411 | B1 | 12/2006 | Blinn |
| 7,156,311 | B2 | 1/2007 | Attia |
| 7,167,903 | B2 | 1/2007 | Percival |
| 7,177,835 | B1 | 2/2007 | Walker |
| 7,177,848 | B2 | 2/2007 | Hogan |
| 7,180,457 | B2 | 2/2007 | Trott |
| 7,194,437 | B1 | 3/2007 | Britto |
| 7,206,847 | B1 | 4/2007 | Alberth |
| 7,209,561 | B1 | 4/2007 | Shankar |
| 7,212,979 | B1 | 5/2007 | Matz |
| 7,228,011 | B1 | 6/2007 | Queeno |
| RE39,736 | E | 7/2007 | Morrill |
| 7,264,154 | B2 | 9/2007 | Harris |
| 7,266,557 | B2 | 9/2007 | Aschen |
| 7,268,667 | B2 | 9/2007 | Beenau |
| 7,268,668 | B2 | 9/2007 | Beenau |
| 7,287,692 | B1 | 10/2007 | Patel |
| 7,290,704 | B1 | 11/2007 | Ball |
| 7,292,999 | B2 | 11/2007 | Hobson |
| 7,313,546 | B2 | 12/2007 | Alarcon-Luther |

(56) References Cited

U.S. PATENT DOCUMENTS 7,318,049 B2 1/2008 Iannacci
7,337,119 B1 2/2008 Geschwender
7,337,144 B1 2/2008 Blinn
7,343,149 B2 3/2008 Benco
7,343,351 B1 3/2008 Bishop
7,349,885 B2 3/2008 Gangi
7,350,230 B2 3/2008 Forrest
7,353,382 B2 4/2008 Labrou
7,356,505 B2 4/2008 March
7,357,310 B2 4/2008 Calabrese
7,359,880 B2 4/2008 Abel
7,373,669 B2 5/2008 Eisen
7,379,899 B1 5/2008 Junger
7,379,919 B2 5/2008 Hogan
7,392,222 B1 6/2008 Hamilton
RE40,444 E 7/2008 Linehan
7,395,242 B2 7/2008 Blinn
7,398,250 B2 7/2008 Blinn
7,413,113 B1 8/2008 Zhu
7,415,443 B2 8/2008 Hobson
7,415,469 B2 8/2008 Singh
7,427,021 B2 9/2008 Kemper
7,444,676 B1 10/2008 Asghari-Kamrani
7,450,966 B2 11/2008 Vanska
7,469,151 B2 12/2008 Khan
7,477,780 B2 1/2009 Boncyk
7,499,889 B2 3/2009 Golan
7,500,607 B2 3/2009 Williams
7,505,935 B2 3/2009 Mendiola
7,533,064 B1 5/2009 Boesch
7,536,318 B1 5/2009 Wolfe
7,536,335 B1 5/2009 Weston
7,536,360 B2 5/2009 Stolfo
7,540,012 B1 5/2009 Herzberg
7,548,889 B2 6/2009 Bhambri
7,567,934 B2 7/2009 Flitcroft
7,567,936 B1 7/2009 Peckover
7,571,139 B1 8/2009 Giordano
7,571,140 B2 8/2009 Weichert
7,571,142 B1 8/2009 Flitcroft
7,580,898 B2 8/2009 Brown
7,584,153 B2 9/2009 Brown
7,593,858 B2 9/2009 Matz
7,593,896 B1 9/2009 Flitcroft
7,603,311 B1 10/2009 Yadav-ranjan
7,606,560 B2 10/2009 Labrou
7,627,531 B2 12/2009 Breck
7,627,895 B2 12/2009 Gifford
7,630,937 B1 12/2009 Mo
7,634,295 B2 12/2009 Hayaashi
7,644,037 B1 1/2010 Ostrovsky
7,644,859 B1 1/2010 Zhu
7,650,314 B1 1/2010 Saunders
7,660,749 B2 2/2010 Koski
7,664,733 B2 2/2010 Erol
7,668,754 B1 2/2010 Bridgelall
7,669,760 B1 3/2010 Zettner
7,676,434 B2 3/2010 Evans
7,685,037 B2 3/2010 Reiners
7,685,067 B1 3/2010 Britto
7,698,221 B2 4/2010 Blinn
7,702,578 B2 4/2010 Fung
7,707,113 B1 4/2010 Dimartino
7,707,120 B2 4/2010 Dominguez
7,708,194 B2 5/2010 Vawter
7,708,198 B2 5/2010 Gangi
7,712,655 B2 5/2010 Wong
7,712,658 B2 5/2010 Gangi
7,720,436 B2 5/2010 Hamynen
7,734,527 B2 6/2010 Uzo
7,739,194 B2 6/2010 Blinn
7,742,984 B2 6/2010 Mohsenzadeh
7,753,265 B2 7/2010 Harris
7,770,789 B2 8/2010 Oder
7,774,076 B2 8/2010 Skowronek
7,783,569 B2 8/2010 Abel
7,784,684 B2 8/2010 Labrou
7,784,685 B1 8/2010 Hopkins
7,793,851 B2 9/2010 Mullen
7,797,215 B1 9/2010 Zerenner
7,801,826 B2 9/2010 Labrou
7,801,829 B2 9/2010 Gray
7,802,719 B2 9/2010 Johnson
7,805,376 B2 9/2010 Smith
7,805,378 B2 9/2010 Berardi
7,810,720 B2 10/2010 Lovett
7,818,264 B2 10/2010 Hammad
7,819,307 B2 10/2010 Lyons
7,827,288 B2 11/2010 Da
7,828,206 B2 11/2010 Hessburg
7,828,220 B2 11/2010 Mullen
7,828,992 B2 11/2010 Kilickiran
7,835,960 B2 11/2010 Breck
7,837,125 B2 11/2010 Biskupski
7,841,523 B2 11/2010 Oder
7,841,539 B2 11/2010 Hewton
7,844,530 B2 11/2010 Ziade
7,844,550 B2 11/2010 Walker
7,848,980 B2 12/2010 Carlson
7,849,014 B2 12/2010 Erikson
7,849,020 B2 12/2010 Johnson
7,853,529 B1 12/2010 Walker
7,853,995 B2 12/2010 Chow
7,865,414 B2 1/2011 Fung
7,870,027 B1 1/2011 Tannenbaum
7,873,579 B2 1/2011 Hobson
7,873,580 B2 1/2011 Hobson
7,877,299 B2 1/2011 Bui
7,878,400 B2 2/2011 Harris
7,890,370 B2 2/2011 Whitsitt
7,890,393 B2 2/2011 Talbert
7,891,563 B2 2/2011 Oder
7,895,119 B2 2/2011 Praisner
7,896,238 B2 3/2011 Fein
7,899,744 B2 3/2011 Bishop
7,904,360 B2 3/2011 Evans
7,908,216 B1 3/2011 Davis
7,908,227 B2 3/2011 Zizzimopoulos
7,922,082 B2 4/2011 Muscato
7,926,714 B1 4/2011 Zhu
7,931,195 B2 4/2011 Mullen
7,933,779 B2 4/2011 Rooks
7,937,324 B2 5/2011 Patterson
7,938,318 B2 5/2011 Fein
7,942,337 B2 5/2011 Jain
7,954,705 B2 6/2011 Mullen
7,959,076 B1 6/2011 Hopkins
7,962,418 B1 6/2011 Wei
7,963,441 B2 6/2011 Emmons
7,967,196 B1 6/2011 Bierbaum
7,971,782 B1 7/2011 Shams
7,996,259 B1 8/2011 Distefano, III
7,996,288 B1 8/2011 Stolfo
8,016,192 B2 9/2011 Messerges
8,020,763 B1 9/2011 Kowalchyk
8,024,260 B1 9/2011 Hogl
8,025,223 B2 9/2011 Saunders
8,028,041 B2 9/2011 Olliphant
8,032,438 B1 10/2011 Barton
8,041,338 B2 10/2011 Chen
8,046,256 B2 10/2011 Chien
8,050,997 B1 11/2011 Nosek
8,060,413 B2 11/2011 Castell
8,060,448 B2 11/2011 Jones
8,060,449 B1 11/2011 Zhu
8,073,565 B2 12/2011 Johnson
8,074,876 B2 12/2011 Foss
8,074,877 B2 12/2011 Mullen
8,074,879 B2 12/2011 Harris
8,082,210 B2 12/2011 Hansen
8,090,351 B2 1/2012 Klein
8,095,113 B2 1/2012 Kean
8,095,602 B1 1/2012 Orbach
8,104,679 B2 1/2012 Brown

(56) References Cited

U.S. PATENT DOCUMENTS

| | | | |
|---|---|---|---|
| 8,108,261 | B2 | 1/2012 | Carlier |
| RE43,157 | E | 2/2012 | Bishop |
| 8,109,436 | B1 | 2/2012 | Hopkins |
| 8,117,127 | B1 | 2/2012 | Sanders |
| 8,121,942 | B2 | 2/2012 | Carlson |
| 8,121,956 | B2 | 2/2012 | Carlson |
| 8,126,449 | B2 | 2/2012 | Beenau |
| 8,127,982 | B1 | 3/2012 | Casey |
| 8,131,666 | B2 | 3/2012 | OBrien |
| 8,140,418 | B1 | 3/2012 | Casey |
| 8,145,188 | B2 | 3/2012 | Park |
| 8,145,561 | B1 | 3/2012 | Zhu |
| 8,145,566 | B1 | 3/2012 | Ahuja |
| 8,145,569 | B2 | 3/2012 | Gong |
| 8,145,898 | B2 | 3/2012 | Kamalakantha |
| 8,150,767 | B2 | 4/2012 | Wankmueller |
| 8,150,772 | B2 | 4/2012 | Mardikar |
| 8,151,328 | B1 | 4/2012 | Lundy |
| 8,151,330 | B2 | 4/2012 | Vishik |
| 8,151,336 | B2 | 4/2012 | Savoor |
| 8,155,999 | B2 | 4/2012 | De Boer |
| 8,156,000 | B1 | 4/2012 | Thompson |
| 8,156,026 | B2 | 4/2012 | Junger |
| 8,156,042 | B2 | 4/2012 | Winkleman, III |
| 8,156,549 | B2 | 4/2012 | Rice |
| 8,157,178 | B2 | 4/2012 | Dewan |
| 8,157,181 | B2 | 4/2012 | Bates |
| 8,160,935 | B2 | 4/2012 | Bui |
| 8,160,959 | B2 | 4/2012 | Rackley, III |
| 8,165,961 | B1 | 4/2012 | Dimartino |
| 8,166,068 | B2 | 4/2012 | Stevens |
| RE43,351 | E | 5/2012 | Jordan |
| 8,170,921 | B2 | 5/2012 | Stocker |
| 8,171,525 | B1 | 5/2012 | Pelly |
| 8,175,235 | B2 | 5/2012 | Mumford |
| 8,175,965 | B2 | 5/2012 | Moore |
| 8,175,967 | B2 | 5/2012 | OLeary |
| 8,175,968 | B2 | 5/2012 | OLeary |
| 8,175,973 | B2 | 5/2012 | Davis |
| 8,175,975 | B2 | 5/2012 | Cai |
| 8,175,979 | B2 | 5/2012 | Baentsch |
| 8,176,416 | B1 | 5/2012 | Williams |
| 8,176,554 | B1 | 5/2012 | Kennedy |
| 8,179,563 | B2 | 5/2012 | King |
| 8,180,289 | B1 | 5/2012 | Glickman |
| 8,180,705 | B2 | 5/2012 | Kowalchyk |
| 8,180,804 | B1 | 5/2012 | Narayanan |
| 8,190,513 | B2 | 5/2012 | Felger |
| 8,190,523 | B2 | 5/2012 | Patterson |
| 8,191,775 | B2 | 6/2012 | Hildred |
| 8,195,233 | B2 | 6/2012 | Morikuni |
| 8,195,544 | B2 | 6/2012 | Horsfall |
| 8,195,547 | B2 | 6/2012 | Aaltonen |
| 8,195,565 | B2 | 6/2012 | Bishop |
| 8,195,576 | B1 | 6/2012 | Grigg |
| 8,196,131 | B1 | 6/2012 | Von Behren |
| 8,196,813 | B2 | 6/2012 | Vadhri |
| 8,200,582 | B1 | 6/2012 | Zhu |
| 8,200,868 | B1 | 6/2012 | Hooft |
| 8,204,774 | B2 | 6/2012 | Chwast |
| 8,204,829 | B2 | 6/2012 | Alvarez |
| 8,205,791 | B2 | 6/2012 | Randazza |
| 8,209,245 | B2 | 6/2012 | Dennes |
| 8,209,744 | B2 | 6/2012 | Zhu |
| 8,214,288 | B2 | 7/2012 | Olliphant |
| 8,214,289 | B2 | 7/2012 | Scipioni |
| 8,214,291 | B2 | 7/2012 | Pelegero |
| 8,214,292 | B2 | 7/2012 | Duggal |
| 8,214,293 | B2 | 7/2012 | Powell |
| 8,214,886 | B2 | 7/2012 | Foley |
| 8,215,546 | B2 | 7/2012 | Lin |
| 8,219,411 | B2 | 7/2012 | Matz |
| 8,219,474 | B2 | 7/2012 | Sutton |
| 8,219,489 | B2 | 7/2012 | Patterson |
| 8,219,490 | B2 | 7/2012 | Hammad |
| 8,220,047 | B1 | 7/2012 | Soghoian |
| 8,224,702 | B2 | 7/2012 | Mangerink |
| 8,224,754 | B2 | 7/2012 | Pastusiak |
| 8,224,773 | B2 | 7/2012 | Spiegel |
| 8,225,385 | B2 | 7/2012 | Chow |
| 8,225,997 | B1 | 7/2012 | Bierbaum |
| 8,227,936 | B1 | 7/2012 | Folk |
| 8,229,354 | B2 | 7/2012 | Sklovsky |
| 8,229,808 | B1 | 7/2012 | Heit |
| 8,229,844 | B2 | 7/2012 | Felger |
| 8,229,851 | B2 | 7/2012 | Doran |
| 8,229,852 | B2 | 7/2012 | Carlson |
| 8,229,854 | B2 | 7/2012 | Stephen |
| 8,233,841 | B2 | 7/2012 | Griffin |
| 8,234,183 | B2 | 7/2012 | Smith |
| 8,239,276 | B2 | 8/2012 | Lin |
| 8,244,580 | B2 | 8/2012 | Mankoff |
| 8,245,139 | B2 | 8/2012 | Michelman |
| 8,249,925 | B2 | 8/2012 | Broms |
| 8,249,965 | B2 | 8/2012 | Tumminaro |
| 8,255,278 | B1 | 8/2012 | Young |
| 8,255,323 | B1 | 8/2012 | Casey |
| 8,255,324 | B2 | 8/2012 | Bercy |
| 8,265,993 | B2 | 9/2012 | Chien |
| 8,275,704 | B2 | 9/2012 | Bishop |
| 8,280,777 | B2 | 10/2012 | Mengerink |
| 8,281,991 | B2 | 10/2012 | Wentker |
| 8,281,998 | B2 | 10/2012 | Tang |
| 8,282,002 | B2 | 10/2012 | Shams |
| 8,285,640 | B2 | 10/2012 | Scipioni |
| 8,285,820 | B2 | 10/2012 | Olliphant |
| 8,285,832 | B2 | 10/2012 | Schwab |
| 8,286,875 | B2 | 10/2012 | Tang |
| 8,290,433 | B2 | 10/2012 | Fisher |
| 8,290,819 | B2 | 10/2012 | Bawcutt |
| 8,290,829 | B1 | 10/2012 | Katz |
| 8,295,898 | B2 | 10/2012 | Ashfield |
| 8,296,187 | B2 | 10/2012 | Light |
| 8,296,204 | B2 | 10/2012 | Templeton |
| 8,296,228 | B1 | 10/2012 | Kloor |
| 8,296,231 | B2 | 10/2012 | Britto |
| 8,301,500 | B2 | 10/2012 | Pharris |
| 8,301,510 | B2 | 10/2012 | Boesch |
| 8,301,556 | B2 | 10/2012 | Hogl |
| 8,311,520 | B2 | 11/2012 | Choi |
| 8,312,096 | B2 | 11/2012 | Cohen |
| 8,321,267 | B2 | 11/2012 | Hoerenz |
| 8,321,294 | B2 | 11/2012 | Carlier |
| 8,321,315 | B2 | 11/2012 | Abel |
| 8,321,338 | B2 | 11/2012 | Baumgart |
| 8,321,343 | B2 | 11/2012 | Ramavarjula |
| 8,321,364 | B1 | 11/2012 | Gharpure |
| 8,326,756 | B2 | 12/2012 | Egendorf |
| 8,326,769 | B1 | 12/2012 | Weisman |
| 8,326,770 | B1 | 12/2012 | Weisman |
| 8,327,450 | B2 | 12/2012 | Clement |
| 8,328,095 | B2 | 12/2012 | Oder |
| 8,332,272 | B2 | 12/2012 | Fisher |
| 8,332,275 | B2 | 12/2012 | Poon |
| 8,332,323 | B2 | 12/2012 | Stals |
| 8,335,720 | B2 | 12/2012 | Juang |
| 8,335,726 | B1 | 12/2012 | Ling |
| 8,335,822 | B2 | 12/2012 | Ahmed |
| 8,335,921 | B2 | 12/2012 | Von Behren |
| 8,335,932 | B2 | 12/2012 | Von Behren |
| 8,336,088 | B2 | 12/2012 | Raj |
| 8,340,666 | B2 | 12/2012 | Ramer |
| 8,341,029 | B1 | 12/2012 | Ramalingam |
| 8,346,643 | B2 | 1/2013 | Boyer |
| 8,346,659 | B1 | 1/2013 | Mohsenzadeh |
| 8,346,663 | B2 | 1/2013 | Kawan |
| 8,346,666 | B2 | 1/2013 | Lindelsee |
| 8,352,323 | B2 | 1/2013 | Fisher |
| 8,352,362 | B2 | 1/2013 | Mohsenzadeh |
| 8,352,499 | B2 | 1/2013 | Bharat |
| 8,352,749 | B2 | 1/2013 | Von Behren |
| 8,355,987 | B2 | 1/2013 | Hirson |
| 8,359,070 | B1 | 1/2013 | Zhu |
| 8,364,587 | B2 | 1/2013 | Nuzum |

(56) References Cited

U.S. PATENT DOCUMENTS

| | | | |
|---|---|---|---|
| 8,364,590 | B1 | 1/2013 | Casey |
| 8,370,264 | B1 | 2/2013 | Wei |
| 8,376,225 | B1 | 2/2013 | Hopkins |
| 8,380,177 | B2 | 2/2013 | Laracey |
| 8,380,349 | B1 | 2/2013 | Hickman |
| 8,386,078 | B1 | 2/2013 | Hickman |
| 8,387,873 | B2 | 3/2013 | Saunders |
| 8,396,750 | B1 | 3/2013 | Hariharan |
| 8,396,810 | B1 | 3/2013 | Cook |
| 8,401,539 | B2 | 3/2013 | Beenau |
| 8,401,898 | B2 | 3/2013 | Chien |
| 8,401,904 | B1 | 3/2013 | Simakov |
| 8,402,555 | B2 | 3/2013 | Grecia |
| 8,403,211 | B2 | 3/2013 | Brooks |
| 8,412,586 | B1 | 4/2013 | Foulser |
| 8,412,623 | B2 | 4/2013 | Moon |
| 8,412,630 | B2 | 4/2013 | Ross |
| 8,412,837 | B1 | 4/2013 | Emigh |
| 8,417,633 | B1 | 4/2013 | Chmara |
| 8,417,642 | B2 | 4/2013 | Oren |
| 8,423,462 | B1 | 4/2013 | Amacker |
| 8,429,521 | B2 | 4/2013 | Lloyd |
| 8,437,633 | B2 | 4/2013 | Chmara |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |
| 8,494,959 | B2 | 7/2013 | Hathaway |
| 8,498,908 | B2 | 7/2013 | Mengerink |
| 8,504,475 | B2 | 8/2013 | Brand |
| 8,504,478 | B2 | 8/2013 | Saunders |
| 8,510,816 | B2 | 8/2013 | Quach |
| 8,433,116 | B2 | 9/2013 | Davis |
| 8,527,360 | B2 | 9/2013 | Groat |
| 8,533,860 | B1 | 9/2013 | Grecia |
| 8,538,845 | B2 | 9/2013 | Liberty |
| 8,555,079 | B2 | 10/2013 | Shablygin |
| 8,560,004 | B1 | 10/2013 | Tsvetkov |
| 8,566,168 | B1 | 10/2013 | Bierbaum |
| 8,567,670 | B2 | 10/2013 | Stanfield |
| 8,571,937 | B2 | 10/2013 | Rose |
| 8,571,939 | B2 | 10/2013 | Lindsey |
| 8,577,336 | B2 | 11/2013 | Mechaley |
| 8,577,803 | B2 | 11/2013 | Chatterjee |
| 8,577,813 | B2 | 11/2013 | Weiss |
| 8,578,176 | B2 | 11/2013 | Mattsson |
| 8,583,494 | B2 | 11/2013 | Fisher |
| 8,584,251 | B2 | 11/2013 | McGuire |
| 8,589,237 | B2 | 11/2013 | Fisher |
| 8,589,271 | B2 | 11/2013 | Evans |
| 8,589,291 | B2 | 11/2013 | Carlson |
| 8,595,098 | B2 | 11/2013 | Starai |
| 8,595,812 | B2 | 11/2013 | Bomar |
| 8,595,850 | B2 | 11/2013 | Spies |
| 8,606,638 | B2 | 12/2013 | Dragt |
| 8,606,700 | B2 | 12/2013 | Carlson |
| 8,606,720 | B1 | 12/2013 | Baker |
| 8,612,325 | B2 | 12/2013 | Stacy |
| 8,615,468 | B2 | 12/2013 | Varadarajan |
| 8,620,754 | B2 | 12/2013 | Fisher |
| 8,627,420 | B2 | 1/2014 | Furlan |
| 8,635,157 | B2 | 1/2014 | Smith |
| 8,639,621 | B1 | 1/2014 | Ellis |
| 8,646,059 | B1 | 2/2014 | von Behren |
| 8,651,374 | B2 | 2/2014 | Brabson |
| 8,656,180 | B2 | 2/2014 | Shablygin |
| 8,661,495 | B2 | 2/2014 | Reisman |
| 8,662,384 | B2 | 3/2014 | Dodin |
| 8,739,016 | B1 | 5/2014 | Goldman |
| 8,751,391 | B2 | 6/2014 | Freund |
| 8,762,263 | B2 | 6/2014 | Gauthier |
| 8,793,186 | B2 | 7/2014 | Patterson |
| 8,838,982 | B2 | 9/2014 | Carlson |
| 8,856,539 | B2 | 10/2014 | Weiss |
| 8,887,308 | B2 | 11/2014 | Grecia |
| 8,893,009 | B2 | 11/2014 | Raleigh |
| 9,008,616 | B2 | 4/2015 | Wall |
| 9,065,643 | B2 | 6/2015 | Hurry |
| 9,070,129 | B2 | 6/2015 | Sheets |
| 9,082,119 | B2 | 7/2015 | Ortiz |
| 9,100,826 | B2 | 8/2015 | Weiss |
| 9,105,050 | B2 | 8/2015 | Tietzen |
| 9,160,741 | B2 | 10/2015 | Wentker |
| 9,195,750 | B2 | 11/2015 | Hayden |
| 9,229,964 | B2 | 1/2016 | Stevelinck |
| 9,245,267 | B2 | 1/2016 | Singh |
| 9,249,241 | B2 | 2/2016 | Dai |
| 9,256,871 | B2 | 2/2016 | Anderson |
| 9,280,765 | B2 | 3/2016 | Hammad |
| 9,307,342 | B2 | 4/2016 | Sojoodi |
| 9,324,098 | B1 | 4/2016 | Agrawal |
| 9,355,393 | B2 | 5/2016 | Purves |
| 9,448,972 | B2 | 9/2016 | Greenberg |
| 9,524,089 | B1 | 12/2016 | Ghosh |
| 9,530,137 | B2 | 12/2016 | Weiss |
| 9,582,598 | B2 | 2/2017 | Kalgi |
| 9,626,351 | B2 | 4/2017 | Davis |
| 9,710,807 | B2 | 7/2017 | Theurer |
| 9,772,987 | B2 | 9/2017 | Davis |
| 9,804,834 | B1 | 10/2017 | Lopyrev |
| 9,830,590 | B2 | 11/2017 | Grigg |
| 9,846,863 | B2 | 12/2017 | Grossi |
| 9,904,537 | B2 | 2/2018 | Lopyrev |
| 10,360,561 | B2 | 7/2019 | Poon |
| 10,699,290 | B1 | 6/2020 | Varadarajan |
| 10,825,001 | B2 | 11/2020 | Purves |
| 11,144,905 | B1 | 10/2021 | Wilkinson |
| 2001/0037297 | A1 | 3/2001 | McNair |
| 2001/0029485 | A1 | 10/2001 | Brody |
| 2001/0034720 | A1 | 10/2001 | Armes |
| 2001/0049635 | A1 | 12/2001 | Chung |
| 2001/0054003 | A1 | 12/2001 | Chien |
| 2001/0056359 | A1 | 12/2001 | Abreu |
| 2001/0056409 | A1 | 12/2001 | Bellovin |
| 2002/0002522 | A1 | 1/2002 | Clift |
| 2002/0004783 | A1 | 1/2002 | Paltenghe |
| 2002/0007320 | A1 | 1/2002 | Hogan |
| 2002/0016749 | A1 | 2/2002 | Borecki |
| 2002/0026575 | A1 | 2/2002 | Wheeler |
| 2002/0029193 | A1 | 3/2002 | Ranjan |
| 2002/0035548 | A1 | 3/2002 | Hogan |
| 2002/0040325 | A1 | 4/2002 | Takae |
| 2002/0046184 | A1 | 4/2002 | Villaret |
| 2002/0052778 | A1 | 5/2002 | Murphy |
| 2002/0069122 | A1 | 6/2002 | Yun |
| 2002/0073045 | A1 | 6/2002 | Rubin |
| 2002/0077976 | A1 | 6/2002 | Meyer |
| 2002/0077978 | A1 | 6/2002 | OLeary |
| 2002/0087894 | A1 | 7/2002 | Foley |
| 2002/0099642 | A1 | 7/2002 | Schwankl |
| 2002/0099647 | A1 | 7/2002 | Howorka |
| 2002/0099656 | A1 | 7/2002 | Poh Wong |
| 2002/0107755 | A1 | 8/2002 | Steed |
| 2002/0111919 | A1 | 8/2002 | Weller |
| 2002/0112014 | A1 | 8/2002 | Bennett |
| 2002/0116271 | A1 | 8/2002 | Mankoff |
| 2002/0116341 | A1 | 8/2002 | Hogan |
| 2002/0120864 | A1 | 8/2002 | Wu |
| 2002/0128977 | A1 | 9/2002 | Nambiar |
| 2002/0133467 | A1 | 9/2002 | Hobson |
| 2002/0138290 | A1 | 9/2002 | Metcalfe |
| 2002/0138445 | A1 | 9/2002 | Laage |
| 2002/0141575 | A1 | 10/2002 | Hird |
| 2002/0143614 | A1 | 10/2002 | MacLean |
| 2002/0147913 | A1 | 10/2002 | Lun Yip |
| 2002/0174030 | A1 | 11/2002 | Praisner |
| 2002/0178370 | A1 | 11/2002 | Gurevich |
| 2002/0194081 | A1 | 12/2002 | Perkowski |
| 2003/0014307 | A1 | 1/2003 | Heng |
| 2003/0018524 | A1 | 1/2003 | Fishman |
| 2003/0026404 | A1 | 2/2003 | Joyce |
| 2003/0028451 | A1 | 2/2003 | Ananian |

(56) References Cited

U.S. PATENT DOCUMENTS

| | | | |
|---|---|---|---|
| 2003/0028481 | A1 | 2/2003 | Flitcroft |
| 2003/0055785 | A1 | 3/2003 | Lahiri |
| 2003/0080185 | A1 | 5/2003 | Werther |
| 2003/0097318 | A1 | 5/2003 | Yu |
| 2003/0101134 | A1 | 5/2003 | Liu |
| 2003/0126076 | A1 | 7/2003 | Kwok |
| 2003/0130955 | A1 | 7/2003 | Hawthorne |
| 2003/0144935 | A1 | 7/2003 | Sobek |
| 2003/0174823 | A1 | 9/2003 | Justice |
| 2003/0177361 | A1 | 9/2003 | Wheeler |
| 2003/0179230 | A1 | 9/2003 | Seidman |
| 2003/0191709 | A1 | 10/2003 | Elston |
| 2003/0191711 | A1 | 10/2003 | Jamison |
| 2003/0191945 | A1 | 10/2003 | Keech |
| 2003/0195659 | A1 | 10/2003 | Kasuga |
| 2003/0200142 | A1 | 10/2003 | Hicks |
| 2003/0200184 | A1 | 10/2003 | Dominguez |
| 2003/0212589 | A1 | 11/2003 | Kish |
| 2003/0212642 | A1 | 11/2003 | Weller |
| 2003/0216996 | A1 | 11/2003 | Cummings |
| 2003/0220835 | A1 | 11/2003 | Barnes |
| 2004/0010462 | A1 | 1/2004 | Moon |
| 2004/0030601 | A1 | 2/2004 | Pond |
| 2004/0050928 | A1 | 3/2004 | Bishop |
| 2004/0059682 | A1 | 3/2004 | Hasumi |
| 2004/0068443 | A1 | 4/2004 | Hopson |
| 2004/0078332 | A1 | 4/2004 | Ferguson |
| 2004/0093281 | A1 | 5/2004 | Silverstein |
| 2004/0103037 | A1 | 5/2004 | Wetmore |
| 2004/0103063 | A1 | 5/2004 | Takayama |
| 2004/0111698 | A1 | 6/2004 | Soong |
| 2004/0128197 | A1 | 7/2004 | Bam |
| 2004/0138999 | A1 | 7/2004 | Friedman |
| 2004/0139008 | A1 | 7/2004 | Mascavage |
| 2004/0143532 | A1 | 7/2004 | Lee |
| 2004/0148255 | A1 | 7/2004 | Beck |
| 2004/0158532 | A1 | 8/2004 | Breck |
| 2004/0204128 | A1 | 10/2004 | Zakharia |
| 2004/0210449 | A1 | 10/2004 | Breck |
| 2004/0210498 | A1 | 10/2004 | Freund |
| 2004/0215560 | A1 | 10/2004 | Amalraj |
| 2004/0215963 | A1 | 10/2004 | Kaplan |
| 2004/0230536 | A1 | 11/2004 | Fung |
| 2004/0232225 | A1 | 11/2004 | Bishop |
| 2004/0236646 | A1 | 11/2004 | Wu |
| 2004/0236819 | A1 | 11/2004 | Anati |
| 2004/0243520 | A1 | 12/2004 | Bishop |
| 2004/0254891 | A1 | 12/2004 | Blinn |
| 2004/0260646 | A1 | 12/2004 | Berardi |
| 2004/0267608 | A1 | 12/2004 | Mansfield |
| 2004/0267655 | A1 | 12/2004 | Davidowitz |
| 2004/0267878 | A1 | 12/2004 | Osias |
| 2005/0010483 | A1 | 1/2005 | Ling |
| 2005/0037735 | A1 | 2/2005 | Courts |
| 2005/0038724 | A1 | 2/2005 | Roever |
| 2005/0065819 | A1 | 3/2005 | Pamela |
| 2005/0080730 | A1 | 4/2005 | Sorrentino |
| 2005/0080732 | A1 | 4/2005 | Warin |
| 2005/0080747 | A1 | 4/2005 | Anderson |
| 2005/0080821 | A1 | 4/2005 | Breil |
| 2005/0097320 | A1 | 5/2005 | Golan |
| 2005/0101309 | A1 | 5/2005 | Croome |
| 2005/0102188 | A1 | 5/2005 | Hutchison |
| 2005/0108178 | A1 | 5/2005 | York |
| 2005/0114784 | A1 | 5/2005 | Spring |
| 2005/0137969 | A1 | 6/2005 | Shah |
| 2005/0144082 | A1 | 6/2005 | Coolman |
| 2005/0171894 | A1 | 8/2005 | Traynor |
| 2005/0171898 | A1 | 8/2005 | Bishop |
| 2005/0184145 | A1 | 8/2005 | Law |
| 2005/0187873 | A1 | 8/2005 | Labrou |
| 2005/0192893 | A1 | 9/2005 | Keeling |
| 2005/0192895 | A1 | 9/2005 | Rogers |
| 2005/0199709 | A1 | 9/2005 | Linlor |
| 2005/0220326 | A1 | 10/2005 | Sim |
| 2005/0234817 | A1 | 10/2005 | VanFleet |
| 2005/0246278 | A1 | 11/2005 | Gerber |
| 2005/0246293 | A1 | 11/2005 | Ong |
| 2005/0251446 | A1 | 11/2005 | Jiang |
| 2005/0254714 | A1 | 11/2005 | Anne |
| 2005/0256802 | A1 | 11/2005 | Ammermann |
| 2005/0261967 | A1 | 11/2005 | Barry |
| 2005/0269401 | A1 | 12/2005 | Spitzer |
| 2005/0269402 | A1 | 12/2005 | Spitzer |
| 2005/0273462 | A1 | 12/2005 | Reed |
| 2006/0002607 | A1 | 1/2006 | Boncyk |
| 2006/0020542 | A1 | 1/2006 | Litle |
| 2006/0053056 | A1 | 3/2006 | Alspach-goss |
| 2006/0059277 | A1 | 3/2006 | Zito |
| 2006/0069619 | A1 | 3/2006 | Walker |
| 2006/0075235 | A1 | 4/2006 | Renkis |
| 2006/0085328 | A1 | 4/2006 | Cohen |
| 2006/0085477 | A1 | 4/2006 | Phillips |
| 2006/0124729 | A1 | 6/2006 | Martin |
| 2006/0129427 | A1 | 6/2006 | Wennberg |
| 2006/0163349 | A1 | 7/2006 | Neugebauer |
| 2006/0178918 | A1 | 8/2006 | Mikurak |
| 2006/0178986 | A1 | 8/2006 | Giordano |
| 2006/0178994 | A1 | 8/2006 | Stolfo |
| 2006/0190347 | A1 | 8/2006 | Cuervo |
| 2006/0195598 | A1 | 8/2006 | Fujita |
| 2006/0208060 | A1 | 9/2006 | Mendelevich |
| 2006/0212434 | A1 | 9/2006 | Crawford |
| 2006/0226216 | A1 | 10/2006 | Keithley |
| 2006/0235795 | A1 | 10/2006 | Johnson |
| 2006/0237528 | A1 | 10/2006 | Bishop |
| 2006/0247982 | A1 | 11/2006 | Stolfo |
| 2006/0277143 | A1 | 12/2006 | Almonte |
| 2006/0278704 | A1 | 12/2006 | Saunders |
| 2006/0282332 | A1 | 12/2006 | Pfleging |
| 2006/0293947 | A1 | 12/2006 | Nicholson |
| 2007/0011025 | A1 | 1/2007 | Cracchiolo |
| 2007/0016523 | A1 | 1/2007 | Blair |
| 2007/0022007 | A1 | 1/2007 | Lawe |
| 2007/0038515 | A1 | 2/2007 | Postrel |
| 2007/0038516 | A1 | 2/2007 | Apple |
| 2007/0055571 | A1 | 3/2007 | Fox |
| 2007/0067215 | A1 | 3/2007 | Agarwal |
| 2007/0087820 | A1 | 4/2007 | Van |
| 2007/0094066 | A1 | 4/2007 | Kumar |
| 2007/0100691 | A1 | 5/2007 | Patterson |
| 2007/0100728 | A1 | 5/2007 | Rotman |
| 2007/0106504 | A1 | 5/2007 | Deng |
| 2007/0106607 | A1 | 5/2007 | Seib |
| 2007/0106627 | A1 | 5/2007 | Srivastava |
| 2007/0107044 | A1 | 5/2007 | Yuen |
| 2007/0113289 | A1 | 5/2007 | Blumenau |
| 2007/0125840 | A1 | 6/2007 | Law |
| 2007/0129955 | A1 | 6/2007 | Dalmia |
| 2007/0136193 | A1 | 6/2007 | Starr |
| 2007/0136211 | A1 | 6/2007 | Brown |
| 2007/0143204 | A1 | 6/2007 | Claus |
| 2007/0150413 | A1 | 6/2007 | Morgenstern |
| 2007/0156726 | A1 | 7/2007 | Levy |
| 2007/0162350 | A1 | 7/2007 | Friedman |
| 2007/0170247 | A1 | 7/2007 | Friedman |
| 2007/0179885 | A1 | 8/2007 | Bird |
| 2007/0180119 | A1 | 8/2007 | Khivesara |
| 2007/0198435 | A1 | 8/2007 | Siegal |
| 2007/0198587 | A1 | 8/2007 | Kobayasfii |
| 2007/0208662 | A1 | 9/2007 | Jeronimus |
| 2007/0208671 | A1 | 9/2007 | Brown |
| 2007/0214078 | A1 | 9/2007 | Coppinger |
| 2007/0214250 | A1 | 9/2007 | Ahmed |
| 2007/0226152 | A1 | 9/2007 | Jones |
| 2007/0233590 | A1 | 10/2007 | Hardison |
| 2007/0233615 | A1 | 10/2007 | Tumminaro |
| 2007/0239502 | A1 | 10/2007 | Babu |
| 2007/0245414 | A1 | 10/2007 | Chan |
| 2007/0276765 | A1 | 11/2007 | Hazel |
| 2007/0288377 | A1 | 12/2007 | Shaked |
| 2007/0291995 | A1 | 12/2007 | Rivera |
| 2008/0004116 | A1 | 1/2008 | Van |
| 2008/0004952 | A1 | 1/2008 | Koli |

(56) References Cited

U.S. PATENT DOCUMENTS

| | | | |
|---|---|---|---|
| 2008/0010096 | A1 | 1/2008 | Patterson |
| 2008/0013335 | A1 | 1/2008 | Tsutsumi |
| 2008/0015988 | A1 | 1/2008 | Brown |
| 2008/0021829 | A1 | 1/2008 | Kranzley |
| 2008/0027218 | A1 | 1/2008 | Daugs |
| 2008/0027850 | A1 | 1/2008 | Brittan |
| 2008/0029607 | A1 | 2/2008 | Mullen |
| 2008/0035738 | A1 | 2/2008 | Mullen |
| 2008/0048022 | A1 | 2/2008 | Vawter |
| 2008/0052226 | A1 | 2/2008 | Agarwal |
| 2008/0054068 | A1 | 3/2008 | Mullen |
| 2008/0054079 | A1 | 3/2008 | Mullen |
| 2008/0054081 | A1 | 3/2008 | Mullen |
| 2008/0059370 | A1 | 3/2008 | Sada |
| 2008/0065554 | A1 | 3/2008 | Hogan |
| 2008/0065555 | A1 | 3/2008 | Mullen |
| 2008/0077489 | A1 | 3/2008 | Gilley |
| 2008/0082424 | A1 | 4/2008 | Walton |
| 2008/0086365 | A1 | 4/2008 | Zollino |
| 2008/0090513 | A1 | 4/2008 | Collins |
| 2008/0091553 | A1 | 4/2008 | Koski |
| 2008/0091616 | A1 | 4/2008 | Helwin |
| 2008/0097856 | A1 | 4/2008 | Blagg |
| 2008/0103795 | A1 | 5/2008 | Jakubowski |
| 2008/0114639 | A1 | 5/2008 | Meek |
| 2008/0114737 | A1 | 5/2008 | Neely |
| 2008/0126145 | A1 | 5/2008 | Racklet, III |
| 2008/0133351 | A1 | 6/2008 | White |
| 2008/0133403 | A1 | 6/2008 | Hamzeh |
| 2008/0140568 | A1 | 6/2008 | Henry |
| 2008/0140684 | A1 | 6/2008 | OReilly |
| 2008/0147883 | A1 | 6/2008 | Philyaw |
| 2008/0154623 | A1 | 6/2008 | Derker |
| 2008/0162361 | A1 | 7/2008 | Sklovsky |
| 2008/0167965 | A1 | 7/2008 | Von |
| 2008/0172274 | A1 | 7/2008 | Hurowitz |
| 2008/0172331 | A1 | 7/2008 | Graves |
| 2008/0177574 | A1 | 7/2008 | Marcos |
| 2008/0177672 | A1 | 7/2008 | Brunner |
| 2008/0201232 | A1 | 8/2008 | Walker |
| 2008/0201264 | A1 | 8/2008 | Brown |
| 2008/0201265 | A1 | 8/2008 | Hewton |
| 2008/0221945 | A1 | 9/2008 | Pace |
| 2008/0223918 | A1 | 9/2008 | Williams |
| 2008/0228646 | A1 | 9/2008 | Myers |
| 2008/0229217 | A1 | 9/2008 | Kembel |
| 2008/0235261 | A1 | 9/2008 | Malek |
| 2008/0024561 | A1 | 10/2008 | Fein |
| 2008/0243305 | A1 | 10/2008 | Lee |
| 2008/0243702 | A1 | 10/2008 | Hart |
| 2008/0245855 | A1 | 10/2008 | Fein |
| 2008/0245861 | A1 | 10/2008 | Fein |
| 2008/0270300 | A1 | 10/2008 | Jones |
| 2008/0272188 | A1 | 11/2008 | Keithley |
| 2008/0283591 | A1 | 11/2008 | Oder |
| 2008/0288376 | A1 | 11/2008 | Panthaki |
| 2008/0288889 | A1 | 11/2008 | Hunt |
| 2008/0300980 | A1 | 12/2008 | Benjamin |
| 2008/0301055 | A1 | 12/2008 | Borgs |
| 2008/0302869 | A1 | 12/2008 | Mullen |
| 2008/0302876 | A1 | 12/2008 | Mullen |
| 2008/0313264 | A1 | 12/2008 | Pestoni |
| 2008/0319905 | A1 | 12/2008 | Carlson |
| 2009/0006181 | A1 | 1/2009 | Ghosh |
| 2009/0006262 | A1 | 1/2009 | Brown |
| 2009/0010488 | A1 | 1/2009 | Matsuoka |
| 2009/0013266 | A1 | 1/2009 | Gandhi |
| 2009/0018895 | A1 | 1/2009 | Weinblatt |
| 2009/0024527 | A1 | 1/2009 | Sellen |
| 2009/0024636 | A1 | 1/2009 | Shiloh |
| 2009/0037255 | A1 | 2/2009 | Chiu |
| 2009/0037326 | A1 | 2/2009 | Chitti |
| 2009/0037333 | A1 | 2/2009 | Flitcroft |
| 2009/0037388 | A1 | 2/2009 | Cooper |
| 2009/0043702 | A1 | 2/2009 | Bennett |
| 2009/0048934 | A1 | 2/2009 | Haddad |
| 2009/0048971 | A1 | 2/2009 | Hathaway |
| 2009/0061884 | A1 | 3/2009 | Rajan |
| 2009/0063261 | A1 | 3/2009 | Scribner |
| 2009/0064056 | A1 | 3/2009 | Anderson |
| 2009/0076953 | A1 | 3/2009 | Saville |
| 2009/0076966 | A1 | 3/2009 | Bishop |
| 2009/0083065 | A1 | 3/2009 | Unland |
| 2009/0089176 | A1 | 4/2009 | Mccabe |
| 2009/0089193 | A1 | 4/2009 | Paintin |
| 2009/0104888 | A1 | 4/2009 | Cox |
| 2009/0106112 | A1 | 4/2009 | Dalmia |
| 2009/0106151 | A1 | 4/2009 | Nelsen |
| 2009/0106160 | A1 | 4/2009 | Skowronek |
| 2009/0106234 | A1 | 4/2009 | Siedlecki |
| 2009/0108080 | A1 | 4/2009 | Meyer |
| 2009/0112775 | A1 | 4/2009 | Chiulli |
| 2009/0119176 | A1 | 5/2009 | Johnson |
| 2009/0119190 | A1 | 5/2009 | Realini |
| 2009/0119211 | A1 | 5/2009 | Johnson |
| 2009/0125429 | A1 | 5/2009 | Takayama |
| 2009/0132347 | A1 | 5/2009 | Anderson |
| 2009/0132366 | A1 | 5/2009 | Lam |
| 2009/0132395 | A1 | 5/2009 | Lam |
| 2009/0134217 | A1 | 5/2009 | Flitcroft |
| 2009/0144104 | A1 | 6/2009 | Johnson |
| 2009/0144201 | A1 | 6/2009 | Gierkink |
| 2009/0157555 | A1 | 6/2009 | Biffle |
| 2009/0159673 | A1 | 6/2009 | Mullen |
| 2009/0159700 | A1 | 6/2009 | Mullen |
| 2009/0159707 | A1 | 6/2009 | Mullen |
| 2009/0164344 | A1 | 6/2009 | Shiftan |
| 2009/0170608 | A1 | 7/2009 | Herrmann |
| 2009/0171778 | A1 | 7/2009 | Powell |
| 2009/0173782 | A1 | 7/2009 | Muscato |
| 2009/0182664 | A1 | 7/2009 | Trombley |
| 2009/0187492 | A1 | 7/2009 | Hammad |
| 2009/0200371 | A1 | 8/2009 | Kean |
| 2009/0210300 | A1 | 8/2009 | Cansler |
| 2009/0216910 | A1 | 8/2009 | Duchesneau |
| 2009/0222347 | A1 | 9/2009 | Whitten |
| 2009/0228211 | A1 | 9/2009 | Rasanen |
| 2009/0233579 | A1 | 9/2009 | Castell |
| 2009/0234751 | A1 | 9/2009 | Chan |
| 2009/0240620 | A1 | 9/2009 | Kendrick |
| 2009/0241159 | A1 | 9/2009 | Campagna |
| 2009/0248583 | A1 | 10/2009 | Chhabra |
| 2009/0248738 | A1 | 10/2009 | Martinez |
| 2009/0254471 | A1 | 10/2009 | Seidel |
| 2009/0254479 | A1 | 10/2009 | Pharris |
| 2009/0254535 | A1 | 10/2009 | Eickelmann |
| 2009/0265274 | A1 | 10/2009 | Hahn-Carlson |
| 2009/0271246 | A1 | 10/2009 | Alvarez |
| 2009/0271265 | A1 | 10/2009 | Lay |
| 2009/0271635 | A1 | 10/2009 | Liu |
| 2009/0276347 | A1 | 11/2009 | Kargman |
| 2009/0281948 | A1 | 11/2009 | Carlson |
| 2009/0288012 | A1 | 11/2009 | Hertel |
| 2009/0294527 | A1 | 12/2009 | Brabson |
| 2009/0307060 | A1 | 12/2009 | Merz |
| 2009/0307135 | A1 | 12/2009 | Gupta |
| 2009/0307139 | A1 | 12/2009 | Mardikar |
| 2009/0308921 | A1 | 12/2009 | Mullen |
| 2009/0313132 | A1 | 12/2009 | McKenna |
| 2009/0319638 | A1 | 12/2009 | Faith |
| 2009/0327045 | A1 | 12/2009 | Olives |
| 2009/0327088 | A1 | 12/2009 | Puthupparambil |
| 2009/0327131 | A1 | 12/2009 | Beenau |
| 2010/0004989 | A1 | 1/2010 | Bonalle |
| 2010/0005025 | A1 | 1/2010 | Kumar |
| 2010/0008535 | A1 | 1/2010 | Abulafia |
| 2010/0009663 | A1 | 1/2010 | Chang |
| 2010/0010964 | A1 | 1/2010 | Skowronek |
| 2010/0012728 | A1 | 1/2010 | Rosset |
| 2010/0021149 | A1 | 1/2010 | Mulder |
| 2010/0023386 | A1 | 1/2010 | Avisar |
| 2010/0023455 | A1 | 1/2010 | Dispensa |
| 2010/0023457 | A1 | 1/2010 | Riviere |
| 2010/0036741 | A1 | 2/2010 | Cleven |

(56) References Cited

U.S. PATENT DOCUMENTS

| | | | |
|---|---|---|---|
| 2010/0036775 | A1 | 2/2010 | Edens |
| 2010/0036884 | A1 | 2/2010 | Brown |
| 2010/0042456 | A1 | 2/2010 | Stinchcombe |
| 2010/0042537 | A1 | 2/2010 | Smith |
| 2010/0042540 | A1 | 2/2010 | Graves |
| 2010/0049879 | A1 | 2/2010 | Leavitt |
| 2010/0057548 | A1 | 3/2010 | Edwards |
| 2010/0063903 | A1 | 3/2010 | Whipple |
| 2010/0070359 | A1 | 3/2010 | Heasley |
| 2010/0076873 | A1 | 3/2010 | Taylor |
| 2010/0076890 | A1 | 3/2010 | Low |
| 2010/0078471 | A1 | 4/2010 | Lin |
| 2010/0078472 | A1 | 4/2010 | Lin |
| 2010/0082444 | A1 | 4/2010 | Lin |
| 2010/0082445 | A1 | 4/2010 | Hodge |
| 2010/0082447 | A1 | 4/2010 | Lin |
| 2010/0082455 | A1 | 4/2010 | Rosenblatt |
| 2010/0082480 | A1 | 4/2010 | Korosec |
| 2010/0082481 | A1 | 4/2010 | Lin |
| 2010/0082485 | A1 | 4/2010 | Lin |
| 2010/0082490 | A1 | 4/2010 | Rosenblatt |
| 2010/0082491 | A1 | 4/2010 | Rosenblatt |
| 2010/0088188 | A1 | 4/2010 | Kumar |
| 2010/0088237 | A1 | 4/2010 | Wankmueller |
| 2010/0094730 | A1 | 4/2010 | Koski |
| 2010/0094755 | A1 | 4/2010 | Kloster |
| 2010/0094878 | A1 | 4/2010 | Soroca |
| 2010/0100480 | A1 | 4/2010 | Altman |
| 2010/0106602 | A1* | 4/2010 | Fuzell-Casey ..... G06Q 30/0261 705/14.58 |
| 2010/0106644 | A1 | 4/2010 | Annan |
| 2010/0114664 | A1 | 5/2010 | Jobin |
| 2010/0120408 | A1 | 5/2010 | Beenau |
| 2010/0121707 | A1 | 5/2010 | Goeldi |
| 2010/0125492 | A1 | 5/2010 | Lin |
| 2010/0125495 | A1 | 5/2010 | Smith |
| 2010/0125509 | A1 | 5/2010 | Kranzley |
| 2010/0125803 | A1 | 5/2010 | Johnson |
| 2010/0131347 | A1 | 5/2010 | Sarptipi |
| 2010/0131415 | A1 | 5/2010 | Sartipi |
| 2010/0133334 | A1 | 6/2010 | Vadhri |
| 2010/0133339 | A1 | 6/2010 | Gibson |
| 2010/0138026 | A1 | 6/2010 | Kaushal |
| 2010/0138347 | A1 | 6/2010 | Chen |
| 2010/0145860 | A1 | 6/2010 | Pelegero |
| 2010/0153865 | A1 | 6/2010 | Barnes |
| 2010/0155470 | A1 | 6/2010 | Woronec |
| 2010/0161433 | A1 | 6/2010 | White |
| 2010/0162126 | A1 | 6/2010 | Donaldson |
| 2010/0174599 | A1 | 7/2010 | Rosenblatt |
| 2010/0179855 | A1 | 7/2010 | Chen |
| 2010/0185505 | A1 | 7/2010 | Sprogoe |
| 2010/0185531 | A1 | 7/2010 | Van |
| 2010/0185545 | A1 | 7/2010 | Royyuru |
| 2010/0191578 | A1 | 7/2010 | Tran |
| 2010/0191622 | A1 | 7/2010 | Reiss |
| 2010/0191770 | A1 | 7/2010 | Cho |
| 2010/0198626 | A1 | 8/2010 | Cho |
| 2010/0211445 | A1 | 8/2010 | Bodington |
| 2010/0211452 | A1 | 8/2010 | D |
| 2010/0211469 | A1 | 8/2010 | Salmon |
| 2010/0211499 | A1 | 8/2010 | Zanzot |
| 2010/0211505 | A1 | 8/2010 | Saunders |
| 2010/0217613 | A1 | 8/2010 | Kelly |
| 2010/0217682 | A1 | 8/2010 | Chan |
| 2010/0223186 | A1 | 9/2010 | Hogan |
| 2010/0228668 | A1 | 9/2010 | Hogan |
| 2010/0235284 | A1 | 9/2010 | Moore |
| 2010/0243728 | A1 | 9/2010 | Wiesman |
| 2010/0250351 | A1 | 9/2010 | Gillenson |
| 2010/0256976 | A1 | 10/2010 | Atsmon |
| 2010/0258620 | A1 | 10/2010 | Torreyson |
| 2010/0268645 | A1 | 10/2010 | Martino |
| 2010/0276484 | A1 | 11/2010 | Banerjee |
| 2010/0287048 | A1 | 11/2010 | Ramer |
| 2010/0287229 | A1 | 11/2010 | Hauser |
| 2010/0291904 | A1 | 11/2010 | Musfeldt |
| 2010/0293032 | A1 | 11/2010 | Engelsma |
| 2010/0299267 | A1 | 11/2010 | Faith |
| 2010/0299292 | A1 | 11/2010 | Collazo |
| 2010/0305848 | A1 | 12/2010 | Stallman |
| 2010/0306075 | A1 | 12/2010 | Drance |
| 2010/0306076 | A1 | 12/2010 | Taveau |
| 2010/0306113 | A1 | 12/2010 | Grey |
| 2010/0312645 | A1 | 12/2010 | Niekadlik |
| 2010/0312676 | A1 | 12/2010 | Muthukumaran |
| 2010/0312724 | A1 | 12/2010 | Pinckney |
| 2010/0325041 | A1 | 12/2010 | Berardi |
| 2010/0332262 | A1 | 12/2010 | Horvitz |
| 2010/0332283 | A1 | 12/2010 | Ng |
| 2011/0004498 | A1 | 1/2011 | Readshaw |
| 2011/0010292 | A1 | 1/2011 | Giordano |
| 2011/0016047 | A1 | 1/2011 | Wu |
| 2011/0016320 | A1 | 1/2011 | Bergsten |
| 2011/0035273 | A1 | 2/2011 | Parikh |
| 2011/0040640 | A1 | 2/2011 | Erikson |
| 2011/0040655 | A1 | 2/2011 | Hendrickson |
| 2011/0047017 | A1 | 2/2011 | Lieblang |
| 2011/0047075 | A1 | 2/2011 | Fourez |
| 2011/0047076 | A1 | 2/2011 | Carlson |
| 2011/0078082 | A1 | 3/2011 | Gupta |
| 2011/0082789 | A1 | 4/2011 | Boyd |
| 2011/0083018 | A1 | 4/2011 | Kesanupalli |
| 2011/0087596 | A1 | 4/2011 | Dorsey |
| 2011/0087726 | A1 | 4/2011 | Shim |
| 2011/0093335 | A1 | 4/2011 | Fordyce |
| 2011/0093397 | A1 | 4/2011 | Carlson |
| 2011/0099057 | A1 | 4/2011 | Tenyer |
| 2011/0105183 | A1 | 5/2011 | Hsiao |
| 2011/0106698 | A1 | 5/2011 | Issacson |
| 2011/0109737 | A1 | 5/2011 | Aben |
| 2011/0119300 | A1 | 5/2011 | Marcade |
| 2011/0125597 | A1 | 5/2011 | Oder |
| 2011/0137740 | A1 | 6/2011 | Bhattacharya |
| 2011/0137742 | A1 | 6/2011 | Parikh |
| 2011/0153437 | A1 | 6/2011 | Archer |
| 2011/0153498 | A1 | 6/2011 | Makhotin |
| 2011/0154466 | A1 | 6/2011 | Harper |
| 2011/0161233 | A1 | 6/2011 | Tieken |
| 2011/0178896 | A1 | 7/2011 | Nakajima |
| 2011/0178926 | A1 | 7/2011 | Lindelsee |
| 2011/0180598 | A1 | 7/2011 | Morgan |
| 2011/0184827 | A1 | 7/2011 | Hubert |
| 2011/0191244 | A1 | 8/2011 | Dai |
| 2011/0208418 | A1 | 8/2011 | Looney |
| 2011/0215146 | A1 | 9/2011 | Shams |
| 2011/0218870 | A1 | 9/2011 | Shams |
| 2011/0221692 | A1 | 9/2011 | Seydoux |
| 2011/0238474 | A1 | 9/2011 | Carr |
| 2011/0238511 | A1 | 9/2011 | Park |
| 2011/0238573 | A1 | 9/2011 | Varadarajan |
| 2011/0246290 | A1 | 10/2011 | Howard |
| 2011/0246317 | A1 | 10/2011 | Coppinger |
| 2011/0251892 | A1 | 10/2011 | Laracey |
| 2011/0258049 | A1 | 10/2011 | Ramer |
| 2011/0258111 | A1 | 10/2011 | Raj |
| 2011/0258123 | A1 | 10/2011 | Dawkins |
| 2011/0270665 | A1 | 11/2011 | Kim |
| 2011/0272471 | A1 | 11/2011 | Mullen |
| 2011/0272478 | A1 | 11/2011 | Mullen |
| 2011/0276380 | A1 | 11/2011 | Mullen |
| 2011/0276381 | A1 | 11/2011 | Mullen |
| 2011/0276424 | A1 | 11/2011 | Mullen |
| 2011/0276425 | A1 | 11/2011 | Mullen |
| 2011/0282780 | A1 | 11/2011 | French |
| 2011/0288684 | A1 | 11/2011 | Farlow |
| 2011/0295745 | A1 | 12/2011 | White |
| 2011/0296508 | A1 | 12/2011 | Os |
| 2011/0302081 | A1 | 12/2011 | Saunders |
| 2011/0312423 | A1 | 12/2011 | Mosites |
| 2011/0320344 | A1 | 12/2011 | Faith |
| 2011/0320345 | A1 | 12/2011 | Taveau |
| 2012/0005026 | A1 | 1/2012 | Khan |
| 2012/0011009 | A1 | 1/2012 | Lindsey |

(56) References Cited

U.S. PATENT DOCUMENTS

| | | | |
|---|---|---|---|
| 2012/0011063 | A1 | 1/2012 | Killian |
| 2012/0016731 | A1 | 1/2012 | Smith |
| 2012/0022943 | A1 | 1/2012 | Howard |
| 2012/0023026 | A1 | 1/2012 | Chen |
| 2012/0023417 | A1 | 1/2012 | Nesladek |
| 2012/0023567 | A1 | 1/2012 | Hammad |
| 2012/0028609 | A1 | 2/2012 | Hruska |
| 2012/0030047 | A1 | 2/2012 | Fuentes |
| 2012/0030101 | A1 | 2/2012 | Boyd |
| 2012/0035998 | A1 | 2/2012 | Chien |
| 2012/0036071 | A1 | 2/2012 | Fulton |
| 2012/0041881 | A1 | 2/2012 | Basu |
| 2012/0047237 | A1 | 2/2012 | Arvidsson |
| 2012/0066065 | A1 | 3/2012 | Switzer |
| 2012/0066078 | A1 | 3/2012 | Kingston |
| 2012/0072311 | A1 | 3/2012 | Khan |
| 2012/0072350 | A1 | 3/2012 | Goldthwaite |
| 2012/0078735 | A1 | 3/2012 | Bauer |
| 2012/0078798 | A1 | 3/2012 | Downing |
| 2012/0078799 | A1 | 3/2012 | Jackson |
| 2012/0084132 | A1 | 4/2012 | Khan |
| 2012/0084204 | A1 | 4/2012 | Castell |
| 2012/0095852 | A1 | 4/2012 | Bauer |
| 2012/0095865 | A1 | 4/2012 | Doherty |
| 2012/0095895 | A1 | 4/2012 | Aston |
| 2012/0101881 | A1 | 4/2012 | Taylor |
| 2012/0110044 | A1 | 5/2012 | Nagpal |
| 2012/0116902 | A1 | 5/2012 | Cardina |
| 2012/0116966 | A1 | 5/2012 | Tan |
| 2012/0118950 | A1 | 5/2012 | Belk |
| 2012/0123838 | A1 | 5/2012 | Sparks |
| 2012/0123882 | A1 | 5/2012 | Carlson |
| 2012/0123924 | A1 | 5/2012 | Rose |
| 2012/0123940 | A1 | 5/2012 | Killian |
| 2012/0124496 | A1 | 5/2012 | Rose |
| 2012/0129514 | A1 | 5/2012 | Beenau |
| 2012/0130794 | A1 | 5/2012 | Strieder |
| 2012/0136780 | A1 | 5/2012 | El-Awady |
| 2012/0143706 | A1 | 6/2012 | Crake |
| 2012/0143767 | A1 | 6/2012 | Abadir |
| 2012/0143772 | A1 | 6/2012 | Abadir |
| 2012/0150750 | A1 | 6/2012 | Law |
| 2012/0158580 | A1 | 6/2012 | Eram |
| 2012/0158589 | A1 | 6/2012 | Katzin |
| 2012/0158593 | A1 | 6/2012 | Garfinkle |
| 2012/0158792 | A1 | 6/2012 | MacLaurin |
| 2012/0158893 | A1 | 6/2012 | Boyns |
| 2012/0159163 | A1 | 6/2012 | von Behren |
| 2012/0165978 | A1 | 6/2012 | Li |
| 2012/0166333 | A1 | 6/2012 | von Behren |
| 2012/0166655 | A1 | 6/2012 | Maddali |
| 2012/0173431 | A1 | 7/2012 | Ritchie |
| 2012/0173962 | A1 | 7/2012 | Oh |
| 2012/0185386 | A1 | 7/2012 | Salama |
| 2012/0190386 | A1 | 7/2012 | Anderson |
| 2012/0197691 | A1 | 8/2012 | Grigg |
| 2012/0197794 | A1 | 8/2012 | Grigg |
| 2012/0197807 | A1 | 8/2012 | Schlesser |
| 2012/0203662 | A1 | 8/2012 | Morgan |
| 2012/0203664 | A1 | 8/2012 | Torossian |
| 2012/0203665 | A1 | 8/2012 | Morgan |
| 2012/0203666 | A1 | 8/2012 | Torossian |
| 2012/0203673 | A1 | 8/2012 | Morgan |
| 2012/0209735 | A1 | 8/2012 | Subramanian |
| 2012/0209749 | A1 | 8/2012 | Hammad |
| 2012/0209773 | A1 | 8/2012 | Ranganathan |
| 2012/0215640 | A1 | 8/2012 | Ramer |
| 2012/0215648 | A1 | 8/2012 | Rose |
| 2012/0215650 | A1 | 8/2012 | Oba |
| 2012/0215684 | A1 | 8/2012 | Kidron |
| 2012/0215688 | A1 | 8/2012 | Musser |
| 2012/0215696 | A1 | 8/2012 | Salonen |
| 2012/0221421 | A1 | 8/2012 | Hammad |
| 2012/0221502 | A1 | 8/2012 | Jerram |
| 2012/0226582 | A1 | 9/2012 | Hammad |
| 2012/0231844 | A1 | 9/2012 | Coppinger |
| 2012/0233004 | A1 | 9/2012 | Bercaw |
| 2012/0233170 | A1 | 9/2012 | Musgrove |
| 2012/0239417 | A1 | 9/2012 | Pourfallah |
| 2012/0239556 | A1 | 9/2012 | Magruder |
| 2012/0239560 | A1 | 9/2012 | Pourfallah |
| 2012/0246070 | A1 | 9/2012 | Vadhri |
| 2012/0246071 | A1 | 9/2012 | Jain |
| 2012/0246079 | A1 | 9/2012 | Wilson |
| 2012/0254108 | A1 | 10/2012 | Wedewer |
| 2012/0259763 | A1 | 10/2012 | Pessin |
| 2012/0265631 | A1 | 10/2012 | Cronic |
| 2012/0265685 | A1 | 10/2012 | Brudnicki |
| 2012/0271770 | A1 | 10/2012 | Harris |
| 2012/0284035 | A1 | 11/2012 | Gillin |
| 2012/0290472 | A1 | 11/2012 | Mullen |
| 2012/0297446 | A1 | 11/2012 | Webb |
| 2012/0300932 | A1 | 11/2012 | Cambridge |
| 2012/0303425 | A1 | 11/2012 | Katzin |
| 2012/0303503 | A1 | 11/2012 | Cambridge |
| 2012/0303736 | A1 | 11/2012 | Novotny |
| 2012/0303961 | A1 | 11/2012 | Kean |
| 2012/0304273 | A1 | 11/2012 | Bailey |
| 2012/0310725 | A1 | 12/2012 | Chien |
| 2012/0310826 | A1 | 12/2012 | Chatterjee |
| 2012/0310831 | A1 | 12/2012 | Harris |
| 2012/0316992 | A1 | 12/2012 | Oborne |
| 2012/0317035 | A1 | 12/2012 | Royyuru |
| 2012/0317036 | A1 | 12/2012 | Bower |
| 2012/0317149 | A1 | 12/2012 | Jagota |
| 2012/0323664 | A1 | 12/2012 | Klems |
| 2012/0330874 | A1 | 12/2012 | Jerram |
| 2013/0013499 | A1 | 1/2013 | Kalgi |
| 2013/0017784 | A1 | 1/2013 | Fisher |
| 2013/0018757 | A1 | 1/2013 | Anderson |
| 2013/0019098 | A1 | 1/2013 | Gupta |
| 2013/0024364 | A1 | 1/2013 | Shrivastava |
| 2013/0024371 | A1 | 1/2013 | Hariramani |
| 2013/0024916 | A1 | 1/2013 | Evans |
| 2013/0030828 | A1 | 1/2013 | Pourfallah |
| 2013/0030964 | A1 | 1/2013 | Nuzzi |
| 2013/0031006 | A1 | 1/2013 | McCullagh |
| 2013/0054337 | A1 | 2/2013 | Brendell |
| 2013/0054466 | A1 | 2/2013 | Muscato |
| 2013/0054470 | A1 | 2/2013 | Campos |
| 2013/0054474 | A1 | 2/2013 | Yeager |
| 2013/0080238 | A1 | 3/2013 | Kelly |
| 2013/0081122 | A1 | 3/2013 | Svigals |
| 2013/0085877 | A1 | 4/2013 | Ruehrig |
| 2013/0090750 | A1 | 4/2013 | Herrman |
| 2013/0091028 | A1 | 4/2013 | Oder |
| 2013/0103574 | A1 | 4/2013 | Conrad |
| 2013/0110658 | A1 | 5/2013 | Lyman |
| 2013/0110678 | A1 | 5/2013 | Vigier |
| 2013/0111599 | A1 | 5/2013 | Gargiulo |
| 2013/0117170 | A1 | 5/2013 | Coppinger |
| 2013/0117185 | A1 | 5/2013 | Collison |
| 2013/0124290 | A1 | 5/2013 | Fisher |
| 2013/0124291 | A1 | 5/2013 | Fisher |
| 2013/0124364 | A1 | 5/2013 | Mittal |
| 2013/0138525 | A1 | 5/2013 | Bercaw |
| 2013/0144785 | A1 | 6/2013 | Karpenko |
| 2013/0144888 | A1 | 6/2013 | Faith |
| 2013/0144957 | A1 | 6/2013 | Sherman |
| 2013/0145148 | A1 | 6/2013 | Shablygin |
| 2013/0145172 | A1 | 6/2013 | Shablygin |
| 2013/0151417 | A1 | 6/2013 | Gupta |
| 2013/0159081 | A1 | 6/2013 | Shastry |
| 2013/0159112 | A1 | 6/2013 | Schultz |
| 2013/0159178 | A1 | 6/2013 | Colon |
| 2013/0159184 | A1 | 6/2013 | Thaw |
| 2013/0159196 | A1 | 6/2013 | Dizoglio |
| 2013/0166332 | A1 | 6/2013 | Hammad |
| 2013/0166402 | A1 | 6/2013 | Parento |
| 2013/0166456 | A1 | 6/2013 | Zhang |
| 2013/0166621 | A1 | 6/2013 | Zhu |
| 2013/0173404 | A1 | 7/2013 | Scipioni |
| 2013/0173736 | A1 | 7/2013 | Krzeminski |
| 2013/0179340 | A1 | 7/2013 | Alba |

(56) References Cited

U.S. PATENT DOCUMENTS

2013/0185202 A1 7/2013 Goldthwaite
2013/0191286 A1 7/2013 Cronic
2013/0191289 A1 7/2013 Cronic
2013/0198071 A1 8/2013 Jurss
2013/0198080 A1 8/2013 Anderson
2013/0200146 A1 8/2013 Moghadam
2013/0204776 A1 8/2013 King
2013/0204787 A1 8/2013 Dubois
2013/0204793 A1 8/2013 Kerridge
2013/0212007 A1 8/2013 Mattsson
2013/0212017 A1 8/2013 Bangia
2013/0212019 A1 8/2013 Mattsson
2013/0212024 A1 8/2013 Mattsson
2013/0212026 A1 8/2013 Powell
2013/0212666 A1 8/2013 Mattsson
2013/0218640 A1 8/2013 Kidder
2013/0218657 A1 8/2013 Salmon
2013/0218698 A1 8/2013 Moon
2013/0218721 A1 8/2013 Borhan
2013/0218765 A1 8/2013 Hammad
2013/0218769 A1 8/2013 Pourfallah
2013/0226799 A1 8/2013 Raj
2013/0226813 A1 8/2013 Voltz
2013/0246199 A1 9/2013 Carlson
2013/0246202 A1 9/2013 Tobin
2013/0246203 A1 9/2013 Laracey
2013/0246258 A1 9/2013 Dessert
2013/0246259 A1 9/2013 Dessert
2013/0246267 A1 9/2013 Tobin
2013/0254028 A1 9/2013 Salci
2013/0254052 A1 9/2013 Royyuru
2013/0254102 A1 9/2013 Royyuru
2013/0254117 A1 9/2013 von Mueller
2013/0262296 A1 10/2013 Thomas
2013/0262302 A1 10/2013 Lettow
2013/0262315 A1 10/2013 Hruska
2013/0262316 A1 10/2013 Hruska
2013/0262317 A1 10/2013 Collinge
2013/0268437 A1 10/2013 Desai
2013/0275300 A1 10/2013 Killian
2013/0275307 A1 10/2013 Khan
2013/0275308 A1 10/2013 Paraskeva
2013/0282502 A1 10/2013 Jooste
2013/0282575 A1 10/2013 Mullen
2013/0282588 A1 10/2013 Hruska
2013/0297501 A1 11/2013 Monk
2013/0297504 A1 11/2013 Nwokolo
2013/0297508 A1 11/2013 Belamant
2013/0304649 A1 11/2013 Cronic
2013/0308778 A1 11/2013 Fosmark
2013/0311382 A1 11/2013 Fosmark
2013/0317982 A1 11/2013 Mengerink
2013/0325579 A1 12/2013 Salmon
2013/0332344 A1 12/2013 Weber
2013/0339240 A1 12/2013 Anderson
2013/0339253 A1 12/2013 Sincai
2013/0346302 A1 12/2013 Purves
2013/0346305 A1 12/2013 Mendes
2013/0346314 A1 12/2013 Mogollon
2014/0006195 A1 1/2014 Wilson
2014/0006198 A1 1/2014 Daly
2014/0006277 A1 1/2014 Rao
2014/0006283 A1 1/2014 Hogg
2014/0007213 A1 1/2014 Sanin
2014/0013106 A1 1/2014 Red path
2014/0013114 A1 1/2014 Red path
2014/0013452 A1 1/2014 Aissi
2014/0019352 A1 1/2014 Shrivastava
2014/0020068 A1 1/2014 Desai
2014/0025581 A1 1/2014 Caiman
2014/0025585 A1 1/2014 Caiman
2014/0025958 A1 1/2014 Caiman
2014/0032417 A1 1/2014 Mattsson
2014/0032418 A1 1/2014 Weber
2014/0040001 A1 2/2014 Harvey
2014/0040127 A1 2/2014 Chatterjee
2014/0040137 A1 2/2014 Carlson
2014/0040139 A1 2/2014 Brudnicki
2014/0040144 A1 2/2014 Plomske
2014/0040145 A1 2/2014 Ozvat
2014/0040148 A1 2/2014 Ozvat
2014/0040628 A1 2/2014 Fort
2014/0041018 A1 2/2014 Bomar
2014/0046853 A1 2/2014 Spies
2014/0047517 A1 2/2014 Ding
2014/0047551 A1 2/2014 Nagasundaram
2014/0052532 A1 2/2014 Tsai
2014/0052620 A1 2/2014 Rogers
2014/0052637 A1 2/2014 Jooste
2014/0068706 A1 3/2014 Aissi
2014/0074637 A1 3/2014 Hammad
2014/0095589 A1 4/2014 Johnson
2014/0108172 A1 4/2014 Weber
2014/0108197 A1 4/2014 Smith
2014/0114857 A1 4/2014 Griggs
2014/0136945 A1 5/2014 Ligman
2014/0143137 A1 5/2014 Carlson
2014/0164176 A1 * 6/2014 Kitlyar ............... G06Q 30/0633
705/26.8
2014/0164243 A1 6/2014 Aabye
2014/0188586 A1 7/2014 Carpenter
2014/0294701 A1 10/2014 Dai
2014/0297534 A1 10/2014 Patterson
2014/0310080 A1 10/2014 Salmon
2014/0310183 A1 10/2014 Weber
2014/0330721 A1 11/2014 Wang
2014/0330722 A1 11/2014 Laxminarayanan
2014/0331265 A1 11/2014 Mozell
2014/0337175 A1 11/2014 Katzin
2014/0337236 A1 11/2014 Wong
2014/0344153 A1 11/2014 Raj
2014/0365295 A1 12/2014 Postrel
2014/0372308 A1 12/2014 Sheets
2015/0019443 A1 1/2015 Sheets
2015/0019944 A1 1/2015 Kalgi
2015/0026049 A1 1/2015 Theurer
2015/0032625 A1 1/2015 Dill
2015/0032626 A1 1/2015 Dill
2015/0032627 A1 1/2015 Dill
2015/0046338 A1 2/2015 Laxminarayanan
2015/0046339 A1 2/2015 Wong
2015/0052064 A1 2/2015 Karpenko
2015/0088756 A1 3/2015 Makhotin
2015/0089350 A1 3/2015 Davis
2015/0106239 A1 4/2015 Gaddam
2015/0112870 A1 4/2015 Nagasundaram
2015/0112871 A1 4/2015 Kumnick
2015/0120472 A1 4/2015 Aabye
2015/0127529 A1 5/2015 Makhotin
2015/0127547 A1 5/2015 Powell
2015/0140960 A1 5/2015 Powell
2015/0142673 A1 5/2015 Nelsen
2015/0154588 A1 6/2015 Purves
2015/0161597 A1 6/2015 Subramanian
2015/0178724 A1 6/2015 Ngo
2015/0180836 A1 6/2015 Wong
2015/0186864 A1 7/2015 Jones
2015/0193222 A1 7/2015 Pirzadeh
2015/0195133 A1 7/2015 Sheets
2015/0199679 A1 7/2015 Palanisamy
2015/0199689 A1 7/2015 Kumnick
2015/0220917 A1 8/2015 Aabye
2015/0248664 A1 9/2015 Makhdumi
2015/0269566 A1 9/2015 Gaddam
2015/0302453 A1 10/2015 Tietzen
2015/0312038 A1 10/2015 Palanisamy
2015/0319158 A1 11/2015 Kumnick
2015/0332262 A1 11/2015 Lingappa
2015/0339767 A1 11/2015 Chen
2015/0356560 A1 12/2015 Shastry
2016/0028550 A1 1/2016 Gaddam
2016/0042263 A1 2/2016 Gaddam
2016/0065370 A1 3/2016 Le Saint
2016/0092696 A1 3/2016 Guglani

(56) References Cited

U.S. PATENT DOCUMENTS

| | | | |
|---|---|---|---|
| 2016/0092872 A1 | 3/2016 | Prakash | |
| 2016/0103675 A1 | 4/2016 | Aabye | |
| 2016/0119296 A1 | 4/2016 | Laxminarayanan | |
| 2016/0224976 A1 | 8/2016 | Basu | |
| 2016/0283941 A1 | 9/2016 | Andrade | |
| 2016/0291920 A1 | 10/2016 | Sirpal | |
| 2016/0379192 A1 | 12/2016 | Purves | |
| 2017/0046696 A1 | 2/2017 | Powell | |
| 2017/0103387 A1 | 4/2017 | Weber | |
| 2017/0134479 A1 | 5/2017 | Kalgi | |
| 2017/0220818 A1 | 8/2017 | Nagasundaram | |
| 2017/0228723 A1 | 8/2017 | Taylor | |
| 2017/0235848 A1 | 8/2017 | Van Dusen | |
| 2017/0300314 A1 | 10/2017 | Lopyrev | |
| 2017/0346876 A1 | 11/2017 | Lim | |
| 2018/0075081 A1 | 3/2018 | Chipman | |
| 2018/0108008 A1 | 4/2018 | Chumbley | |
| 2019/0188719 A1 | 6/2019 | Das | |
| 2019/0266604 A1 | 8/2019 | Desai | |
| 2019/0385146 A1 | 12/2019 | Priest | |
| 2020/0013051 A1 | 1/2020 | Kadiwala | |
| 2021/0084024 A1 | 3/2021 | Sadayoshi | |

FOREIGN PATENT DOCUMENTS

| | | | |
|---|---|---|---|
| CN | 1928907 | A | 3/2007 |
| CN | 101025806 | A | 8/2007 |
| CN | 101075316 | A | 11/2007 |
| CN | 101231727 | A | 7/2008 |
| CN | 101334876 | A | 12/2008 |
| CN | 101388125 | A | 3/2009 |
| CN | 101719255 | A | 6/2010 |
| CN | 101840550 | A | 9/2010 |
| CN | 101924690 | A | 12/2010 |
| CN | 101945127 | A | 1/2011 |
| CN | 101958025 | A | 1/2011 |
| CN | 102143290 | A | 8/2011 |
| CN | 102779304 | | 11/2012 |
| CN | 102947847 | | 2/2013 |
| CN | 103635920 | | 3/2014 |
| CN | 105027153 | | 11/2015 |
| EP | 0745961 | A2 | 12/1996 |
| EP | 0855659 | A1 | 7/1998 |
| EP | 1921578 | A1 | 5/2008 |
| EP | 2156397 | A1 | 2/2010 |
| EP | 2503496 | | 9/2012 |
| JP | 2001344544 | A | 12/2001 |
| JP | 2005004621 | A | 1/2005 |
| JP | 2007328549 | | 12/2007 |
| JP | 2008527495 | A | 7/2008 |
| JP | 200854521 | | 12/2008 |
| JP | 2009151730 | A | 7/2009 |
| JP | 2009176259 | | 8/2009 |
| JP | 2011186660 | A | 9/2011 |
| JP | 2012027824 | A | 2/2012 |
| KR | 20000058839 | A | 10/2000 |
| KR | 20010055426 | | 7/2001 |
| KR | 100432430 | B1 | 5/2004 |
| KR | 20060117177 | A | 11/2006 |
| KR | 20070104087 | A | 10/2007 |
| SG | 2013069539 | | 10/2013 |
| WO | 2000046769 | A1 | 8/2000 |
| WO | 2001035304 | A1 | 5/2001 |
| WO | 0165502 | A2 | 9/2001 |
| WO | 2003001866 | A1 | 1/2003 |
| WO | 03023674 | A1 | 3/2003 |
| WO | 2003046697 | A2 | 6/2003 |
| WO | 2003071386 | A2 | 8/2003 |
| WO | 2003083737 | A1 | 10/2003 |
| WO | 2004042536 | A2 | 5/2004 |
| WO | 2005079254 | A2 | 9/2005 |
| WO | 2006113834 | A2 | 10/2006 |
| WO | 2009032523 | A1 | 3/2009 |
| WO | 2010078522 | A1 | 7/2010 |
| WO | 2010148704 | A1 | 12/2010 |
| WO | 2010148737 | A1 | 12/2010 |
| WO | 2012068078 | A2 | 5/2012 |
| WO | 2012098556 | A1 | 7/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |
| WO | 201505136 | | 1/2015 |

OTHER PUBLICATIONS

Office Action dated Dec. 12, 2019 for U.S. Appl. No. 14/935,122 (pp. 1-12).

Vitt, Elizabeth et al. Data Integration Solutions for Master Data Management (Feb. 2006). https://technet.microsoft.com/en-us/library/aa964123(v=sql.90).aspx (19 pages).

Vitt, Elizabeth, et al. "Microsoft SQL Server 2005 Analysis Services Performance Guide." White Paper, White Paper (2007). (116 pages).

U.S. Appl. No. 12/940,664 (unpublished), entitled "System and Method for Determining Transaction Distance" filed Nov. 5, 2010. (51 pages).

European Patent Office, Supplementary European Search Report and European Search Opinion, in EP Application No. 12749451.6, dated Apr. 20, 2015, 7 pages.

International Search Report and Written Opinion for PCT/US13/46875, dated Oct. 24, 2013, 14 pages.

IP Australia, Patent Examination Report No. 1, Australian Application No. 2012220669, dated Sep. 8, 2014, 6 pages.

IP Australia, Patent Examination Report No. 2, Australian Application No. 2012220669, dated Jun. 8, 2016, 4 pages.

Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.

State Intellectual Property of the People's Republic of China, First Office Action in Chinese Application No. 201280019629.X, dated Aug. 1, 2016, 15 pages.

David Breitkopf, "ACS to Take Over Mich. WC Distribution Program", American Banker, New York, NY: Jul. 20, 2006, vol. 171. Issue 138, p. 6.

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?arnumber=5369384, pp. 449-452.

International Search Report for PCT/US09/54921 dated Oct. 21, 2009. (2 pages).

International Search Report and Written Opinion for PCT/US2010/048344 dated Nov. 15, 2010. (7 pages).

International Search Report and Written Opinion for PCT/US2010/041860 dated Feb. 1, 2011. (8 pages).

International Search Report for PCT/US11/49393 dated Dec. 5, 2011. (2 pages).

International Search Report and Written Opinion for PCT/US11/57179 dated Jan. 5, 2012. (7 pages).

International Search Report and Written Opinion for PCT/US11/57173 dated Mar. 15, 2012. (11 pages).

International Search Report and Written Opinion for PCT/US2012/026205, dated May 29, 2012. 2 pages.

International Search Report for PCT/US11/65305 dated Apr. 16, 2012. 2 pages.

International Search Report for PCT/US12/23856 dated Jun. 6, 2012. 3 pages.

International Search Report and Written Opinion for PCT/US2012/027043 dated Jul. 13, 2012. 15 pages.

(56) References Cited

OTHER PUBLICATIONS

International Search Report for PCT/US12/24772 dated Jul. 24, 2012. 3 pages.
International Search Report for PCT/US12/25530 dated Aug. 7, 2012. 4 pages.
International Search Report PCT/US12/27620 dated Aug. 10, 2012. 3 pages.
International Search Report and Written Opinion for PCT/US12/41437 dated Aug. 24, 2012. (20 pages).
International Search Report and Written Opinion for PCT/US12/37597 dated Sep. 21, 2012 (11 pages).
International Search Report for PCT/US12/39638 dated Sep. 24, 2012. 4 pages.
International Search Report for PCT/US12/45875 dated Nov. 16, 2012. 4 pages.
International Search Report and Written Opinion for PCT/US12/47092 dated Nov. 26, 2012. 11 pages.
International Search Report for PCT/US12/57577 dated Nov. 29, 2012. 2 pages.
International Search Report and Written Opinion for PCT/US12/57528 dated Dec. 17, 2012. 8 pages.
International Search Report and Written Opinion for PCT/US12/66898 dated Feb. 11, 2013. 14 pages.
International Search Report and Written Opinion for PCT/US12/56759 dated Feb. 25, 2013. 12 pages.
International Search Report and Written Opinion for PCT/US2013/020411 dated May 21, 2013. 18 pages.
International Search Report and Written Opinion for PCT/US2013/024538, dated May 31, 2013. 15 pages.
Written Opinion for PCT/US12/27620 dated Aug. 10, 2012. 5 pages.
International Search Report and Written Opinion for PCT/US2010/033861 dated Dec. 9, 2010 (7 pages).
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2010/046833 dated Apr. 26, 2011 (8 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report for PCT/US2011/035268 dated Aug. 5, 2011 (3 pages).
International Search Report and Written Opinion for PCT/US2011/032093 dated Aug. 24, 2011 (11 pages).
International Search Report and Written Opinion for PCT/US2012/045601 dated Feb. 1, 2013. 11 pages.
International Search Report and Written Opinion for PCT/US12/65738 dated Apr. 19, 2013. 9 pages.
Australian Patent Office, Patent Examination Report No. 2 in Australian Patent Application No. 2012217606, dated Jun. 15, 2016, 6 pages.
Dizaj, Mohammad Vahid Alizadeh, Moghaddam, Rexa Askari, Momenebellah, Samad, New Mobile Payment Protocol: Mobile Pay Center Protocol 2 (MPCP2) By Using New Key Agreement Protocol: VAM, 3d International Conference on Electronics Computer Technology, vol. 2, Apr. 2011, pp. 12-18.
State Intellectual Property Office of the People's Republic of China, First Office Action in Chinese Application No. 201280018719.7, dated Jul. 4, 2016, 15 pages.
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
International Search Report and Written Opinion for PCT/US2014/030517, dated Aug. 18, 2014. (9 pages).
Smartphone e-payment and Google AD send blog, 'Google Wallet on Smartphone', <http://stockpedia.blogspot.kr/2011/06/google-wallet.html> Jun. 10, 2011, pp. 1-3.
Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
International Search Report and Writtten Opinion for PCT/US2011/039178 dated Sep. 16, 2011 (7 pages).
International Search Report and Written Opinion for PCT/US11/57180 dated Mar. 15, 2012 (11 pages).
International Search Report and Written Opinion for PCT/US12/55636 dated Nov. 30, 2012. 2 pages.
International Preliminary Report on Patentability dated Jan. 14, 2014 cited in related/corresponding International PCT Appl. No. PCT/US2012/045875 filed Jul. 7, 2012. (11 pages).
Stack Exchange, Why aren't there automated translators from one programming language to another, 2010 (5 pages).
McCarney et al., "Tapas: Design, Implementation, and Usability Evaluation of a Password Manager," Copyright 2012, ACM 978 1-4503-1312-4/12/12 (10 pages).
International Search Report for PCT/US2010/033229 dated Dec. 29, 2010, 8 pages.
International Search Report for PCT/US12/21000 dated May 15, 2012. 2 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
International Search Report and Written Opinion for PCT/US2010/033229 dated Dec. 29, 2010. (8 pages).
International Search Report and Written Opinion for PCT/US2012/069557 dated Feb. 22, 2013. 8 pages.
International Search Report and Written Opinion for PCT/US2012/057528, dated May 29, 2012. (8 pages).
International Search Report and Written Opinion issued in connection with PCT/US11/42062 dated Sep. 29, 2011 (8 pages).
International Search Report and Written Opinion for PCT/US2013/031084, dated Jun. 4, 2013. 9 pages.
ShopSavvy Blog. Feb. 2012. Retrieved from https://web.archive.Org/web/20120212104611/http://shopsavvy.com/blog. pp. 1-13 (Year: 2012).
International Preliminary Report on Patentability dated Jan. 16, 2014 in related/corresponding PCT Patent Appl. No. PCT/US2012/045601 filed Jul. 5, 2012. (7 pages).
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Office Action dated Feb. 28, 2018 for U.S. Appl. No. 14/242,403 (pp. 1-11).
Office Action dated Apr. 12, 2018 for U.S. Appl. No. 13/520,481 (pp. 1-8).
Australian Examination Report for AU2017203295 dated Apr. 19, 2018, 4 pages.
Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Office Action dated May 22, 2018 for U.S. Appl. No. 14/216,382 (pp. 1-8).
Chinese Office Action dated Oct. 10, 2017 for CN Application No. 201280019629.X, 7 pages.

(56) References Cited

OTHER PUBLICATIONS

Pan Kexian "Development of the Location-Based Service LBS Application of Intelligent Mobile Phone", Information Technologies, Oct. 25, 2009, pp. 134-137, cited on Oct. 10, 2017 in CN201280019629.
Yang Jingjing "Help Web: Life Search Forerunner" Scientific and Technological Information, Aug. 5, 2010, pp. 36-37, cited on Oct. 10, 2017 in CN201280019629.
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Chinese Office Action dated Nov. 6, 2017 for CN Application No. 201280018719.7, 24 pages.
Charland et al., Mobile Application Development: Web vs. Native, Apr. 2011, 9 pages.
Lee et al., osgGap: scene graph library for mobile based on hybrid web app framework, Nov. 2013, 4 pages.
Immaneni et al., Hybrid retrieval from the unified web, Mar. 2007, 5 pages.
Gao et al., "A 2D Barcode-Based Mobile Payment System", (2009), XP031561633 (10 pages).
Office Action dated Jun. 22, 2018 for U.S. Appl. No. 13/629,006 (pp. 1-8).
Office Action dated Jun. 21, 2018 for U.S. Appl. No. 14/216,351 (pp. 1-12).
Office Action dated Jun. 27, 2018 for U.S. Appl. No. 15/717,409 (pp. 1-7).
Office Action dated Jul. 16, 2018 for U.S. Appl. No. 14/698,317 (pp. 1-13).
I. Malavolta, Web-based hybrid mobile apps: state of the practice and research opportunities, 2 pages (Year: 2016).
Office Action dated Oct. 4, 2018 for U.S. Appl. No. 13/758,472 (pp. 1-22).
Office Action dated Sep. 21, 2018 for U.S. Appl. No. 15/839,493 (pp. 1-21).
Brick-and-mortar retailers snatching customers away from E-tailers. (Feb. 16, 2012). PR Newswire Retrieved from https://dialog.proguest.com/professional/docview/1346330115?accountid=142257 (Year: 2012) 3 pages.
Office Action dated Nov. 2, 2018 for U.S. Appl. No. 13/624,779 (pp. 1-18).
Office Action dated Dec. 3, 2018 for U.S. Appl. No. 14/935,122 (pp. 1-13).
Office Action dated Dec. 27, 2018 for U.S. Appl. No. 13/398,817 (pp. 1-10).
Office Action dated Jan. 17, 2019 for U.S. Appl. No. 14/216,382 (pp. 1-7).
Win Anyu, "A cluster based routing relay node selection algorithm", 2010 Asia-Pacific Conference on Information Network and Digital Content Security (2010APCID), (Dec. 31, 2010).
Jiang Hao, "Research on the discovery mechanism of relay node in the middle of the peer network", the full-text database of excellent Master's degree thesis in China, (May 15, 2009).
Xing Chang-you and Chen Ming; "Network distance prediction technology", Journal of Software , (Sep. 30, 2009), vol. 20, No. 9, p. 2470-2482 http://www.jos.org.cn/josen/ch/reader/view_abstract.aspx?flag=1&file_no=3559&journal_id=jos.
Chinese Office Action (with English language translation) dated Jan. 30, 2019 for Application No. 201280019629.X, 10 pages.
Chinese Office Action (with English language translation) for Application No. 201480023694.9 dated Dec. 3, 2018, 17 pages.
Office Action dated Mar. 1, 2019 for U.S. Appl. No. 14/698,317 (pp. 1-11).
Chinese Office Action (with English language translation) for Application No. 201480023694.9, dated Jun. 26, 2019, 7 pages.
Office Action dated Jul. 10, 2019 for U.S. Appl. No. 13/398,817 (pp. 1-8).
Office Action dated Jun. 27, 2019 for U.S. Appl. No. 13/629,006 (pp. 1-7).
Chinese Office Action (with English language translation) for Application No. CN201480023694.9, dated Jan. 21, 2020, 12 pages.
Chinese Office Action (with English language translation) for Application No. CN201710037081.6, dated Mar. 17, 2020, 23 pages.
Liang, J., Shi, R., Liang, F., & Gao, Z. H. (2001). WAP clients & SET protocol. Dr.Dobb's Journal, 26(6), 85-91. Retrieved from http:/ /dialog.proquest.conn/professional/docview/202692023?accountid=131444 (Year: 2001).
Office Action dated Apr. 1, 2020 for U.S. Appl. No. 16/140,879 (pp. 1-17).
Office Action dated Feb. 4, 2020 for U.S. Appl. No. 13/629,006 (pp. 1-7).
Office Action dated Mar. 13, 2020 for U.S. Appl. No. 15/494,294 (pp. 1-8).
Office Action dated Mar. 6, 2020 for U.S. Appl. No. 16/017,241 (pp. 1-7).
Office Action dated Mar. 6, 2020 for U.S. Appl. No. 16/440,486 (pp. 1-8).
Indian Examination Report for Application No. 8894/DELNP/2015, dated Oct. 21, 2019, 7 pages.
Notice of Allowance dated Nov. 8, 2019 for U.S. Appl. No. 14/698,317 (pp. 1-10).
Office Action dated Oct. 29, 2019 for U.S. Appl. No. 14/216,382 (pp. 1-8).
Office Action dated Oct. 31, 2019 for U.S. Appl. No. 15/627,085 (pp. 1-9).
Notice of Allowance dated Apr. 12, 2019 for U.S. Appl. No. 16/182,288 (pp. 1-8).
Notice of Allowance dated May 30, 2019 for U.S. Appl. No. 13/758,472 (pp. 1-10).
Office Action dated May 14, 2019 for U.S. Appl. No. 14/935,122 (pp. 1-11).
Notice of Allowance dated Jun. 10, 2020 for U.S. Appl. No. 15/494,294 (pp. 1-10).
Notice of Allowance dated Jun. 15, 2020 for U.S. Appl. No. 16/440,486 (pp. 1-8).
Office Action dated Jul. 10, 2020 for U.S. Appl. No. 16/017,241 (pp. 1-9).
Office Action dated May 19, 2020 for U.S. Appl. No. 15/627,085 (pp. 1-11).
Chinese Office Action (including English translation) for Application No. CN201710037081.6, dated Feb. 5, 2021, 7 pages.
Notice of Allowance dated Mar. 31, 2021 for U.S. Appl. No. 16/294,676 (pp. 1-9).
Office Action dated May 25, 2021 for U.S. Appl. No. 16/017,241 (pp. 1-13).
Chandra, Shalini; Srivastava, Shirish C.; and Theng, Yin-Leng (2010) "Evaluating the Role ofTrust in Consumer Adoption of Mobile Payment Systems: An Empirical Analysis," Communications of the Association for Information Systems: vol. 27, Article 29. http://aisel.aisnet.org/cais/vol27/iss1/29 (Year: 2010) 30 pages.
Chinese Office Action (with English language translation) for Application No. CN201710037081.6, dated Oct. 21, 2020, 11 pages.
Notice of Allowance dated Feb. 10, 2021 for U.S. Appl. No. 15/627,085 (pp. 1-15).
Notice of Allowance dated Jan. 14, 2021 for U.S. Appl. No. 16/140,879 (pp. 1-9).
Notice of Allowance dated Jan. 19, 2021 for U.S. Appl. No. 16/283,251 (pp. 1-5).
Notice of Allowance dated Jan. 22, 2021 for U.S. Appl. No. 16/532,095 (pp. 1-10).
Notice of Allowance dated Jan. 27, 2021 for U.S. Appl. No. 16/273,976 (pp. 1-9).
Notice of Allowance dated Jan. 29, 2021 for U.S. Appl. No. 15/988,485 (pp. 1-7).
Office Action dated Aug. 21, 2020 for U.S. Appl. No. 15/988,485 (pp. 1-10).
Office Action dated Dec. 4, 2020 for U.S. Appl. No. 16/017,241 (pp. 1-10).
Office Action dated Nov. 12, 2020 for U.S. Appl. No. 16/273,976 (pp. 1-9).

(56) References Cited

OTHER PUBLICATIONS

Office Action dated Oct. 22, 2020 for U.S. Appl. No. 14/244,488 (pp. 1-13).
Office Action dated Oct. 27, 2020 for U.S. Appl. No. 16/294,676 (pp. 1-9).
Office Action dated Oct. 6, 2020 for U.S. Appl. No. 16/532,095 (pp. 1-13).
Office Action dated Oct. 9, 2020 for U.S. Appl. No. 16/283,251 (pp. 1-6).
Office Action dated Sep. 4, 2020 for U.S. Appl. No. 15/627,085 (pp. 1-10).
Notice of Allowance dated Nov. 18, 2021 for U.S. Appl. No. 16/017,241 (pp. 1-9).
Office Action dated Oct. 27, 2021 for U.S. Appl. No. 17/064,832 (pp. 1-20).
Supplemental Notice of Allowability dated Dec. 3, 2021 for U.S. Appl. No. 16/017,241 (pp. 1-2).

* cited by examiner

Example Data Flow: Store Injection Search

Example Logic Flow: Automated Shopping Item Availability Processing, e.g., AAP Component 300

Example Logic Flow: Automated Shopping Item Availability Processing, e.g., AAP Component 300

SIS Example: Track Consumer via Store Injection

SIS Example: Predictive Advertising

SIS Example Data Flow (1)

SIS Example Data Flow (2)

Example Logic Flow: SIS via Browser Cookie

SIS Example Logic Flow: Store Injection Data Aggregation

SIS Example Logic Flow: Predictive Advertising

SIS Example Logic Flow: Ad-Purchase Correlation

SIS Example Logic Flow: Ad-Purchase Correlation

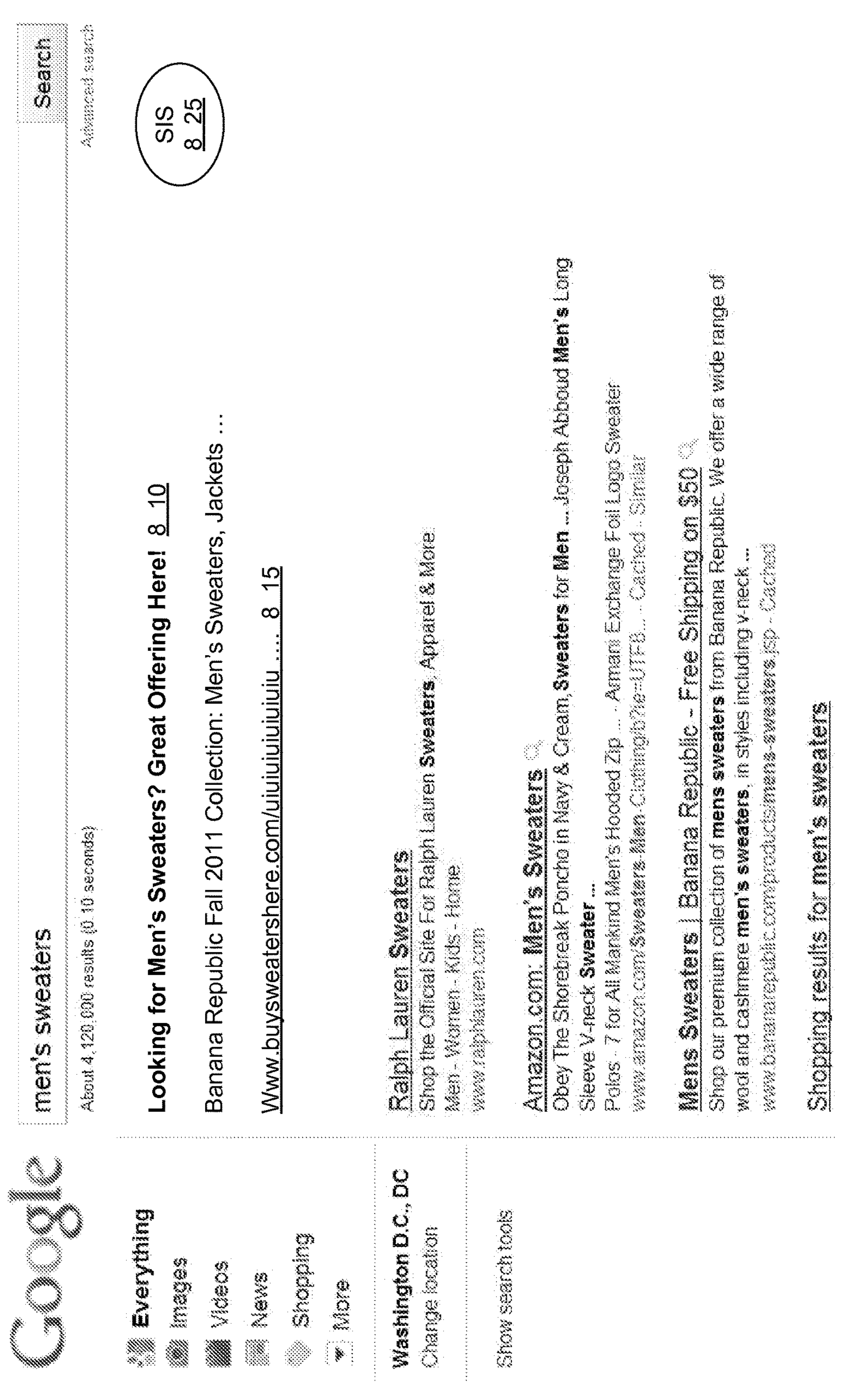

Figure 8A men's sweaters                                              Search

About 4,120,000 results (0.10 seconds)                      Advanced search

Looking for Men's Sweaters? Great Offering Here!  8 10

Banana Republic Fall 2011 Collection: Men's Sweaters, Jackets ...
Www.buysweatershere.com/uiuiuiuiuiuiu.....  8 15

Ralph Lauren Sweaters
Shop the Official Site For Ralph Lauren Sweaters, Apparel & More
Men - Women - Kids - Home
www.ralphlauren.com Amazon.com: Men's Sweaters
Obey The Shorebreak Poncho in Navy & Cream, Sweaters for Men ... Joseph Abboud Men's Long Sleeve V-neck Sweater ...
Polos - 7 for All Mankind Men's Hooded Zip ... Armani Exchange Foil Logo Sweater
www.amazon.com/Sweaters-Men-Clothing/b?ie=UTF8 - Cached - Similar Mens Sweaters | Banana Republic – Free Shipping on $50
Shop our premium collection of mens sweaters from Banana Republic. We offer a wide range of wool and cashmere men's sweaters, in styles including v-neck ...
www.bananarepublic.com/products/mens-sweaters.jsp - Cached Shopping results for men's sweaters (SIS 8 25)

Google
- Everything
- Images
- Videos
- News
- Shopping
- More

Washington D.C., DC
Change location

Show search tools

Google

Everything
- Images
- Videos
- News
- Shopping
- More

Washington D.C., DC
Change location

Show search tools men's sweaters      Search
                    Advanced search About 4,120,000 results (0.10 seconds)

(SIS 8.25)

Banana Republic Men's Accessories 8.65

See the winter collection for men ...

Amazon.com: Men's Sweaters
Obey The Shorebreak Poncho in Navy & Cream, Sweaters for Men ... Joseph Abboud Men's Long Sleeve V-neck Sweater ...
Polos - 7 for All Mankind Men's Hooded Zip ... Armani Exchange Foil Logo Sweater
www.amazon.com/Sweaters-Men-Clothing/?ie=UTF8... - Cached - Similar

Mens Sweaters | Banana Republic - Free Shipping on $50
Shop our premium collection of mens sweaters from Banana Republic. We offer a wide range of wool and cashmere men's sweaters, in styles including v-neck...
www.bananarepublic.com/products/mens-sweaters.jsp - Cached Shopping results for men's sweaters

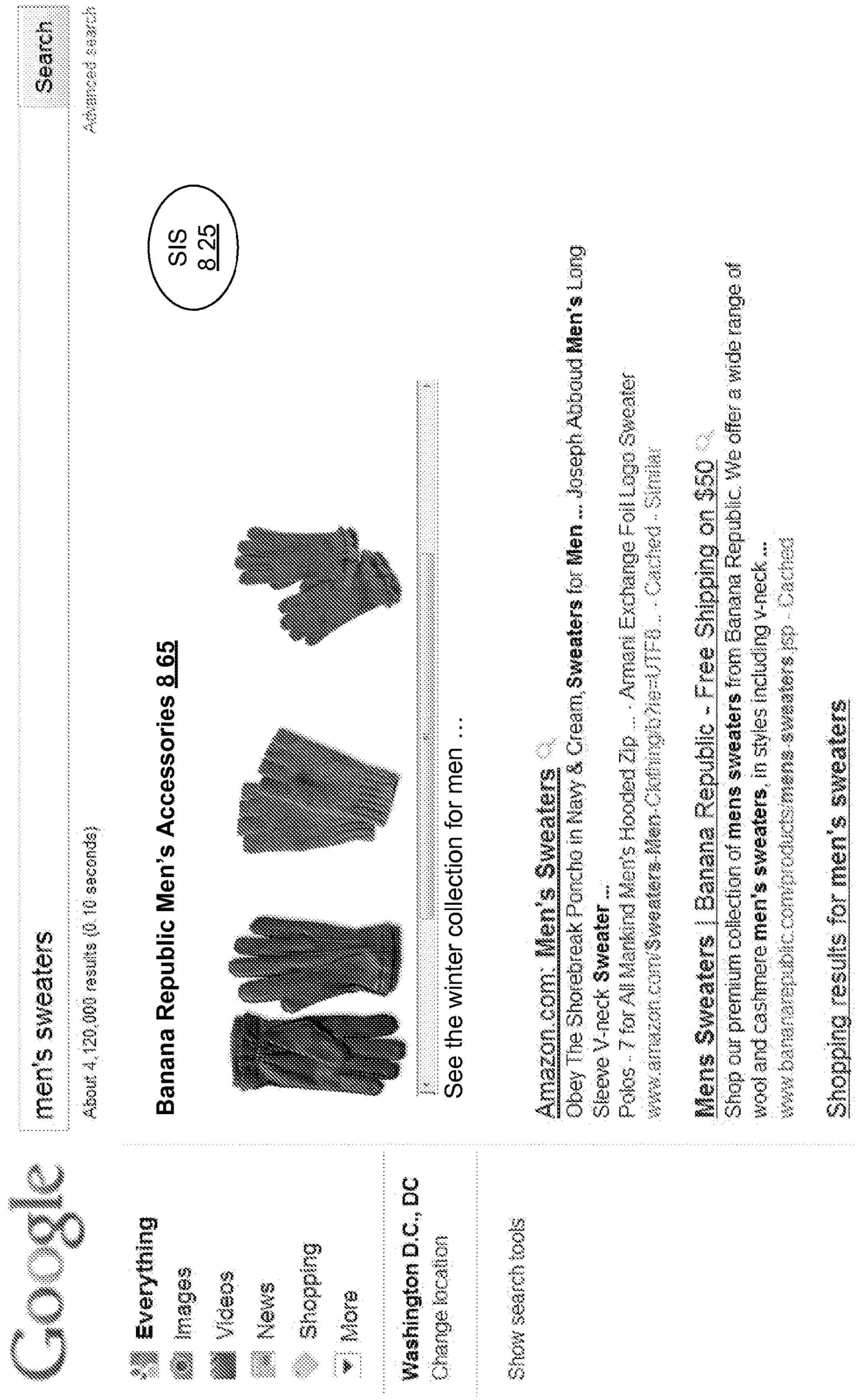

Figure 8D

Example: Receipts Processing Component

Example: Predictive Shopping List Generation Component

Example: Predictive Shopping List Generation Component

Example: External Receipt Retrieval Component

Example: Checkout Scan Processing Component

Example: Snap Purchase Processing Component

Example: Smart Cart Checkout Processing Component

Example: Feedback Processing Component

Example Data Flow: Product Placement Revenue Sharing

Example Data Flow: Product Placement Revenue Sharing

Example Logic Flow: User Location Engagement Processing (e.g., ULEP Component 2900)

Example Logic Flow: User Location Engagement Processing (e.g., ULEP Component 2900)

Example Logic Flow: Rendering Injection Responses with Interaction Tracking (e.g., RIR Component 3000)

Example Logic Flow: Process Virtual Engagement Message (e.g., PVE Component 3100)

Example Logic Flow: Product Placement Revenue Share Processing (e.g., PPR Component 3200)

Example Logic Flow: Product Placement Revenue Share Processing (e.g., PPR Component 3200)

Example Wallet Bonds Setting Mode

SMART SHOPPING CART WITH E-WALLET STORE INJECTION SEARCH

PRIORITY CLAIM

This application claims priority under 35 USC § 120 to U.S. patent application Ser. No. 14/242,403, filed Apr. 1, 2014, entitled "E-Wallet Store Injection Search Apparatuses, Methods and Systems," which claims priority under 35 USC § 120 to U.S. patent application Ser. No. 13/542,443 filed Jul. 5, 2012, entitled "Electronic Wallet Checkout Platform Apparatuses, Methods And Systems" and U.S. patent application Ser. No. 13/520,481, filed Jul. 3, 2012, entitled "Universal Electronic Payment Apparatuses, Methods and Systems."

U.S. patent application Ser. No. 13/520,481 is a National Stage Entry entitled to, and hereby claims priority under 35 U.S.C. §§ 365, 371 to, Patent Cooperation Treaty International Application No. PCT/US12/26205, filed Feb. 22, 2012, entitled "Universal Electronic Payment Apparatuses, Methods And Systems," which in turn claims priority under 35 USC § 119 to: U.S. Provisional Patent Application Ser. No. 61/545,971 filed Oct. 11, 2011, entitled "Universal Electronic Payment Apparatuses, Methods And Systems;" U.S. Provisional Patent Application Ser. No. 61/538,761 filed Sep. 23, 2011, entitled "Electronic Wallet Transaction Consumer Leash Apparatuses, Methods And Systems;" and, U.S. Provisional Patent Application Ser. No. 61/539,969 filed Sep. 27, 2011, entitled "Apparatuses, Methods, And Systems For Finding, Storing, And Applying Discounts For Use In An Electronic Transaction."

Patent Cooperation Treaty International Application No. PCT/US12/26205 is also a continuation-in-part of, and claims priority under 35 U.S.C. §§ 120, 365 to U.S. patent application Ser. No. 13/398,817 filed Feb. 16, 2012, entitled "Snap Mobile Payment Apparatuses, Methods And Systems" and U.S. patent application Ser. No. 13/348,634 filed Jan. 11, 2012, entitled "Universal Value Exchange Apparatuses, Methods And Systems."

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

This application is related to Patent Cooperation Treaty International Application No. PCT/US2012/045875 filed Jul. 7, 2012 entitled "Bidirectional Bandwidth Reducing Notifications And Targeted Incentive Platform Apparatuses, Methods And Systems."

The entire contents of the aforementioned application(s) are expressly incorporated by reference herein.

FIELD

The present innovations generally address merchant store injection package searching, and more particularly, include E-WALLET STORE INJECTION SEARCH APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Consumers may desire to purchase products and may create shopping lists of items for purchase. Merchants may stock products for purchase by consumers. Consumers may visit merchants during the merchant's business hours to purchase products that may be on their shopping list.

BRIEF DESCRIPTION OF THE DRAWINGS

The accompanying appendices and/or drawings illustrate various nonlimiting, example, innovative aspects in accordance with the present descriptions:

FIGS. 8A-8D provide example screen shots illustrating embodiments of the SIS;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

SIS

The E-WALLET STORE INJECTION SEARCH APPARATUSES, METHODS AND SYSTEMS (hereinafter "SIS" user interface) transform the user automated shopping list and user location updates, via SIS components, into automated shopping list triggering events and notifications. In some embodiments, this is carried out in real time.

Figure 1:
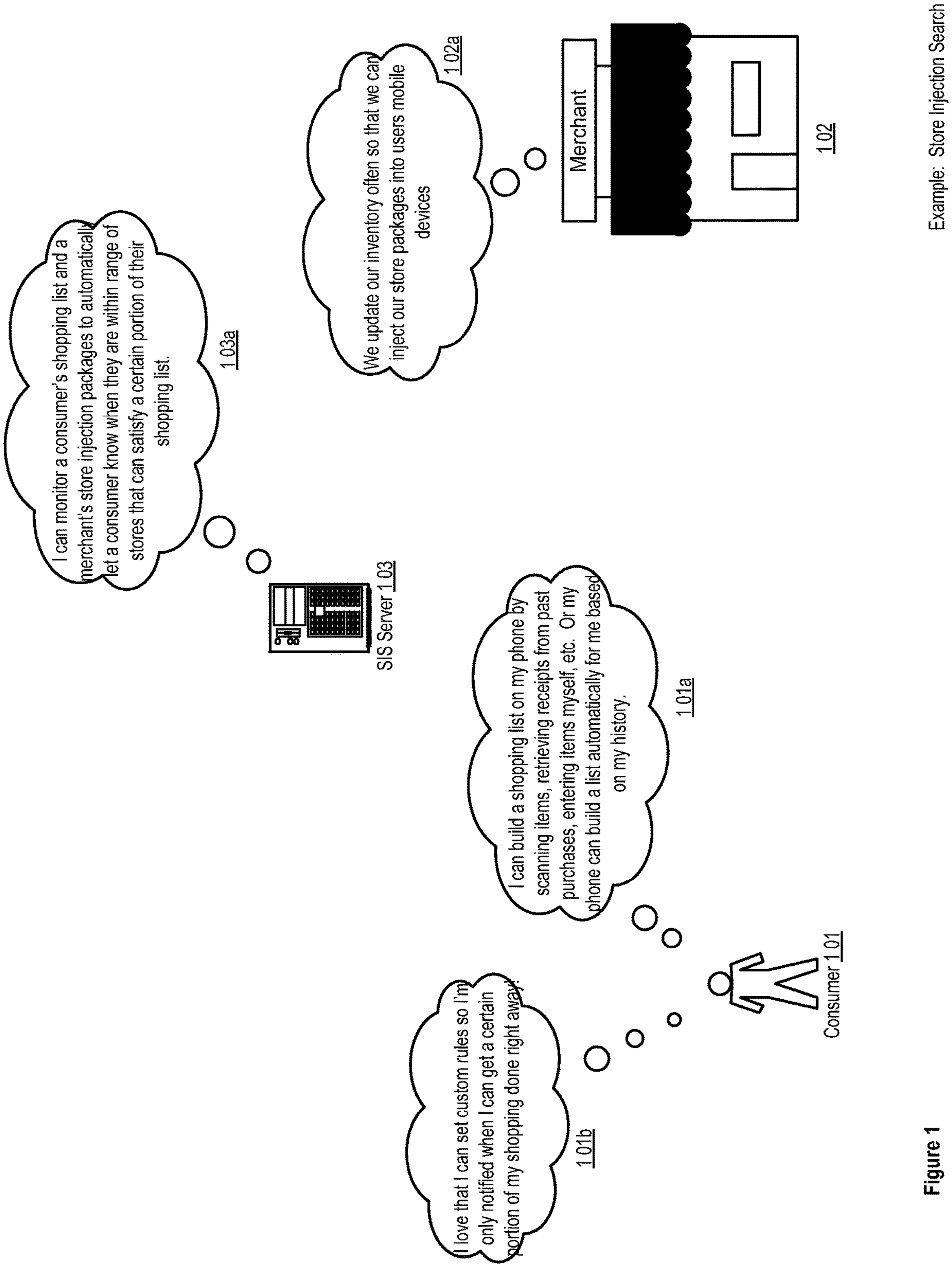
FIG. 1 shows an example block diagram illustrating aspects of the SIS, in one implementation of the SIS operation.

FIG. 1 shows a block diagram illustrating example aspects of the SIS, in some embodiments of the SIS. In one embodiment, consumer 101 may desire to build a shopping list on their mobile phone by scanning items, retrieving receipts from previous purchases (e.g., by providing email access credentials, social media credentials, and/or the like for automated scanning of previous purchases), entering items or services into an automated shopping list, and/or the like, e.g., 101*a*. In one embodiment, the user's mobile device may use past purchase history to build an automated shopping list. In other embodiments, a user may specify a generic item for purchase (e.g., "orange juice", "dinner for Thursday", "a gift for Jody", "the highest ranked LCD television on lcdreviews.com", and/or the like). In so doing, the SIS may match items from the user's automated shopping list to multiple items at a merchant, or may determine that a merchant may fulfill an item on the user's shopping list even though the merchant does not have the specific item the user scanned or input into their shopping list. In some embodiments, the SIS may enable a user to mark certain items on their list as available for substitution, in which case although a user has specified a specific item (e.g., "Sony LCD television Model X-4587", and/or the like), the SIS may notify the user if they are within range of a store location containing a substitute item or service. In one embodiment, a consumer may specify notification rules that may be used by SIS Server 103 in order to alert the consumer when a certain portion of their list is available for purchase, when certain items are within range, when an item marked with a buying deadline is available, and/or the like, e.g., 101*b*. In one embodiment, merchant 102 may periodically update a store injection package with current inventory stock levels, e.g., 102*a*. The merchant may update their store injection packages of their own initiative, in response to a triggering event such as a purchase at one of their locations, in response to a request from SIS Server 103, and/or the like. In one embodiment, SIS Server 103 may monitor both a consumer's shopping list and a merchant's store injection packages and notify the consumer when they are within range of stores that can satisfy a certain portion of their shopping list, e.g., 103*a*. In one embodiment, the notification rules for notifying a consumer may be customized by the consumer (e.g., by specifying a priority item, marking items with must-buy-before date/times, specifying categories of shopping list items with differing notification rules, and/or the like).

Figure 2:
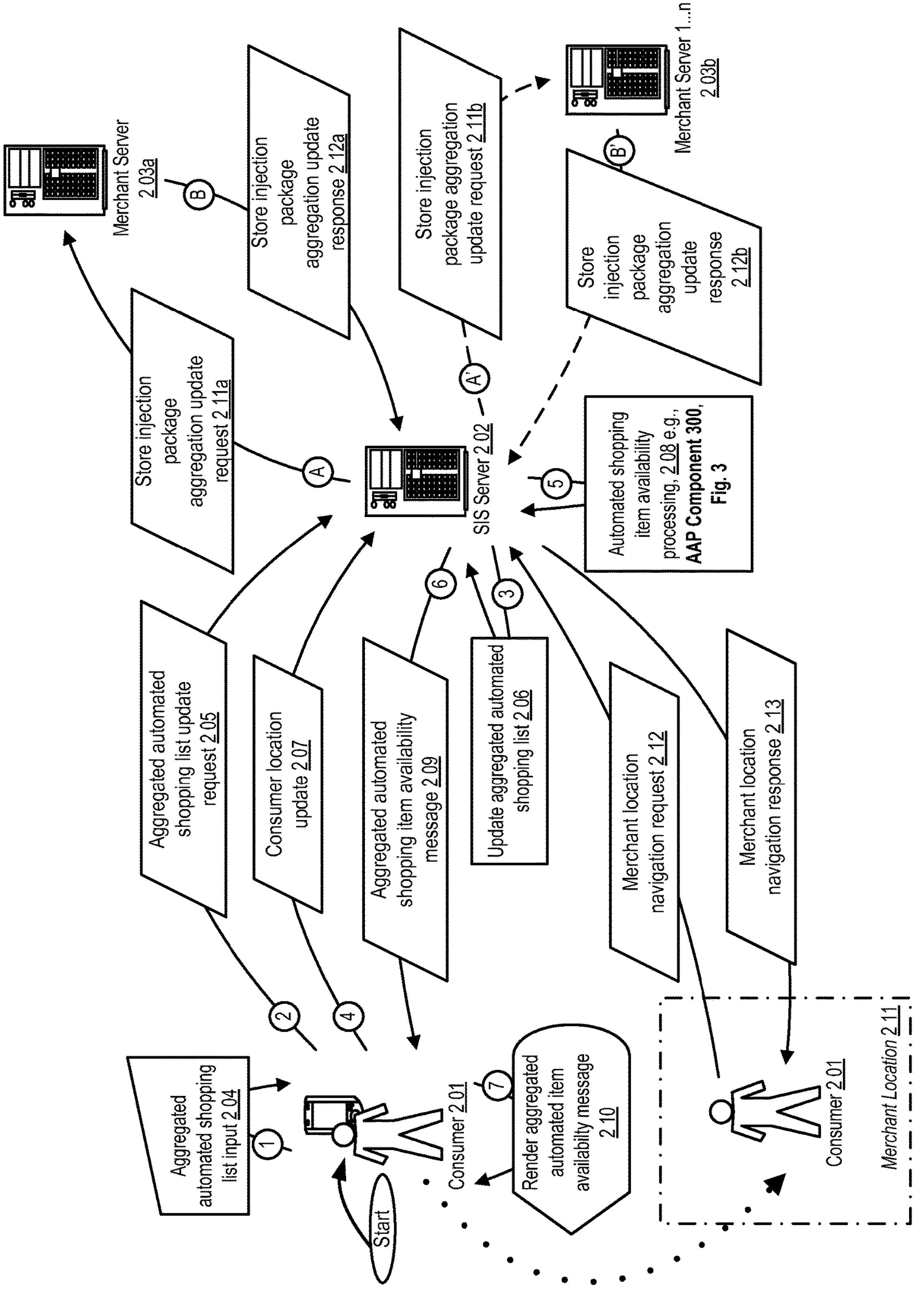
FIG. 2 shows an example data flow illustrating aspects of store injection search, in one implementation of the SIS operation.

FIG. 2 shows an example data flow illustrating aspects of store injection search, in one embodiment of the SIS. In one embodiment, consumer 201 may input an aggregated automated shopping list. Other examples of aggregated automated shopping list creation may be found with respect to FIGS. 10-27. An aggregated shopping list may be built by the consumer by scanning items for purchase (e.g., a photo of the item, an item's UPC barcode, and/or the like), selecting items from a scanned receipt, directly entering items on a mobile device, and/or the like, e.g., 204. In one embodiment, a consumer may specify a generic item for purchase (e.g., "orange juice", "dinner for Thursday", "a gift for Jody", "the highest ranked LCD television on lcdreviews.com", and/or the like). In one embodiment, an aggregated automated shopping list may be specified using a voice-to-text translation API such as Apple Siri, Google Now, and/or the like. Aggregated automated shopping lists may be built using predictive shopping lists, such as may be generated by analysis of a consumer's past purchase behavior, wish list settings, and/or the like. Further detail regarding aggregated automated shopping list building using predictive shopping features may be found herein and with respect to FIGS. 10-27. In one embodiment, the consumer may specify that certain items are available for substitution, such that an alternative item may be suggested and/or substituted by the SIS.

In one embodiment, a consumer's mobile device may transmit an aggregated automated shopping list update request 205 to a SIS server 202. An automated shopping list update may, in one example, contain a list of items or services that the consumer wants to purchase as well as meta-data about the items or services such as a date to buy before, a maximum distance the consumer is willing to travel to purchase the item, a maximum price setting, a payment account to use when the item is bought, and/or the like. In some embodiments, groups of consumers (such as, for example, families) may collectively maintain an aggregated automated shopping list such that each consumer's location may be used to determine when items on the aggregated shopping list may be purchased. In one embodiment, group aggregated automated shopping lists may be built using electronic wallet bonds such that restrictions and options may be associated with access to and modification of a consumer's aggregated automated shopping list. Further detail regarding wallet bonds may be found herein and with respect to FIG. 33. Additional detail relating to wallet bonds may be found in U.S. patent application Ser. No. 13/520,481, filed Jul. 3, 2012, entitled "Universal Electronic Payment Apparatuses, Methods and Systems", the entirety of which is hereby incorporated by reference. An example aggregated automated shopping list update request 205, substantially in the form of an HTTP(S) POST message including XML-formatted data, is provided below:

```
POST /aggregated__automated__shopping__list__update__req.php HTTP/1.1
Host: www.SISserver.com
Content-Type: Application/XML
Content-Length: 667
<?XML version = "1.0" encoding = "UTF-8"?>
<aggregated__automated__shopping__list__update__req>
    <timestamp>2020-12-12 15:22:43</timestamp>
    <auth type="consumerdevice">
        <api key="87KJHIUIUYGUY" />
        <certificate>
            &GHJHTYFDRTJDTRTRDTRFD
            * 876CFDTRW#E#UYFYUKW#@
            LO*I&TRDFKHDRT$WGFVYIU
        </certificate>
</auth>
<device type="iPhone" id="IF434543" />
<user__ID="56434">
    <name value="John Consumer" />
    <current__location lat="23.654" lon="12.987" />
</user>
<list__update type="aggregated__automated__list" id="7649">
    <list__name value="my__daily__shopping__list" />
    <last__updated value="2020-12-12 15:18:42" />
    <list__contents>
    <item type="specific item">
    <name value="Sony LCD Television" />
    <model value="HW-876765" />
    <max__price value="$999.95" />
    <can__substitute value="no__substitutions" />
    </item>
    <item type="specific__item">
        <name value="Levis 501 Jeans" />
        <model value="501" />
        <size value="32Slim" />
        <max__price value="$59.95" />
```

-continued

```
            <can__substitute value="substitutions__allowed" />
            <aggregate__item__with type="family__members">
                <with type="person" value="dad" id="E654654" />
                <with type="person" value="mom" id="E45657" />
                <with type="person" value="brother" id="E31548" />
                <allow__access__to__payment__method>
                    <pan__num>5454878765653232</pan__num>
                    <exp__date>12/25</exp__date>
                </allow__access__to__payment__method>
            </aggregated__item__with>
        </item>
        <item type="generic__item">
            <search__name>orange juice</search__name>
            <max__distance value="2 miles" />
        </item>
        <item type="service">
            <search__name>haircut</search__name>
        </item>
        <item>
        ...
        </item>
    </list__contents>
</list__update>
<list__update>
    ...
    </list__update>
</aggregated__automated__shopping__list__update__req>
```

In one embodiment, the SIS server 202 may update the user's aggregated automated shopping list, e.g., 206. In other embodiments, the aggregated automated shopping list may be stored on the user's mobile device or a third-party server and live-streamed or made available to the SIS server.

In one embodiment, the consumer's mobile device may transmit a consumer location update, e.g., 207, to SIS server 202. In so doing, the SIS server may utilize the user's current location to determine if items on the user's automated shopping list may be purchased at merchant locations nearby that have stock of said items. In one example, the SIS server may also determine substitute items that may be purchased in place of a specific item, may determine a specific item from a generically listed item (e.g., determining that a certain store has a particular brand of orange juice in stock when the consumer's automated list contains an item for "juice", and/or the like), and/or the like. An example consumer location update 207, substantially in the form of an HTTP(S) POST message including XML-formatted data, is provided below:

```
POST /consumer__location__update.php HTTP/1.1
Host: www.SISserver.com
Content-Type: Application/XML
Content-Length: 667
<?XML version = "1.0" encoding = "UTF-8"?>
<consumer__location__update>
  <timestamp>2020-12-12 15:25:43</timestamp>
  <auth type="consumerdevice">
    <api key="87KJHIUIUYGUY" />
    <certificate>
      &GHJHTYFDRTJDTRTRDTRFD
      *876CFDTRW#E#UYFYUKW#@
      LO*I&TRDFKHDRT$WGFVYIU
      </certificate>
  </auth>
  <device type="iPhone" id="IF434543" />
  <user__ID="56434">
    <name value="John Consumer" />
    <current__location lat="23.654" lon="12.987" />
  </user>
</consumer__location__update>
```

In one embodiment, SIS server 202 may then determine if items are available based on the user's location, the user's notification preferences, and the store injection packages of merchant's in the consumer's area, e.g., 208. Further detail regarding automated shopping item availability processing may be found with respect to FIGS. 3A-B, e.g., AAP Component 300.

In one embodiment, SIS server 202 may respond to the consumer with a notification that certain items are available within range of the consumer's current location, e.g., an aggregated automated shopping item availability message 209. In so doing, a consumer may be notified that a certain number of items, a certain portion of an aggregated automated shopping list, a substitute item, an item marked as high priority, and/or the like, is available for purchase at a merchant. The distance from the consumer to the merchant required to generate the item availability message may be specified by the consumer, variable (e.g., based on the consumer's current location, the consumer's current mode of travel, and/or the like), based on item characteristics such as price or inventory stock levels, based on the quantity of an item the consumer has remaining (e.g., the number of oranges in the consumer's home refrigerator), the estimated expiration date of an item (e.g., milk expiration date) and/or the like. An example aggregated automated shopping item availability message 209, substantially in the form of an HTTP(S) POST message including XML-formatted data, is provided below:

```
POST /aggregated_automated_item_availability_msg.php HTTP/1.1
Host: www.consumerdevice.com
Content-Type: Application/XML
Content-Length: 667
<?XML version = "1.0" encoding = "UTF-8"?>
<aggregated_automated_shopping_item_availability_message>
  <timestamp>2020-12-12 15:28:43</timestamp>
  <auth type="SIS_server">
    <api key="AWERFVIUYGUY" />
    <certificate>
      OIMOIHUYTJDTRTRDTRFD
      CTRCRECRETRC#UYFYUKW#@
      IJHUTRFTRTRDRT$WGFVYIU
      </certificate>
  </auth>
  <item_availability>
      <item type="specific_item">
        <from_list value="my_daily_shopping_list" />
        <!-- items may be substituted -->
        <is_specific_item_requested value="true" />
        <name value="Sony LCD Television" />
        <model value="HW-876765" />
        <store name="BestBuy">
          <location lat="12.756564" lon="56.45454"
                    aisle="4" stack="2" shelf="4" />
          <distance value=".5 miles" />
          <point_accruing_item value="true"
                Points_with_purchase="1000 bonus points" />
          <pay_with_points value="true">
            <points_option value="visa points" />
            <points_option value="chase points" />
          </pay_with_points>
          <current_price value="$855.95" />
          <current_inventory value="14" />
        </store>
        <store>
            ...
        </store>
      </item>
      <item type="generic_item">
        <search name>orange juice</search_name>
        <store name="ShopRite Grocery Store">
          <location lat="12.856564" lon="57.45454"
                aisle="5" stack="7" shelf="1" />
          <distance value=".67 miles" />
          <item name="Tropicana Orange Juice" />
          <current_inventory value="85" />
```

-continued

```
        </store>
      </item>
      <item type="specific_item_aggregated_shared_list"> <from_list
        value="mom_shopping_list" />
        <name value="Lentil Soup" />
        <store name="ShopRite Grocery Store">
          <location lat="12.856564" lon="57.45454"
                aisle="4" stack="2" shelf="2" />
          <distance value=".67 miles" />
          <item name="Gordon's Lentil Soup" />
          <quantity_required value="2" />
          <current_price value="2.99" />
          <current_inventory value="85" />
        </store>
      </item>
      <item>
      ...
      </item>
</aggregated_automated_shopping_item_availability_message>
```

In one embodiment, the consumer's mobile device may render an automated item availability message, e.g., 210. The message may notify the consumer that a given criteria for an aggregated automated shopping list has been met. In one embodiment, the consumer mobile device may then direct the consumer to a first merchant location, e.g., 211. The merchant locations to be visited may be ordered by the SIS server to minimize time in transit, to ensure item availability, and/or the like. For example, if one merchant that is to be visited to purchase an item on the aggregated automated shopping list has only two of an item on-hand remaining, the consumer may be directed to that merchant first even though it may not be the closest merchant. In so doing, the SIS may minimize the chance that an item will sell out in the time between when the SIS notified a consumer that an item was available at a merchant and when the consumer actually arrives at the merchant to purchase the item.

In one embodiment, upon arriving at a merchant location 211, consumer 201 may use their mobile device to request that the SIS provide a navigation package to the device for use in helping the consumer find a given item in the store, e.g., a merchant location navigation request 212. For example, the SIS may direct a consumer to a store that the consumer has never been to before as part of fulfilling the consumer's aggregated automated shopping list. In order to minimize the time required by the consumer to purchase the desired item, the SIS server may provide a portion of a store injection package (e.g., an item aisle/shelf location, and/or the like), a store map, and/or the like in order to assist the consumer in quickly finding items. In another embodiment, the consumer may utilize an injection enabled shopping cart or device on a merchant's premises. The consumer's mobile device may communicate the portion of the consumer's aggregated shopping list that is to be purchased at the merchant and the injection enabled shopping cart or device may then route the consumer through the store in the most expeditious manner (e.g., by providing a visual store layout, by indicating a path the consumer should follow through the store, and/or the like). An example merchant location navigation request 212, substantially in the form of an HTTP(S) POST message including XML-formatted data, is provided below:

```
POST /merchant_location_navigation_request.php HTTP/1.1
Host: www.SISserver.com
```

-continued

```
Content-Type: Application/XML
Content-Length: 667
<?XML version = "1.0" encoding = "UTF-8"?>
<merchant__location__navigation__request>
  <timestamp>2020-12-12 15:35:43</timestamp>
  <auth type="consumer__device">
    <api key="AWERFVIUYGUY" />
    <certificate>
      OIMOIHUYTJDTRTRDTRFD
      CTRCRECRETRC#UYFYUKW#@
      IJHUTRFTRTRDRT$WGFVYIU
      </certificate>
  </auth>
  <store name="BestBuy">
    <device type="iPhone" id="E456745" />
    <shopping__cart id="SC34" />
    <augmented__reality device="google__glasses" sid="gg654654" />
    <location lat="12.756564" lon="56.45454"
        aisle="4" stack="2" shelf="4" />
    <item>
      <item type="specific__item">
      <from__list value="my__daily__shopping__list" />
      <name value="Sony LCD Television" />
      <model value="HW-876765" />
    </item>
  </store>
</merchant__location__navigation__request>
```

In one embodiment, SIS server may respond to the consumer device with a merchant location navigation response, e.g., 213. The navigation response may contain store route information, aisle/shelf information for items, a best-path through the store based on current public traffic, and/or the like. An example merchant location navigation response 213, substantially in the form of an HTTP(S) POST message including XML-formatted data, is provided below:

```
POST /merchant__location__navigation__response.php HTTP/1.1
Host: www.consumerdevice.com
Content-Type: Application/XML
Content-Length: 667
<?XML version = "1.0" encoding = "UTF-8"?>
<merchant__location__navigation__response>
  <timestamp>2020-12-12 15:28:43</timestamp>
  <auth type="SIS__server">
    <api key="AWERFVIUYGUY" />
    <certificate>
      OIMOIHUYTJDTRTRDTRFD
      CTRCRECRETRC#UYFYUKW#@
      IJHUTRFTRTRDRT$WGFVYIU
    </certificate>
  </auth>
  <store name="BestBuy">
    <location lat="12.756564" lon="56.45454"
                aisle="4" stack="2" shelf="4" />
    <store__map__overlay>
      <uri value="https:/ /indoormapserver.com/ IUYTUY" />
    </store__map__overlay>
    <item>
      <name value="Sony LCD Television" />
      <model value="HW-876765" />
      <item__location>
        <item__aisle value="4" />
        <item__stack value="2" />
        <item__shelf value="4" />
        <from__entrance x="55-feet" y="213-feet" />
      </item__location>
    </item>
    <item>
    ...
  </item>
</merchant__location__navigation__response>
```

Periodically, SIS server 202 may request that merchant server's, e.g., 203*a-b* provide an updated store injection package for use by the SIS server. The SIS server may request an updated store injection package, e.g., a store injection package aggregation update request 211*a-b*. In response, a merchant server may prepare and deliver an updated store injection package containing current inventory levels, pricing, and/or the like, e.g., a store injection package aggregation update response 212*a-b*. In other embodiments, store injection package aggregation updates may be provided to the SIS server automatically (e.g., periodically, via a live-stream, a cron job, and/or the like) and/or at the initiation of the merchant server or a third-party server. An example store injection package aggregation update request 211*a*, 211*b*, substantially in the form of an HTTP(S) POST message including XML-formatted data, is provided below:

```
POST /store__injection__aggregation__update__request.php HTTP/1.1
Host: www.merchantserver.com
Content-Type: Application/XML
Content-Length: 667
<?XML version = "1.0" encoding = "UTF-8"?>
<store__injection__aggregation__update__request>
  <timestamp>2020-12-12 15:41:43</timestamp>
  <auth type="SIS__server">
    <api key="AWERFVIUYGUY" />
    <certificate>
      OIMOIHUYTJDTRTRDTRFD
      CTRCRECRETRC#UYFYUKW#@
      IJHUTRFTRTRDRT$WGFVYIU
    </certificate>
  </auth>
  <injection__request type="update__injection">
    <post__to value="https:/ /injsrv.com/in/87664654" />
    <last__package__received seq="87674345"
              time="2020-12-12 13:14:54" />
    <future__injection__schedule type="set__schedule" />
      <category number="1" name="frequent">
        <item type="produce" update freq="10minutes" />
        <item type="seafood" update__freq="25minutes" />
      </category>
      <category number="2" name="occasional">
        <item type="cereal" update__freq="daily" />
      </category>
      <category number="3">
        ...
      </category>
    </future__injection__schedule>
  </injection__request>
  <injection request>
    ...
  </injection__request>
</store__injection__aggregation__update__request>
```

In one embodiment, the merchant server may prepare a store injection package for transmission. For example, the merchant server may poll point-of-sale terminals in a given store location to retrieve up-to-the-minute sales information for inventory in a store. In one embodiment, the merchant server may poll a third-party pricing server (which, in one example, may determine pricing based on market conditions, stock market index values, weather at a given location, and/or the like) in order to determine real-time pricing values for items or services available in a given merchant store location. In one embodiment, merchant server 203*a*, 203*b*, may respond with a store injection package or a modified store injection package (e.g., a diff package, and/or the like), e.g., a store injection package aggregation update response 212*a*, 212*b*. An example store injection package aggregation update response 212*a*, 212*b*, substantially in the form of an HTTP(S) POST message including XML-formatted data, is provided below:

```
POST /store__injection__aggregation__update__response.php HTTP/1.1
Host: www.SISserver.com
Content-Type: Application/XML
Content-Length: 667
<?XML version = “1.0” encoding = “UTF-8”?>
<store__injection__aggregation__update__response>
  <timestamp>2020-12-12 15:42:18</timestamp>
  <auth type=“merchant__server”>
    <api key=“AWERFVIUYGUY” />
    <certificate>
      UYTFG&^%TJDTRTRDRECFTTRFD
          IUHYGTFUYFYFTYGTYFTRFKW#@
          654TYFGFRTRRTRDRT$WGFVYIU
        </certificate>
      </auth>
      <store id=“767543”>
        <name val=“ShopRite Grocery Store” />
        <addr val=“500 Main St., Anytown, CA, 90245” />
        <hours>
          <open when=“m-f” open=“8am” close=“9pm” />
          <closed when=“sat-sun” />
        </hours>
        <next__nearest__location>
          <location id=“654454” distance=“6miles” />
        </next__nearest__location>
        <store__map loc=“https:/ /mapsrv.com/876876“ />
        <augmented__reality__flag value=“ON” />
        <shopping__cart__injection__routing__available
                  value=“yes” qty=“12carts__in__store” />
        <injection>
          <item upc=“E65465432”>
            <name val=“Morgan’s Mustard” />
            <description>
              Morgan’s mustard is spicy, rich, and made the same
              since 1924!
            </description>
            <price val=“4.56” currency=“usd” />
            <item__image type=“jpeg” kind=“inline__binary__stream”>
              ÿØÿàJFIFddDuckyUÿîAdobedÀÿÛ...
            </item image>
            <unit__of__measure type=“bottle” value=“10oz” />
            <quantity in__store=“54” on__order=“100”
                    next__delv=“+2day” />
            <loc lat=“7.45454” lon=“4.876876”
                  store__x=“56feet” store__y=“234feet”
                  aisle=“4” stack=“2” shelf=“5” />
            <item__specials>
              <coupon kind=“manuf” type=“prct__discount”
              val=“10%” />
            </item__specials>
      </item>
      <item upc=“T54543”>
        <name val=“Tropicanna Orange Juice” />
        <description>
          Florida Fresh Orange Juice!
        </description>
        <price val=“6.99” currency=“usd” />
        <unit__of__measure type=“container” value=“lgal” />
        <quantity in__store=“12” product__expires=“Mar-23”
              on order=“75” next__delv=“+1day” />
        <loc lat=“7.52454” lon=“4.906876”
            store__x=“156feet” store__y=“12feet”
            aisle=“18” stack=“3” shelf=“1” />
        <payment__options>
          <pay__with points__value=“true”>
            <program name=“VisaPoints” price=“200” />
            <program name=“MerchantPoints” price=“300” />
          </pay__with__points>
        </payment__options>
      </item>
      <item>
      ...
      </item>
    </injection>
    <injection>
      ...
    </ injection>
    <store__injection__enhanced__interface__data>
      <floorplan__URL>
        www.inject.com?id=ANAv483&type=img
      </ floorplan__URL>
```

-continued

```
      <UI__script__URL>
        www.inject.com?id=ANAv483&type=script
        </UI__script__URL>
      <ShopAssistant__UIbundle__url>
        www.inject.com?id=ANAv483&type=bundle
      </ShopAssistant__UIbundle__url>
      <AugmentedRealityFloorplanCartPinOverlayUI__html5__url>
        www.inject.com?id=ANAv483&type=html5
      </AugmentedRealityFloorplanCartPinOverlayUI__html5__url>
      <InteractiveStore__flash__url>
        www.inject.com?id=ANAv483&type=flash
      </InteractiveStore__flash__url>
    </store__injection__enhanced__interface__data>
  </ store>
  <store>
    ...
  </store>
<store__injection__aggregation__update__response>
```

Figure 3A:
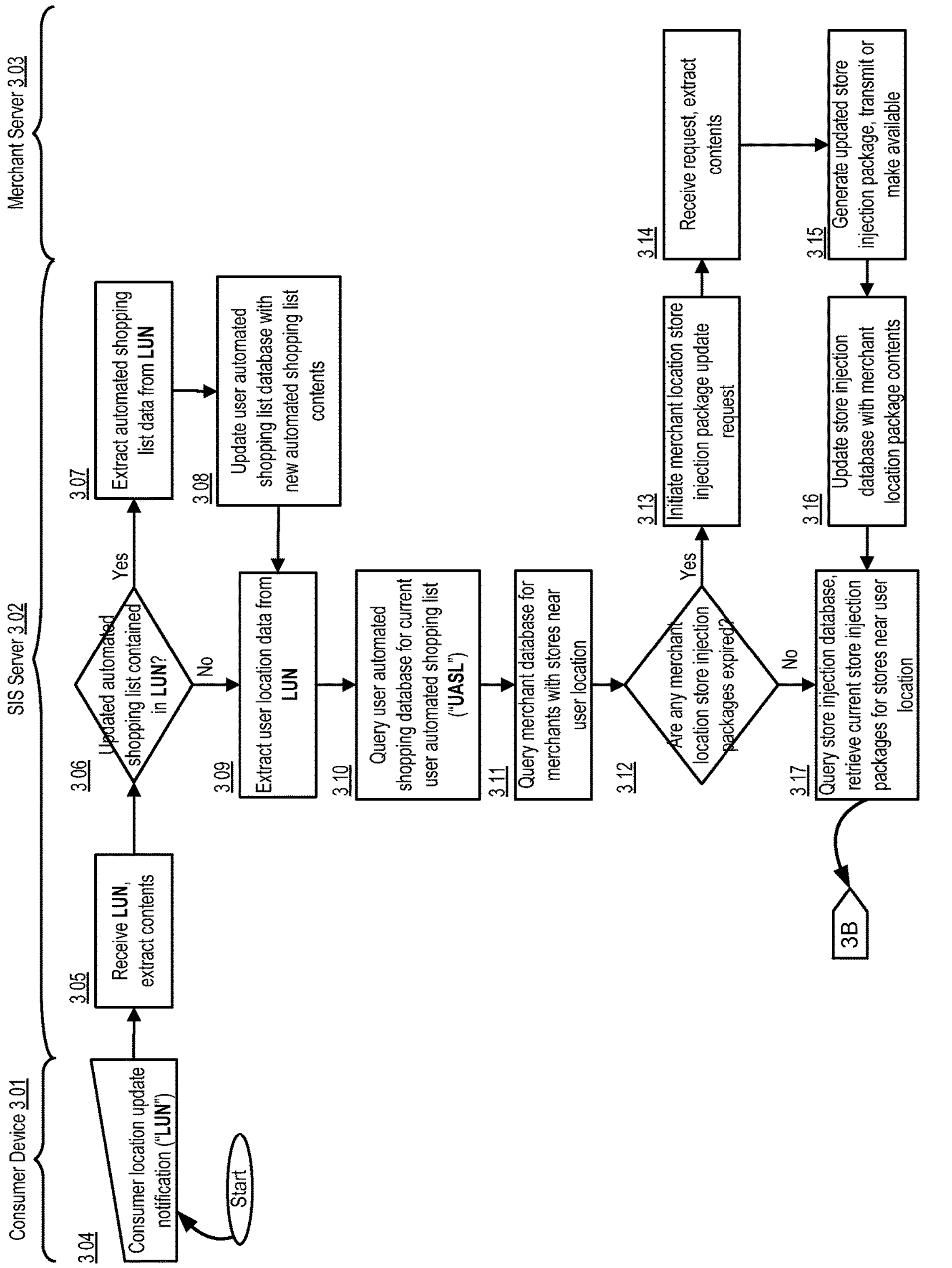
FIGS. 3A-B show an example logic flow illustrating aspects of automated shopping item availability processing, e.g., an example AAP Component, in one implementation of the SIS operation.
Figure 3B:
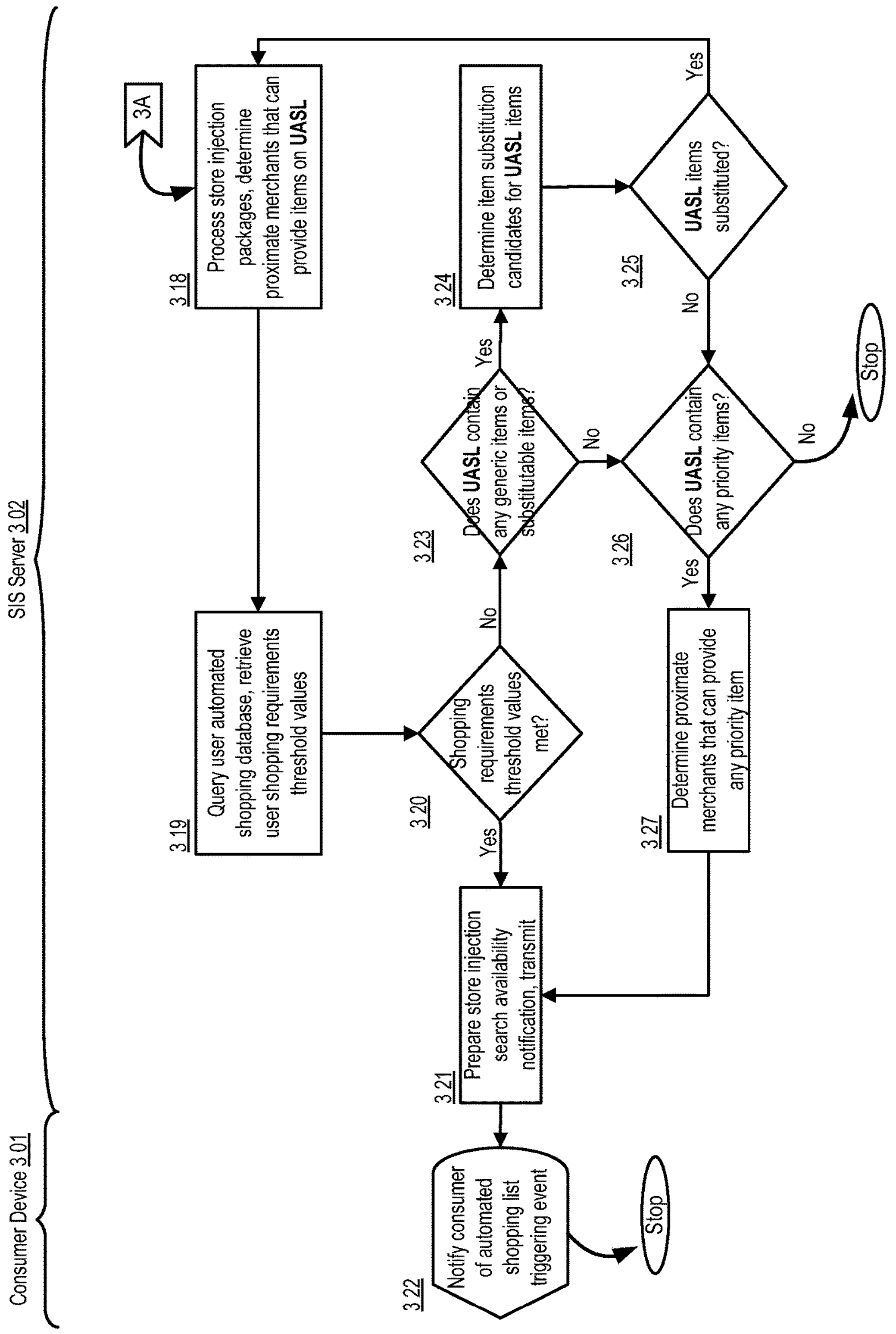

FIGS. 3A-B show an example logic flow illustrating aspects of automated shopping item availability processing, e.g., an AAP Component 300, in one embodiment of the SIS. In one embodiment, consumer device 301 may transmit a consumer location update notification, e.g., 304 to SIS server 302. The SIS server may receive the location update and extract the contents (e.g., by utilizing an integrated parse capability as described herein and with respect to FIG. 34), e.g., 305. In one embodiment, an automated shopping list may be contained in the location update location, e.g., 306. The list may be extracted, e.g., 307, and the contents of the list used to update a record in a shopping list database in communication with the SIS server, e.g., 308. In one embodiment, user location data (e.g., cell phone WiFi triangulation data, cellular tower information, GPS output, and/or the like) may be extracted from the location update notification, e.g., 309. A user automated shopping database may be queried for a current user automated shopping list corresponding with the consumer and/or consumer device, e.g., 310. In one embodiment, a merchant database may be queried for merchants that are in a proximity to the user's location (e.g., within walking distance, within a certain mileage, a certain bounded area indicated by the consumer, and/or the like), e.g., 311. Merchants may have store injection packages associated with their stores and/or store locations. Store injection packages may be periodically updated by initiative of the SIS server (e.g., by initiating an update procedure and contacting a merchant server), on the initiative of the merchant (e.g., by the merchant pushing updated store injection packages to the SIS server), and/or the like. In one embodiment, store injection packages may contain current inventory stock levels, current offers or specials available to consumers, staff that are currently in the store location, item pricing information, item descriptions, item reviews, and/or the like.

In one embodiment, if any merchant store injection packages are expired (e.g., not updated within a given time quantum, do not contain enough items, have stale data, are past an indicated merchant or SIS set expiration date/time, and/or the like), e.g., 312, a merchant location store injection package update request may be initiated, e.g., 313. Merchant server 303 may receive the update request, e.g., 314, extract the contents, generate an updated store injection package, and transmit or make the injection package available for use by the SIS server or a third-party server, e.g., 315. In one embodiment, SIS server 302 may update the store injection database with the merchant location package store injection contents, e.g., 316. In one embodiment, a store injection database may be queried to retrieve current store injection packages for stores near the user's location, e.g., 317.

With respect to FIG. 3B, SIS server 302 may process the store injection packages to determine proximate merchants that can provide items that are on the consumer's automated shopping list, e.g., 318. For example, the SIS server may execute a keyword or UPC number scan of the identified merchant store injection packages to determine nearby merchants that can provide items on the consumer's automated shopping list. In one embodiment, the SIS server may query the user automated shopping database for user shopping requirement threshold values, e.g., 319. Threshold values may be values that the consumer or SIS server has set that identify when the consumer should be notified of automated shopping opportunities. For example, in one embodiment, a consumer may choose to be notified only when a certain percentage of their shopping list is available for purchase in a given radius. In other embodiments, a consumer may set shopping requirement threshold values that identify some items as high priority (e.g., items that may override otherwise more restrictive threshold values), items that must be purchased by a certain date/time, and/or the like. In one embodiment, if the shopping requirement threshold values are met, e.g., 320, a store injection search availability notification may be prepared, e.g., 321. In one embodiment, consumer device 301 may then notify the consumer that an automated shopping list triggering event has occurred and, in one example, direct the consumer to a series of store locations to execute their purchases, e.g., 322. If the shopping requirement threshold values are not met, e.g., 320, the SIS server may determine if the consumer's automated shopping list contains any generic or substitutable items, e.g., 323. Generic items may be items on the consumer's shopping list that may be readily replaced with a more specific varietal of item while still preserving the user's desired purchase intent. For example, if a consumer indicated that they wanted to buy "juice for breakfast", a generic substitution for "orange juice" or "apple juice" would be appropriate. An item on the consumer's list may not be generic but may nevertheless be marked or designated (e.g., by the consumer, the SIS server itself, and/or the like) as an item capable of substitution. For example, if a user's automated shopping list contains a specific model of Sony television, the consumer may mark the item as substitutable for items of equivalent or better specifications (e.g., same or larger screen size, resolution, and/or the like) by a different manufacturer. In one embodiment, the SIS server may determine candidate items that may be substituted for items on the consumer's automated shopping list, e.g., 324. In one embodiment, if items are substituted, e.g., 325, the processing of store injection packages may repeat. In other embodiments, if no items are substitutable, the SIS server may determine if any items on the consumer's automated shopping list are priority items, e.g., 326. A priority item may be an item that the consumer designates that should be bought, if available in a proximity, even if the applicable user shopping requirement threshold values are not met. In one embodiment, if the SIS server determines that a proximate merchant can provide an item marked as a priority item, e.g., 327, then a store injection search availability notification may be prepared and sent to the consumer device, e.g., 321, and the consumer notified of the priority item shopping opportunity, e.g., 322.

Figure 4A:
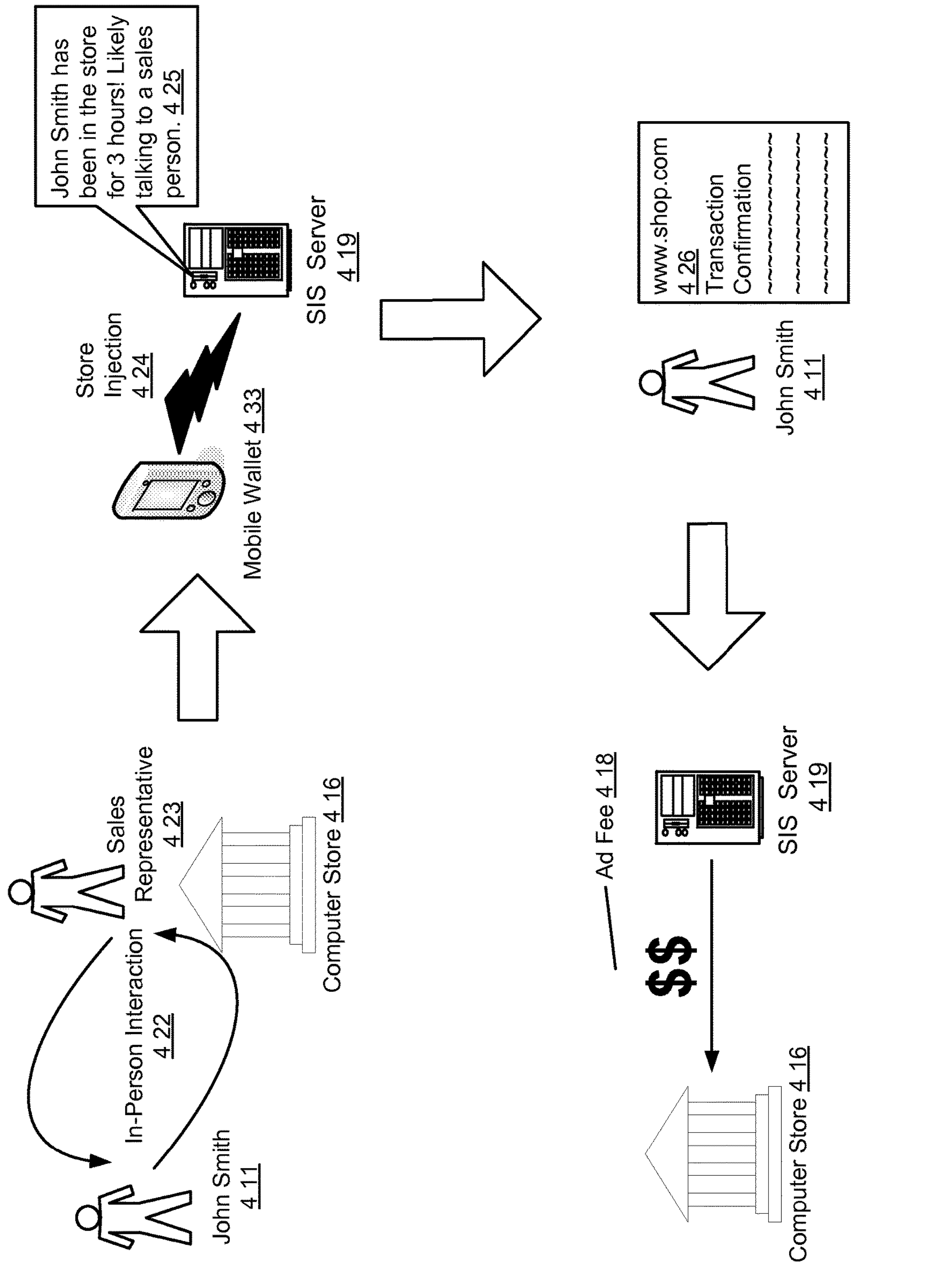
FIG. 4A provides an example block diagram illustrating tracking consumer ad exposure via store injection within embodiments of the SIS.

FIG. 4A provides an example block diagram illustrating tracking consumer ad exposure via store injection within embodiments of the SIS. Within embodiments, in one implementation, the consumer "John Smith" 411, may walk into a computer store 416 and obtain information from a sales representative 423 for a featured product. In one implementation, such in-person interaction 422 including exposure to advertisements may not be able to be tracked by monitoring the consumer's online activities.

In one implementation, the SIS may track such in-store advertisement exposure via a store injection component 424 instantiated with the consumer's mobile wallet 433. For example, the consumer's mobile wallet 401 may track the consumer's store check-in showing the consumer has spent significant time with the merchant store 425. In another implementation, the store injection component 424 may track the consumer's interested products in store.

In one implementation, when the consumer "John Smith" 402 makes a subsequent purchase, e.g., via an Internet shopping site 426, the SIS server 419 may generate heuristics that the purchase is a result of the in-store advertisement and sales work. The SIS server 419 may then distribute a contingent ad fee 418 to the retailer, e.g., the computer store 416.

Figure 4B:
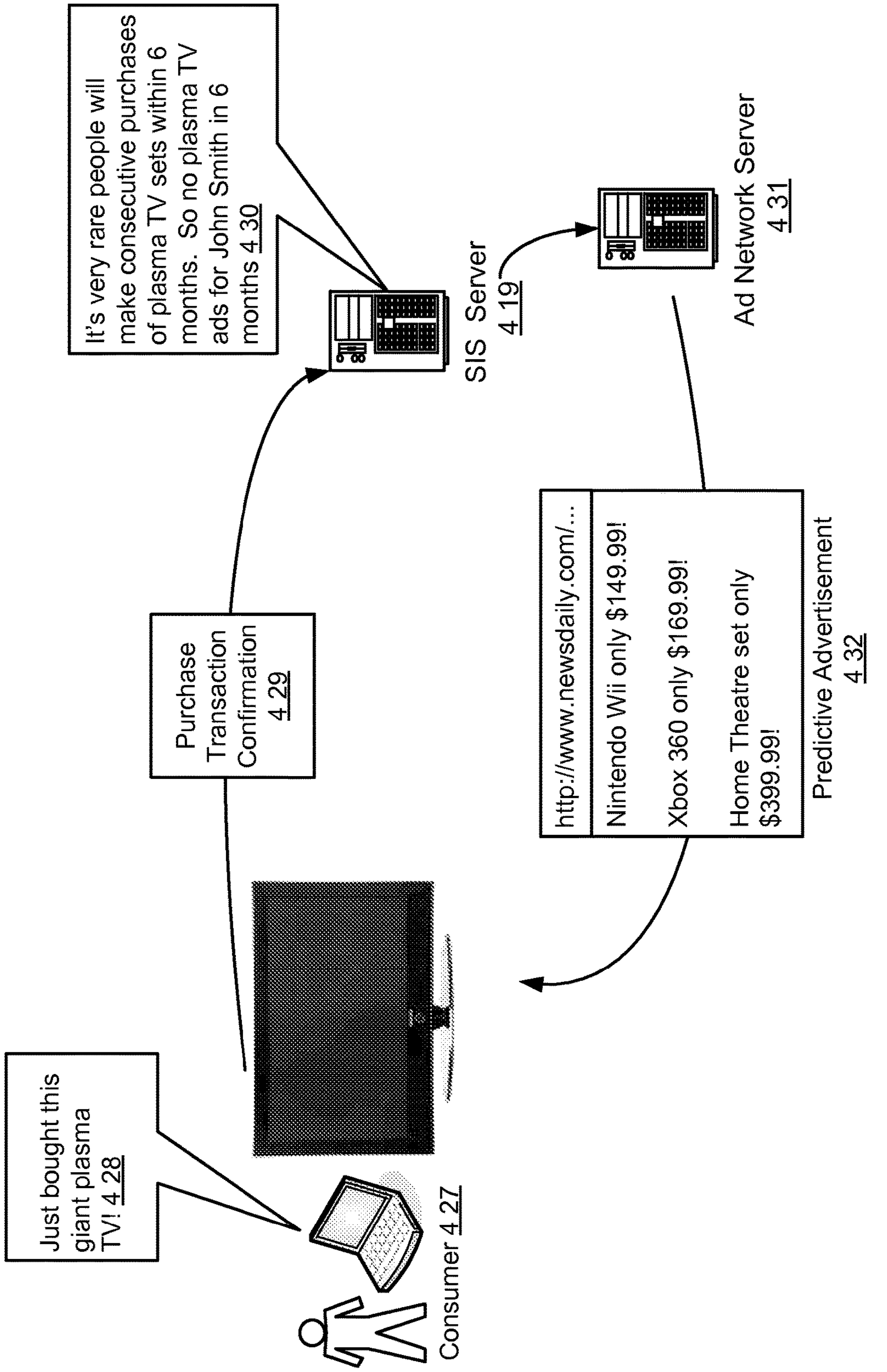
FIG. 4B provides an example block diagram illustrating predictive/seasonal advertising within embodiments of the SIS.

FIG. 4B provides an example block diagram illustrating predictive/seasonal advertising within embodiments of the SIS. Within implementations, upon purchasing a product, the SIS may obtain a purchase transaction confirmation 429 from a consumer, a merchant, a financial processing payment network/issuer (e.g., Visa, etc.) and/or the like. The SIS server 419 may generate heuristics data based on the consumer's purchasing history and shopping patterns to provide individualized advertisement delivery. For example, if the consumer 402 has just bought a plasma TV 428, the SIS server 419 may determine based on heuristics 430 that it is unlikely the consumer may be interested in shopping for another plasma TV within at least 6 months, and may not provide plasma TV ads to the user.

In one implementation, the SIS server may be integrated with an Ad Network server 431 to provide ads to a consumer. In another implementation, the SIS server may comprise an independent server that will feed information to the ad network server 431 as to what ads to be provided to the consumer. For example, the ad network server 431 may receive instructions to generate predictive ads 432 that do not include a TV ad. In another example, the SIS server may instead feature TV related products ads to the user 427, e.g., video game equipment, home theatre system, etc. For example, if the same consumer browses an online store for electronics and searches for popular electronic products, the electronics store may not provide ads of plasma TVs but the complementary gaming gadgets to the consumer.

Figure 5A:
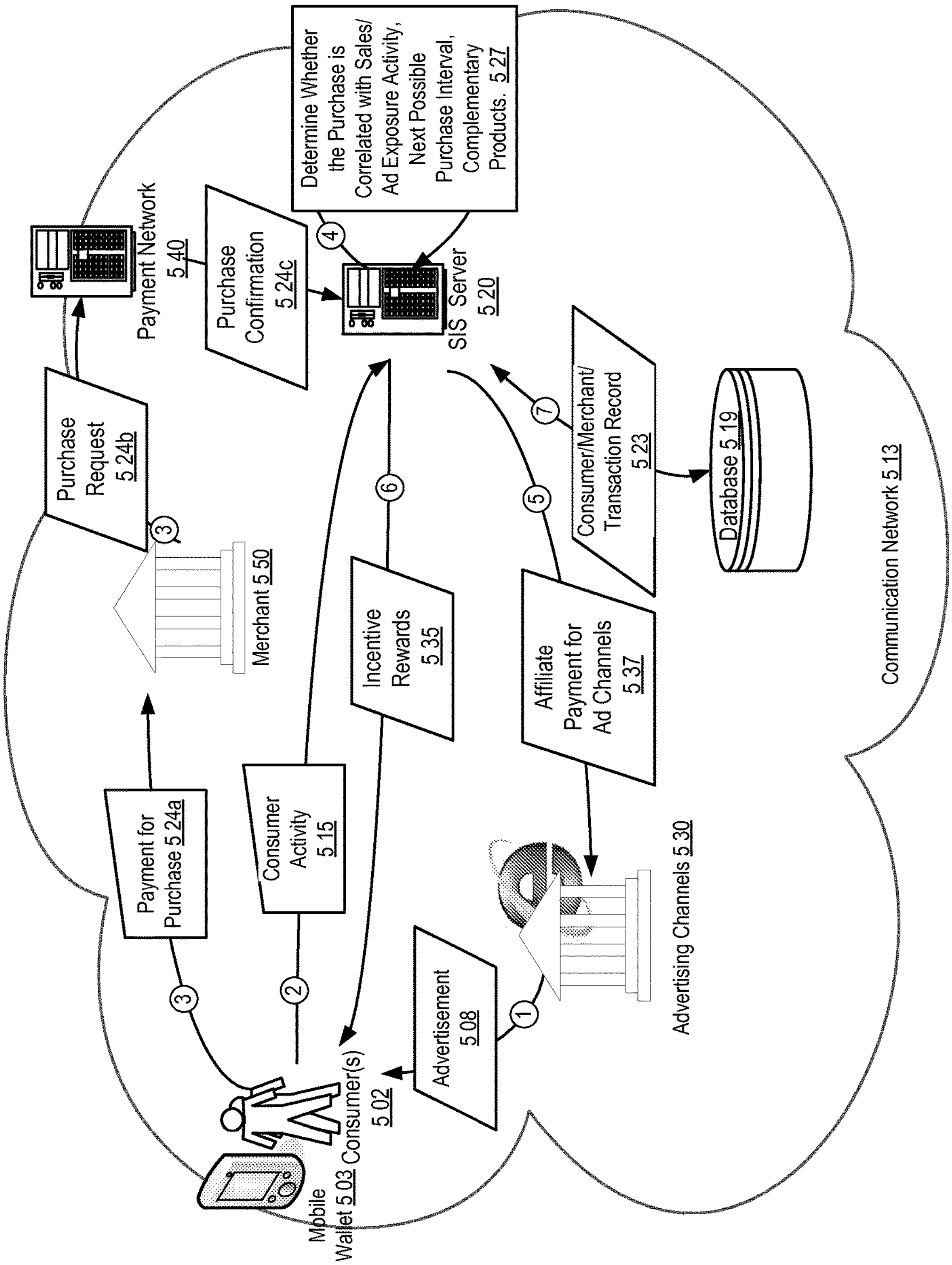
FIGS. 5A-5B show block diagrams illustrating data flows between SIS server and affiliated entities within various embodiments of the SIS.

FIG. 5A shows a block diagram illustrating data flows between SIS server and affiliated entities within various embodiments of the SIS. Within various embodiments, one or more consumers 502, SIS server 520, SIS database(s) 519, merchant 550, and/or advertising channels 530 are shown to interact via various communication network 513.

In one embodiment, a consumer 502, may operate a wide variety of different user devices, including communications devices and technologies within embodiments of SIS operation. For example, in one embodiment, the consumer devices may include, but are not limited to, computer terminals, work stations, cellular telephony handsets, smart phones, tablets, personal digital assistants (PDAs), and/or the like. In one embodiment, the SIS server 520 may be equipped at a terminal computer of the consumer 502. For example, the SIS component may be instantiated on a consumer device to conduct SIS analysis. In another embodiment, the SIS server 520 may be a remote server which is accessed by the consumer 502 via a communication network 513, such as, but not limited to local area network (LAN), in-house intranet, the Internet, and/or the like.

In one implementation, the consumer 502 may be associated with an electronic wallet 503, which may have various registered accounts, including one or more bank accounts, an SIS service account, a merchant membership account, and/or the like, possessed with the consumer 502. For example, a consumer may possess an electronic wallet linked a Bank of America checking account, a Chase credit card account, a Sam's Club membership account, and/or the like. For another example, the consumer's electronic wallet may be registered for the SIS service. For another example, a consumer may operate a mobile device to access his electronic wallet to make a purchase, as further illustrated in the example screen shots.

In one embodiment, the consumer's electronic wallet may be registered with the SIS server 520. For example, the consumer's electronic wallet may comprise a tag indicating the consumer electronic wallet is "SIS enabled." In one implementation, when a consumer initiates a browser session via a personal device (e.g., a laptop, a smart phone, etc.), such as opening a browsing window on Internet Explorer, Firefox, Safari, Google Chrome, and/or the like, the browser may state information of the session indicating the session is eligible for SIS service. For example, when a consumer searches for desired products on Google, the user's browser may contain cookies of an SIS label, and may notify the Google server of such SIS label; the search engine may return a list of SIS featured search results, e.g., listing the SIS participating merchants' products/advertisements on top of the list. In this way, the consumer may obtain advertising information 508 from the merchants' advertising channels 530, e.g., the Internet, etc.

In alternative implementations, the consumer 502 may click on a URL link and view an online advertisement 508 from an advertising channel 530, such as a news site, a social media ad, and/or the like.

In another embodiment, upon receiving an advertisement (e.g., on the consumer's Internet browser, etc.), the consumer's activities 515 may be recorded and forwarded to the SIS server 520. For example, in one implementation, the SIS server may run a Java applet within the consumer's browser and monitor the consumer's interactive activities with the displayed advertisement, e.g., clicking on the advertisement link, visiting a merchant website following links provided in the advertisement, making a subsequent purchase on the merchant website, and/or the like. The SIS server 520 may store the consumer activity information, and correlate it with subsequently received purchasing information to determine whether the consumer's purchase is triggered by the advertisement.

For example, in one implementation, the consumer device may provide a consumer activity message 515 to the SIS server 520 as a HTTP(S) POST message including XML-formatted data. An example listing of a consumer activity message 515, substantially in the form of a HTTP(S) POST message including XML-formatted data, is provided below:

-continued

```
POST /consumer_activity.php HTTP/1.1
Host: www.SIS.com
Content-Type: Application/XML
Content-Length: 667
<?XML version = "1.0" encoding = "UTF-8"?>
<consumer activity>
    <activity_ID> WEB2015-9991 </activity_ID>
     <timestamp>2015-12-15 17:15:56 </timestamp>
  <Source>
    <hardware_ID> JS-00923 <hardware_ID>
    <hardware_type> Apple iPhone </hardware_type>
    <IP_address> 206.205.82.130 </IP_address>
    <session_type> browser </session_type>
    <session_ID> G656TD <session_ID>
  ...
  </Source>
   <user>
    <user_ID> JS-001 </user_ID>
    <user_name> John Smith </user_name>
    <user_number> 000-000-0001 </user_number>
    ...
  </user>
   <Message>
    <message_type> query </message_type>
    <url> www.google.com </url>
    <key_term> "men sweater" </key_term>
    <ad_exposure>
        <ad_l>
            <ad-id> BR_0001 </ad-id>
       </ad_sponsor> Banana Republic
</ad_sponsor>
       <url> www.banana-republic.com/men/sweater </url>
       <activity> click and view </activity>
       <duration> 00:01:56 </duration>
       ...
    </ad_l>
    <ad_2>
            <ad-id> AX_0001 </ad-id>
            <ad_sponsor> Armani Exchange
  </ad_sponsor>
            <url>
 www.armani exchange.com/men/sweater </url>
            <activity> click </activity>
            <duration> 00:00:04 </duration>
            ...
       <ad_2>
       ...
     <ad_exposure>
    </Message>
     ...
 </consumer_activity>
```

In the above example, the consumer activity message 515 includes a consumer Google search event for "men sweater," and the consumer subsequently clicked on two advertisement links returned in the search results, e.g., the "Banana Republic" and "Armani Exchange," and the consumer's interactions with the advertisements, e.g., click and view, or just click through, etc., and the duration that the consumer has stayed on the advertisement are recorded and included in the consumer activity message 515.

In another implementation, the SIS may track consumer advertisement exposure via In-Store injection data and web crawl via a profile aggregator.

In one implementation, the consumer may submit payment information to make a purchase request 524*a* with the merchant 550 (e.g., either at a physical merchant store, or an online shopping site, etc.) when the consumer is interested in the advertised products. For example, in one implementation, the consumer may visit a participating merchant store's website, a third party shopping website featuring the merchant's product (e.g., Amazon.com, Zappos.com, etc.) and/or visit product advertisement via social media (e.g., Facebook, Twitter, etc.), and/or the like, and may submit an online purchase request if a desired product by providing payment information, e.g., entering a credit card number, electronic wallet information, and/or the like.

For another example, the consumer may visit a merchant store and make an in-store purchase of the product. In one embodiment, the consumer 502 may provide his SIS wallet information included in the payment request 524*a* to a merchant store 550 prior to his check-out. For example, in one implementation, the consumer may swipe an SIS membership magstripe card at a POS terminal of the merchant store. For another example, the consumer may operate a smart phone for registration with the POS via short messages. For another example, the consumer may register with the merchant via bar code scan of the consumer's SIS membership card and/or the product.

For example, in one implementation, the consumer may provide a purchase request 524*a* to the merchant server 550 as a HTTP(S) POST message including XML-formatted data. An example listing of a payment request 524*a*, substantially in the form of a HTTP(S) POST message including XML-formatted data, is provided below:

```
POST /payment-request.php HTTP/1.1
Host: www.merchant.com
Content-Type: Application/XML
Content-Length: 667
<?XML version = "1.0" encoding = "UTF-8"?>
<payment_request>
        <request_ID>RS-99942e</request_ID>
        <timestamp>2015-12-20 17:15:56 </timestamp>
        <Source>
            <hardware_ID> JS-00923 <hardware_ID>
            <hardware_type> Apple iPhone </hardware_type>
            <IP_address> 206.205.82.130 </IP_address>
            <session_type> browser </session_type>
            <session_ID> G656TD <session_ID>
            ...
        </Source>
        <user>
            <user_ID> JS-001 </user_ID>
            <user_name> John Smith </user_name>
            <user_number> 000-000-0001 </user_number>
            ...
        </user>
        <payment>
            <type> Visa mobile wallet </type>
            <account> visa </account>
            <account_no> 0000 0000 0000 0000 </account_no>
            <routing_no> 123456789 </routing_no>
            <CCV> 000 </CCV>
            <amount> 99.99 </amount>
            ...
        </payment>
        <product>
            <MCC> 09090909 </MCC>
            <category> apparel </category>
            <description> men sweater navy </description>
            <price> 99.99 </price>
            <brand> Banana Republic </brand>
            ...
        </product>
        <merchant>
            <merchant_name> Banana Republic </merchant_name>
            <source> www.banana-republic.com/online/shop/...
</source>
            ...
        </merchant>
        </payment_request>
```

In one implementation, the SIS server 520 may obtain an indication of the user purchase from a purchase request 524*b* received from a merchant 520. In another implementation, a payment network/issuer (e.g., Visa) 540 may receive and process the purchase request 524*b* from the merchant 550 and may provide a purchase confirmation 524*c* to the the SIS server 520 as an indication of purchase transaction when the transaction is finished and cleared. For example, the purchase confirmation message 524*c* may include fields similar to that of the purchase request, including fields such as the product information, merchant information, a timestamp, and/or the like.

In one implementation, the SIS server 520 may determine whether the purchase is correlated with any prior ad exposure activity 527. For example, in one implementation, the SIS may determine whether the purchase transaction is a result of consumer exposure to an ad, or the consumer naturally having the propensity to shop with the merchant. In another example, the SIS may determine a next possible purchase interval (e.g., if a consumer has bought a plasma TV, it is unlikely the consumer may purchase a second one within 6 months, etc.). In another example, the SIS may determine complementary products to the purchase transaction (e.g., video gaming gadgets as complementary to the purchase of a plasma TV, etc.). Upon the correlation, the merchant 550 may determine whether an affiliate payment 533 is due to the SIS server 520 and/or the advertising channel 530. In an alternative implementation, the SIS server 520 may receive an indication of the purchase (e.g., via the consumer's wallet, via the SIS java applet if the consumer makes an online purchase, etc.), and then determine a correlation of the purchase between the purchase and the consumer's Internet activity. For example, if the merchant record shows the consumer has never purchased any products from the merchant in the past six months, but the purchase is made after a subsequent viewing of the merchant's advertisement, as indicated in the internet activity 515 recorded at the SIS server 520, the merchant may provide affiliate payment to SIS server 520 and the advertising channel 530 based on their agreement, e.g., 2% of the purchase price to SIS server, 2% to the advertising channel (e.g., Google, etc.).

In one embodiment, the merchant may provide incentive rewards to the consumer, e.g., a rebate amount, etc., for using SIS. For example, after the consumer has made a purchase, and the SIS server has correlated the purchase to the consumer's internet activity of viewing an SIS advertisement of the product, the merchant 550 may allocate 2% of the purchase price of the purchase as incentive rewards to the consumer. In one implementation, the SIS server credit the incentive rewards to the consumer's electronic wallet. In alternative implementations, a variety of incentive awards may be provided to the consumer, such as store points, coupons, sample gifts, and/or the like.

In one implementation, the merchant may provide affiliate payment to the SIS server 520, which may re-distribute the affiliate payment to the consumer as incentive rewards, and affiliate payment to the advertising channels 530 for advertising fee. For example, the merchant may allocate 6% of the purchase price of a transaction to the SIS server 520, and request 2% be re-distributed to an advertising channel (e.g., Google, etc.), and 2% be credited to the consumer.

In one embodiment, the SIS server 520 may establish data records of registered consumers, merchants, past transactions 523 for storage in a database 519. For example, in one implementation, the consumer/merchant transaction record 523 may comprise information with regard to the purchase price, a purchase time-stamp, conditions of the purchase (e.g., whether eligible for SIS affiliate payment), and/or the like.

For example, an exemplary XML record of a transaction may take a form similar to the following:

```
<Transaction>
<TransactionID> 223456789 </TranactionID>
    <TransactionTime> 09:10:23 06-06-2000 </TransactionTime>
    <TransactionPrice> 39.99 </TransactionPrice>
    <ProductID> BR-Men-89999 <?ProductID>
    <Merchant>
        <MerchantID> M0008 </MerchantID>
    <MerchantName> Banana Republic </MerchantName>
        <ProductID> BR_Men_Sweater_89999 </ProductID>
        <MerchantRule>
            <TimeFrame> 280 days </TimeFrame>
            <PurchaseRange> Category <PurchaseRange>
            <BrandRange> Banana Republic <BrandRange>
            <AffiliatePaymentRule>
                <Rule1>
                <Amount> 2% </Amount
                <Entity> SIS <Entity>
                </Rule1>
                <Rule2>
                <Amount> 2% </Amount>
        ... <Entity> Google <Entity>
                </Rule2>
                <Rule3>
                <Amount> 2% </Amount>
        ... <Entity> Consumer <Entity> </Rule3>
            </AffiliatePaymentRule>
            ...
        </MerchantRule>
            <EligibleSourceSites>
                <Site1> www.bananarepublic.com </Site1>
                <Site2> www.Amazon.com </Site2>
                <Site3> www.6pm.com </Site2>
            ...
            </EligibleSourceSites>
...
    </Merchant>
    <ConsumerID> 00001 </ConsumerID>
    <ConsumerWalletID> Wallet8888 </ConsumerWalletID>
    <Consumer>
    <ConsumerHistory>
        <Brand> banana republic </Brand>
         <ProductRange> Men's apparel </PRoductRange>
        <PurchaseRecord> Null </PurchaseRecord>
...
        </ConsumerHistory>
```

-continued

```
...
    <AffiliatePayment>
        <Paymentl>
            <Amount> 0.8 </Amount>
            <Entity> SIS <Entity>
        </Paymentl>
        <Payment2>
            <Amount> 0.8 </Amount>
            ...<Entity> Google <Entity>
        </Payment2>
        <Payment3>
            <Amount> 0.8 </Amount>
            ...<Entity> Consumer <Entity>
        </Payment3>
        ...
    </AffiliatePayment>
    ...
</Transaction>
```

In the above XML example, the purchase includes a product from the merchant "Banana Republic," and the merchant may specify rules for the affiliate payment eligibility, e.g., a time frame of 280 days prior to the purchase, during which the consumer did not purchase any product of the same "category," e.g., Banana Republic men's apparel. For another example, the merchant may expand the purchase range to the entire brand name, e.g., requiring a consumer with no prior purchase of any Banana Republic products within the past 280 days, etc. The merchant may further specify that purchases made via a list of participating sites are eligible to be considered for affiliate payment, e.g., Amazon.com, etc. The merchant may further specify the affiliate payment rule, e.g., splitting 2% of the purchase price to the SIS, Google and the consumer, etc.

In some embodiments, the SIS server 520 may store the transaction record by issuing PHP/SQL commands to store the data to the database table. An example transaction record store command 523, substantially in the form of PHP/SQL commands, is provided below:

```
<?PHP

Header ('Content-Type: text/plain');

mysql_connect ("254.92.185.103",$DBserver,$password); // access database server

mysql_select ("SIS_DB.SQL"); // select database to append mysql query ("INSERT
INTO TransactionTable (transaction_ID, transaction_date, requested_time,

receipt_time, user_ID, user_name, user_password, account no, total_amount,
transfer_log, payee_ID, payor_ID, transfer_amount ...)

VALUES ($transaction_ID$, $transaction_date$, $requested_time$, $receipt_time$,
$user_ID$, $user_name$, $user_password$, $account_no$, $total_amount$, $transfer_log$,
$payee_ID$,
$payor_ID$, $transfer_amount$ ...) ; //
add data to table in database ; // add data to table in database
mysql_close ("SIS _DB.SQL"); // close connection to database
?>
```

Figure 5B:
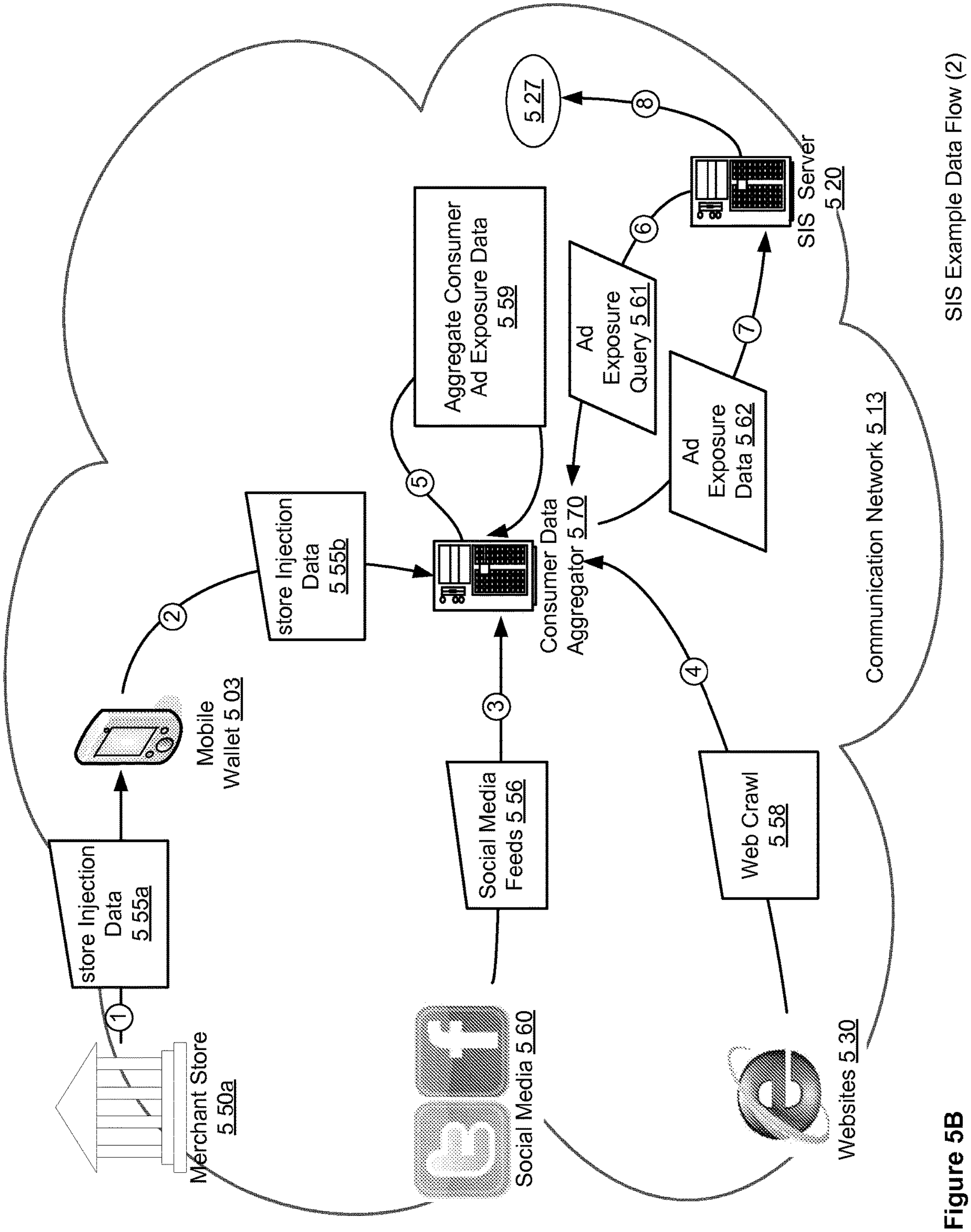

With reference to FIG. 5B, a consumer data aggregator 570 may collect various consumer data from various sources.

For example, in one implementation, the consumer operating a mobile wallet 503 may obtain store injection data 555*a* from the merchant store, and forward such injection data 555*b* indicating consumer activities in a physical merchant store to the consumer data aggregator 570. In one implementation, the store injection data 555*a-b* may comprise the consumer's GPS location information, duration of the stay, price-checking using barcode/QR code scanning via the mobile wallet, and/or the like. For example, the mobile wallet 503 may provide a store injection data message 555*b* to the SIS server as a HTTP(S) POST message including XML-formatted data. An example listing of a store injection data message, substantially in the form of a HTTP(S) POST message including XML-formatted data, is provided below:

```
POST /store_event.php HTTP/1.1
Host: www.merchant.com
Content-Type: Application/XML
Content-Length: 667
<?XML version = "1.0" encoding = "UTF-8"?>
<store_event>
    <event_ID> BR_1122 </event_ID>
    <timestamp>2015-12-18 17:15:56 </timestamp>
    <event_type> check-in </event_type>
    <GPS> 38°53'22.0000" N 77°2'6.000" W </GPS>
    <store_location>
        <address_linel> 133 palm street </address_linel>
        <address_line2> San Isla, CA </address_line>
        <zipcode> 00000 </zipcode>
        ...
    </store_location>
    <merchant>
        <merchant_ID> BR001 </merchant_ID>
        <merchant_name> Banana republic </merchant_name>
        <merchant_category> apparel </merchant_category>
        ...
    </merchant>
    <user>
        <wallet_ID> JS-001 </user_ID>
        <user_name> John Smith </user_name>
        <user_number> 000-000-0001 </user_number>
        ...
    </user>
    <duration> 00:56:34 </duration>
    ...
</store_event>
```

In the above example, the store injection data message 555*b* includes the GPS information of a physical "Banana Republic" store and indicates that the consumer "John Smith" has visited and stayed in the store for 56 minutes. In another example, other store event types may reflect in-store ad exposure to the consumer, such as price checking, etc. Another example listing of an store injection data message 525*b*, substantially in the form of a HTTP(S) POST message including XML-formatted data, is provided below:

```
POST /store_event.php HTTP/1.1
Host: www.mobile-wallet.com
Content-Type: Application/XML
Content-Length: 667
<?XML version = "1.0" encoding = "UTF-8"?>
<store_event>
    <event_ID> BR 1122 </event_ID>
    <timestamp>2015-12-18 17:15:56 </timestamp>
    <event_type> price check </event_type>
    <GPS> 38°53'22.0000"N 77 °2'6.000" W </GPS>
    ...
```

-continued

```
    <merchant>
        <merchant_ID> BR001 </merchant_ID>
        <merchant_name>Banana republic </merchant_name>
        <merchant_category> apparel </merchant_category>
        ...
    </merchant>
    <user>
        <wallet_ID> JS-001 </user_ID>
        <user_name> John Smith </user_name>
        <user_number> 000-000-0001 </user_number>
        ...
    </user>
    <product>
        <product_ID> MC0001 </ProductID>
        <product_name> men sweater spring </product_name>
        <product_description>
            <QR_code> 877fsf.jpg </QR_code>
            <color> navy </color>
            ...
        </product_description>
        <price> 99.99 </price>
        ...
    </product>
    <purchase_channel>
        <channell>
            <url> www, amazon.com </url>
            <price> 99.99 </price>
            <activity> none </activity>
        </channell>
        <channel2>
            <url> www.shop,com </url> <price>
            85.99 </price> <activity> click
            </activity>
            ...
        </channel2>
    </purchase_channel>
</store_event>
```

In the above example, the store injection data message 555*b* comprises information of consumer's price check of a product using a mobile wallet. For example, the consumer may operate his/her mobile wallet device (e.g., a smartphone, etc.) to scan a QR code of the product and generate a price comparison check, e.g., the price listings on merchant sites "amazon.com" and "shop.com." If the user has clicked on a searched merchant site, e.g., www.shop.com. such information is also fed to the consumer data aggregator 570, which may be considered as an ad exposure event.

In another implementation, the consumer data aggregator 570 may obtain social media feeds 556 from a social media platform 560. For example, a consumer's social payment, social comments, "like" event on Facebook, and/or the like, may reflect a consumer's sentiment towards a product, or a brand name.

For example, the social media platforms 560 may provide a social media feeds message 556 to the SIS server as a HTTP(S) POST message including XML-formatted data. An example listing of a social media feeds message, substantially in the form of a HTTP(S) POST message including XML-formatted data, is provided below:

```
POST /social_feed.php HTTP/1.1
Host: www.social_media.com
Content-Type: Application/XML
Content-Length: 667
<?XML version = "1.0" encoding = "UTF-8"?>
<social_feed>
    <feed_ID> FB_0001 </feed_ID>
    <timestamp>2015-12-11 17:15:56 </timestamp>
    <social_platform>
        <name> Facebook </name >
        <server> www.facebook,com </server>
```

-continued

```
            <server_ip> 000.000.00.00 </server_ip>
            <feed_type> like </feed_type>
            <object> "Buy 1 get 1 50% Banana Republic Coupon"
    </object>_
        ...
        </social_platform>
         <user>
            <wallet_ID> JS-001 </user_ID>
            <user_name> John Smith </user_name>
            <user_number> 000-000-0001 </user_number>
            ...
        </user>
        ...
        </social_feed>
```

In another implementation, the consumer data aggregator 570 may obtain updates from web crawl 558 from various website 530, e.g., consumer's blog posts, browsing activities, etc. For example, the web server 530 may provide an update message 558 to the SIS server as a HTTP(S) POST message including XML-formatted data. An example listing of a web update message 558, substantially in the form of a HTTP(S) POST message including XML-formatted data, is provided below:

```
POST /web-claw.php HTTP/1.1
Host: www.variousweb.com
Content-Type: Application/XML
Content-Length: 667
<?XML version = "1.0" encoding = "UTF-8"?>
<web_claw>
        <web_ID> web_0001 </feed_ID>
        <timestamp>2015-12-11 17:15:56 </timestamp>
        <user>
            <wallet_ID> JS-001 </user_ID>
            <user_name> John Smith </user_name>
            <user_number> 000-000-0001 </user_number>
            ...
        </user>
        <source> www.amazon,com </source>
        <event_type> rating </event_type>
        <product>
            <product_ID> MC0001 </ProductID>
            <product_name> men sweater spring </product_name>
            <product_description>
                <color> navy </color>
                ...
            </product_description>
            <price> 99.99 </price>
            ...
        </product>
...
</web_claw>
```

In one implementation, the consumer data aggregator 570 may aggregate consumer ad exposure data 559, and store the aggregation results in a data store. In one implementation, the SIS server 520 may generate an ad exposure query 561 to the consumer data aggregator 570. For example, when the SIS server 520 has received a purchase indication, the SIS server 520 may query on the purchased item to determine whether the consumer has prior ad exposure for the purchased item.

For example, the SIS server 520 may issue PHP/SQL commands to query a database table for ad exposure data. An example ad exposure data query 561, substantially in the form of PHP/SQL commands, is provided below:

```
<?PHP
Header ('Content-Type: text/plain');
mysql_connect ("254.93.179.112", $DBserver, $password); // access
database server
mysql_select_db ("SIS _DB.SQL"); // select database table to search
//create query
$query = "SELECT comment like access FROM SocialTable WHERE
product LIKE '%' $Banana Republic";
$result = mysql_query ($query); // perform the search query
mysql_close ("SIS_DB.SQL"); // close database access
?>
```

In some embodiments, the SIS server may receive an ad exposure data 562 query results from the consumer data aggregator 570, indicating whether there is prior ad exposure to the queries product name, or brand name. For example, the ad exposure data 562 may comprise any previously stored ad exposure record in a form similar to the received store injection data 555*b*, social media feeds 556, web crawl 558, and/or the like. The SIS server 520 may then proceed to correlation at 527 in FIG. 5A.

Figure 6A:
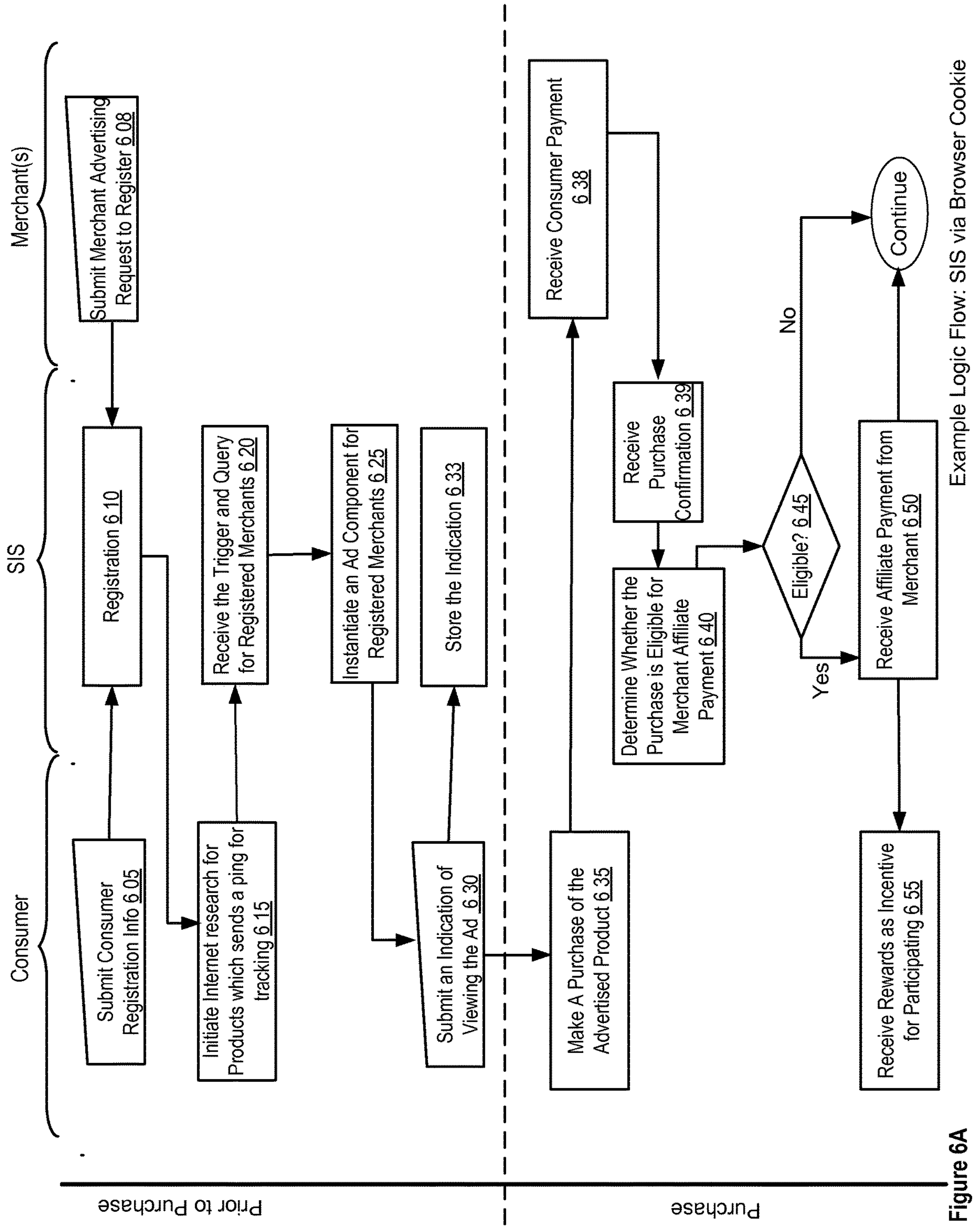
FIGS. 6A-6B provide logic flow diagrams illustrating embodiments of the SIS.
Figure 6B:
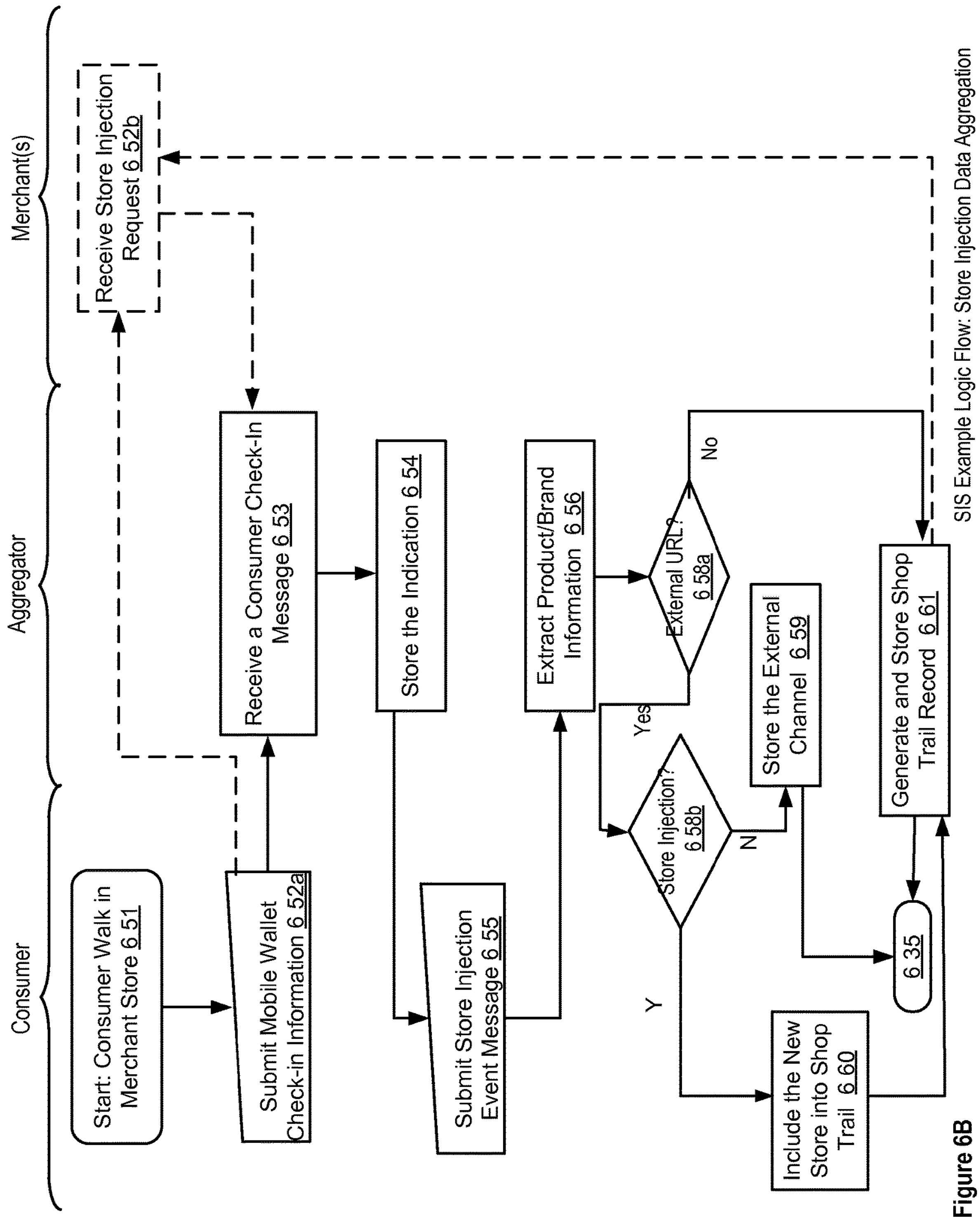

FIGS. 6A-6B provide logic flow diagrams illustrating embodiments of the SIS. Within embodiments, a consumer may submit consumer registration information 605 to register with the SIS. For example, a consumer may establish a user account with the SIS, and submit payment information (e.g., a credit card, a debit card, a checking account, PayPal account, etc.) to SIS in order to register 610. In one embodiment, upon user registration, the SIS may run a remote component (e.g., Java Applet, etc.) at the consumer's browser to track consumer's Internet browsing behaviors.

In one embodiment, a merchant, e.g., a brand name product company, etc., may register with the SIS by submitting merchant information 608. In another implementation, the merchant may submit a request to advertise to the SIS, so that the SIS may generate an advertising component for display at the consumer terminal for the merchant. In an alternative implementation, the merchant may submit information with regard to a third party advertising channel wherein the merchant's products are advertised, to the SIS 120.

In one embodiment, upon registration with SIS, a consumer may initiate Internet research for a desired product 615. For example, if the consumer wants to buy a sweater, he may initiate a search based on key term "sweater." In one implementation, during the course of the Internet research for a sweater, the consumer may trigger an event which sends an indication to SIS indicating the consumer is looking for a "sweater." The consumer's device may send a query to search network, e.g., Google, Yahoo, Bing, etc., or may click on certain ads. Such indication of interests may be saved as an ad cookie on the consumer device, intercepted by the use of a plug-in of the consumer's web browser, captured in log by the target of the search, (e.g., web search engine, advertising networks, merchants, etc.) those targets may subsequently make the search terms available to the SIS, and/or the ad networks; such information may be passed as a data structure through a HTTP POST message. For example, the triggered event may include, but not be limited to consumer clicking on a search advertisement of "men's sweaters", consumer clicking on a display advertisement of "men's sweaters," consumer interacting with an advertisement related to "men's sweaters" for an extended period, consumer visiting a merchant website featuring "men's sweaters," consumer visiting a product review website related to "men's sweaters," and/or the like.

In one implementation, the SIS may receive the event trigger and query for registered related merchants 620. For example, in one implementation, if the consumer clicks on an advertisement for "new collection for men's sweaters," the SIS may receive this indication that the consumer is interested in "men's sweaters," and may form a query in its merchant database for merchants that offer "men's sweaters."

In one implementation, the SIS may instantiate an advertisement component (e.g., on the browser, etc.) for a queried merchant 625. For example, the SIS may determine "Banana Republic" offers "men's sweaters," and may then display an advertisement for Banana Republic to the consumer. In one implementation, there may be more than one registered merchant that offer "men's sweaters." In one implementation, the SIS may sort a list of advertisements of different merchants based on a variety of metrics, such as, but not limited to relevancy, the percentage of affiliated payment the merchant is willing to pay SIS, and/or the like.

In one embodiment, the consumer may view the provided advertisement and submit an indication of view the advertisement to SIS 630, e.g., by clicking on the advertisement. The SIS may store the indication 633, e.g., a time-stamp, an advertisement ID, a consumer ID, and/or the like. As such, to this point, the SIS may operate as an ad network. In one embodiment, SIS may communicate with an ad network, and otherwise shed such ad network features itself, and provide indication of transactions while performing operations as follows.

In one implementation, a consumer may subsequently make a purchase of the advertised product 635, e.g., a Banana Republic sweater for men as discussed in the above example. Within a variety of implementations, the consumer may purchase the product via a variety of commercial channels, such as in-store, via the merchant website, via a shopping website (e.g., Amazon.com, macys.com, etc.), and/or the like.

In one implementation, information used to confer an eligible product has been purchased by the consumer may be obtained from the user device (e.g., an electronic wallet on a mobile device, etc.), the merchant, an issuer and/or payment network cooperating with the SIS system. In one implementation, registered consumers may have all account transactions that occur with registered accounts serve as a trigger to determine if such purchased items are eligible for SIS rewards.

In an alternative embodiment, when the merchant has no direct relationship with SIS, a merchant may charge a consumer's payment account for the purchase, and the transaction may be processed by a payment network and/or an issuer (e.g., Visa, etc.). The SIS may be disposed with communication with the payment network/issuer, and thereby may be provided the payment indication through such networks.

Upon receiving payment from the consumer 638, the merchant may confirm purchase transaction with a payment network. For example, the SIS may receive purchase confirmation 639 from the merchant, the payment network, and/or the like. In one implementation, the merchant and the SIS may determine whether the purchase is eligible for a merchant affiliate payment 640, e.g., whether the merchant should pay SIS for advertising. In one implementation, rules for determining the eligibility may be established in a merchant-SIS agreement. In one embodiment, the SIS has aggregated different types of consumer activities, all of which may be saved at an SIS database and associated with a consumer identifier, and a timestamp at which the activity occurs. As such, the consumer activity SIS database may be used to correlate activities with obtained purchase confirmation by the same consumer, and such database may be queried on rules that establish eligibility for revenue sharing, incentive rewards, and/or the like. For example, if the SIS determines the consumer hasn't made a purchase with the merchant in the last 180 days, the merchant should pay a portion of the transaction amount to the SIS. For another example, SIS and the merchant may agree that if the purchase takes place within a short period of time (e.g., within 34 hours, etc.) subsequent to the time stamped indication of consumer viewing an advertisement at 633, SIS is eligible for affiliate payment from merchant. For example, the SIS may generate a query into the correlation rule table to determine whether the purchase is correlated with the ad exposure:

```
<?PHP
Header ('Content-Type: text/plain');
mysql_connect ("254.93.179.112", $DBserver, $password); // access
database server
mysql_select_db ("SIS_DB.SQL"); // select database table to search
// create query
$query = "SELECT correlation id, correlation name, rule sponsor,
ad fee sponsor, ad product_ID, correlation_status FROM
CorrelationTable WHERE purchase interval LIKE '%'
$purchase_interval";
$result = mysql_query ($query); // perform the search query
mysql all_close ("SIS_DB.SQL"); // close database access
?>
```

In another example, if the consumer has repeatedly clicked on the advertisement by the same merchant (e.g., Banana Republic) within a period of time (e.g., a week), the correlation rule may acknowledge a subsequent purchase as a result of ad exposure. For example, the SIS may generate a query into the correlation rule table:

```
<?PHP
Header ('Content-Type: text/plain');
mysql_connect ("254.93.179.112", $DBserver, $password); // access
database server mysql_select_db ("SIS_DB.SQL");
// select database table to search //create query $query = "SELECT
correlation_ID, correlation_name, rule_sponsor, ad_fee_sponsor,
ad_product_ID, correlation_status FROM CorrelationTable WHERE
visits_per_week LIKE '%'
$visits_per_week";
$result = mysql_query ($query); // perform the search query
mysql_close ("SIS_DB.SQL"); // close database access
?>
```

For another example, eligibility of the purchased item may be determined 645 upon whether the consumer has "viewed" the advertisement by retrieving an indication 633, e.g., whether the user has clicked on, followed a link by a related advertisement of the merchant's product. As such, the SIS would work regardless where the purchase takes place, e.g., online purchase, in-store purchase, and/or the like.

In one embodiment, if eligible, the merchant may through pay a portion (e.g., 5%) of purchase transaction to SIS as an affiliate payment 650. In one implementation, this payment may be variable based on the consumer's previous activity—for example, if they had made a purchase (or multiple purchases) at the same merchant in the last 180 days, then the payment could be lower. In one implementation, SIS may split the payment. For example, a portion of the payment (e.g., 3%) may be made to the site/channel where the most relevant driving event occurred, or splitting the payment amongst channels. For another example, a portion of the payment (e.g., 1%) may be made to the consumer as an incentive for participation 655. In one implementation, SIS may provide rewards as incentive to consumers in a variety of forms, such as, but not limited to cash backs, coupons for next purchase, and/or the like.

In one implementation, the SIS rewards may be provided to the consumer in various ways. For example, a consumer may obtain cash back via his electronic wallet. For another example, a consumer may receive a check in the mail after the purchase, and/or the like. For another example, a consumer may obtain store points credited to a brand membership card, and/or the like. Further implementations of determining consumer purchasing heuristics are discussed in a shopping trail revenue sharing component.

FIG. 6B provides a logic flow diagram illustrating store injection data aggregation within embodiments of the SIS. Within implementations, a consumer may start the process by walking into a merchant store 651. In one implementation, the consumer may operate a mobile wallet and submit a check-in message to the consumer data aggregator via the wallet check-in component 652*a*. In another implementation, the merchant may receive store injection request 652*b*, and provide merchant store information to aggregator via the mobile wallet.

Upon receiving a check message 653, the data aggregator may store the consumer location indication 654 from the check-in message and monitor further store injection data. If there is a store injection event message 655 received from the mobile wallet, the aggregator may extract product/brand information 656 from the message, e.g., the consumer may operate the mobile wallet to scan a barcode of a product, price check and comparison, checkout at a merchant POS, etc. In one implementation, the aggregator may determine whether there is an external URL 658*a* in the store injection message, e.g., the consumer may snap the barcode/QR code to conduct Internet search on the product, and/or conduct a price match which may direct the consumer to another URL. In one implementation, if there is no external link included in the store injection event message 655 (e.g., the message is not a price match/search event, etc.), the aggregator may generate and store the shop trail record 661 including the current merchant store, e.g., the store that consumer has walked in at 651.

In another implementation, if the store injection event message includes an external link and the consumer clicks on the external link 658*a*, e.g., from the price match results, the aggregator may proceed to determine a type of the link, e.g., whether it is a store injection to a new store 658*b*. For example, if the external URL 658*a* includes an advertisement of the product on "Newsdaily.com," then the URL is not a store injection 658*b*, and the aggregator may store the external channel (e.g., "Newsdaily.com") 659 and proceed to 635.

In another implementation, if the external link is a store injection 658*b*, e.g., the consumer may be directed to another online store (e.g., Amazon.com, buy.com, etc.) 658*b*, the aggregator may include the new store into the shop trail 660, and generate and store the shop trail record 661. In one implementation, the currently injected store merchant (e.g., Amazon.com, buy.com, etc.) may receive a store check-in message e.g., at 652*b*. Further implementations of the store injection shop trail are discussed in FIG. 6E.

The aggregator may store the external channel 659 if it is visited by the consumer and generate/store the injection record 661.

Figure 7A:
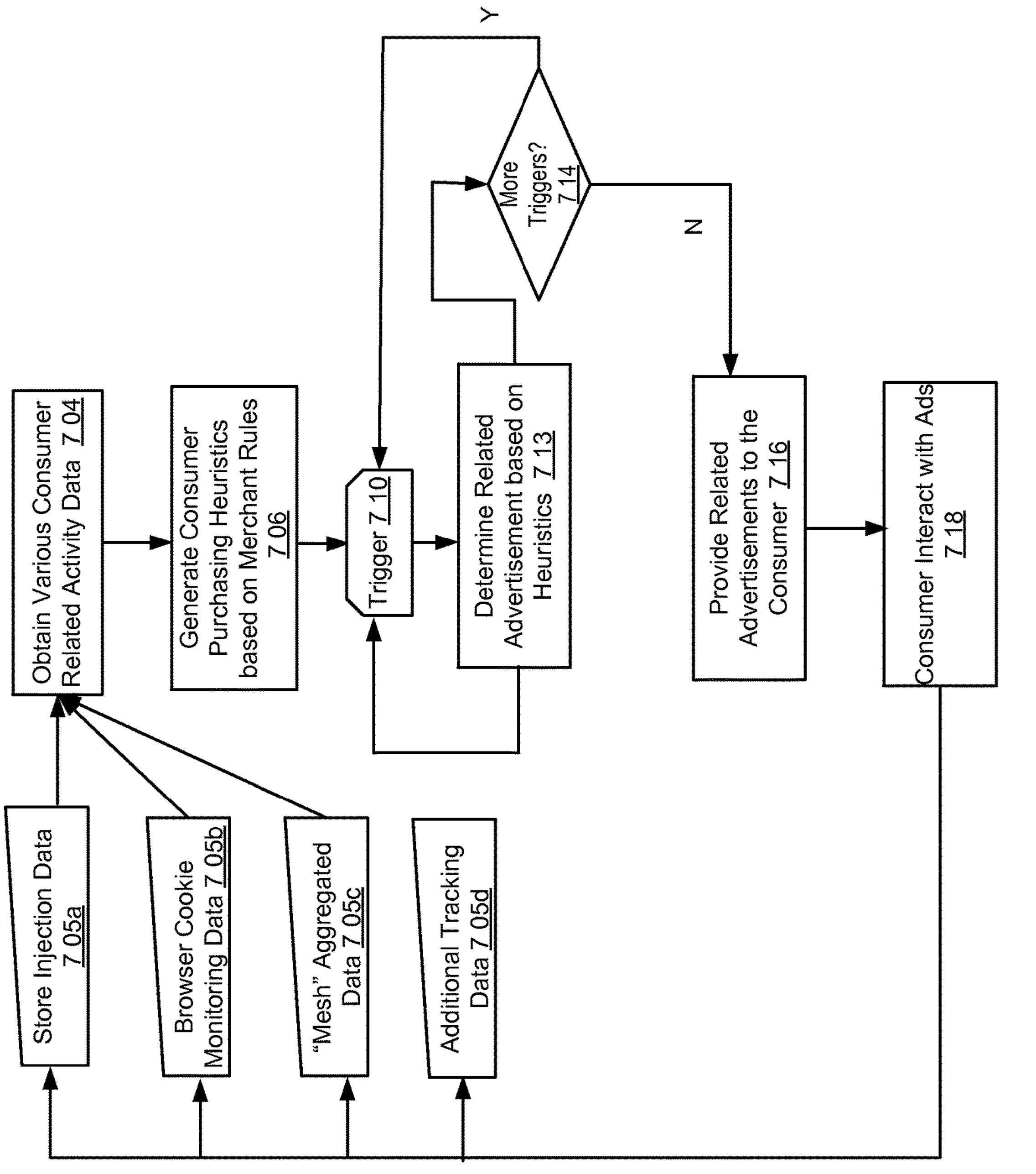
FIG. 7A provides a logic flow diagram illustrating predictive advertising within embodiments of the SIS.

FIG. 7A provides a logic flow diagram illustrating predictive advertising within embodiments of the SIS. Within implementation, the SIS may may collect various consumer related activity data 704, e.g., store injection data 705*a*, browser cookie monitoring data 705*b*, "mesh" aggregated data 705*c*, and any additional tracking data 705*d* (e.g., consumer filled out questionnaire, etc.). The SIS may generate consumer purchasing heuristics based on merchant rules 706. For example, a merchant may specify a rule that if a consumer has purchased a digital camera, advertisement of a related product, e.g., a camera bag, etc., shall be provided to the consumer. In another example, SIS may establish rules and heuristics that if a consumer regularly purchases a product, advertisement of similar products shall be provided. In another example, SIS may perform data mining on consumer purchasing pattern on a group of consumers and determine that consumers who bought a digital camera may have the propensity to purchase a camera bag, and may then correlate the purchase of a digital camera with a camera bag. For example, this may be achieved by having an SIS table in the SIS database having a field for "complementary_product_ID" which may be supplied by merchants, manufacturers, advertisers, heuristics generated by the SIS, and/or the like. As such, when a product has been purchased which is not likely to be purchased again for a short period of time (e.g., a plasma TV, etc.), the SIS may purge the complementary product identifier in the table and use such query results to provide additional ads to the consumer.

For example, in one implementation, when the SIS receives a purchase confirmation that a consumer has purchased a plasma TV, the SIS may perform the following query for ads featuring complementary products:

```
<?PHP
Header ('Content-Type: text/plain');
mysql_connect ("254.93.179.112", $DBserver, $password); // access
database server mysql_select_db ("SIS_DB.SQL");
// select database table to search //create query $query = "SELECT
ad_ID, ad_name, ad_product_ID, ad_data, ad_merchant_ID,
ad_template FROM AdsTable WHERE ad_complementary_product_ID
LIKE '%' "PlasmaTV001";
$result = mysql_query ($query); // perform the search query
mysql_close ("SIS_DB.SQL"); // close database access
?>
```

In the above example, the SIS may query for any complementary products which are labeled as complementary to the purchased plasma TV. For example, the complementary products may include video gaming gadgets, a TV stand, and/or the like.

In one implementation, when the SIS receives a trigger event 710, e.g., the consumer has made a purchase, etc., the SIS may determine related advertisement based on the generated heuristics 713 at step 706. The SIS may receive a batch of triggers (e.g., transaction records, etc.), and may review and analyze each record 714 until there are no more triggers. In one implementation, for example, if the trigger event indicates a purchase of relatively long-lasting goods, e.g., a plasma TV, a mattress, etc., the SIS may determine not to provide advertisements of similar products to the consumer within a period of time (e.g., 6 months, etc.), as consumer purchasing pattern may reflect that it is rare a consumer may consecutively purchase a plasma TV within 6 months.

In one implementation, upon receiving an advertisement (e.g., via an online channel, mobile wallet, social media, etc.), the consumer may interact with the ads 718, e.g., click-through, etc. Such activities may be captured by the aggregator for analysis.

Figure 7B:
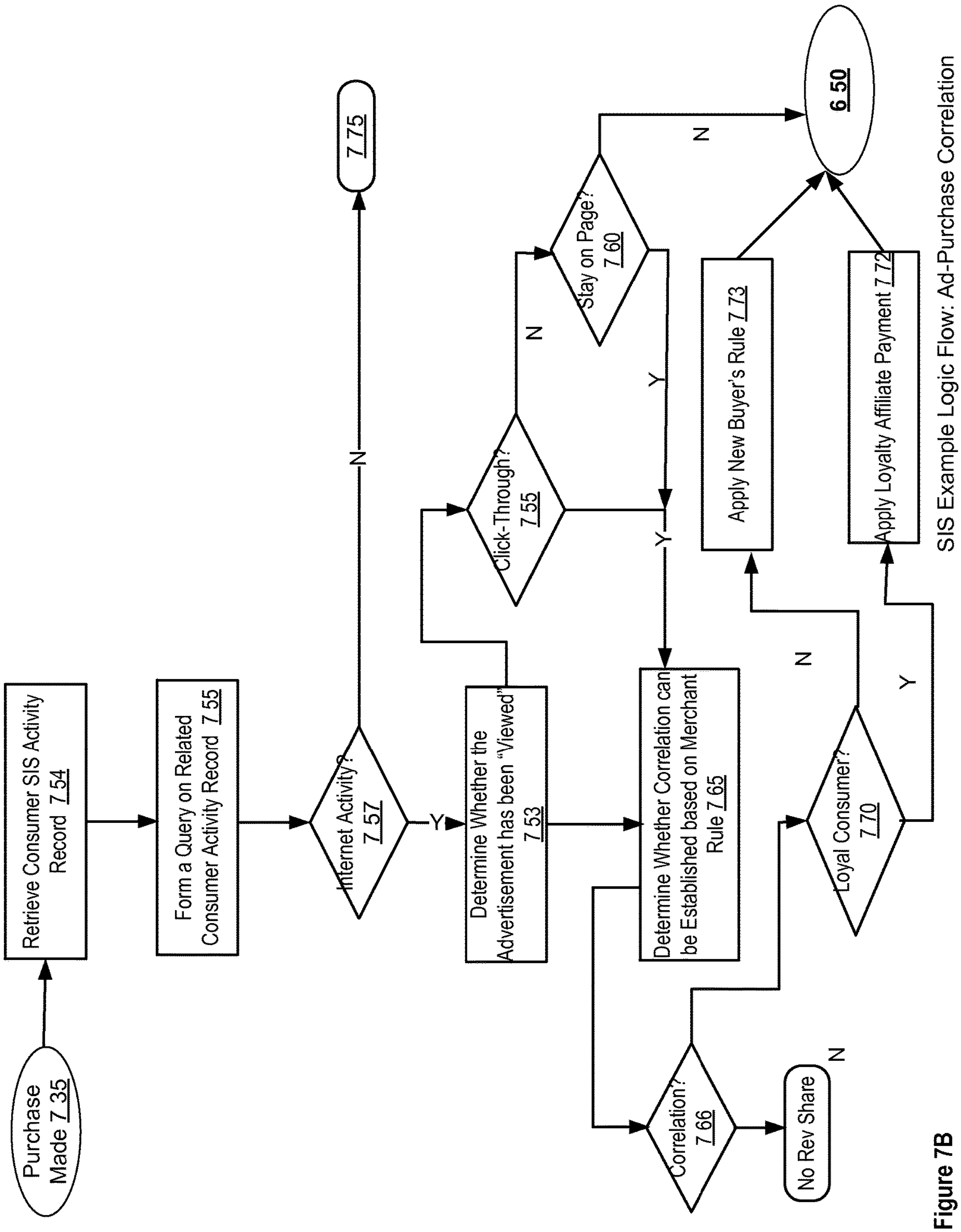
FIGS. 7B-7C provide a logic flow illustrating correlating consumer trigger activities and purchases in one embodiment of the SIS.
Figure 7C:
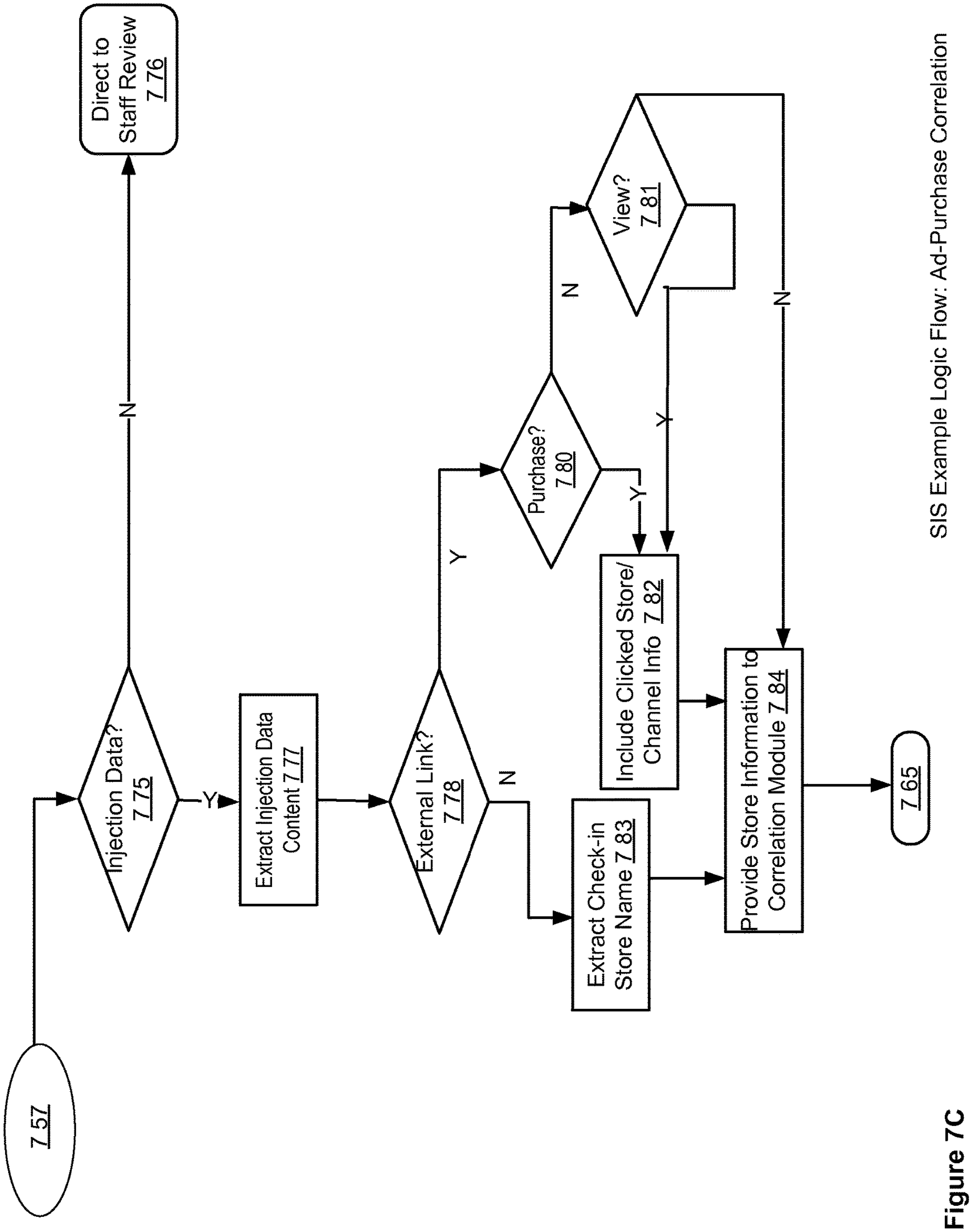

FIGS. 7B-7C provide a logic flow illustrating correlating consumer trigger activities and purchases in one embodiment of the SIS. In one implementation, upon SIS receiving an indication that a registered consumer has purchased products from a registered merchant, the SIS may retrieve consumer SIS activity records 754, e.g., stored at 733, to determine whether the consumer has viewed a related advertisement. In one implementation, the SIS may form a query based on the purchased product category, brand name, merchant_name, and/or the like, to search for related advertisement 755.

In one implementation, the SIS and/or the merchant may establish eligibility rule of advertisement. For example, the SIS may require the purchased product and the advertisement must be within the same category, e.g., a consumer who has interacted with an advertisement on "Banana Republic collection on women's dresses" but has bought a men's sweater is not eligible. For another example, the SIS and/or the merchant may have a more relaxed rule, e.g., as long as the consumer has viewed an advertisement with the brand, e.g., a consumer who viewed an ad on "Banana Republic collection on women's dresses" may likely view the men's collection as well.

If there is an Internet activity record 757 based on the eligibility rule, the SIS may determine whether the ad has been "viewed" by the consumer 753, as the consumer may close the ad without viewing it. For example, the SIS may determine whether the consumer has clicked on the presented ad 755. If not, the SIS may determine whether the consumer has stayed on the ad 760 for a sufficient period of time, e.g., scrolling down the ad to view product listings. If the SIS determines the consumer has "viewed" the ad, the SIS may go on to determine whether the consumer viewing correlates to his subsequent purchase 765.

In one implementation, if the correlation is established 766, the SIS may move on to determine an affiliate payment, e.g., based on consumer loyalty type 770. If not, no ad revenue may be provided to either the ad channel or the consumer.

In one embodiment, the SIS may retrieve the consumer's purchasing history to determine whether the consumer is a loyal consumer to the merchant, or a new consumer 770. For example, for non-frequent buyers, the merchant may issue affiliate SIS payment if the consumer has not bought any brand product within the past 180 days, as a rule for the new buyer 773. For another example, for loyal consumers, even if the consumer's purchasing history shows the consumer made purchases with the merchant within the 180 days, the SIS may apply another rule for affiliate payment. For example, the merchant may provide 6% of the proceeds to SIS with a new buyer's purchase, 4% of the proceeds to SIS for loyal consumers' purchases. In a further implementation, the merchant may not provide affiliate payment to SIS for loyal purchases.

Continuing on with FIG. 7C, if the query at 755 returned injection data 775 (otherwise, SIS may direct the data record for staff review 776 to determine what kind of ad exposure type it is), the SIS may extract injection data content 777 from the injection message. For example, the SIS may determine whether the injection data message comprises any external link 778. If not, the SIS may extract check-in store name 783 and provide the store information to correlation module 784 for correlation analysis, e.g., whether the consumer's store check-in event may be correlated with a subsequent purchase. Additional correlation rules may be applied to store injection data. For example, if the injection data comprises any in-store check-in, or scans (e.g., price check, product location inquiry, etc.), the SIS may proceed to determine whether such activities are to be correlated with the purchase based on merchant specified rules (e.g., the merchant may specify a price check at a retail store may not make the retail store eligible for ad revenue sharing, but consecutive price checks at related product at the same retail store may be eligible, etc.).

In another implementation, if the injection data comprises an external link 778, e.g., price matching information which directs to another online store, an advertisement featuring the product, etc., the SIS may determine whether the consumer clicks or views the external link 780, e.g., an amazon.com link, etc. Similar to the procedure to analyze Internet activities, the SIS may determine whether there is a click-through, or whether the consumer makes a purchase transaction 780 via the link (e.g., Amazon.com, etc.), stays on the external link to view 781, and/or the like. If a consumer has clicked and stayed on the new link 781 (e.g., the consumer has viewed an ad link, or has injected an online store), the SIS may include the clicked store/channel information 782 to provide to the correlation module 784.

For example, an injection data message may comprise information that a consumer walked in a Banana Republic retail store and operate his/her mobile wallet to conduct a price match on a sweater, the consumer clicked on an Amazon link as returned by the price match. If the consumer has stayed on the Amazon link for a period of time (e.g., 2 minutes, etc.), the consumer may be considered as having injected the Amazon store, and Amazon may be included into the shop trail as the consumer's ad exposure. If a purchase of the sweater is made, the SIS may analyze whether Amazon is eligible for an ad fee reward based on correlation.

Various rules may be established for correlation based on injection data. For example, a merchant may establish rules that if the user has clicked on a price match link of a shopping site but does not purchase the product from the same shopping site, the shopping site may not be considered as an eligible channel for ad revenue sharing. In another implementation, if the data comprises a shop trail injection event, e.g., the consumer has checked in another store (e.g., by clicking on an Amazon.com link, etc.), the SIS may determine whether the merchant (e.g., Amazon.com) has been included in the shop trail 783.

Figure 8B:
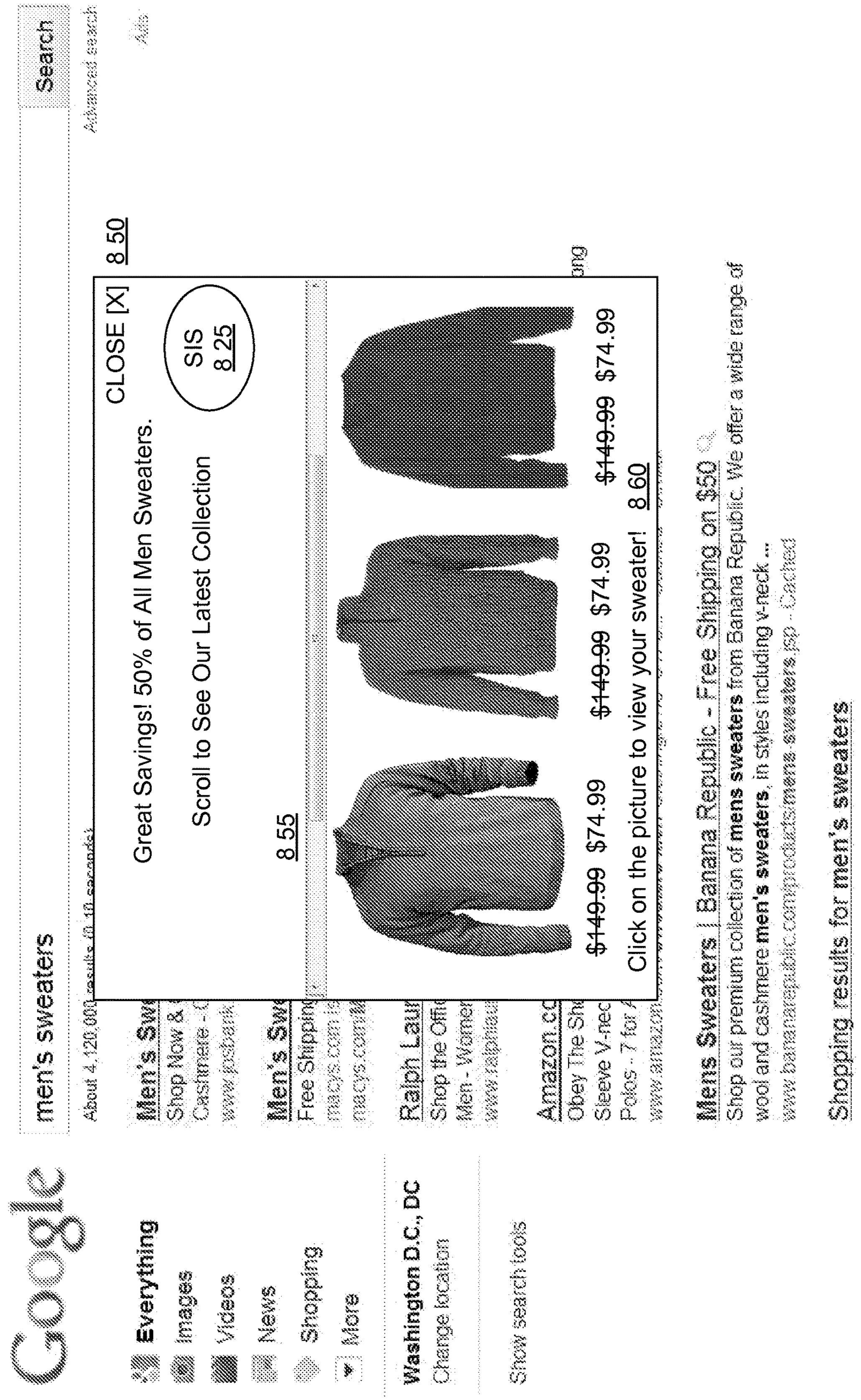

FIGS. 8A-8B provide example screen shots illustrating embodiments of the SIS. In FIG. 8A, a consumer may initiate a trigger, e.g., a Google search for "men's sweaters." The SIS applet 825 running on the browser application may send an indication to the SIS server. The SIS may then send an SIS advertisement 810 within the browser of the consumer, e.g., with an SIS icon 825, showing a "Banana Republic" advertisement 810 with a link to the merchant website 815. If the user clicks on the link 815, the SIS component 825 may send an indication recording a "user click" to the SIS server.

FIG. 8B provides an alternative embodiment of providing SIS advertisement based on consumer opt-in activities within embodiments of the SIS. In one implementation, when a consumer initiates the trigger by searching for "men's sweater" on the search engine, the SIS component 825 may provide an advertisement via a floating window 850. The SIS component 825 may then monitor the consumer's interaction with the advertisement. For example, the consumer may immediately close the floating winder 850.

For another example, the consumer may stay on the floating window and scroll the page to view the listed products 855, and the SIS component 825 may record the time length the consumer stays on the window. For another example, the consumer may click on the picture to be redirected to the merchant site for more product details 860. The SIS may record these consumer activities and evaluate correlation with the consumer's subsequent purchase.

Figure 8C:
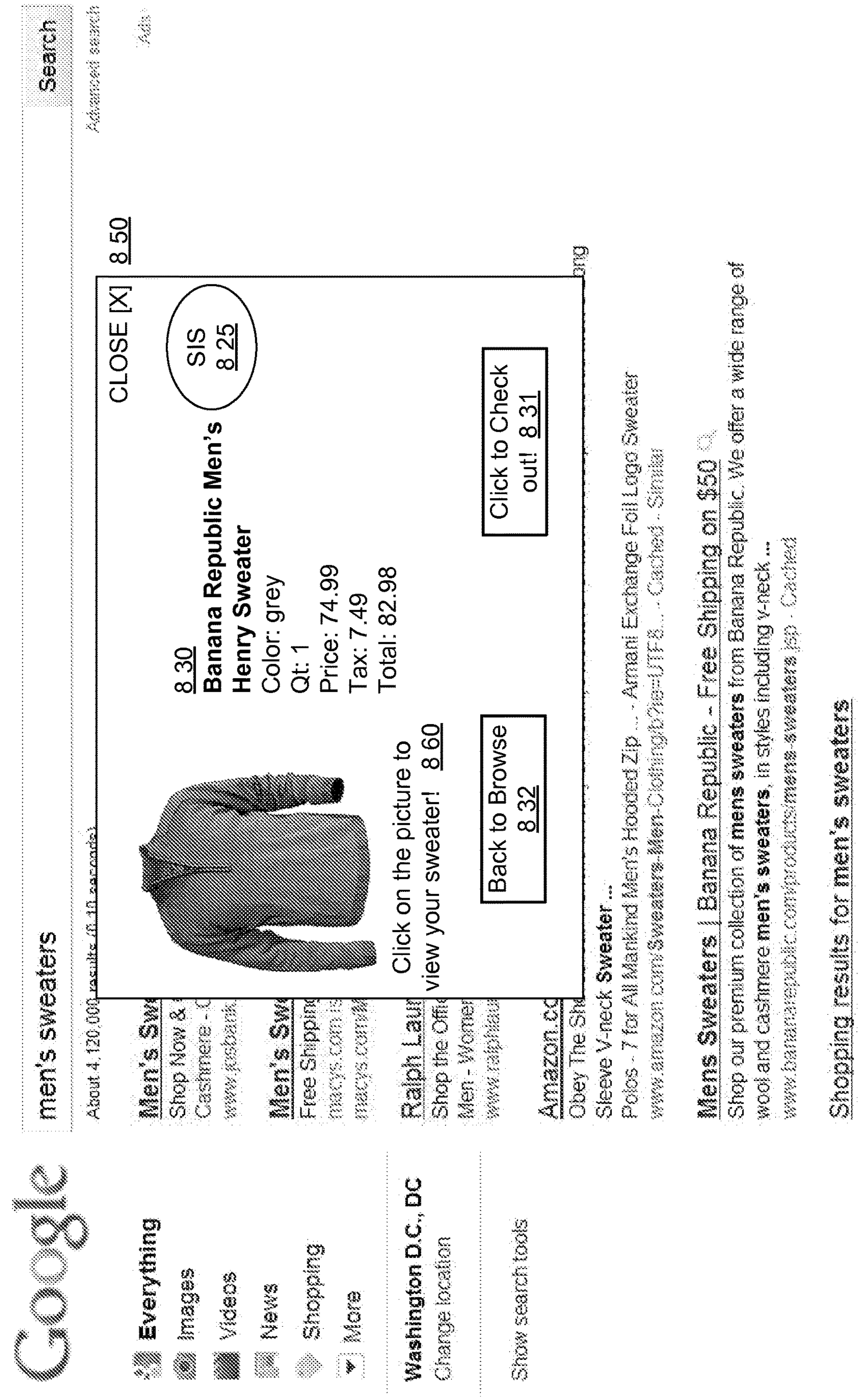

With reference to FIG. 8C, in one implementation, when a consumer clicks on a displayed product to view details at 860 in FIG. 8B, the consumer may view a page of product details 830. The consumer may then elect to click "back to browse" more products 832, or click "to checkout" the current item 831.

With reference to FIG. 8D, after the consumer has purchased a sweater from Banana Republic men's collection, SIS may label the purchase and generate ads of complementary products to the consumer. For example, as shown in FIG. 8D, when the consumer enters the same search term "men's sweater," as SIS recognizes the consumer has purchased men's sweaters from the merchant brand "Banana Republic," the SIS may provide ads of complementary products 865, e.g., men's accessories of the same brand, etc.

Figure 8E:
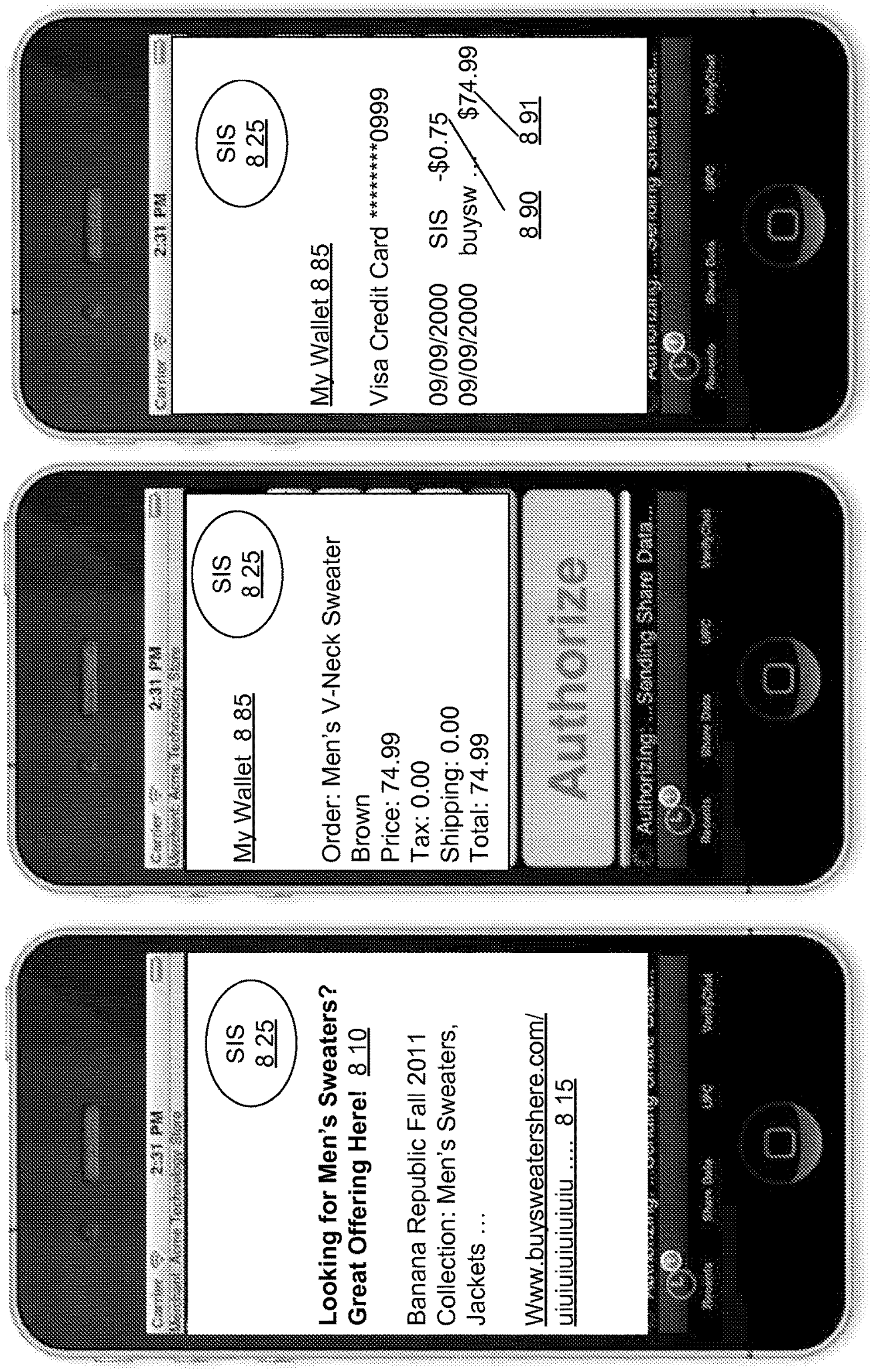
FIG. 8E provides a schematic mobile application screen shots within embodiments of the SIS.

FIG. 8E provide a schematic mobile application screen shots within embodiments of the SIS. In one implementation, the consumer may operate a smart phone (e.g., an Apple iPhone, etc.) to browse a SIS advertisement 810. In one implementation, the consumer may make a purchase of the advertised product via his electronic wallet 885. In one implementation, after the purchase, the consumer may view a reward credited to his wallet account 885, e.g., "$0.75" 890 paid by the SIS, as 1% rebate amount of previous purchase of an SIS advertised product at "$74.99" 891.

Figure 9:
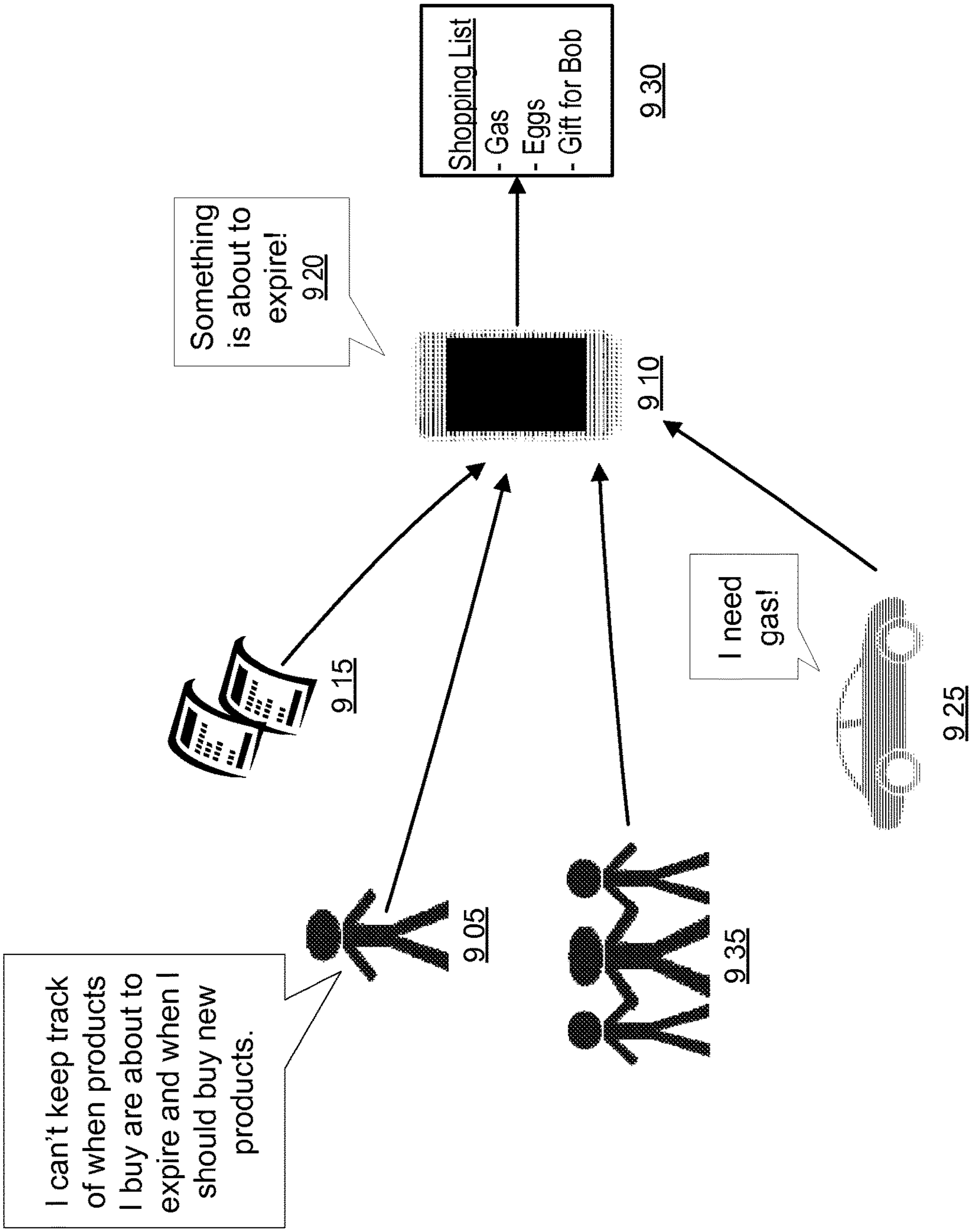
FIG. 9 shows a block diagram illustrating example embodiments of the SIS.

FIG. 9 shows a block diagram illustrating example embodiments of the SIS. In some implementations, a user 905 may want something that will keep track of expiring products, suggest products to buy the next time the user visits the grocery store, and/or the like. In some implementations, SIS may work with the user's electronic wallet 910 in order to generate a predictive shopping list 930 with items that are determined to be expiring 920, items frequently purchased based on receipt and/or other purchase data 915, based on smart devices 925 that can indicate a need to purchase more supplies for the device, via feedback 935 from people in the user's social network (or from the user directly), and/or the like.

Figure 10:
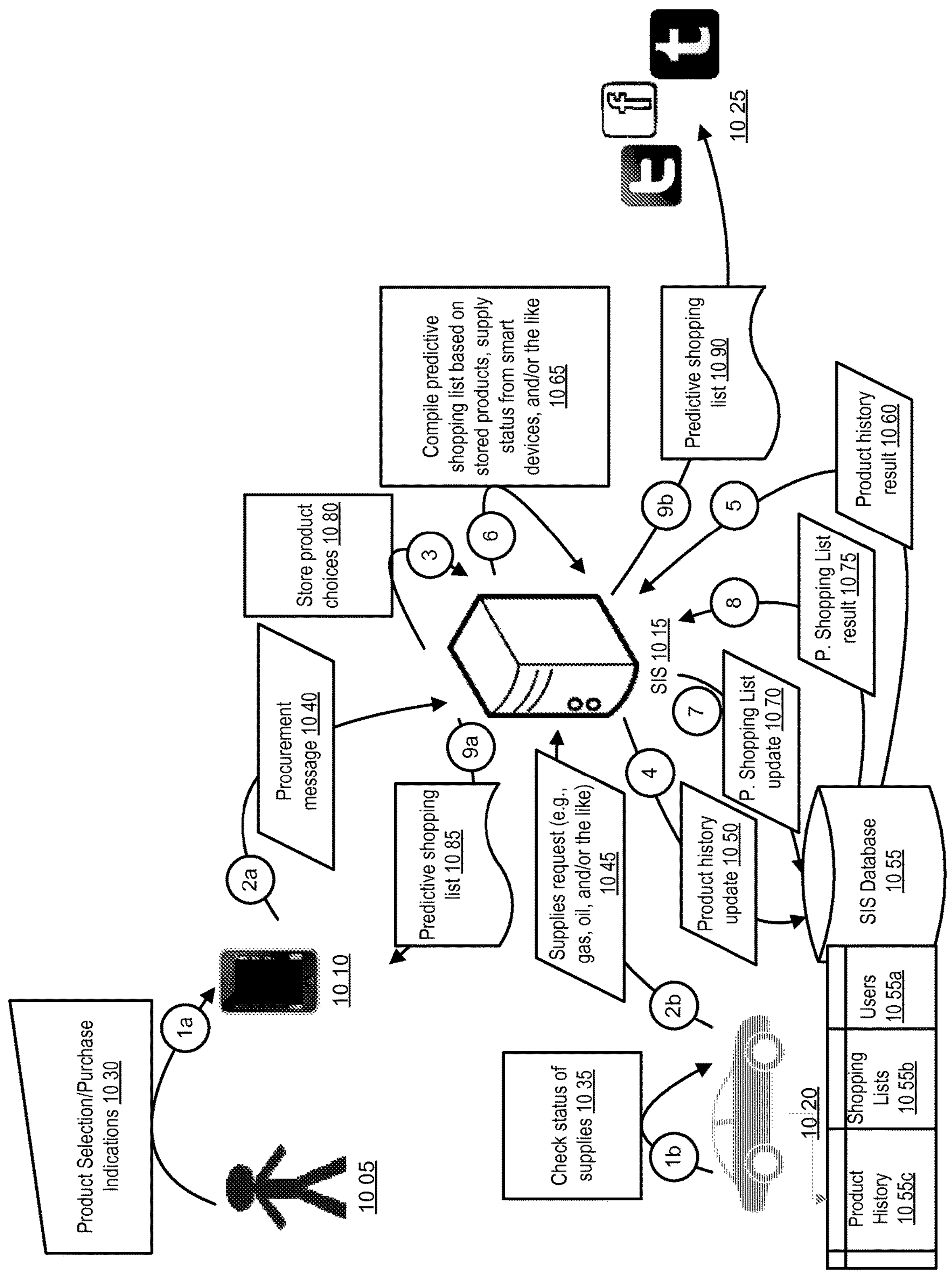
FIG. 10 shows a data flow diagram illustrating collecting information for predictive shopping lists in some embodiments of the SIS.

FIG. 10 shows a data flow diagram illustrating collecting information for predictive shopping lists in some embodiments of the SIS. In some implementations, a user 1005 may provide to an electronic device 1010 item purchase selections 1030. In some implementations, the electronic device may be a mobile device such as a mobile phone, laptop, and/or the like, and may connect to an electronic wallet. In some implementations, the item purchase history may include transaction data (e.g. receipts, scanning products for purchase, information for a pending transaction, and/or the like) and/or the like. In some implementations, the electronic device may send a procurement_message 1040 to SIS, which may be an XML-encoded message that takes a form similar to the following:

```
POST /procurement_message.php HTTP/1.1
Host: www.SISproccess.com
Content-Type: Application/XML
Content-Length: 788
<?XML version = "1.0" encoding = "UTF-8"?>
<procurement_message>
<timestamp>2016-01-01 12:30:00</timestamp>
    <user_params>
        <user_ID> 10123456789 </user_ID>
            <user_password>********</user_password>
            <wallet_ID>A2C4E6G8I</wallet_ID>
        </user_params>
        <procurement_params>
            <purchase>
                <product>
                    <id>098765432</id>
                    <name>Sunshine &#174; Cheez-It &#174; Baked Snack
Crackers</name>
                    <weight>170</weight>
                    <product_code>2410070582</product_code>
                    <lot_ID>9274E8AC</lot_ID>
                    <merchant_ID>1155448899</merchant_ID>
                    <price>3.99</price>
                    <aisle>5</aisle>
                    <shelf>2</shelf>
                    <expiration_date>2017-02-01 12:30:00</expiration_date>
  12:30:00</expiration_date>
                ...
                </product>
            </purchase>
            <scan>
                <product>
                        <ID>289786479</ID>
                        <name>Twinings &#174; Chai Ultra SpiceTea</name>
                        <weight>40</weight>
                        <product_code>7017726772</product_code>
                        <lot_ID>90 8D0F98 9A</lot_ID>
```

-continued

```
                <merchant_ID>9483738921</merchant_ID>
                <price>4.99</price>
                <aisle>7</aisle>
                <shelf>3</shelf>
                <expiration_date></expiration_date>
                <GPS>40.7589905, -73.9790277</GPS>
                <scan>
                  <qr_object_params>
                  <qr_image>
                  <name> exp_QR </name>
                  <format> JPEG </format>
                  <compression> JPEG compression</compression>
                  <size> 123456 bytes </size>
                  <x-Resolution> 72.0 </x-Resolution>
                  <y-Resolution> 72.0 </y-Resolution>
                  <date_time> 2014:8:11 16:45:32</date_time>
                  ...
                  <content> ÿØÿà JFIF H H
ÿâ ICC_PROFILE ¤appl mntrRGB XYZ Ü      $ acspAPPL öÖÓ-appl
desc      P      bdscm      '        Scprt --------------------@   $wtpt
-----------------------------d     rXYZ   -------------------------------------------x        gXYZ
-----------------------------(E    bXYZ ------------------------------------------- =         rTC
-----------------------------'   aarg      À        vcgt ...
                  </ content>
                  ...
                  </qr image>
                  <QR content>"Expiration Date,
2020:8:11"</QR content>
                  </qr_object_params>
                </scan>
                ...
              </product>
        </scan>
        ...
        <smart device>
              <product>
                  <id></id>
                  <name>Gasoline/name>
                  <weight></weight>
                  <product_code></product_code>
                  <lot_IDX/lot_ID>
                  <merchant_ID></merchant_ID>
                  <price></price>
                  <aisle></aisle>
                  <shelf></shelf>
                  <note>8 gallons</note>
                  <expiration date>2016-01-05
12:30:00</expiration date>
                  ...
              </product>
        </smart devices>
         <expiration>
              <product>
                  <id></id>
                  <name>Silk &#174; Organic Original Soymilk</name>
                  <weight>4, quart</weight>
                  <product_code>7854675684356348</product_code>
                  <lot ID>982183242</lot ID>
                  <merchant_ID>9483738921</merchant_ID>
                  <price>3.99</price>
                  <aisle>DAIRY</aisle>
                  <shelf>2</shelf>
                  <note> </note>
                  <expiration_date>2016-01-01
12:30:00</expiration date>
                  ...
              </product>
        </expiration>
      </procurement params>
</procurement_message>
```

In some implementations, SIS may store the product choice information 1080, via querying 1050 a database 1055 and storing the user's product history information in the user's product history record 1055*c*, which is tied to the user's record in 1055*a*. In some implementations, may query the database using PHP code similar to the following:

```
<?php
    ...
    foreach ($product_list as $product){
    $new_product = $product;
    $product result = mysql query ("INSERT INTO
```

-continued

```
product__history(ID, name, weight, product__code, lot__ID,
merchant__ID, price, aisle, shelf, note, user__ID, exp__date, scan,
scan__GPS)   VALUES      (mysql real escape string ($new product.ID),
                mysql real escape string ($new product.name),
                mysql__real__escape__string ($new__product.weight),
                mysql__real__escape__string
                ($new__product.product__code),
                mysql real escape string ($new product.lot ID),
                mysql real escape string ($new product.merchant__ID),
                mysql real escape string ($new product.price),
                mysql real escape string ($new product.aisle),
                mysql real escape string ($new product.shelf),
                mysql__real__escape__string ($new__product.note),
                mysql real escape string($new product.user__ID),
                mysql real escape string($new product.exp date),
                mysql real escape string($new product.scan),
                mysql__real__escape__string($new__product.scan__GPS),)
                );
                }
    ?>
```

In some implementations, after SIS has received a query result 1060 that indicates that the insert was successfully performed, SIS may use the user's product history to compile a predictive shopping list 1065. In some implementations SIS may also collect data from smart devices 1020 which have capabilities to both check the status of their own supplies 1035 and send messages to SIS 1045 indicating a need to refill a particular supply. In some implementations, the supplies request 1045 may be an XML-encoded message and may take a form similar to the following:

```
POST /supplies message.php HTTP/1.1
Host: www.SISproccess.com
Content-Type: Application/XML
Content-Length: 788
<?XML version = "1.0" encoding = "UTF-8"?>
<supplies__message>
<timestamp>2016-01-01 12:30:00</timestamp>
    <device__params>
        <user__ID>123456789</user__ID>
        <device__ID>********</device__ID>
        <wallet__ID>A2C4E6G8I</wallet__ID>
    </device__params>
    <supplies__params>
        <product__list>
            <product>
                <id></id>
                <name>Gasoline is Low/name>
                <weight></weight>
                <product__code></product__code>
                <lot__ID></lot__ID>
                <merchant__ID></merchant__ID>
                <price></price>
                <aisle></aisle>
                <shelf></shelf>
                <note>8 gallons</note>
                <expiration__date>2016-01-05
12:30:00</expiration__date>
                ...
            </product>
            ...
        </product__list>
    </supplies__params>
</supplies__message>
```

As an example, SIS may collect information from a smart car that is capable of determining how much gasoline it has in the tank, and is capable of sending a message to SIS indicating that it is currently running low. In some implementations, other smart devices may include refrigerators, and/or the like. SIS may also add such supplies to the user's predictive shopping list as they are provided to SIS. In some implementations, SIS may store the generated predictive shopping list in the SIS database via a shopping list query 1070 to the shopping list table **1055*b*** of the SIS database. In some implementations, the PHP-encoded shopping list query may take a form similar to the following:

```
<?php
    ...
    $user__ID = "123456789";
    $name = "Example Predictive Shopping List";
    foreach ($product__list as $product){
        $new__product = $new__product .". $product.ID;
    }
    $product result = mysql__query ("INSERT INTO
shopping__lists (user__ID, name, products)     VALUES
    (mysql__real__escape__string ($user__ID),
    mysql__real__escape__string ($name),
    mysql__real__escape__string($new__product) ) );
?>
```

Once SIS receives a predictive shopping list result 1075 for the query indicating that the insert was successfully performed, SIS may send the user a copy of their predictive shopping list 1085, which the user may keep in the user's wallet-enabled device, and which the user may also forward 1090 to social networking sites 1025 (e.g. Facebook, Twitter, and/or the like) in order to receive feedback on the shopping list from friends, family, and/or the like. In some implementations, an XML-encoded predictive shopping list 1085 may take a form similar to the following:

```
<product__list>
        <user>
            <user__ID>123456789</user__ID>
            <wallet__ID>A2C4E6G8I</wallet__ID>
        </user>
        <list__params>
            <name> Example Predictive Shopping List </name>
            <date__created>2016-01-01 12:30:00</date__created>
            </list params>
        <replacement products>
    <expiring>
                <product>
                    <id></id>
                    <name>Silk &#174; Organic Original
Soymilk</name>
                    <weight>4, quart</weight>
        <product__code>7854675684356348</product__code>
                    <lot__ID>982183242</lot__ID>
                    <merchant__ID>9483738921</merchant__ID>
```

-continued

<price>3.99</price>
<aisle>DAIRY</aisle>
<shelf>2</shelf>
<note> </note>
<expiration_date>2016-01-01 12:30:00</expiration_date>
<confidence_level>K/confidence_level>
<rating>4.3</rating>
<replenish_cycle>2, week</replenish_cycle>
<alt_products>5874654824885, 4245654356436,
2425458454, ...</alt_products>
...
</product>
</expiring>
<smart_device>
<product>
<id></id>
<name>Gasoline is Low/name>
<weight></weight>
<product_code></product_code>
<lot_ID>/lot_ID>
<merchant_ID</merchant_ID>
<price></price>
<aisle></aisle>
<shelf></shelf>
<note>8 gallons</note>
<expiration_date>2016-01-05
12:30:00</expiration date>
<confidence_level>K/confidence_level>
<rating>3.3</rating>
<replenish_cycle>l,
week</replenish_cycle>
<alt_products></alt_products>
...
</product>
</smart_device>
<predicted_replace>
<product>
<id>098765432</id>
<name>Sunshine ® Cheez-It ® Baked
Snack Crackers</name>
<weight>170</weight>
<product_code>2410070582</product_code>
<lot_ID>9274E8AC</lot_ID>
<merchant_ID>1155448899</merchant_ID>
<price>3.99</price>
<aisle>5</aisle>
<shelf>2</shelf>
<expiration_date>2017-02-01 12:30:00</expiration_date>
<confidence_level>0.7</confidence_level>
<rating>4.4</rating>
<replenish_cycle>2,
week</replenish_cycle>
<alt_products>874684689468,
6347689469846</alt_products>
...
</product>
<predicted_replace>
</replacement_products>
<suggested_products>
<personal>
<product>
<ID>289786479</ID>
<name>Twinings ® Chai Ultra Spice
Tea</name>
<weight>40, g</weight>
<product_code>7017726772</product_code>
<lot_ID>908D0F989A</lot_ID>
<merchant_ID>9483738921/merchant_ID>
<price>4.99</price>
<aisle>7</aisle>
<shelf>3</shelf>
<expiration_date></expiration_date>
<confidence_level>0.8</confidence_level>
<rating>4.7</rating>
<replenish_cycle>4,
week</replenish-cycle>

-continued

```
                    <alt__products>587456465874,
97298473974</alt__products>
                ...
                </product>
            </personal>
            <social>
                <product>
                    <ID>38749326578</ID>
                    <name>Lipton &#174; Black Tea</name>
                    <weight>40, g</weight>
                    <product__code>83487456874</product__code>
                    <lot__ID>232D2F436A</lot__ID>
        <merchant__ID>54758487487428</merchant__ID>
                    <price>3.99</price>
                    <aisle>7</aisle>
                    <shelf>3</shelf>
                    <expiration-date></expiration-date>
        <confidence__level>0.76</confidence__level>
                    <rating>3.7</rating>
                    <replenish__cycle>4,
week</replenish__cycle>
                    <alt__products>289786479,
97298473974</alt products>
                ...
                </product>
            </social>
        </suggested__products>
</product__list>
```

Figure 11:
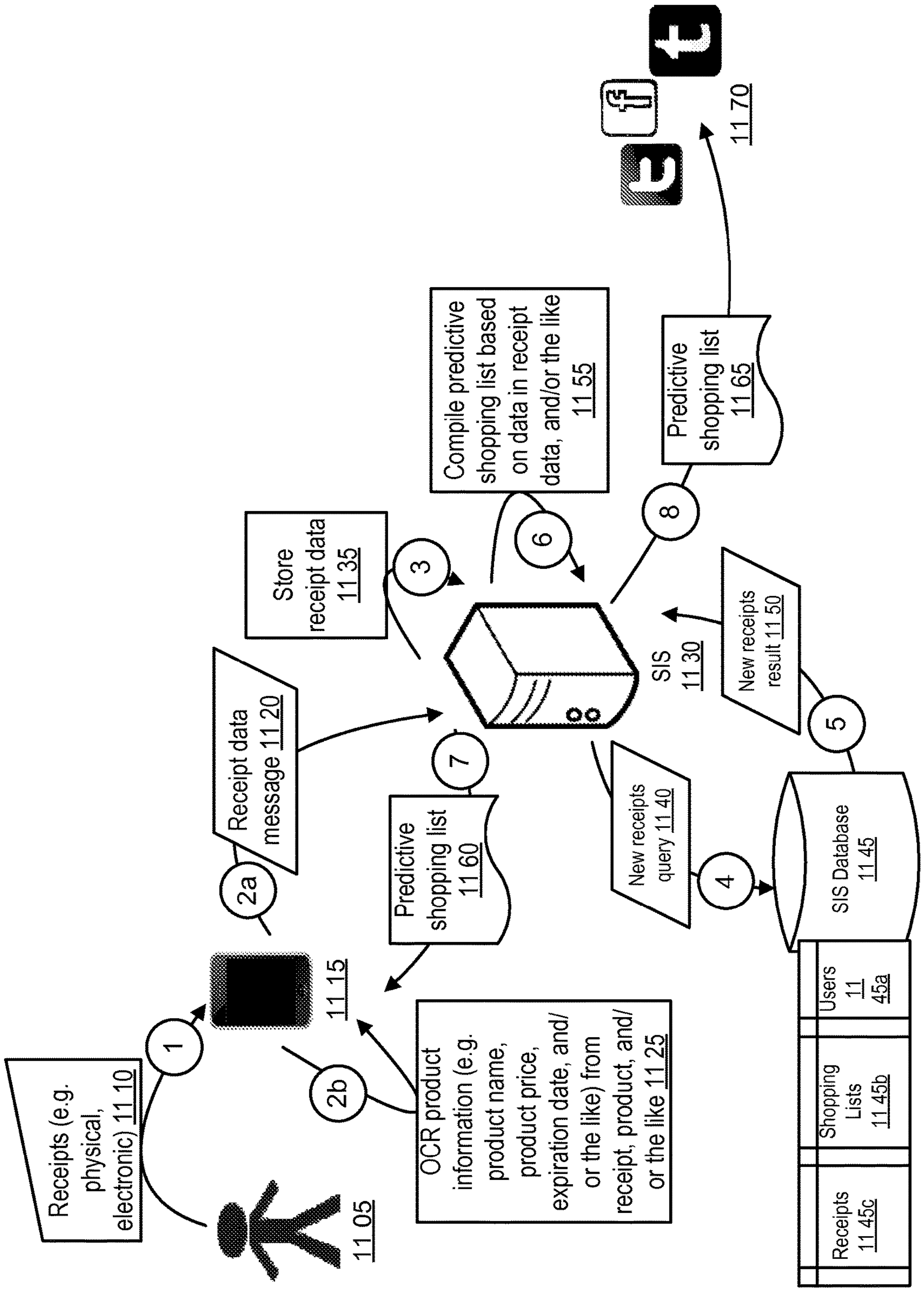
FIG. 11 shows a data flow diagram illustrating collecting receipt information for predictive shopping lists in some embodiments of the SIS.

FIG. 11 shows a data flow diagram illustrating collecting receipt information for predictive shopping lists in some embodiments of the ______. In some implementations, a user 1105 may provide receipts 1110 (physical, electronic, and/or the like) to their wallet-enabled electronic device 1115. In some implementations the electronic device may send the receipt data to SIS 1130 via a receipt data message 1120. In some implementations, the electronic device may also OCR product information (e.g., the product name, product expiration date, and/or the like) from the user receipts, and may send said information to SIS within the receipt data message. In some implementations, the XML-encoded receipt data message may take a form similar to the following:

```
POST /receipts__message.php HTTP/1.1
Host: www.SISproccess.com
Content-Type: Application/XML
Content-Length: 788
<?XML version = "1.0" encoding = "UTF-8"?>
<receipts__message>
<timestamp>2016-01-01 12:30:00</timestamp>
    <user__params>
        <user__ID>123456789</user__ID>
        <user__password>********</user__password>
        <wallet__ID>A2C4E6G8I</wallet__ID>
    </user__params>
    <receipts__params>
        <receipts__list>
            <receipt>
                <date created>2012-01-01
12:30:00</date__created>
                <merchant__ID>82719487194</merchant__ID>
                <transaction total>24.50</transaction__total>
                <tax>1.50</tax>
                <products>
                    <product>
                        <ID289786479</ID>
                        <name>Twinings &#174; Chai Ultra
Spice Tea</name>
                        <weight>40, g</weight>
<product code>7017726772</product__code>
                        <lot__ID>908D0F989A</lot__ID>
<merchant__ID>9483738921</merchant__ID>
                        <price>4.99</price>
                        <aisle>7</aisle>
                        <shelf>3</shelf>
                        <expiration__date></expiration__date>
                        ...
                    </product>
                    <product>
                        <id>098765432</id>
                        <name>Sunshine &#174; Cheez-It &#174;
```

-continued

```
Baked Snack Crackers</name>
                                        <weight>170</weight>
<product_code>2410070582</product_code>
                                        <lot_ID>92 74E8AC</lot_ID>
<merchant_ID>1155448899</merchant_ID>
                                        <price>3.99</price>
                                        <aisle>5</aisle>
                                        <shelf>2</shelf>
                                        <expiration_date>2017-02-01
12:30:00</expiration_date>
                                        ...
                                </product>
                        </products>
                </receipt>
                ...
                <receipt>
                        <date_created>2012-01-01
12:30:00</date_created>
                        <merchant_ID>82719487194</merchant_ID>
                        <products>
                                ...
                        </products>
                </receipt>
        </receipt_list>
    </receipts_params>
</receipt_message>
```

In some implementations, the SIS may store the receipt data 1135 via generating a new receipts query 1140 to the SIS database 1145, which may create a new receipts record in the receipts table 1145*c* of the database. In some implementations, the PHP-encoded receipts query 1140 to the database may take a form similar to the following:

```
<?php
    ...
            $user_ID = "123456789";
            $merchant_ID = "8486588468498";
            $date = "2012-01-01 12:30:00";
            $trans_total = 24.50;
            $tax = 1.50;
            For each ($product_list as $product){
                    $new product = $new product . " " . $product.ID;
            }
            $product_result = mysql query("INSERT INTO receipts
(user_ID, date, merchant_ID, trans total, tax, products) VALUES
            (mysql_real_escape_string ($user_ID),
            mysql_real_escape_string ($date),
            mysql_real_escape_string ($merchant_ID),
            mysql_real_escape_string ($trans_total),
mysql_real_escape_string ($tax),
            mysql_real_escape_string ($new_product)));
?>
```

In some implementations, after receiving a new receipts result 1150 from the query, SIS may compile a predictive shopping list based on data from the receipts, and/or like information 1155. SIS may then send a copy of the predictive shopping list 1160 to the user's wallet, as well as generate a link so that the user may send a copy 1165 of the predictive shopping list to the user's social networks 1170 (e.g. Facebook, Twitter, and/or the like).

Figure 12A:
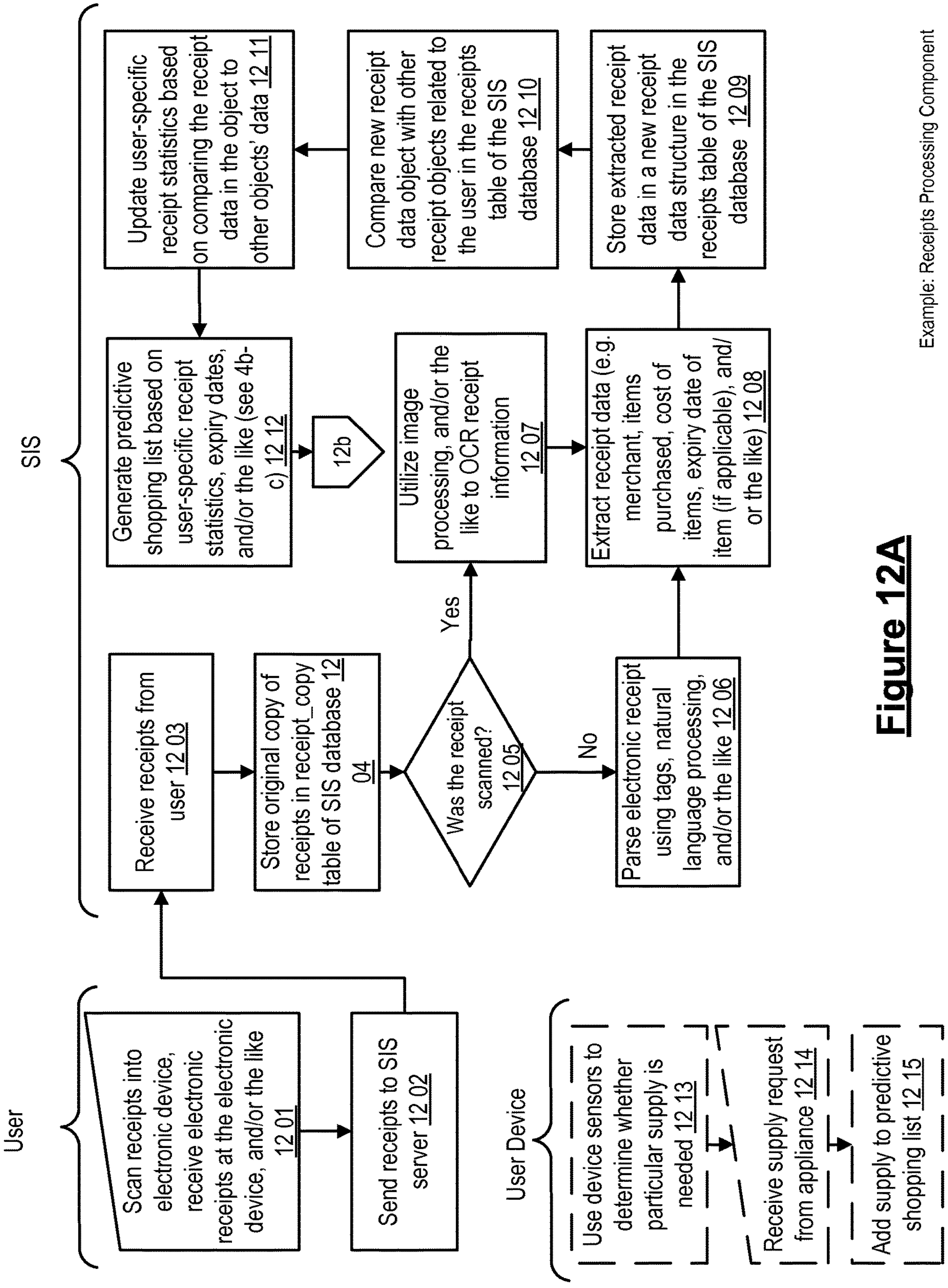
FIGS. 12*a-c* show logic flow diagrams illustrating parsing receipts and generating predictive shopping lists in some embodiments of the SIS.
Figure 12B:
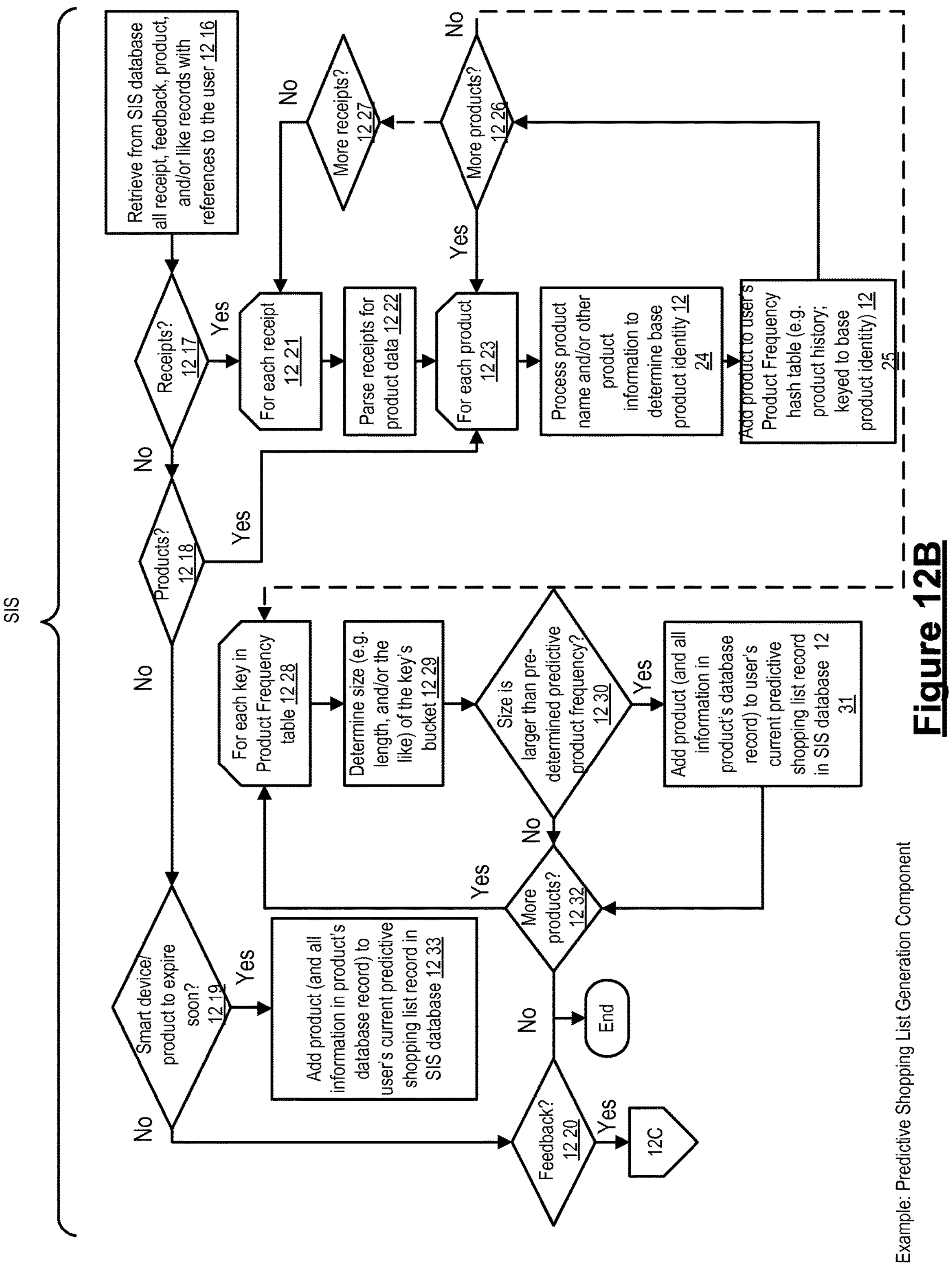
Figure 12C:
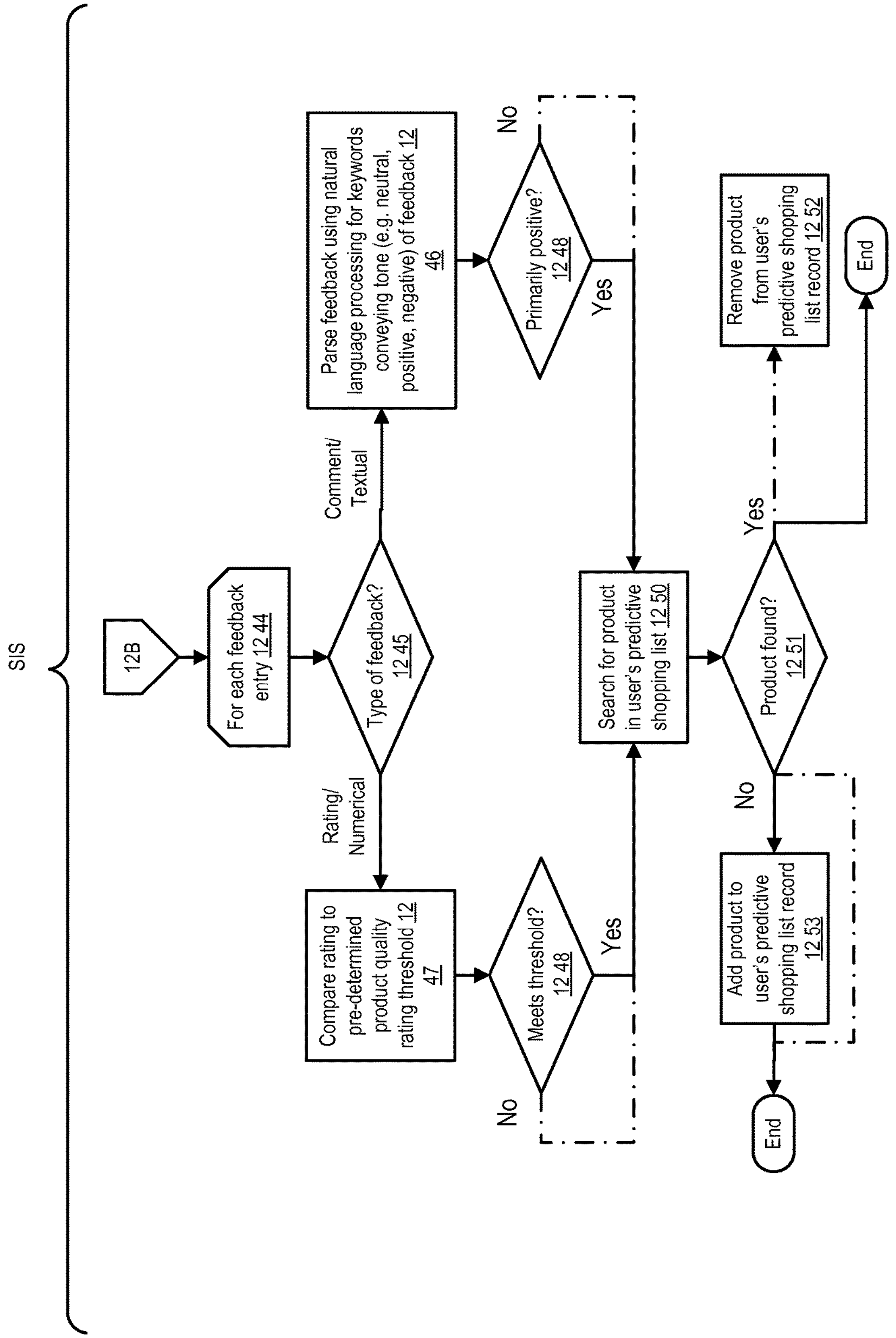

FIGS. 12*a-c* show logic flow diagrams illustrating parsing receipts and generating predictive shopping lists in some embodiments of the SIS. In some implementations, the user may scan 1201 receipts into his/her electronic device, and/or obtain past receipts via other means such as is described herein. In some implementations, the user may then send these receipts to SIS 1202, which may receive the receipts 1203 and may then store an original copy of the receipts in a table in the SIS database 1204. SIS may then check to determine whether the receipt was scanned or was an electronic receipt 1205. If scanned, SIS may use image processing and/or a like component to convert (e.g. via Optical Character Recognition (OCR) and/or a like process) the images into textual receipts 1207. If not scanned, SIS may directly parse the electronic receipt 1206 using metadata (e.g. Tags and/or the like) within the electronic receipt, via natural language processing, and/or the like. Once the data on the receipt is readable, may then extract 1208 data from the receipt (for example, merchant_IDentification, items purchased, cost of items, expiry date of items if applicable, and/or the like), and may store this extracted information 1209 in a new receipt data structure in the SIS database. In some implementations, a copy of the receipt from which the data was extracted may also be stored along with the new data structure. In some implementations, SIS may compare the new receipt data object with others already created for the user and stored in the database 1210, and may update user receipt statistics 1211 based on these comparisons. For example, SIS may keep track of how often a type of eggs from a particular company comes up in all of the user's receipts, and/or the like. From this information, SIS may generate a predictive shopping list 1212, wherein products are placed on the predictive shopping list based on frequency of purchase, based on when they were last purchased, based on when products are about to expire, and/or the like.

In some implementations, SIS may retrieve all receipt, feedback, product, and/or like data from the SIS database relating to the user and his or her product history in order to determine a product inclusion index (e.g., a score to assign to the product to determine whether it should be added to the list). In some implementations, if receipts associated with the user are retrieved 1217, SIS may, for each receipt 1221, parse the receipts for product data 1222 in order to determine each individual product on the receipt. SIS may then, for each product 1223, process the product name, product description, product ID, and/or other information 1224 in order to determine a base product identity. In some implementations, this base product identity may be used to link similar products that may come from different merchants, may have substantially different product names, and/or the like. As an example, a base product identity of "cheese crackers" may apply both to Cheez-It® crackers, as well as to Nabisco Cheese Nips®, and/or the like. In some implementations, SIS may add a reference to the product to a user's Product Frequency hash table stored in the SIS database. In some implementations, the product identity may be used as the product's key in the hash table, and the information saved to the hash table may include the product information and/or the record ID of the product in the SIS database. In some implementations, if an object has already been hashed to the key, SIS may handle the overflow multiple ways. For example, it may compare the product to be added to the Product Frequency table to the product(s) already hashed to the same base product identity key: if the product is also from the same brand, of the same price, and/or shares like factors, SIS may not add the product to the table, and may instead update the frequency field of the product already in the table (e.g. increasing the frequency by one). If, however, the product to be added to the table is of a brand, and/or the like from all products similarly keyed to the hash table, SIS may add the product to the key bucket via adding it to the end of a link list keyed to the base product identity. If there are more products to potentially add to the Product Frequency hash table 1226, SIS may continue to compare products against the Product Frequency table. If there are no other products, SIS may check to see if there are more receipts 1227, and may process the rest of the receipts if they exist. Otherwise SIS may process the newly-updated Product Frequency table by checking each key in the table 1228 and determining the size of the key's bucket 1229. In some implementations, determining the size of the bucket may include both checking the size of the linked list at the key, and totaling the frequency of each product in the list, and/or some similar process. In some implementations, the total frequency may equate to the product's product inclusion index. In some implementations, if the size of the calculated frequency for a particular base product identity (e.g. sum of frequency of each product) is equal to or greater than a predetermined predictive product frequency 1230, the product may be added to the user's current predictive shopping list. In some implementations, the actual product placed on the list may depend on the frequency of each individual product (e.g., the product with the highest frequency may be added to the list), based on product feedback (e.g. the product with the highest ratings and/or the like may be added to the list), and/or the like. If the base product identity's calculated frequency is not equal to or greater than the predetermined threshold, SIS may check if there are more base product identities to check 1232 and may process them accordingly. If there are no more products, SIS may complete adding items to the predictive shopping list.

If SIS obtains product records 1218 from the database, SIS may process each item in a manner similar to how they would be processed if the product was extracted from a receipt (see 1223). If SIS retrieves information from a smart device, or retrieves a product that is soon to expire (e.g. has an expiration date within a specified range of close to expiring) 1219, SIS may automatically add the item to the user's predictive shopping list 1233, and may note on the shopping list the device the product came from and/or the expiration date of the item the user last bought. In some implementations, an expiring product and/or a product submitted by a smart device may always be automatically added to the predictive shopping list because such items may have their product inclusion indices always set to exceed the threshold necessary to add items to the list.

In some implementations, if SIS retrieves feedback 1220 about any products and/or predictive shopping lists attributed to the user, SIS may process the feedback to determine how to handle the products which have received feedback. For example, for each feedback entry 1244, SIS may determine the type of feedback obtained on a particular product 1245. If the feedback is textual (e.g. a comment/short answer), SIS may parse the feedback 1246 using natural language processing and/or like components in order to identify keywords 1246 that convey a tone of the feedback (e.g. positive words such as "great," "fantastic," negative words such as "terrible," "don't buy," and neutral words such as "okay," "sufficient"). After determining the general tone of the comment by analyzing such keywords in the comment, if the tone of the comment seems positive 1248, SIS may search the user's predictive shopping list for the product 1250, and, if the product is not on the list 1251, may add the product to the predictive shopping list, and/or replace a similar product already on the shopping list. If the product comments seem mostly negative, then SIS may, if the product is on the predictive shopping list, remove the product from the predictive shopping list 1252. In some implementations, removal of the product may prompt SIS to add an alternative to the product in place of the removed item. In some implementations, if the feedback was numerical (e.g. a rating), SIS may compare 1247 the numerical value of the rating (or the aggregate of all ratings for the product) to a predetermined product quality threshold (e.g. determined by the user). If the product, based on its ratings, meets the threshold, 1249, SIS may check the user's predictive shopping list and may either add the product to the list or replace another similar product with the highly-rated product. If the product does not meet the threshold, SIS may remove the item from the list if it is currently on the list, and may also determine a suitable alternative to the removed product.

Figure 13:
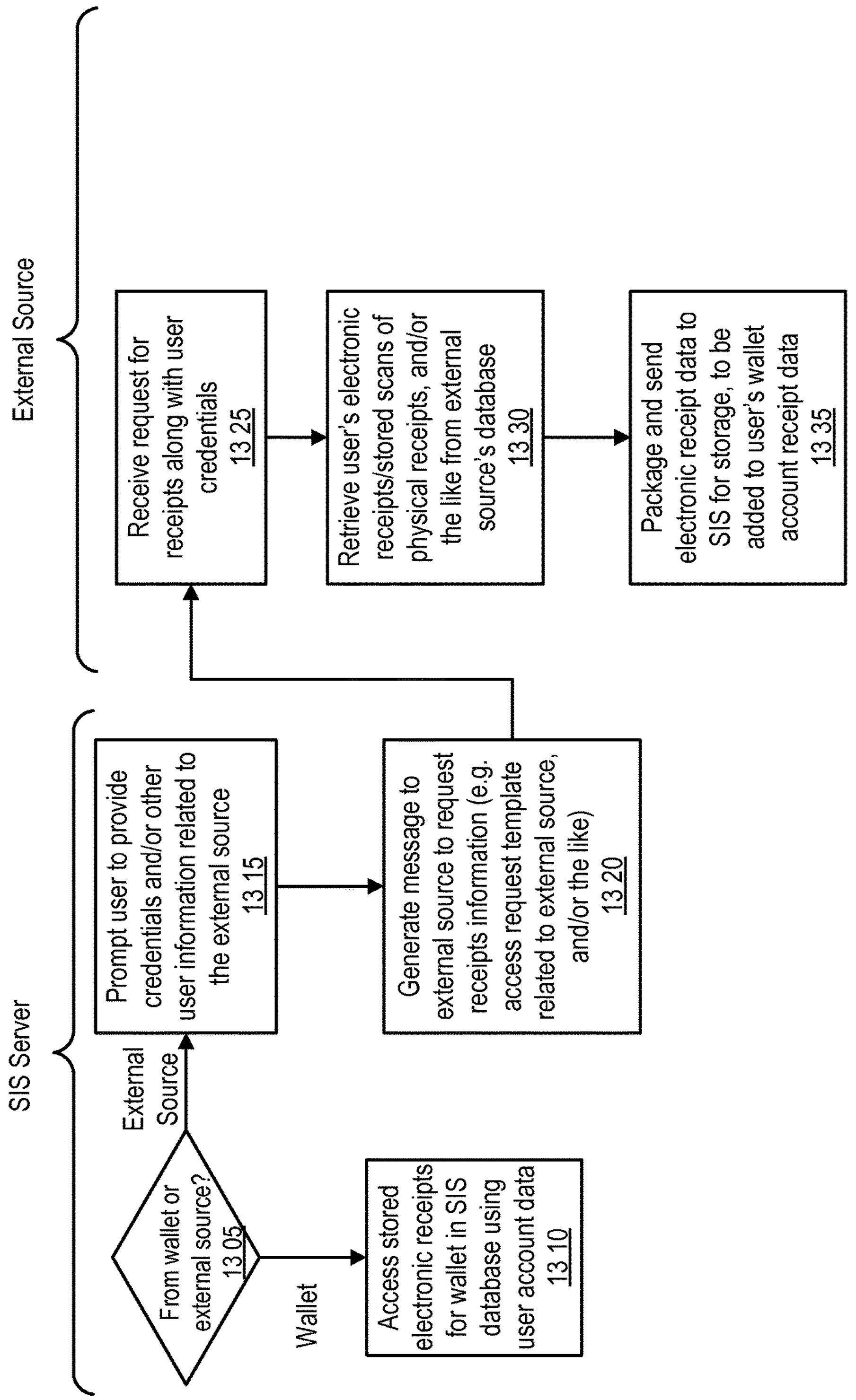
FIG. 13 shows a logic flow diagram illustrating obtaining electronic receipts in some embodiments of the SIS.

FIG. 13 shows a logic flow diagram illustrating obtaining electronic receipts in some embodiments of the SIS. In some implementations, SIS may determine 1305 whether the receipts are coming from the user's electronic wallet (e.g. a wallet connected to SIS or a wallet from another entity), or from an external source (e.g. from emails, from scanned images on a computer, and/or the like). In some implementations, if the receipts are coming from an electronic wallet, SIS may access stored receipts within the SIS 1310 by retrieving those which are linked to the user, or may access receipts in electronic wallets not connected to SIS via using the user's account credentials and/or other data to retrieve the receipts from the user's records. If the receipts are from an external source, SIS may prompt 1315 the user to provide his/her credentials and/or other information necessary to access the user's data from the external source. SIS may then generate a message 1320 to the external source using the provided user credentials in order to request receipt information. In some implementations, the message may provide a template for the external source, which it may use to determine what data to retrieve and how to format the data when it sends the data to SIS. In some implementations, the external source may receive the request 1325 and, after authenticating SIS using the user credentials, may retrieve 1330 the user's emails containing electronic receipts, scans of physical receipts, and/or the like from the external source's database. The external source may then package and send 1335 the data to SIS using the provided data template, and SIS, upon receiving the data, may store the receipts data in receipts records in the SIS database, and may link the new receipts records to the user's electronic wallet account.

Figure 14:
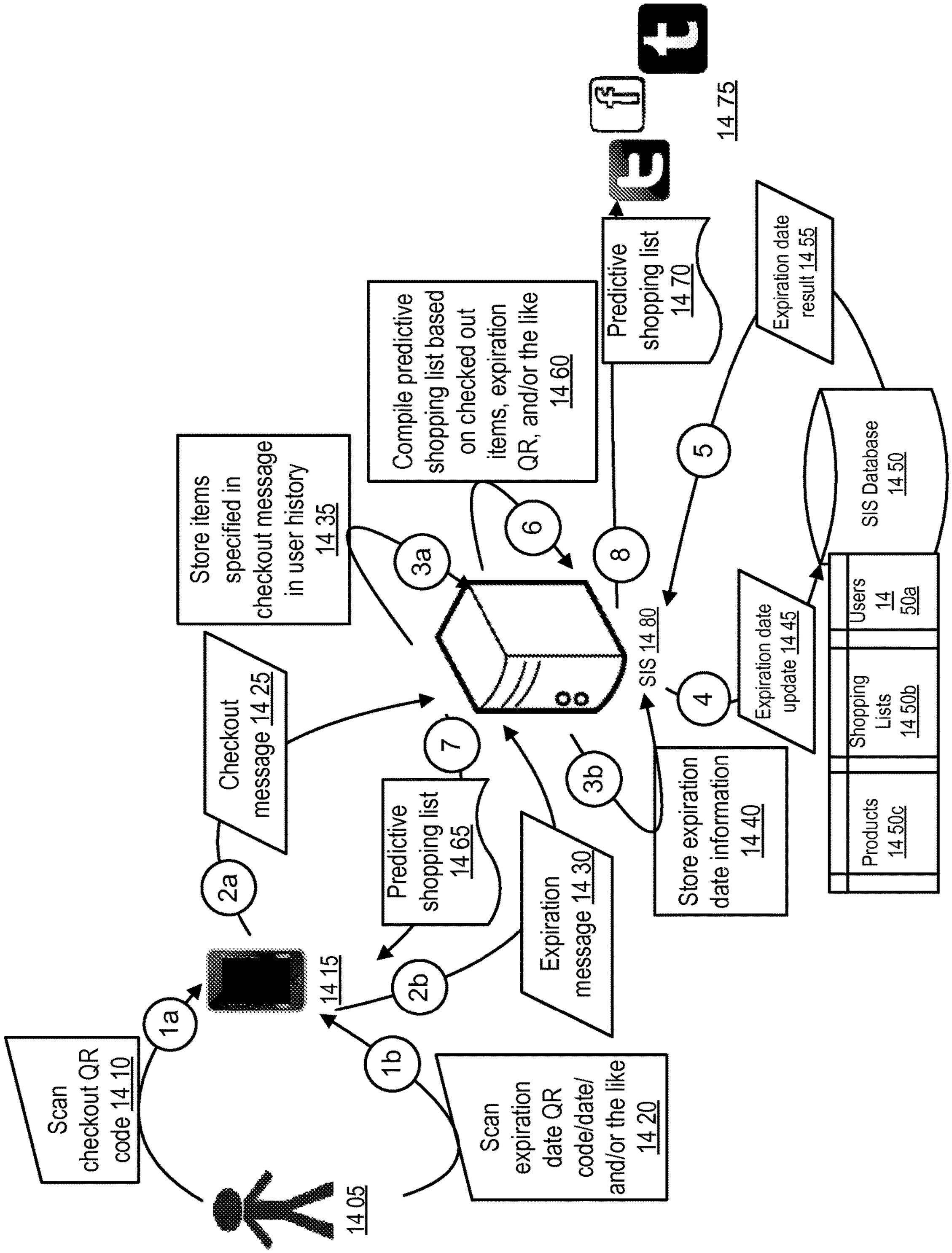
FIG. 14 shows a data flow diagram illustrating collecting code information for predictive shopping lists in some embodiments of the SIS.

FIG. 14 shows a data flow diagram illustrating collecting code information for predictive shopping lists in some embodiments of the SIS. In some implementations, a user 1405 may use an electronic wallet-enabled device 1415 to scan 1410 a checkout code in order to check out at a merchant. In some embodiments, the checkout code may be a QR code, an NFC tag, a checkout bar code, and/or the like. In some implementations, the wallet-enabled device may send a checkout message 1425 to SIS 1480. In some implementations, an XML-enabled checkout message 1425 may take a form similar to the following:

```
POST /checkout_message.php HTTP/1.1
Host: www.SISproccess.com
Content-Type: Application/XML
Content-Length: 788
<?XML version = "1.0" encoding = "UTF-8"?>
<checkout_message>
<timestamp>2016-01-01 12:30:00</timestamp>
    <user_params>
        <user_ID123456789</user_ID>
        <use_password>********</user_password>
        <wallet_ID>A2C4E6G8I/<wallet_ID>
    </user_params> <checkout_params>
        <date_performed>2012-01-01 12:30:00</date_performed>
        <merchant_ID>82719487194</merchant_ID>
        <transaction_total>/<transaction_total>
        <pay_method>wallet</pay_method>
        ...
        <products_list>
            <product>
            ...
            </product>
            ...
            <product>
            ...
            </product>
        </products_list>
        <checkout_QR>
            <qr_object_params>
            <qr image>
                <name> exp_QR </name>
                <format> JPEG </format>
                <compression> JPEG compression </compression>
                <size> 123456 bytes </size>
                <x-Resolution> 72.0 </x-Resolution>
                <y-Resolution> 72.0 </y-Resolution>
                <date_time> 2014:8:11 16:45:32 </date_time>
                ...
                <content> ÿØÿà JFIF H H ya ’ ICC_PROFILE
□appl mntrRGB XYZ Ü $ acspAPPL öÓÓ-appl
desc P bdscm ’ Šcprt______________________@ $wtpt
_____________d      rXYZ _________________x          gXYZ
_____________ Œ     bXYZ _______________             rTRC
_____________’      aarg    Á     vcgt ...
                </content>
                ...
            </qr_image>
            <QR_content>"Products, 893479357985,
98573347932749, ..."</QR_content>
            </qr_obj ect_params>
        </checkout_QR>
        <GPS>40.7589905, -73.9790277</GPS>
    </checkout_params>
</checkout_message>
```

In some implementations SIS may process the information in the scanned code 1435 and may store the specified items in the user's purchase history in the user's record 1450*a*, and may also store records of the products in the products table 1450*c* of the SIS database. In some implementations, SIS may then compile a predictive shopping list and/or update the user's existing predictive shopping list 1460 using the items checked out with the checkout code. In some implementations SIS may send a copy of the predictive shopping list 1465 to the user's electronic device, and may allow the user to send another copy of the predictive shopping list 1470 to his/her social network profiles 1475 (e.g. Facebook, Twitter, and/or the like).

In some implementations, the user may also scan 1420 an expiration date code (e.g. a QR code, NFC tag, barcode, RFID tag, and/or the like), and/or may scan an expiration date from the product's package. In some implementations, the electronic device may send an expiration message 1430 to SIS containing the expiration data scanned from the code. In some implementations, the XML-enabled expiration message may take a form similar to the following:

```
POST /expiration_message.php HTTP/1.1
Host: www.SISproccess.com
Content-Type: Application/XML
Content-Length: 788
<?XML version = "1.0" encoding = "UTF-8"?>
<checkout_message>
<timestamp>2016-01-01 12:30:00</timestamp>
    <user_params>
        <user_ID123456789</user_ID>
        <user_password>********</user_password>
        <wallet_ID>A2C4E6G8I</wallet_ID>
    </user_params>
    <product_exp_params>
        <exp_date>
            <qr_object_params>
            <qr_image>
                <name> exp_QR </name>
                <format> JPEG </format>
                <compression> JPEG compression </compression>
                <size> 123456 bytes </size>
                <x-Resolution> 72.0 </x-Resolution>
                <y-Resolution> 72.0 </y-Resolution>
                <date_time> 2014:8:11 16:45:32 </date_time>
                ...
                <content> ÿØÿà JFIF H H ÿâ ’ ICC_PROFILE
□appl    mntrRGB    XYZ   U      $    acspAPPL oOO-appl
Desc    P   bdscm  ’  Scprt _______________________@   $wtpt
___________________d       rXYZ___________________x   gXYZ
                   Œ       bXYZ__________________      rTRC
___________________’
___________________        aarg   Á         vcgt ...
                </content>
                ...
            </qr_image>
            <QR_content>"Expiration Date,
2014:8:11"</QR_content>
            </qr_obj ect_params>
        </exp_date>
        <product_ID>484873258932</product_ID>
        <GPS>40.7589905, -73.9790277</GPS>
    </product_exp_params>
</expiration_message>
```

In some implementations, SIS may then store 1440 the expiration date information in the products table 1450*c* of the SIS database via an expiration date query 1445 to the SIS database 1450. In some implementations, a PHP-encoded expiration date query 1445 may take a form similar to the following:

```
<?php
    ...
        $product = "8578388889475";
        $exp_date = "2014:8:11";
        $exp_result = mysql_query("UPDATE products SET
exp_date=' $exp_date' WHERE id=' $product'");
?>
```

In some implementations, after receiving an expiration date result 1455, SIS may use the expiration date data to update the user's predictive shopping list (e.g. adding items that will expire soon to the shopping list, and/or the like).

Figure 15:
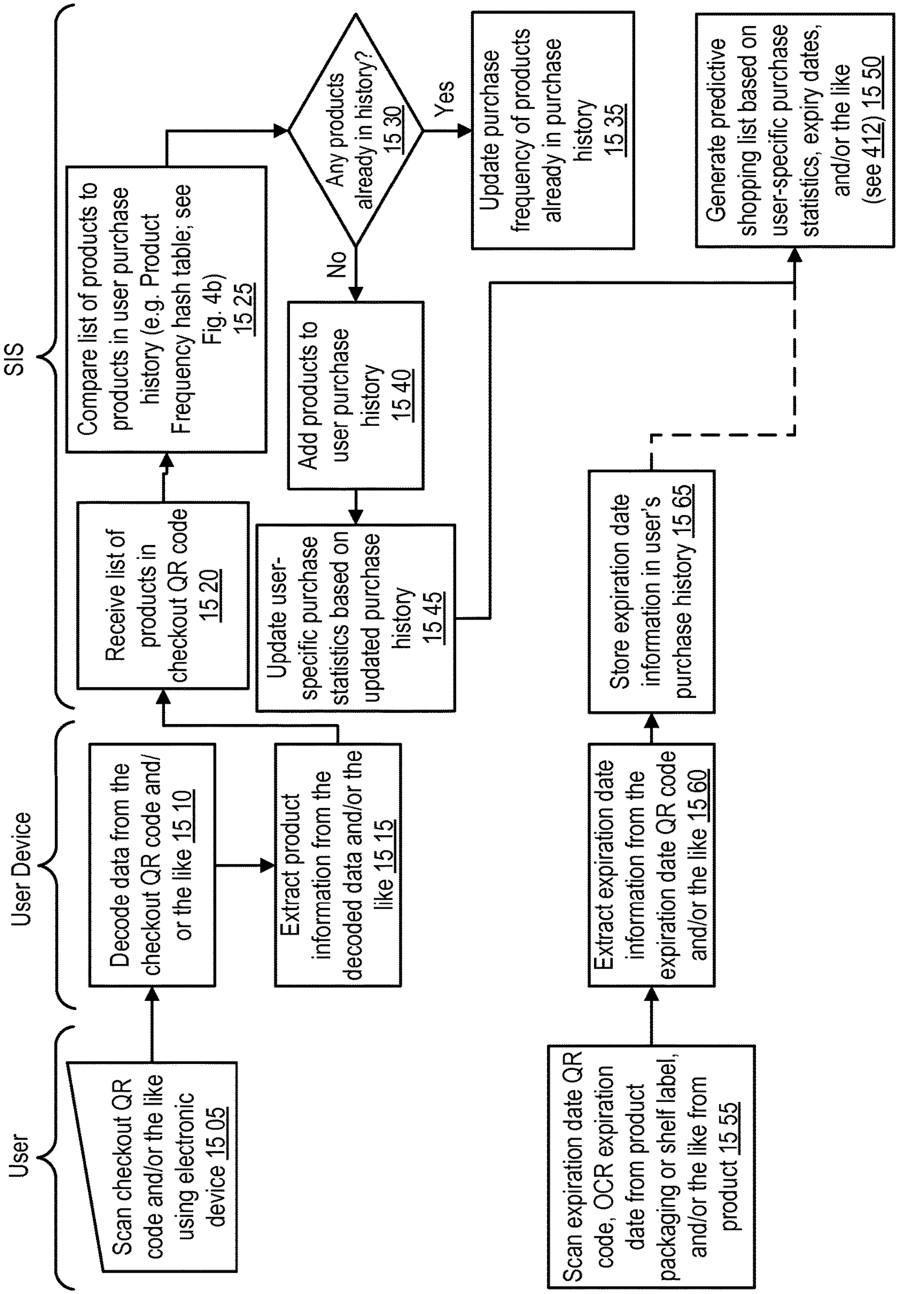
FIG. 15 shows a logic flow diagram illustrating collecting code information for predictive shopping lists in some embodiments of the SIS.

FIG. 15 shows a logic flow diagram illustrating collecting code information for predictive shopping lists in some embodiments of the SIS. In some implementations, the user may scan a checkout code and/or the like using the user's electronic device 1505. The electronic device may decode 1510 the data from the checkout code and/or the like, and may extract 1515 product information from the decoded code data and send the decoded information to SIS. In some implementations SIS may receive 1520 a list of the products in the checkout code, and may compare 1525 the list of products to the products stored in the user's purchase history. If any product on the user's checkout list is already in the user's product history 1530, SIS may update 1535 the purchase frequency of the products already in the user's purchase history. If any product on the checkout list is not in the user's purchase history, SIS may add the products 1540 to the user's purchase history, and may update the user's purchase statistics 1545 based on the updated purchase history and purchase frequencies. SIS may then generate and/or update a predictive shopping list for the user 1550 based on the user's purchase statistics and/or the like.

In some implementations, the user may also scan an expiration date code 1555 from the product's packaging, from a shelf label, and/or the like using the user's electronic device, and the electronic device may extract 1560 from the expiration code the expiration date for the product. In some implementations, the electronic may send the expiration data to SIS, which may store 1565 the expiration data in the product record and/or in the user's purchase history data, and which may use the expiration data to update the user's predictive shopping list.

Figure 16:
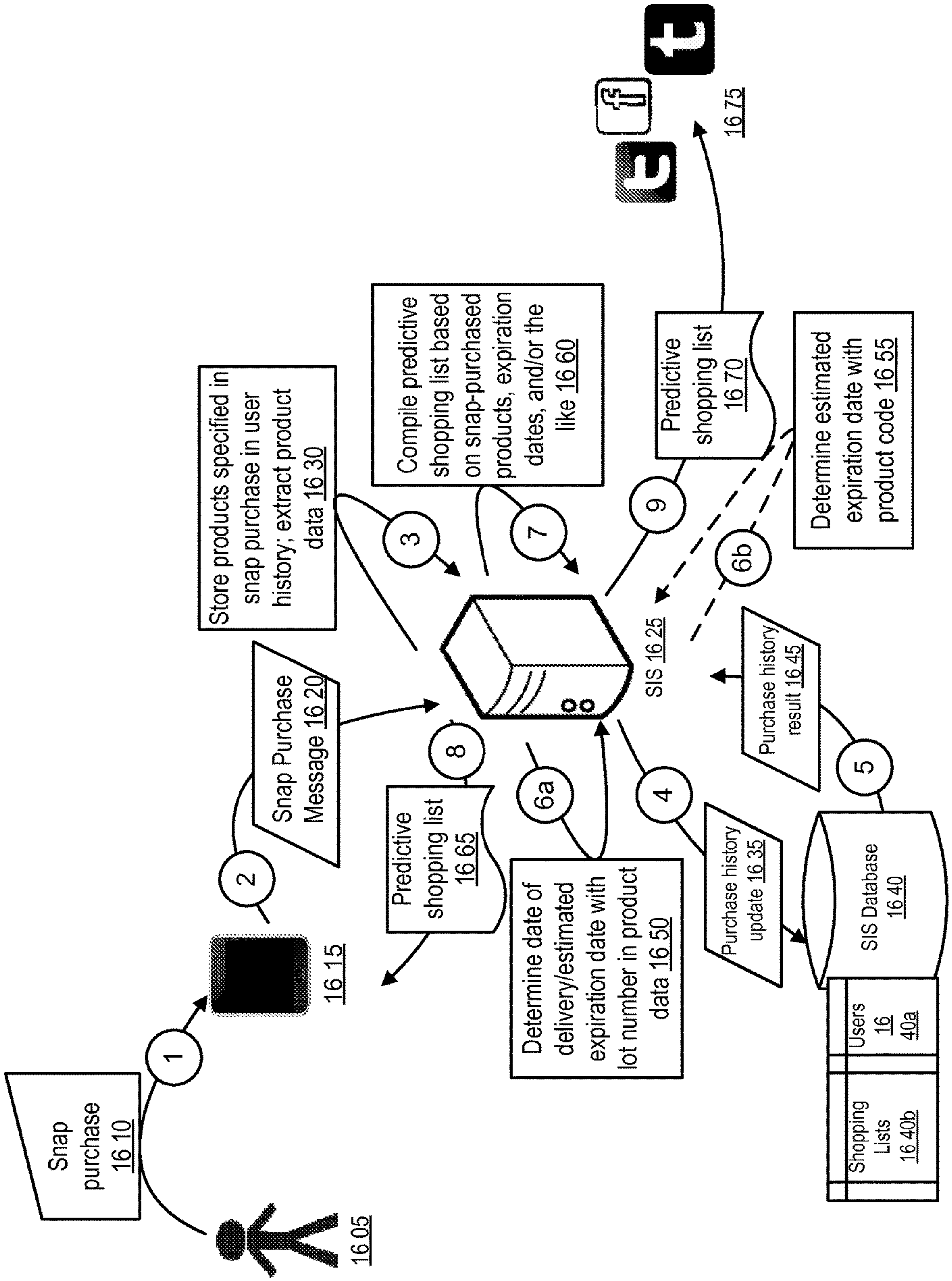
FIG. 16 shows a data flow diagram illustrating collecting snap purchase information for predictive shopping lists in some embodiments of the SIS.

FIG. 16 shows a data flow diagram illustrating collecting snap purchase information for predictive shopping lists in some embodiments of the SIS. In some implementations, a user 1605 may perform a snap purchase 1610 using an electronic device 1615. In some implementations, the electronic device may send a snap purchase message 1620 to SIS 1625, which may be an XML-enabled message that may take a form similar to the following:

```
POST /snap_purchase_message.php HTTP/1.1
Host: www.SISproccess.com
Content-Type: Application/XML
Content-Length: 788
<?XML version = "1.0" encoding = "UTF-8"?>
<snap_purchase_message>
<timestamp>2016-01-01 12:30:00</timestamp>
  <user_params>
    <user_ID123456789</user_ID>
    <user_password>********</user_password>
    <wallet_ID>A2C4E6G8I</wallet_ID>
  </user_params>
  <decoded_tag_params>
    <checkout_params>
      <date>2012-01-01 12:30:00</date >
      <merchant_ID>82719487194</merchant_ID>
      <transaction_total>24.50</transaction_total>
      <tax>1.50</tax>
    </checkout_params>
    <product_params>
      <product>
        <ID>289786479</ID>
        <name>Twinings &#174; Chai Ultra Spice
Tea</name>
        <weight>40, g</weight>
        <product_code>7017726772</product_code>
        <lot_ID>90 8D0F98 9A</lot_ID>
        <merchant_ID>9483738921</merchant_ID>
        <price>4.99</price>
        <aisle>7</aisle>
        <shelf>3</shelf>
        <expiration_date></expiration_date>
        <GPS>40.7589905, -73.9790277</GPS>
        ...
      </product>
      <product>
        <id>098765432</id>
        <name>Sunshine &#174; Cheez-It &#174; Baked Snack
Crackers</name>
        <weight>170</weight>
        <product_code>2410070582</product_code>
        <lot_ID>9274E8AC</lot_ID>
        <merchant_ID>1155448899</merchant_ID>
        <price>3.99</price>
        <aisle>5</aisle>
        <shelf>2</shelf>
        <expiration_date>2017-02-01 12:30:00</expiration_date>
        <GPS>40.7589905, -73.9790277</GPS>
        ...
      </product>
    </product_params>
  </decoded_tag_params>
  <tag_params>
    <qr_object_params>
      <qr_image>
        <name> exp_QR </name>
        <format> JPEG </format>
        <compression> JPEG compression </compression>
        <size> 123456 bytes </size>
        <x-Resolution> 72.0 </x-Resolution>
        <y-Resolution> 72.0 </y-Resolution>
        <date_time> 2014:8:11 16:45:32 </date_time>
        <content> ÿØÿá JFIF H H ÿâ' ICC_PROFILE
□appl mntrRGB XYZ Ü $ acspAPPL öÖÓ-appl
Desc P bdscm ' Šcprt_______________@ $wtpt
___________________d rXYZ___________________x gXYZ
___________________Œ Bxyz___________________ rTRC
___________________' aarg À vcgt ...
        </content>
        ...
      </qr_image>
    </qr_object_params>
  </tag_params>
  <dig_signature>897987a87e878232322b22</dig_signature>
</snap_purchase_message>
```

In some implementations, SIS may store 1630 the products specified in the snap purchase within the user history, and may also extract product information from the snap purchase message, or retrieve the information from the SIS database. In some implementations, SIS may query the SIS database 1640 with a purchase history update query 1635 in order to update the user's product history in the user's record 1640*a*. After receiving a purchase history result 1645, SIS may compile and/or update a predictive shopping list for the user 1660 using the snap purchase information. SIS may also use the extracted product information in order to determine an expiration date for each product. For example, SIS may use the product's lot number 1650 to determine the product's date of delivery to the merchant, and therefore to estimate the expiration date of the product. SIS may also use the product ID or code 1655 to estimate the expiration date, based on information SIS may already have about the type of product (e.g. SIS may estimate the expiration date of a brand of eggs based on aggregate information about egg expiration dates, and/or the like). SIS may use the expiration date information to update the user's predictive shopping list. SIS may then send 1665 a copy of the predictive shopping list to the user, and may allow the user to send a copy and/or link of the predictive shopping list 1670 to the user's social networking profiles 1675 (e.g. Facebook, Twitter, and/or the like).

Figure 17:
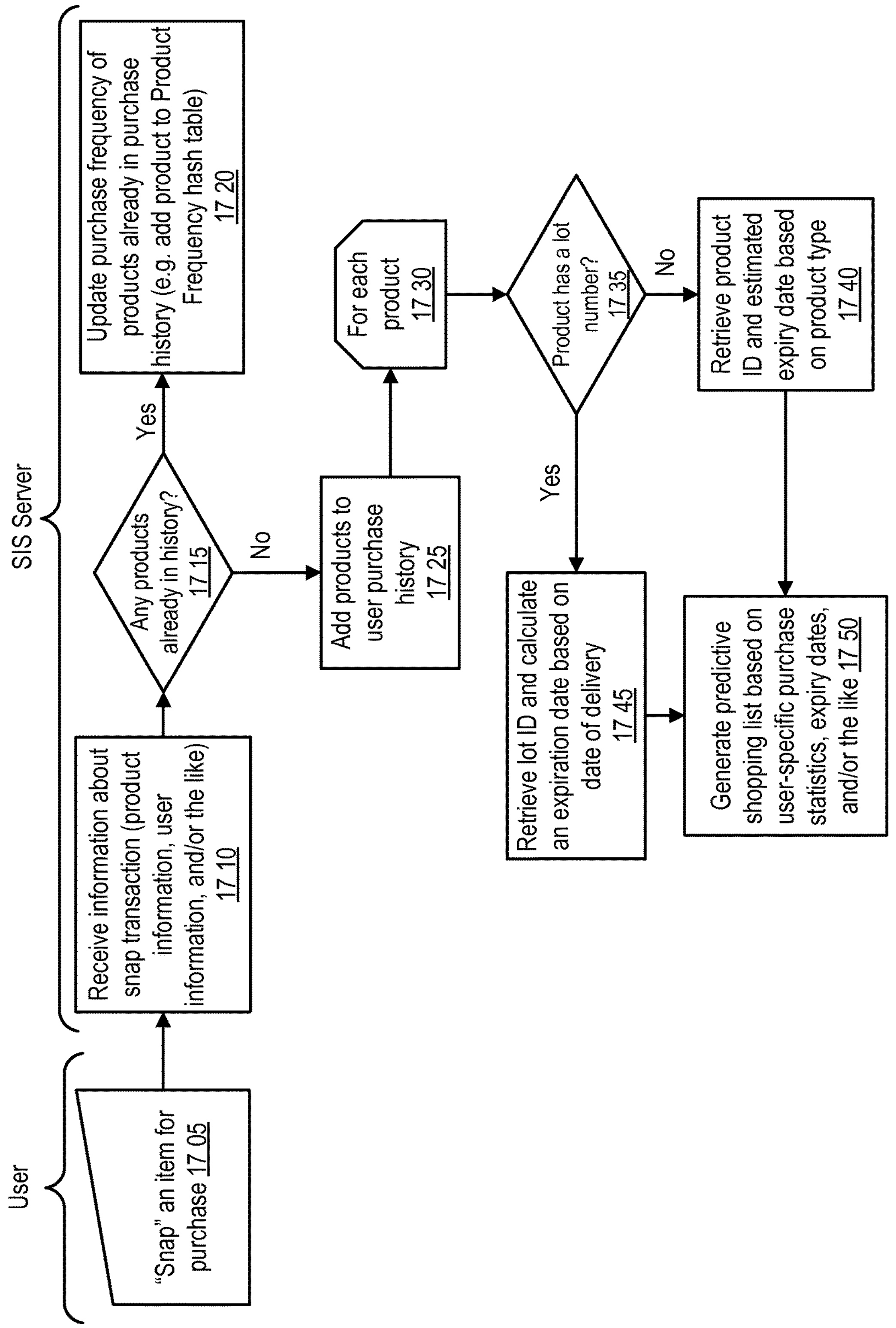
FIG. 17 shows a logic flow diagram illustrating collecting snap purchase information for predictive shopping lists in some embodiments of the SIS.

FIG. 17 shows a logic flow diagram illustrating collecting snap purchase information for predictive shopping lists in some embodiments of the SIS. In some implementations, the user may snap an item and/or a set of items for purchase 1705, and the snap purchase information may be sent to SIS. In some implementations, SIS may receive 1710 the information about the snap transaction, and may determine 1715 whether any of the products that were snapped for purchase already appear in the user's product history. If any do, SIS may update the purchase frequency of those products 1720; if a product does not appear in the user's product history, SIS may add the product to the user's purchase history 1725. In some implementations, for each product 1730 in the user's product history, SIS may also determine whether or not the product has a lot number 1735 or a product ID and/or code by retrieving the product's record from the SIS database. If the product has a lot number, SIS may retrieve the lot ID 1745 and calculate an expiration date for the product based on the product's date of delivery; if the product does not have a lot number and/or ID but does have a product ID and/or code, SIS may instead retrieve the product ID and/or code, determine the type of product based on the ID and/or code, and estimate an expiration date for the product based on the product type, and based on data SIS already has for the type of product. SIS may then generate 1750 a predictive shopping list based on the user's purchase statistics and/or any other information obtained from the snap purchase.

Figure 18:
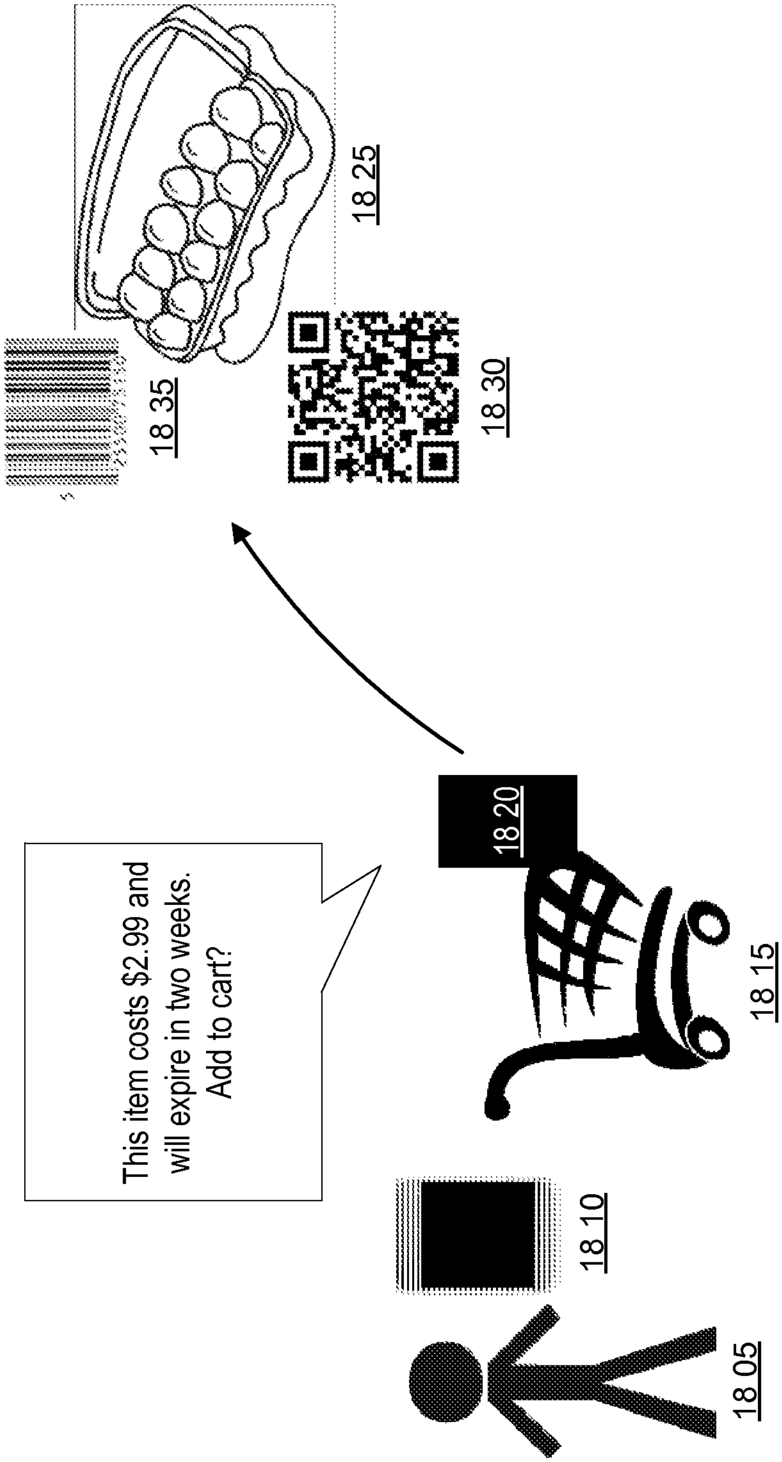
FIG. 18 shows a block diagram illustrating using predictive shopping lists with a smart shopping cart in some embodiments of the SIS.

FIG. 18 shows a block diagram illustrating using predictive shopping lists with a smart shopping cart in some embodiments of the SIS. In some implementations, a user 1805 may want to use their electronic device 1810 connected to their electronic wallet, in conjunction with a smart cart 1815 with a code reader 1820, to automatically read product 1825 information from QR codes 1830, barcodes 1835, and/or like codes in order to keep track of products being purchased while at a merchant.

Figure 19A:
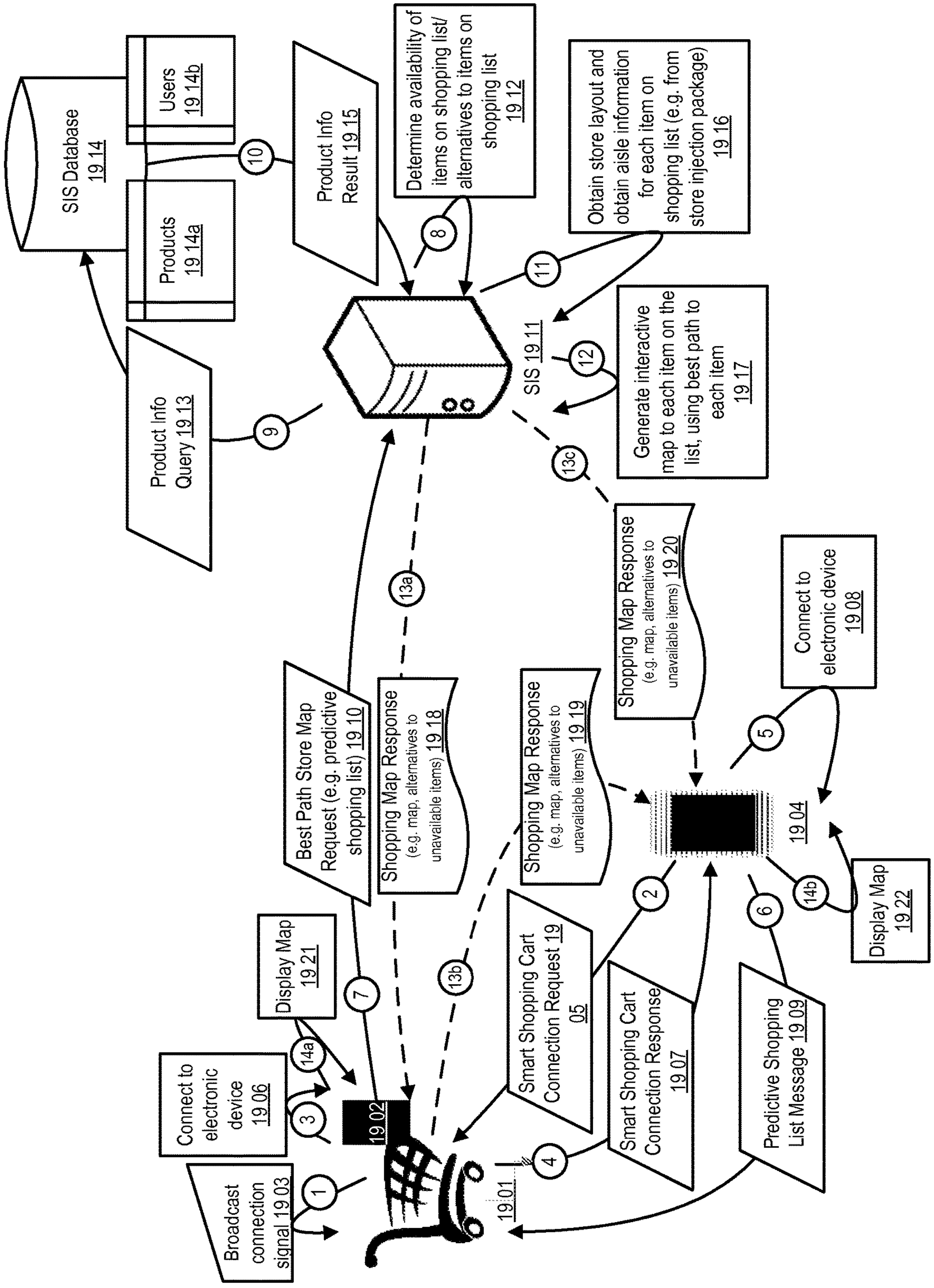
FIGS. 19*a-b* show data flow diagrams illustrating using predictive shopping lists with a smart shopping cart in some embodiments of the SIS.
Figure 19B:
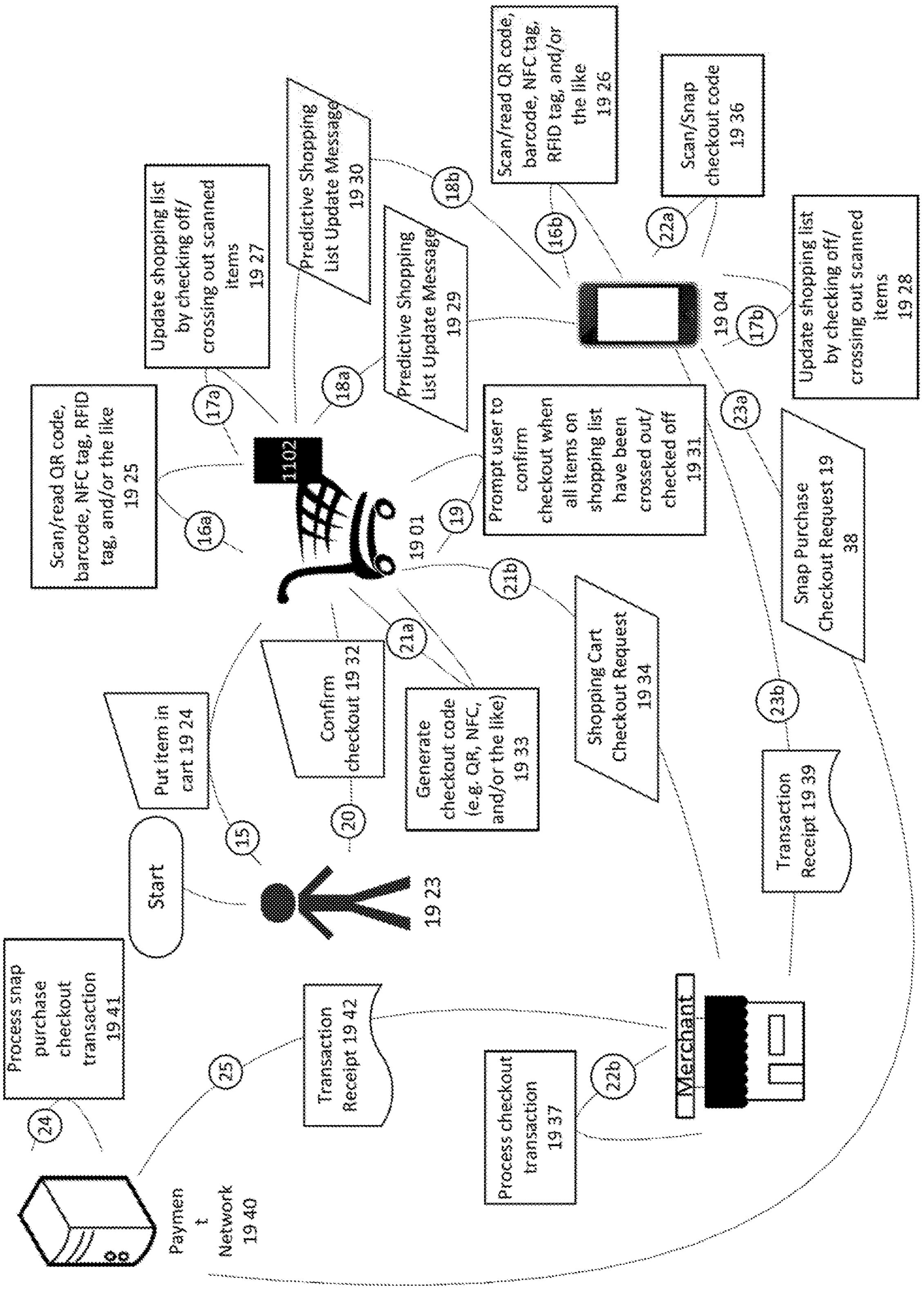

FIGS. 19*a-b* show data flow diagrams illustrating using predictive shopping lists with a smart shopping cart in some embodiments of the SIS. In some implementations, a merchant may have smart shopping carts 1901 fitted with a code scanner 1902, which may be able to read QR codes, barcodes, NFC tags, RFID tags, and/or the like. A smart shopping cart may broadcast 1903 a connection signal so that users may connect devices to the smart shopping cart. In some implementations, a user's wallet-enabled electronic device 1904 may be able to pick up the broadcasted signal, and may send a smart shopping cart connection request 1905 to the shopping cart. In some implementations, an exemplary XML-encoded shopping cart connection request 1905 may take a form similar to the following:

```
POST /connect_message.php HTTP/1.1
Host: www.SISproccess.com
Content-Type: Application/XML
Content-Length: 788
<?XML version = "1.0" encoding = "UTF-8"?>
<connect_message>
<timestamp>2016-01-01 12:30:00</timestamp>
    <user_params>
        <user_ID123456789</user_ID>
        <user_password>********</user_password>
        <wallet_ID>A2C4E6G8I</wallet_ID>
    </user_params>
    <device_params>
        <device_ID>875464684658</device_ID>
        <device_name>Example Device</device_name>
        <device_pin>1234</device_pin>
        <device_connect>bluetooth, wifi</user_connect>
```

-continued

```
    </device_params>
</connect_message>
```

In some implementations, the shopping cart may attempt to connect 1906 to the electronic device and, if successful, may send a smart shopping cart connection response 1907, which may contain a notification that the shopping cart is successfully able to see and communicate with the electronic device, or a notification of a failed connection attempt, allowing the user to try to connect to the shopping cart again through his/her device. In some implementations the notification may also contain information about the cart which may help facilitate a connection between the two devices, e.g. a passcode and/or the like. In some implementations, the electronic device may then connect 1908 to the smart shopping cart, and may send a copy 1909 of the user's predictive shopping list to the cart. The shopping cart may then send a best path store map request 1910 to SIS, which may contain the predictive shopping list so that SIS may determine the fastest route through the store to get to the items on the list. In some implementations, the store map request 1110 may take a form similar to the following:

```
POST /map_message.php HTTP/1.1
Host: www.SISproccess.com
Content-Type: Application/XML
Content-Length: 788
<?XML version = "1.0" encoding = "UTF-8"?>
<map_message>
<timestamp>2016-01-01 12:30:00</timestamp>
    <user_params>
        <user_ID123456789</user_ID>
        <user_password>********</user_password>
        <wallet_ID>A2C4E6G8I</wallet_ID>
    </user_params>
    <shopping_list_params>
        <list_params>
            <name> Example Predictive Shopping List </name>
            <date_created>2016-01-01 12:30:00</date_created>
        </list_params>
        <product_list>
            ...
        </product_list>
    </shopping_list_params>
    <path_params>
        <start>closest_to_user</start>
        <end>closest_to_checkout</end>
        <alts>true</alts>
    </path_params>
</map_message>
```

In some implementations, SIS may determine the availability 1912 of the items on the user's predictive shopping list, and/or the availability of alternative items (e.g. if items in the shopping list are not available and/or the like) via sending a product information query 1913 to the SIS database 1914. A PHP-encoded product info query may take a form similar to the following:

```
<?php
...
$merchant = "54435435562436";
$exp_result = mysql_query("FROM products WHERE
merchant_ID='$merchant' SELECT *);
?>
```

In some implementations, the query may access the products table 1915*a* and retrieve a store injection package stored on SIS for the purpose of determining the merchant's most recently-provided inventory. In some implementations, SIS may, instead of retrieving said package from the SIS database, may contact a store injection database or a merchant directly to retrieve a recent store injection package for the merchant. In some implementations, the SIS database may return a product information result 1915, which may contain a store injection package for the merchant specified, so that SIS may parse the package for the merchant's available inventory. In some implementations, items on the user's predictive shopping list not available at the merchant at the time of purchase may be swapped for alternative items (e.g. stored in the predictive shopping list, proposed by the merchant and/or social network contacts, and/or the like), and SIS may parse the package for information regarding these alternative items. In some implementations, SIS may also obtain the store layout 1916 and aisle information for all the items on the user's predictive shopping list and/or alternatives added to the list, e.g. via parsing the store injection package for such information. In some implementations, SIS may use the store layout, aisle and shelf information for each product, and/or the like to determine the best path to each item in the store, and to generate an interactive map 1917 to each item on the predictive shopping list. In some implementations, the path from item to item may be drawn via mapping Cartesian coordinates to the floor map/bird's eye view image of the store, and plotting the path based on these coordinates. In some implementations, SIS may then send the shopping map via a shopping map response 1918 to the smart shopping cart. In some implementations, a XML-enabled shopping map 1918 may take a form similar to the following:

```
<graphic-shopping map>
    <order>
        <product>
            <id>573687474878</id>
            <x>20</x>
            <y>40</y>
        </product>
        <product>
            <id>87676876879</id>
            <x>20</x>
            <y>70</y>
        </product>
        ...
    </order>
    <map-base>
        <format> JPEG </format>
        <compression> JPEG compression </compression>
            <size> 123456 bytes </size>
            <x-Resolution> 72.0 </x-Resolution>
            <y-Resolution> 72.0 </y-Resolution>
            <x-width>200</x-width>
            <y-height>320</y-height>
            <date_time> 2014:8:11 16:45:32 </date_time>
            <color>greyscale</color>
            <content> ÿØÿà JFIF H H ÿâ'ICC_PROFILE
□appl mntrRGB XYZ Ü $ acspAPPL öÖÓ-appl
desc P bdscm ' Šcprt____________________@ $wtpt
_______________d  rXYZ____________________x  gXYZ
_______________Œ  bXYZ__________________   Rtrc
_______________'  AARG  À  vcgt  ...
            </content>
    </map_base>
    <overlay_color>red</overlay_color>
</graphic_shopping_map>
```

In some implementations, the shopping cart may forward 1919 the shopping map to the user's electronic device. In some implementations, SIS may send the shopping map 1920 directly to the user's electronic device. In some implementations, the cart may display 1921 the map on a display mounted on the cart, and/or the user's electronic device may display 1922 the map on its screen.

After receiving the map, the user 1923 may add items to his/her cart 1924, which may involve allowing the smart cart to scan and/or read 1925 a code (e.g. a QR code, barcode, NFC tag, RFID tag, and/or the like) from the product packaging. The smart cart may then update the shopping list 1927 on the cart by marking the item scanned as being obtained via checking off the item, crossing off the item, and/or a like action on the list. In some implementations, the cart may also send a predictive shopping list update message 1929 to the user's electronic device, which may use the sent scanned product information to update a copy of the shopping list being maintained on the electronic device 1928. In some implementations, an exemplary XML-encoded shopping list update message 1929 may take a form similar to the following:

```
POST /scanned_item_message.php HTTP/1.1
Host: www.SISproccess.com
Content-Type: Application/XML
Content-Length: 788
<?XML version = "1.0" encoding = "UTF-8"?>
<scanned_item_message>
<timestamp>2016-01-01 12:30:00</timestamp>
        <user_params>
            <user_ID123456789</user_ID>
            <user_password>********</user_password>
            <wallet_ID>A2C4E6G8I</wallet_ID>
    </user_params>
        <scanned_item_params>
            <product>
                ...
            </product>
            <on_list>true</on_list>
            <action>check_off</action>
        </scanned_item_params>
</scanned_item_message>
```

In other implementations, the user may instead scan and/or read a code from a product using the user's electronic device 1926, and may send a predictive shopping list update message 1930 to the user's smart cart, which may provide scanned product information to the cart that may allow it to cross off and/or otherwise mark items on its copy of the shopping list. In some implementations, the shopping list update message 1930 may take a form similar to update message 1929. In some implementations, the user may be able to dynamically change his/her predictive shopping list while shopping for products on the list. For example, the user may be able to manually add new items for the list, or manually remove items on the list. In other implementations, scanning items not on the list may add them automatically to the user's predictive shopping list, and re-scanning items already scanned and placed in the cart may remove them from the list and/or uncheck them on the list.

In some implementations, the cart may ask the user to confirm checkout 1931 of the items collected in the cart once all of the items on the predictive shopping list have been marked as being scanned. In some implementations, the user's electronic device may also prompt the user to checkout once all of the items on the user's predictive shopping list have been marked as being scanned. In some implementations the user may confirm 1932 checkout of the items added to the cart. In some implementations, the shopping cart may generate 1933 a checkout code that the user may use in order to initiate a snap purchase 1936 via the user's electronic device. The user's device may then send a snap purchase checkout request 1938 to a payment network 1940. In some implementations, a XML-encoded snap purchase checkout request 1938 may take a form similar to snap purchase message as described herein.

In some implementations, the payment network may talk to the appropriate parties (e.g. merchant's acquirer, user's issuer, and/or the like) in order to process 1941 the snap purchase checkout transaction. In some implementations the payment network may then send a transaction receipt 1942 to the merchant 1935 so that the merchant may create a record for the transaction, and be able to verify that the user purchased the items without needing the user to complete any part of the transaction with the merchant. In some implementations the payment network may send a notification and/or transaction receipt to the user as well.

In some implementations, the shopping cart may, instead of generating a checkout code, generate and send a shopping cart checkout request 1934 directly to the merchant. In some implementations, the checkout request 1934 may take a form similar to the following:

```
POST /checkout message.php HTTP/1.1
Host: www.SISproccess.com
Content-Type: Application/XML
Content-Length: 788
<?XML version = "1.0" encoding = "UTF-8"?>
<checkout_message>
<timestamp>2016-01-01 12:30:00</timestamp>
    <user_params>
        <user 10123456789</user_ID>
        <user_password>********</user_password>
        <wallet_ID>A2C4E6G8I</wallet_ID>
    </user_params>
    <checkout_params>
        <date>2012-01-01 12:30:00</date >
        <merchant_ID>82719487194</merchant_ID>
        <transaction_total>24.50</transaction_total>
        <tax>l,50</tax>
    </checkout_params>
    <product_params>
        <product>
            <ID>289786479</ID>
              <name>Twinings &#174; Chai Ultra Spice
              Tea</name>
              <weight>40, g</weight>
            <product_code>7017726772</product_code>
            <lot_ID>908D0F989A</lot_ID>
            <merchant_ID>9483738921</merchant_ID>
            <price>4.99</price>
            <aisle>7</aisle>
            <shelf>3</shelf>
            <expiration_datex/expiration_date>
            ...
        </product>
        <product>
            <id>098765432</id>
            <name>Sunshine &#174; Cheez-It &#174; Baked
            Snack Crackers</name>
            <weight>170</weight>
            <product_code>2410070582</product_code>
            <lot_ID>9274E8AC</lot_ID>
            <merchant_ID>1155448899</merchant_ID>
            <price>3.99</price>
            <aisle>5</aisle>
            <shelf>2</shelf>
            <expiration_date>2017-02-01
12 : 30:00</expiration_date>
            ...
            </product>
    </product_params>
</checkout_message>
```

In some implementations the merchant may then process 1937 the checkout transaction using the information in the checkout request, and may send a transaction receipt 1939 to the user once the checkout has been processed.

Figure 20A:
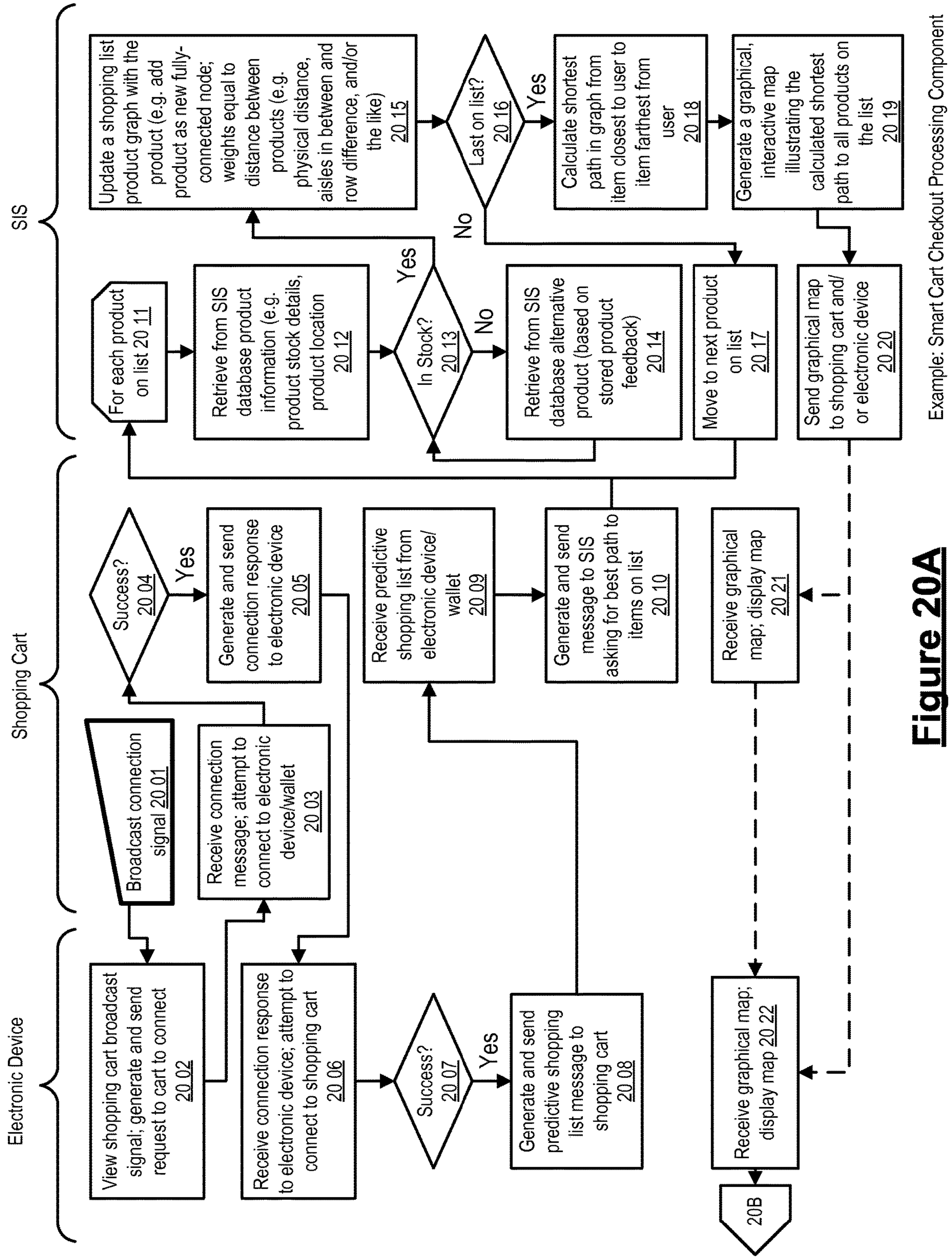
FIGS. 20-*a-b* show logic flow diagrams illustrating using predictive shopping lists with a smart shopping cart in some embodiments of the SIS.
Figure 20B:
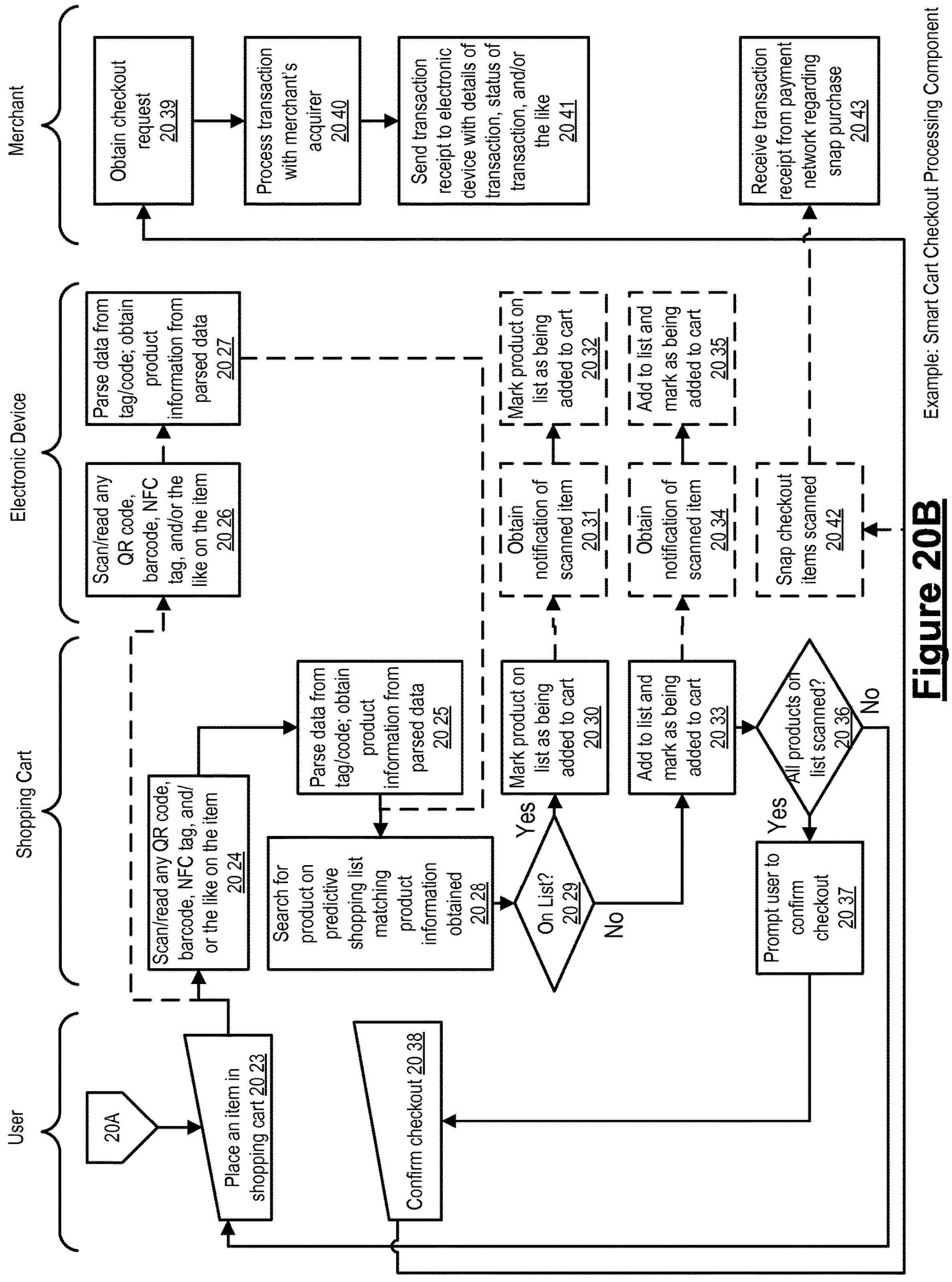

FIGS. 20-*a*-*b* show logic flow diagrams illustrating using predictive shopping lusts with a smart shopping cart in some embodiments of the SIS. In some implementations, the shopping cart may broadcast a connection signal 2001, which may be picked up by the user's electronic device. In some implementations the user may view the shopping cart's broadcast signal 2002, and may send a request to the cart in order to connect to the shopping cart. In some implementations, the shopping cart may receive 2003 the connection message and may attempt to connect to the electronic device. If the connection attempt is a success 2004, then the shopping cart may send a connection response 2005 to the electronic device, which may provide information to aid the electronic device in connecting to the shopping cart. In some implementations, the electronic device may receive the connection response 2006 and may use the response information to attempt to connect to the shopping cart. If the electronic device successfully connects to the shopping cart 2007, then the electronic device may send 2008 a predictive shopping list message to the shopping cart, containing the user's predictive shopping list. The shopping cart may receive the shopping list 2009 from the electronic device, and may send a message 2010 to SIS containing the predictive shopping list and asking SIS to determine the best path to all items on the list. SIS may, for each product 2011, retrieve from the SIS database 2012 product information, such as the product location, the product availability, and/or the like. If the item is not in stock 2013, SIS may retrieve alternative products in stock 2014 from the SIS database, which may be chosen based on stored product feedback, alternative items already in the user's predictive shopping list, and/or the like. In some implementations, if the item on the list is in stock, SIS may add the product to a shopping list product graph 2015, which may include adding the product as a node to the graph, which is fully-connected to all other nodes (i.e. products) in the graph, and in which each weight is equal to the distance between the product and the other node it is attached to. In some implementations, distance may be determined by the physical distance between items, may be determined by the number of aisles in between the products (with an added weight given to products whose aisles are in different rows), and/or a like metric. In some implementations, if the item added to the graph is not the last on the list 1216, SIS may then check the next item on the list 2017. Otherwise, SIS may use the generated graph to calculate 2018 the shortest path on the graph from the item closest to the user, to the item furthest from the user, to the item closest to the checkout section of the store, to and from items chosen by the user, and/or the like. SIS may use the calculated path to generate a graphical and optionally interactive map that may illustrate the calculated shortest path to all products on the list. In some implementations, the graphical map may be a drawn map of the store, with a colored path overlay signifying how to navigate the store, and containing markers which indicate products to purchase. In other implementations, the user may view a bird's-eye image view of the store with the path overlayed on the image, along with markers indicating products on the user's list. In some implementations, SIS may send 2020 this graphical map to the shopping cart, which may display 2021 the map for the user. The user may also receive the graphical map on his/her electronic device 2022, which may also display the map for the user's convenience.

In some implementations, the user may place 2023 items in the shopping cart, and may scan and/or read codes from the product via the shopping cart 2024, or scan and/or read codes from the product via the user's electronic device 2026. In some implementations the code scanned may be a QR code, RFID tag, bar code, NFC tag, and/or a like code. In some implementations, after either the shopping cart 2025 or the electronic device 2027 parses the data from the scanned code and obtains information from the parsed data (and, if applicable, after the electronic device has send a notification of a scan to the shopping cart), the shopping cart may search 2028 for the scanned product on the predictive shopping list using the product information in the code that was scanned. In some implementations, if the item is on the list 2029, the shopping cart may mark 2030 the product as being added to the cart on the shopping cart's predictive shopping list, and may additionally send a notification to the user's electronic device 2031, which may provide an indication that the item was checked off the shopping cart's list, so that the electronic device may also mark 2032 the product as being added to the cart. In some implementations, if the electronic device scans the item as it is put in the cart, the electronic device may cross the item off its own list, and may send a notification to the cart indicating the scanned item is on the list.

If the item is not on the list, the shopping cart may add the item to the list 2033 and then mark the item as being added to the cart, and may send a notification 2034 to the electronic device indicating that an item should be added to the list on the electronic device 2032 and that the item should also be marked as added to the cart. In some implementations, if the electronic device is used to scan the item, the electronic device may instead add the item to its copy of the list, mark the item as being added to the cart, and may send a message to the shopping cart indicating that an item has been added to the list and to the shopping cart. In some implementations, re-scanning an item marked off may unmark the item and/or may remove the item from the list. In some implementations, once all items on the list have been scanned 2036, the shopping cart may prompt the user to confirm checkout 2037. If the user confirms 2038 the checkout, a checkout request 2039 may be sent to the merchant, who may process the transaction 2040 and may send a transaction receipt 2041 to the user's electronic device detailing the transaction status, and/or other transaction details (e.g. total cost, items purchased in transaction, and/or the like). In some implementations, rather than sending a checkout message to the merchant, the electronic device may snap 2042 a checkout code and/or perform a like task to snap checkout the items scanned by the device and/or the shopping cart, which may involve sending a message to a payment network to process the transaction. In some implementations, the merchant may receive a transaction receipt from the payment network 2043 once the transaction has been processed in order to verify that the user has successfully purchased the items. In other implementations, the smart shopping cart may instead generate a checkout code (e.g. QR code, barcode, and/or the like) for the merchant to scan at its checkout counter via a point-of-sales (PoS) device, may generate a store injection checkout message to send to the user's electronic device so that the user may initiate a store injection transaction, and/or the like.

Figure 21:
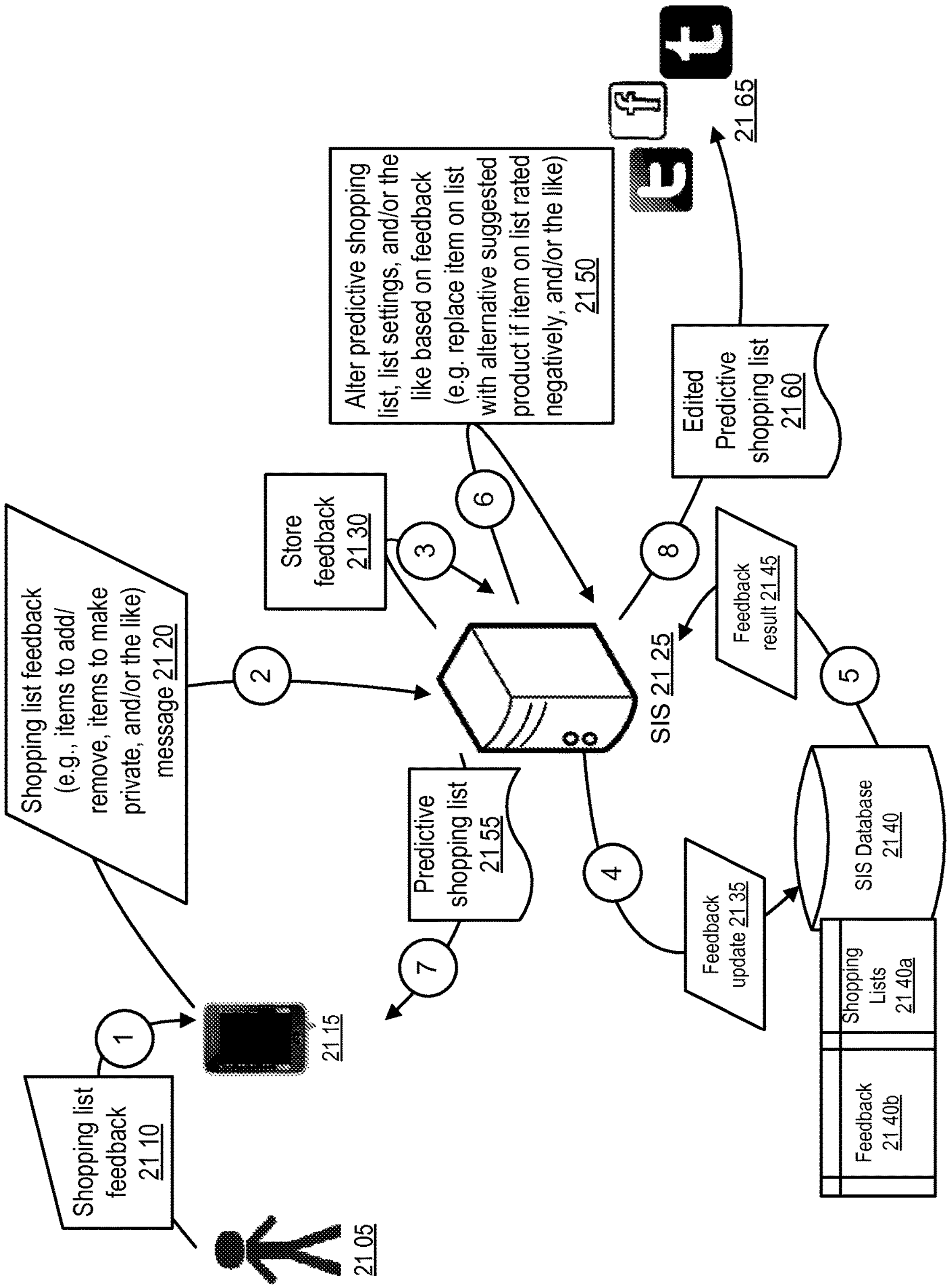
FIG. 21 shows a data flow diagram illustrating providing predictive shopping list feedback in some embodiments of the SIS.

FIG. 21 shows a data flow diagram illustrating providing predictive shopping list feedback in some embodiments of the SIS. In some implementations, the user 2105 may provide feedback 2110 on items on his/her predictive shopping list by entering said feedback into his/her electronic device 2115, which may be connected to the user's electronic wallet account. In some implementations, feedback may comprise textual feedback such as comments and/or the like, numerical feedback such as ratings/scores and/or the like, and/or a like type of feedback. In some implementations, feedback may also comprise indicating new items to add, items to delete from the shopping list, items to make public/private, and/or like information. In some implementations, the electronic device may then send the feedback via a shopping list feedback message 2120 to SIS 2125. In some implementations, an XML-encoded shopping list feedback message may take a form similar to the following:

```
POST /feedback_message.php HTTP/1.1
Host: www.SISproccess.com
Content-Type: Application/XML
Content-Length: 788
<?XML version = "1.0" encoding = "UTF-8"?>
<feedback_message>
<timestamp>2016-01-01 12:30:00</timestamp>
    <user_params>
        <user 10123456789</user_ID>
        <user_password>********</user_password>
        <wallet_ID>A2C4E6G8I</wallet_ID>
    </user_params>
    <feedback_params>
        <feedback>
            <product_ID>38749326578</product_ID>
            <from_user>567463546548</from_user>
            <rating>5</rating>
            <comment></comment>
            <visible>false</visible>
            <action>update</action>
            <GPS>40.7589905, -73.9790277</GPS>
        </feedback>
        ...
        <feedback>
            <product_ID>5637563959</product_ID>
            <from_user>567463546548</from_user>
            <rating></rating>
            <comment>Terrible taste; do not buy.</comment>
            <visible>true</visible>
            <action>remove</action>
            <GPS>40.7589905, -73.9790277</GPS>
        </feedback>
        <feedback>
            <product_ID>289786479</product_ID>
            <from_user>567463546548</from_user>
            <rating>5</rating>
            <comment>Really good tea.</comment>
            <visible>true</visible>
            <action>add</action>
            <GPS>40.7589905, -73.9790277</GPS>
        </feedback>
</feedback_params>
</feedback_message>
```

In some implementations, SIS may store 2130 the feedback information from the feedback message by sending a feedback update query 2135 to the SIS database 2140 and storing the information in a new feedback record within the feedback table 2140*b*. After receiving a feedback result 2145 from the SIS database, SIS may update 2150 the user's predictive shopping list in the predictive shopping list table 2140*a* of the SIS database, based on the feedback received. For example, SIS may replace and/or add items to the predictive shopping list, may swap items on the list with alternative items suggested by SIS when the original item has negative aggregate and/or user feedback and/or when an alternate item has more positive aggregate and/or user feedback, and/or the like. SIS may then send the predictive shopping list 2155 to the user, and may allow the user to send a copy of and/or link to the list 2160 to various social networking profiles 2165 (e.g. Facebook, Twitter, and/or the like). In some implementations, the XML-encoded list may take a form similar to the following:

```
<product_list>
    <user>
        <user_ID>123456789</user_ID>
        <wallet_ID>A2C4E6G8ID</wallet_ID>
    </user>
    <list_params>
        <name> Example Predictive Shopping List </name>
        <date_created>2016-01-01 12:30:00</date_created>
    </list params>
    <replacement_products>
        <expiring>
            ...
        </expiring>
        <smart_device>
            ...
        </smart_device>
        <predicted_replace>
            ...
        <predicted_replace>
    </replacement_products>
    <suggested_products>
        <personal>
            <product>
                <ID>289786479</ID>
                <name>Twinings &#174; Chai Ultra Spice
                Tea</name>
                <weight>40, g</weight>
                <product_code>7017726772</product_code>
                <lot_ID>90 8D0F98 9A</lot_ID>
                <merchant_ID>9483738921</merchant_ID>
                <price>4.99</price>
                <aisle>7</aisle>
                <shelf>3</shelf>
                <expiration_date></expiration_date>
                <confidence_level>0.8</confidence_level>
                <agg_SIS_rating>4.7</agg_SIS_rating>
    <agg_external_rating>4.5</agg_external_rating>
    <feedback_IDs>87487487485, 5587468786, 67464687868,
    ...</feedback_IDs>
                <visible>true</visible>
                <GPS>40.7589905, -73.9790277</GPS>
                <replenish_cycle>4, week</replenish_cycle>
                <alt_products>587456465874,
                38749326578</alt_products>
                ...
            </product>
        </personal>
        <social>
            <product>
                <ID>38749326578</ID>
                <name>Lipton &#174; Black Tea</name>
                <weight>40, g</weight>
                <product_code>83487456874</product_code>
                <lot_ID>232D2F436A</lot_ID>
    <merchant_ID>54758487487428</merchant_ID>
                <price>3.99</price>
                <aisle>7</aisle>
                <shelf>3</shelf>
                <expiration_date></expiration_date>
    <confidence_level>0.76</confidence_level>
                <agg_SIS_rating>4.0</agg_SIS_rating>
                <agg_external_rating>3.7</agg_external_rating>
    <feedback_IDs>87487487485, 5587468786, 67464687868,
    ...</feedback IDs>
                <GPS>40.7589905, -73.9790277</GPS>
                <replenish_cycle>4, week</replenish_cycle>
                <alt_products>289786479,
                97298473974</alt_products>
                ...
            </product>
        </social>
    </suggested_products>
</product_list>
```

Figure 22:
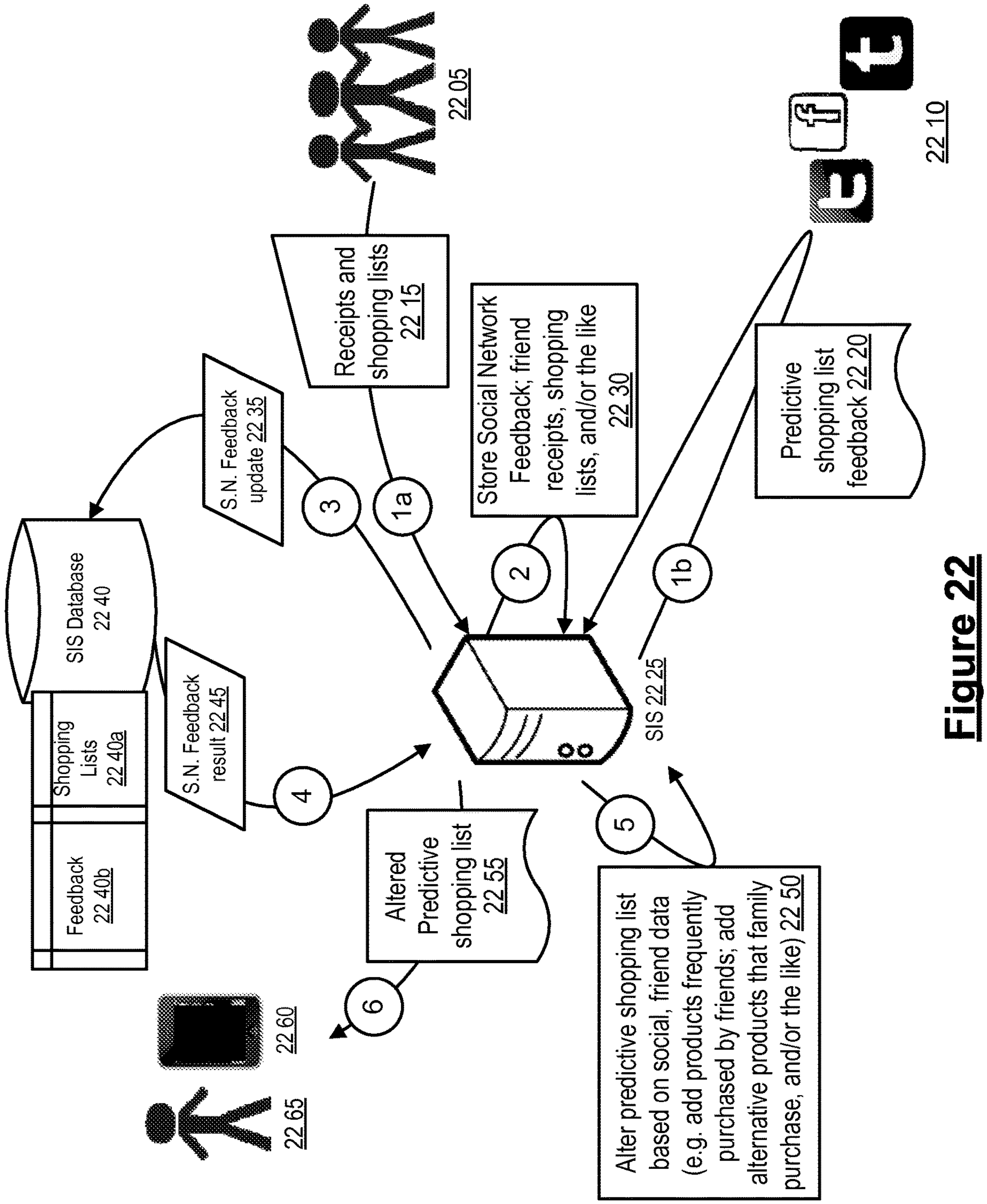
FIG. 22 shows a data flow diagram illustrating receiving predictive shopping list feedback from other users in some embodiments of the SIS.

FIG. 22 shows a data flow diagram illustrating receiving predictive shopping list feedback from other users in some embodiments of the SIS. In some implementations, friends, family, and/or like entities 2205 may provide their own receipts, shopping lists, and/or the like 2215 to SIS 2225. In some implementations, friends, family, and/or like entities on social networking websites 2210 where the user 2265 has provided his/her predictive shopping list may also provide feedback 2220 on the user's predictive shopping list. In some implementations, SIS may store 2230 the social network feedback, as well as the receipt and shopping list data from friends, family, and/or the like, by sending the feedback and/or the like to the SIS database 2240 via a social network feedback update query 2235. SIS may store the social network feedback in the feedback table 2240*b* of the SIS database, and may store the user's friends, family, and/or the like in the shopping list table 2240*a* of the SIS database. SIS database may send a social network feedback result 2245 back to the SIS. SIS may then alter 2250 the predictive shopping lists of the user and/or the friends, family, and/or other entities that have provided their own predictive shopping lists, based on the aggregate feedback received and based on other users' predictive shopping lists. For example, SIS may alter the user's predictive shopping list via removing a product from the list if the aggregate feedback is negative for the particular item, suggesting alternative products for the removed products based on alternative items that friends, family, and/or the like have positively rated, adding products frequently purchased by friends, family, and/or the like (and/or offering such products as alternatives to products already on the user's predictive shopping list), and/or the like. SIS may, after altering the user's predictive shopping list, send an updated copy of the predictive shopping list 2255 to the user via the user's electronic device 2260.

Figure 23:
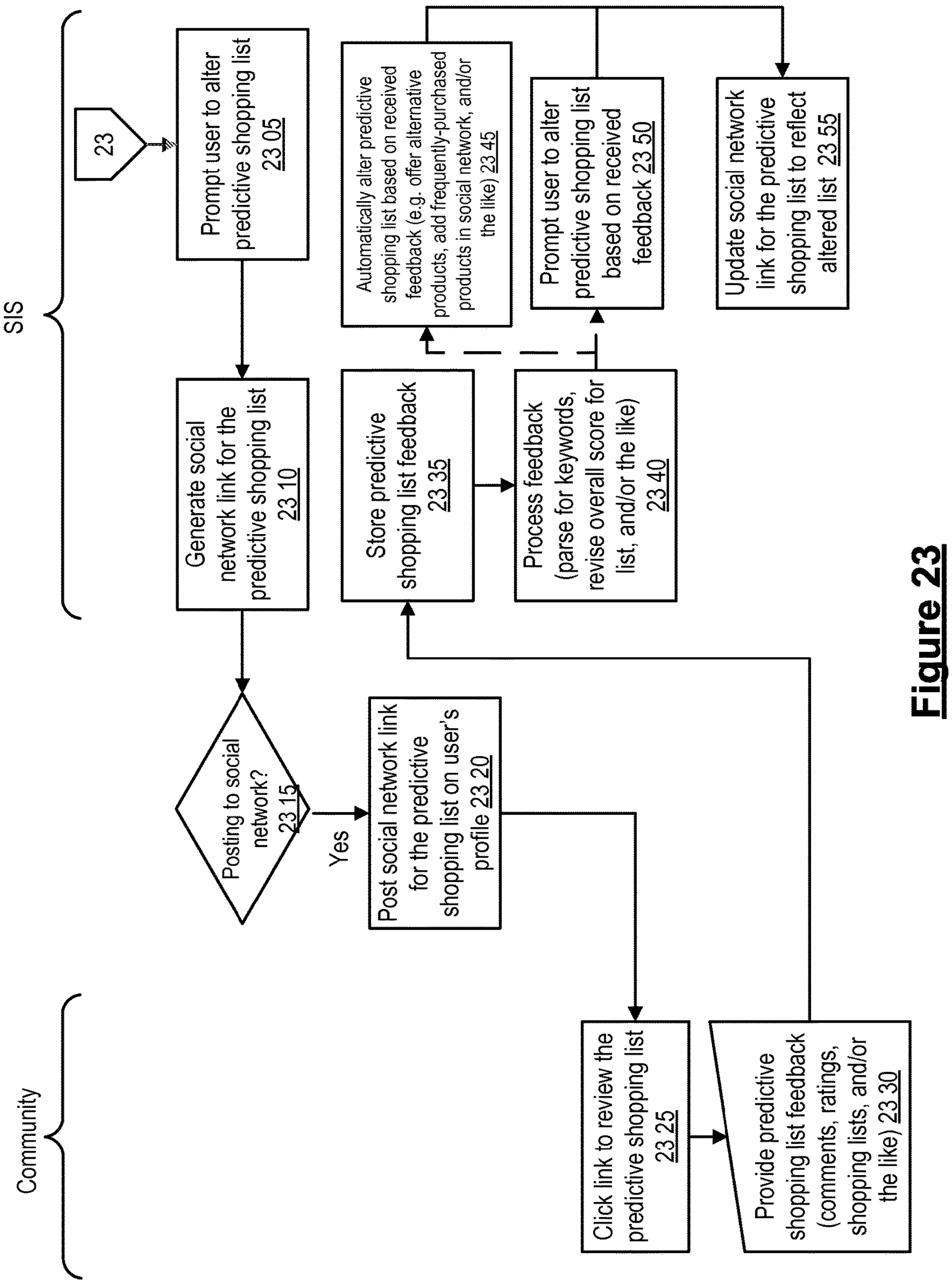
FIG. 23 shows a logic flow diagram illustrating receiving feedback for predictive shopping list in some embodiments of the SIS.

FIG. 23 shows a logic flow diagram illustrating receiving feedback for predictive shopping list in some embodiments of the SIS. In some implementations, the user may be prompted by SIS to provide feedback 2305 to their predictive shopping list, if applicable, including but not limited to commenting and/or rating the shopping list, adding/removing items on the list, swapping items on the list with items offered as alternatives to those already on the list, and/or the like. In some implementations, SIS may generate a social network link 2310 that the user may use to post the predictive shopping list on a social networking website (e.g. on Facebook, Twitter, and/or the like). In some implementations, if the user agrees to post the list to a social network 2315, the user may be provided with a number of methods of doing so, e.g., via marking a "share" setting in the predictive shopping list that may automatically add the predictive shopping list to social networking profiles specified by the user and may automatically update the shopping list if it changes, via the user manually posting the link to the predictive shopping list on a social networking website 2320, and/or the like. In some implementations, the user's social networking may then be able to interact with the link provided by SIS to review 2325 the user's predictive shopping list, and to provide feedback on the predictive shopping list 2330, including providing comments, ratings, their own receipts and/or shopping lists, and/or like input. In some implementations such feedback may be communicated to SIS, which may store 2335 the predictive shopping list feedback in the feedback table of the SIS database. SIS may also process 2340 the feedback provided (such as updating the aggregated score and/or rating of the item, parsing the comments provided for keywords to indicate the tone of the comments, parsing the community's receipts and/or shopping lists for alternative items, and/or the like). SIS may automatically 2345 alter the user's predictive shopping list based on the feedback processed, and/or may prompt the user 2350 to alter his/her predictive shopping list based on the feedback received from the community. In some implementations, altering the shopping list may be performed via adding and/or removing items from the list, reviewing alternative items and replacing items on the list based on which items received mostly negative feedback and which receive mostly positive feedback, and/or the like. In some implementations, the user may also set a threshold for how much negative feedback an item may receive before SIS automatically removes it from the user's list (e.g., the user may be able to specify that only items ranked at least 4 out of 5 starts may be kept on the list, and that any items ranked lower may be removed from the list and replaced with alternative items ranked at least 4 out of 5, and/or the like). In some implementations, SIS may then update 2355 the social network link to reflect the altered list.

Figure 24:
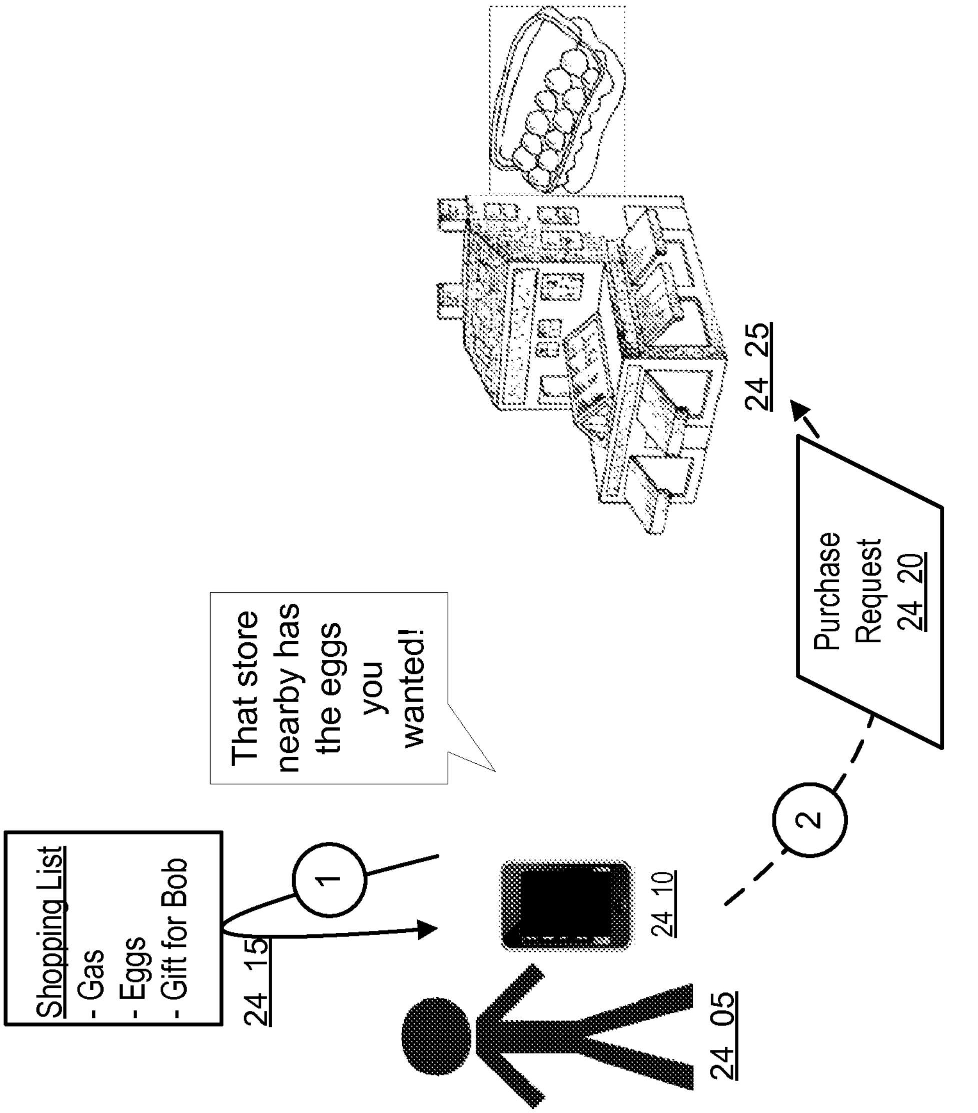
FIG. 24 shows a block diagram illustrating notifying users of nearby merchants with items on predictive shopping list in some embodiments of the SIS.

FIG. 24 shows a block diagram illustrating notifying users of nearby merchants with items on predictive shopping list in some embodiments of the SIS. In some implementations, a user 2405 may walk around in the real world, and may be notified via his/her electronic wallet-enabled device 2410 that a nearby merchant 2425 has an item on the user's predictive shopping list 2415 in stock. The user may be able to enter the store and purchase the item 2420, or may be able to purchase the item from the user's electronic device, and pick the item up once the user arrives at the merchant.

Figure 25:
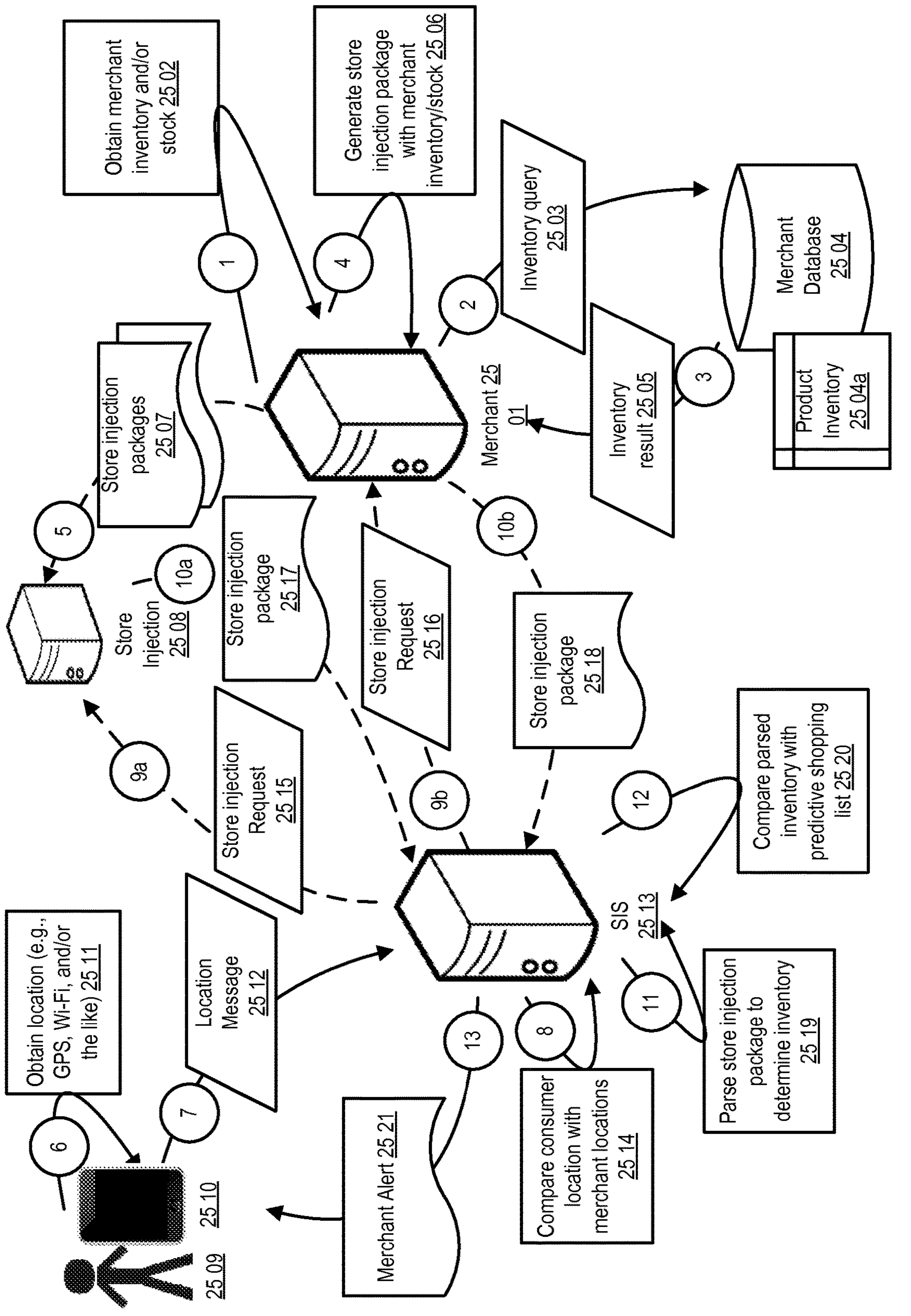
FIG. 25 shows a data flow diagram illustrating notifying users of nearby merchants with items on predictive shopping list in some embodiments of the SIS.
Figure 26A:
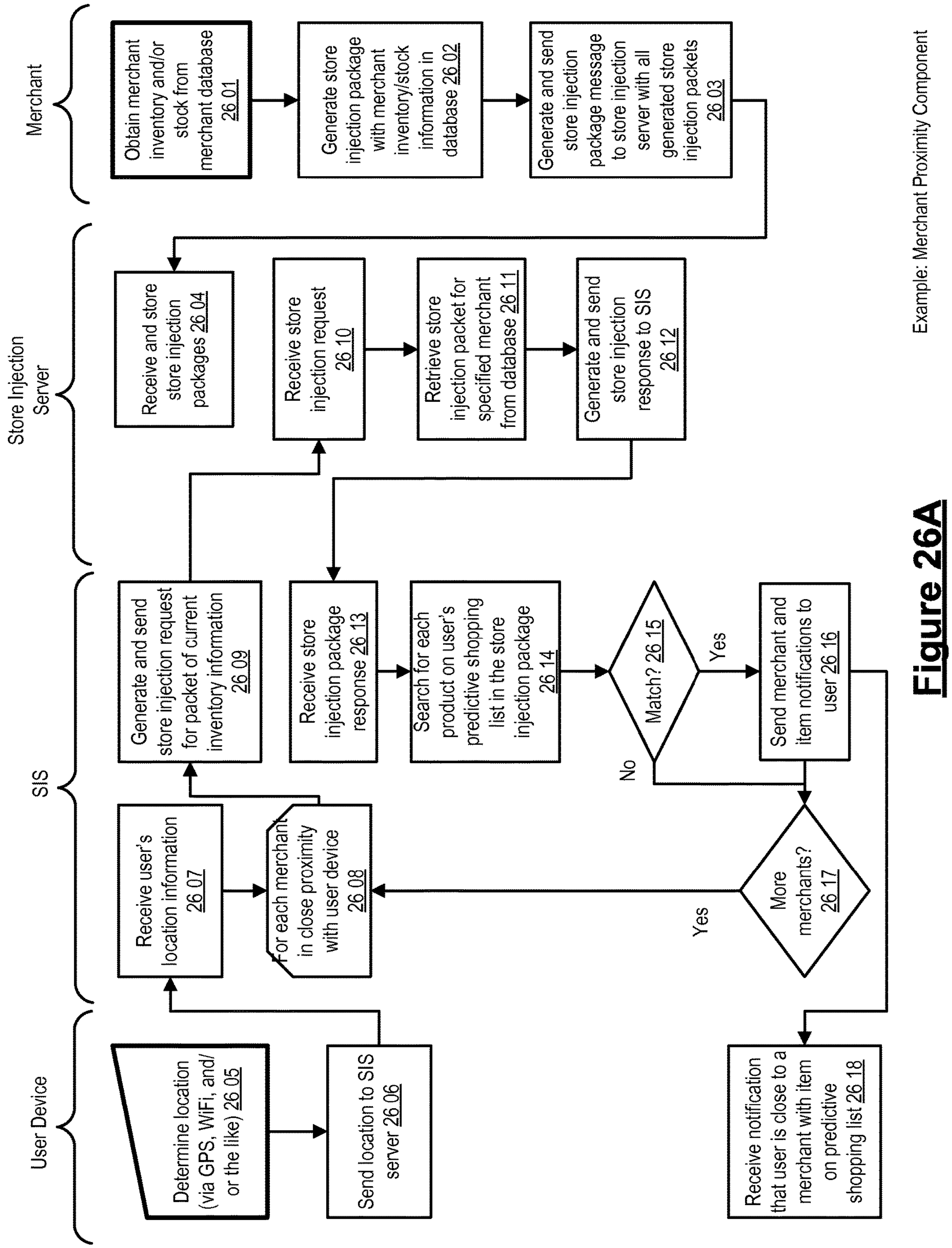
FIGS. 26*a-b* show logic flow diagrams illustrating notifying users of nearby merchants with items on predictive shopping list in some embodiments of the SIS.
Figure 26B:
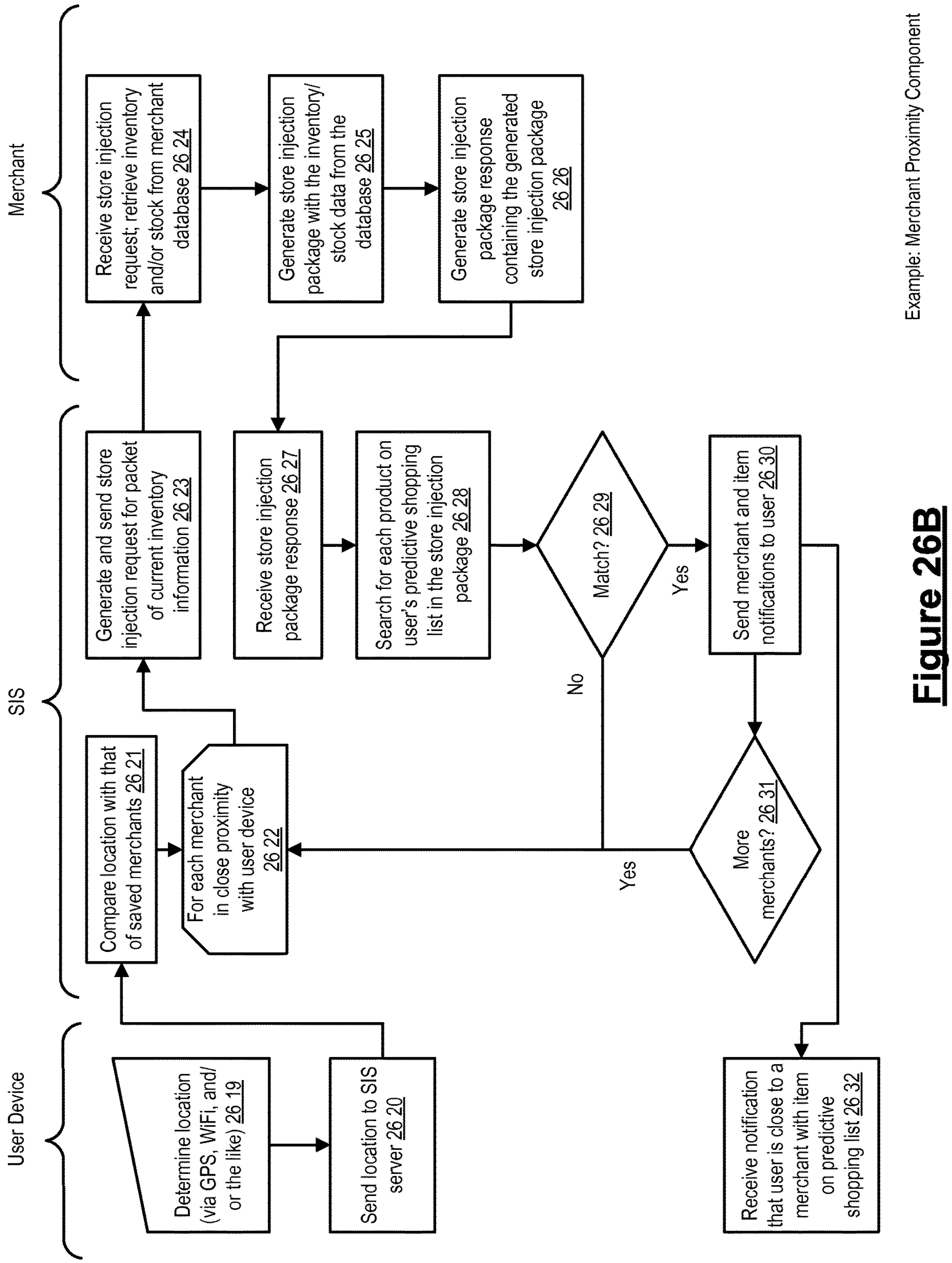

FIG. 25 shows a data flow diagram illustrating notifying users of nearby merchants with items on predictive shopping list in some embodiments of the SIS. In some implementations, a merchant 2501 may wish to generate store injection packages, and may do so via obtaining its inventory and/or stock 2502 via sending an inventory query 2503 to the merchant's database 2504. In some implementations a PHP-encoded database query 2503 may take a form similar to the following:

```
<?php
    ...
    $product_result = mysql_query("FROM products SELECT * ;");
?>
```

In some implementations the database may send an inventory result 2505 containing a list of all products and their attributes, including availability of items and/or the like. The merchant may generate 2506 a store injection package containing information about the merchant's store, the merchant's inventory and/or stock, and or like information about the merchant. The merchant may then send 2507 the store injection package to a store injection server 2508 configured to pass store injection packages to entities requesting the merchant's inventory information.

In some implementations, a user 2509 may also walk around his/her real-life environment with his/her wallet-enabled electronic device 2510, which may periodically (e.g. every 20 seconds, every 5 minutes, every 20 minutes, based on a user-specified cycle period, and/or the like) obtain the location of the user (e.g. via GPS coordinates, Wi-Fi triangulation, and/or the like) 2511 and send the location information via a location message 2512 to the SIS. In some implementations a XML-encoded location message 2512 may take a form similar to the following:

-continued

```
POST /location_message.php HTTP/1.1
Host: www.SISproccess.com
Content-Type: Application/XML
Content-Length: 788
<?XML version = "1.0" encoding = "UTF-8"?>
<location_message>
<timestamp>2016-01-01 12:30:00</timestamp>
    <user_params>
        <user_ID>10123456789</user_ID>
        <user_password>********</user_password>
        <wallet_ID>A2C4E6G8I</wallet_ID>
    </user_params>
    <location_params>
        <GPS>40.7589905, -73.9790277</GPS>
        <wifi_IPs> 50.59.105.10, 50.59.102.10,
        50.59.104.3</wifi_IPs>
    </location_params>
</location_message>
```

In some implementations, SIS may compare the user's location with the location of merchants in the SIS database. In some implementations, the user may also be able to indicate where (s)he is going, and SIS may, rather than determining merchants near the user, may determine merchants on the user's way to his/her destination. SIS may send a store injection request 2515 to the store injection server, requesting a store injection package of the specified merchant. In some implementations a XML-encoded store injection request 2515 may take a form similar to the following:

```
POST /injection_package_message.php HTTP/1.1
Host: www.SISproccess.com
Content-Type: Application/XML
Content-Length: 788
<?XML version = "1.0" encoding = "UTF-8"?>
<injection_package message>
<timestamp>2016-01-01 12:30:00</timestamp>
    <merchant_params>
        <merchant_ID>27462548458</merchant_ID>
        <merchant_name>********</merchant_name>
        <data_requested>inventory package</data_requested>
    </merchant_params>
</injection_package_message>
```

In some implementations the store injection server may send SIS a store injection package 2517 containing the most recent inventory and/or like information the merchant has provided. In other implementations, SIS may send a similar store injection request 2516 directly to the merchant in order to receive the store inventory. The merchant may in turn directly send its store injection package 2518 to SIS. SIS may then parse 2519 the store injection package to determine the merchant's inventory, and then may compare 2520 the parsed inventory information with the products on the user's predictive shopping list. If a product on the list matches a product in the merchant's inventory, SIS may send an alert 2521 to the user indicating that a nearby merchant (and/or a merchant on the way to a pre-entered destination) has a product on the user's list.

FIGS. **26*a*-*b* show logic flow diagrams illustrating notifying users of nearby merchants with items on predictive shopping list in some embodiments of the SIS. In some implementations, a merchant may obtain its inventory and/or stock 2601 from its database, and may generate 2602 a store injection package using all of the inventory information retrieved from the database. The merchant may then generate and send 2603 a store injection package message to a store injection server, which may store 2604** and keep track of all generated store injection packets, and which may also request updated packets at regular intervals which may be specified by the merchant and/or another entity.

In some implementations, the user device may also determine its location 2605 via GPS, Wi-Fi, and or a like method and/or type of data. The user's device may send 2606 the device's location to the SIS, which may, after receiving 2607 the user's location information, may, for each merchant in proximity to the user 2608, generate and send a store injection request 2609 to the store injection server asking for current inventory information. In some implementations, proximity may be gauged by physical distance to the user's current location, distance from a user-entered destination or from the path the user is taking to the destination, and/or the like, in some implementations, the store injection server may receive 2610 the request for the merchant's store injection package and may retrieve the package for the specified merchant from its database 2611. In some implementations, the store injection server may then send a store injection response 2612 to SIS containing the pertinent store injection package. SIS may receive the package response 2613 and may search the package 2614 for each product on the user's predictive shopping list. If at least one product is found 2615, SIS may send the user a merchant and item notification 2616 which, when received by the user 2618, may indicate to the user that a merchant has been found close to the user that has at least one item on the user's predictive shopping list. In some implementations, if the merchant does not have any of the user's items in its inventory and/or stock, SIS may try another merchant 2617 in close proximity to the user and/or the user's destination, and may request a store injection for the other merchant in a similar manner as described above.

In one embodiment, the user device may determine a user's location 2619 and send that location to the SIS server 2620. The SIS server may compare the user's location with that of saved merchants 2621 and for each merchant in a proximity to the user device, e.g., 2622, generate and send a store injection request for the package of current inventory information, e.g., 2623. The merchant server may receive the injection request and retrieve current inventory stock levels 2624, generate a store injection package 2625, and generate a response containing the generated store injection package, e.g., 2626. In one embodiment, the SIS server may receive the response 2627 and if it matches 2629, send the merchant and item notifications to the user, e.g., 2630. If there are more merchants, e.g., 2631, the process may repeat. In one embodiment, the user device may receive the notification that the user is close to a merchant with an item on their predictive shopping list, e.g., 2632, and may alert the user to the predictive shopping opportunity.

Figure 27:
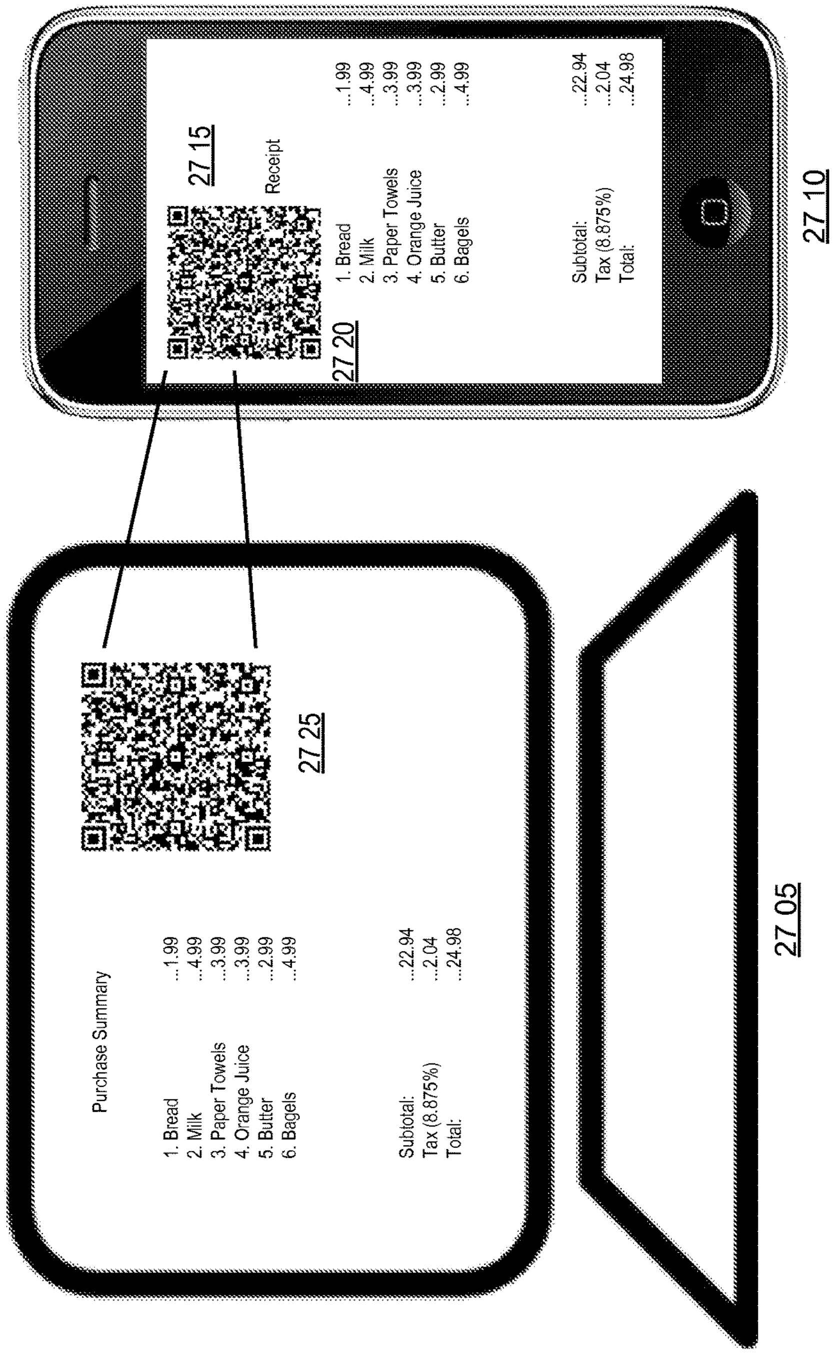
FIG. 27 shows a block diagram illustrating a PoS checkout code in some embodiments of the SIS.

FIG. 27 shows a block diagram illustrating a PoS checkout code in some embodiments of the SIS. In some implementations, a user, after scanning all items on his/her predictive shopping list, may view on his/her electronic wallet-enabled device 2710, a receipt 2715 containing all of the items checked out, as well as a QR and/or like code 2720 that may be scanned by PoS device 2705. By scanning QR code 2720, the PoS device may be able to obtain all the information about the user's checkout 2725, including product information for all items the user plans to purchase. The PoS may then use this information for the user to check out. Alternatively, the user may checkout automatically through the electronic wallet, and the PoS may be able to scan the QR and/or like code in order to verify that the user has successfully checked out through his/her electronic wallet, and does not need to check out via the merchant's PoS.

Figure 28A:
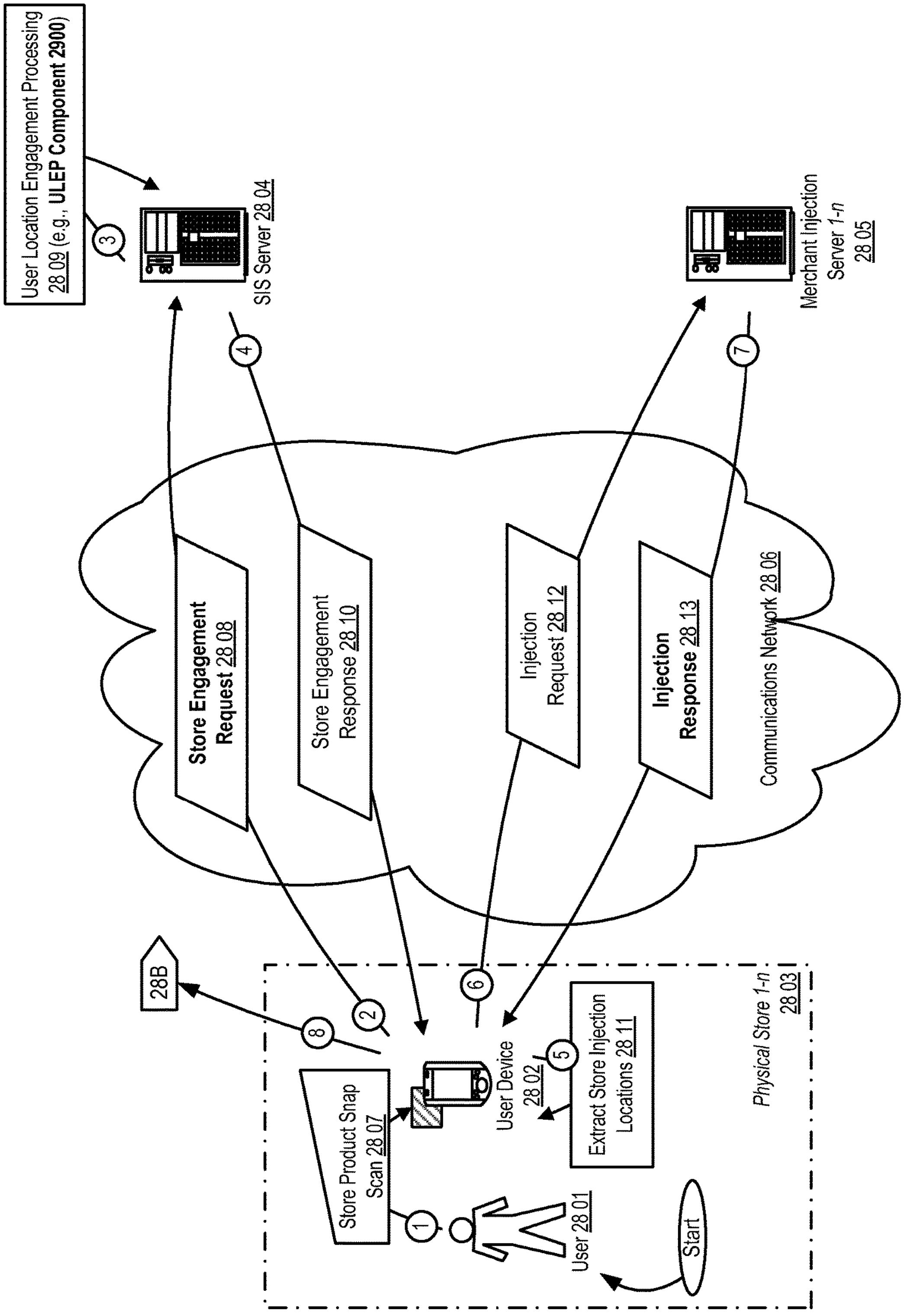
FIGS. 28A-B are an example data flow illustrating aspects of product placement revenue sharing, in one embodiment of the SIS.
Figure 28B:
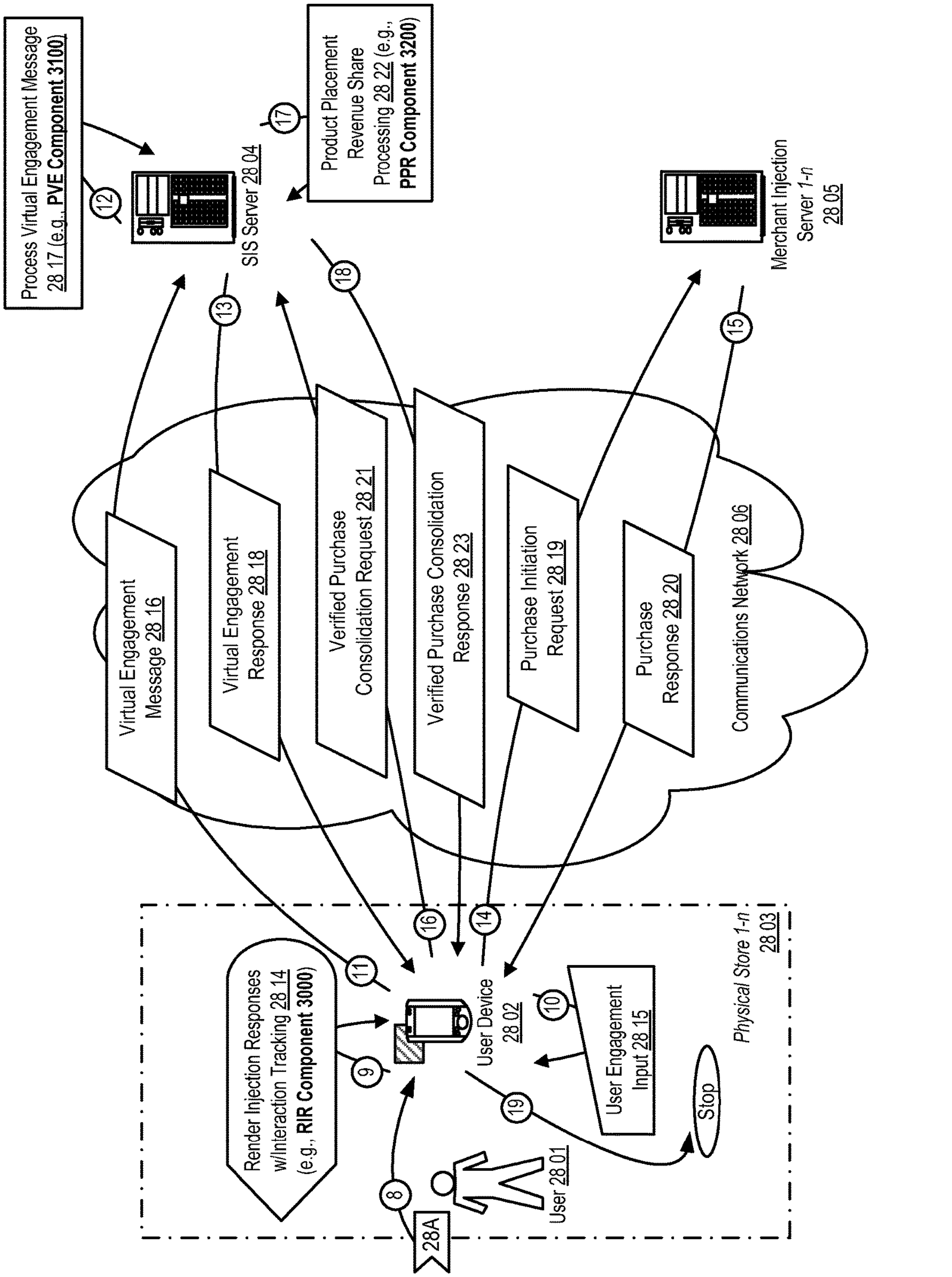

FIGS. 28A-B are an example data flow illustrating aspects of product placement revenue sharing, in one embodiment of the SIS. In one embodiment, user 2801 observes a product in a store 2803 and scans it with his/her mobile device 2802. In so doing, the user's mobile device may transmit a store engagement request 28 to a snap server 2804. The engagement request may contain information about the product scanned, such as a photo of the product, the location of the product and user, the store that the user is physically in, nearby WiFi or cellular networks for tracking the user, and/or the like. In some embodiments, only the image data of the snapped product will be sent to the snap server. In other embodiments, additional meta-data relating to the user's movement or behavior may be transmitted, such as how long the user has been in the store, where within the store they are, what their path through the store has been, other products that are near the user, and/or the like. An example store engagement request, substantially in the form of an HTTP(S) POST message including XML-formatted data, is provided below:

```
POST /store_engagement_request_post.php HTTP/1.1
Host: www.snapserver.com
Content-Type: Application/XML
Content-Length: 667
<?XML version = "1.0" encoding = "UTF-8"?>
<store_engagement_request>
    <timestamp>2020-12-12 15:22:43</timestamp>
    <user_name>John Doe</user_name>
    <user_credentials>
        <password>secretpassl234</password>
        <private_key>h767kwjiwnfe456#@hnniimidrtsxbi</private_key>
    </user_credentials>
    <store>
        <lat>23.15484</lat>
        <lon>15.4758</lon>
        <last_visited_store>15days</last_visited_store>
        <store_map_provider>google_maps_interior</store_map_provider>
        <store_interactions baseLat=23.1557 baseLon=15.4768>
            <point type="entry" time="−600sec" xOset="0" yOset="O"/>
            <point type="aisle" time="−432sec" xOset="12" yOset="5.2"/>
            <point type="store_clerk_interaction" time="−215sec">
                <detected_using type="nfc_clerk_badge" id="E3521" />
                <total_time_interaction value="93sec" />
            </point>
            <point type="nearProduct" time="−122" xOset="5" yOset="18">
            <product determinedVia="internal_prod_db" name="iPhone"/>
            <detected using_type="mobile_device_camera_passive" />
                <time_interaction value="−26sec" />
            </point>
```

-continued

```
        </store_interactions>
        <current_location_in_store xOset="19" yOset="5">
        <product_snap id="584758">
            <name detectedVia="NFC" value="iPad Mini" />
            <image type="JPEG">
                ÿØÿáæExif2012:04:27 O9:45:38zØhÿÿÖ£ÿûû; ÿÿ£ ÿÿ'ú . ô#£
                ô'.þþ ÿg úþ hÿüþ ÿÿÿ_ ô#ÿ£ÿûôÿûÿÿÿôhh`"ÿgÿcþ  Yôûÿr`ûþ ô
                oúÿ, ÿh . g >ÿûôÿiþ ÿû*ÿôÖÿch*~ ô ÿûÿÿôþ "ûûôôŸÿúÖÿþ 'íûÿô
                ...
            </image>
        </product_snap>
        <product_snap>
        ...
         </product_snap>
</store_engagement_request>
```

In one embodiment, the snap server 2804 will then process the store engagement request, e.g., 2809 and send a store engagement response 2810 to the user. Further detail regarding the processing of user location engagement requests may be found with respect to FIG. 28, e.g., ULEP Component 2900. In some embodiments, the store engagement response may include links to retrieve merchant store injection packages. In still other embodiments, the snap server 2804 may itself retrieve either directly from the merchant server, e.g., 2805, or from a database accessible to the snap server 2804, store injection packages in substantially complete form. In so doing, the user mobile device may receive merchant store injection packages directly from the snap server 2804.

In one embodiment, user device 2802 may then extract the links to store injection packages from the store injection response 2810, e.g., 2811. For each store injection link contained within the response, the user device may initiate an injection request, e.g., 2812 to a merchant injection server 2805. The merchant server may then reply with an injection response, e.g., 2813, containing views, product information, reviews of a product, alternative products, and/or the like. An example injection response 2813, substantially in the form of an HTTP(S) POST message including XML-formatted data, is provided below:

```
POST /injection_response.php HTTP/1.1
Host: www.merchantserver.com
Content-Type: Application/XML
Content-Length: 667
<?XML version = "1.0" encoding = "UTF-8"?>
<injection_response id="8547">
    <timestamp>2020-12-12 15:22:43</timestamp>
    <user_name>John Doe</user_name>
    <user_credentials>
        <password>secretpassl234</password>
        <private_key>h767kwjiwnfe456#@hnniimidrtsxbi</private_key>
    </user_credentials>
    <injection id="8547.1">
        <store_name>Buy.com</ store_name>
        <view id="l" is_default="yes" type="store">
            <link toView="2">Read Reviews</link>
            <link toView="3">View Product Photos</link>
            <link toView="4">View comparable products</link>
            <link toView="5">Buy now</link>
        </view>
        <view id="2" type="reviews">
            <review>
                <snip>This product is great! Buy it now..</snip>
                <full_review>http://www.merch.com/65565</full_review>
            </review>
            <review>
                ...
                </review>
        </view>
        <view id="3" type="product_photos">
            <photo angle="front" type="JPEG">
                ô'.þ ÿg úþ hÿüþ ÿÿÿÿ_ô#ÿ£ÿûÿÿÿôhh`"ÿgÿcþ  Yôûÿr` ûþ ô
                oúÿ, ÿh . g >ÿûôÿiþ ÿû*ÿôÖÿch*~ ô ÿûÿÿôþ "ûûôôŸÿúÖÿþ  'íûÿô
            </photo>
            <photo>
                ...
            </photo>
        </view>
        <view id="4" type="compare">
            <compare_search>pricequery</compare_search>
            <url>http://www.compare.com/prod=iPad+Mini</url>
        </view>
        <view id=5" type="buy_now">
            <price>$299.99</price>
```

-continued

```
            <lightbox_checkout url = “http://www.merch.com/87664” />
            </view>
        </injection>
        <injection>
            ...
        </injection>
</ injection_response>
```

In one embodiment, user device 2802 will render an injection response with interaction tracking, e.g., 2814. Interaction tracking may include changing links returned in the injection response 2813 to point to alternative locations, setting device or hardware based triggers that monitor the user's use of the injection response, setting device triggers to monitor a user's location, and/or the like. In one embodiment, the snap server 2804 will perform the injection response modification. An example injection response 2813, modified to include interaction tracking, substantially in the form of XML-formatted data, is provided below:

```
<?XML version = “1.0” encoding = “UTF-8”?>
<modified_injection_response id=“8547”>
    <timestamp>2020-12-12 15:22:43</timestamp>
    <user_name>John Doe</user_name>
    <user_credentials>
        <password>secretpassl234</password>
        <private_key>h767kwjiwnfe456#@hnniimidrtsxbi</private_key>
    </user_credentials>
    <injection id=“8547.1”>
        <store_name>Buy.com</store_name>
        <view id=“l” is_default=“yes” type=“store”>
            <tracking_link=“http://snpsrvr.com/87645“ />
            <link toView=“2”>Read Reviews</link>
            <link toView=“3”>View Product Photos</link>
            <link toView=“4”>View comparable products</link>
            <link toView=“5”>Buy now</link>
        </view>
        <view id=“2” type=“reviews”>
            <review>
                <snip>This product is great! Buy it now..</snip>
            <full_review>http://snpsrvr.com/www.march.com/65565
                        </full_review>
            </review>
            <review>
                ...
            </review>
        </view>
        <view id=“3” type=“product_photos”>
            <trigger set_on=“device” type=“when_viewed”>
                <meta_data>
                    <include>time_viewed</include>
                    <include>did_user_zoom</include>
                </meta_data>
            </trigger>
            <photo angle=“front” type=“JPEG”>
                ô'.ꝥ ÿg úþ hÿüþ ÿÿÿÿ_ô#ÿ£ÿûÿÿÿôhh`"ÿgÿcþ Yôûÿr` ûþ ô
                oúÿ, ÿh . g >ÿûôÿíþ ÿû*ýôÖÿch*~ ô ÿûÿÿôþ "ûûôôŸÿúÖÿꝥ 'íûÿô
            </photo>
            </photo>
                ...
            </photo>
        </view>
        <view id=“4” type=“compare”>
            <compare_search>pricequery</compare_search>
            <url>http://snpsrvr.com/prod=iPad+Mini</url>
        </view>
        <view id=5” type=“buy_now”>
            <price>$299.99</price>
            <lightbox_checkout url = “http://www.merch.com/87664” />
          </view>
    </injection>
    <injection>
        ...
    </injection>
</modified_injection_response>
```

Figure 30:
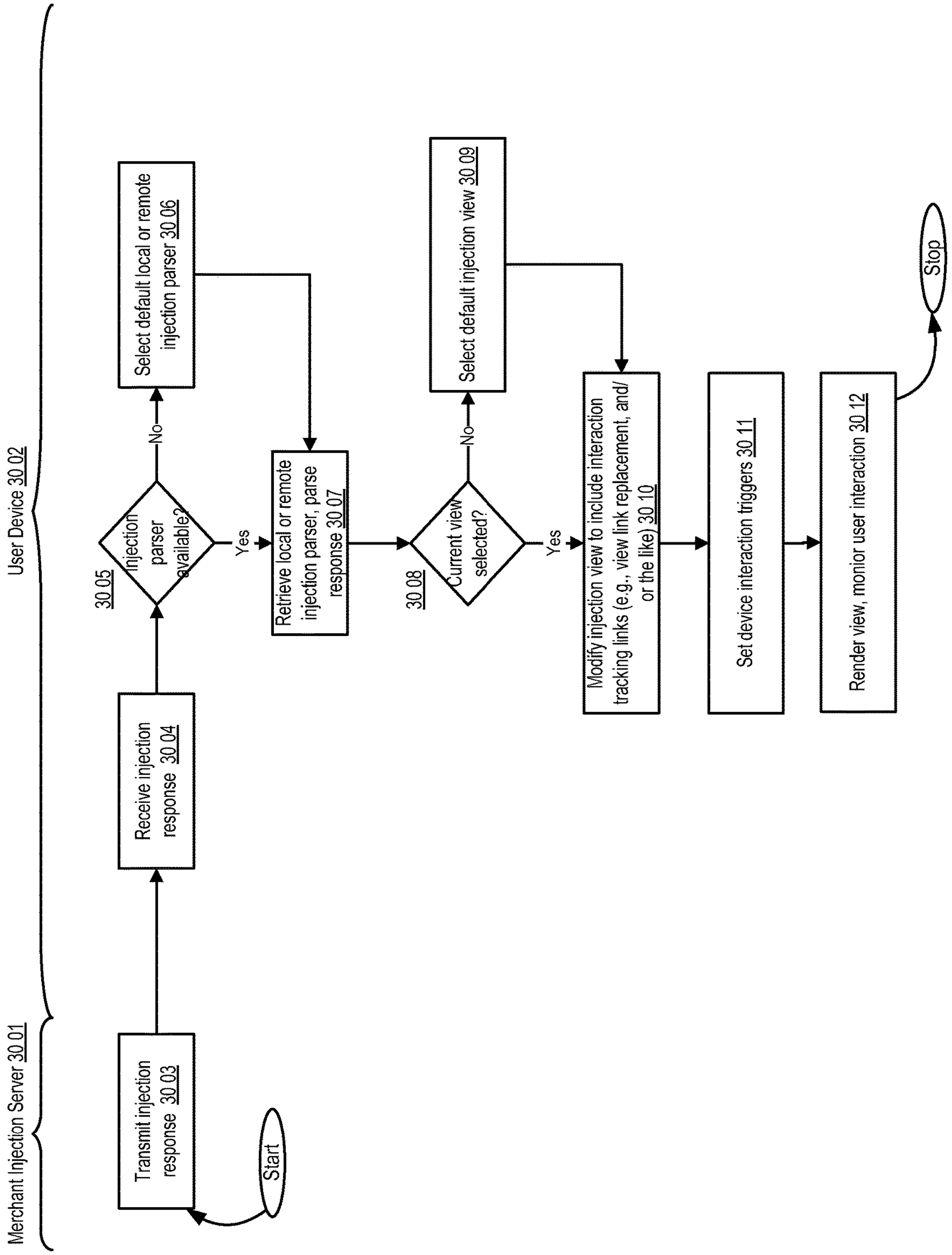
FIG. 30 is an example logic flow illustrating aspects of rendering injection responses with interaction tracking, e.g., an example RIR Component, in one embodiment of a SIS.

Further detail regarding rendering injection responses with interaction tracking may be found herein and particularly with respect to FIG. 30, e.g., RIR Component 3000.

In some embodiments, user 2801 may then interact with the rendered injection responses (i.e., by viewing reviews, browsing an integrated product store, looking at product photos, and/or the like), e.g., 2815. User device 2802 may have triggers that are set to monitor the user's behavior, or the endpoint of the injected content may have been changed as described above in order to facilitate tracking of user engagement in the injection response by snap server 2804.

In one embodiment, user device 2802 will prepare a virtual engagement message 2816 that contains details about the user's interaction with the injected content as well as information about the location and/or behavior of the user while viewing the injected content. In so doing, the snap server 2804 may be enabled to facilitate calculation of the relative engagement factor, a given set of injected content imparted on the user's ultimate purchase decision. An example virtual engagement message 2816, substantially in the form of an HTTP(S) POST message including XML-formatted data, is provided below:

```
POST /virtual_engagement_message.php HTTP/1.1
Host: www.snapserver.com
Content-Type: Application/XML
Content-Length: 667
<?XML version = "1.0" encoding = "UTF-8"?>
<virtual_engagement_message id="8547">
    <timestamp>2020-12-12 15:22:43</timestamp>
    <user_name>John Doe</user_name>
    <user_credentials>
        <password>secretpassl234</password>
        <private key>h767kwjiwnfe456#@hnniimidrtsxbi</private key>
    </user credentials>
    < engagements >
        <injection id="8547.1">
            <view id="1">
                <user_action type="click_link">
                    <link toView="2">
                    <time_of_action value="12:45:18 UTC" />
                    <location_during_action>
                        <lat>54.125</lat>
                        <lon>18.1247</lon>
                    </location_during_action>
                    <wifi_signals_nearby>
                        <signal ssid="starbucks45st" />
                    </wifi_signals_nearby>
                    <user_friends _nearby>
                        <friend facebook_id="454844" name="Mi
                        Lee" />
                        <friend facebook_id="671323" name="John
                        Lee" />
                    </user_friends_nearby>
                </user_action>
            </view>
            <view id="2">
                <user_action type="read_review">
                    <review_ID>1254</review_ID>
                    <time_of_action value="12:45:45 UTC" />
                    <location_during_action>
                        <lat>54.125</lat>
                        <lon>18.1247</lon>
                    </location_during_action>
                    <wifi_signals_nearby>
                        <signal ssid="linksys" />
                        <signal ssid="starbucks45st" />
                    </wifi_signals_nearby>
                    <user_friends_nearby>
                        <friend facebook id="671323" name="John
                        Lee" />
                        </user_friends_nearby>
                </user_action>
                <user_action type="scrolled_bottom_review">
                    <time_of_action value="12:45:49 UTC" />
```

-continued

```
                    <scroll speed value="2.5inchesPerSecond" />
                </user_action>
            </view>
            <view>
                ...
            </view>
            </injection>
            <injection>
                ...
        </injection>
    </engagements >
</virtual_engagement_message>
```

In one embodiment, the snap server 2804 may then process the virtual engagement message, e.g., 2817. Further details regarding processing a virtual engagement message may be found herein and particularly with reference to FIG. 31, e.g., PVE Component 3100. In one embodiment, snap server 2804 may then reply to the user device with an acknowledgement that the virtual engagement message has been processed, e.g., a virtual engagement response 2818. The process of monitoring user engagement inputs, e.g., 2815, and sending/processing of virtual engagement messages 2816 may repeat.

In one embodiment, user 2801 may have received sufficient information in order to purchase a product. As such, the user may initiate a purchase, e.g., a purchase initiation request 2819, using their mobile device. In other embodiments, the user may instead purchase the product in a physical store such as the store they are currently in. A merchant 2805 may process the sale and provide the user device with a confirmation of purchase, e.g., purchase response 2820, indicating that the product or service has been purchased.

In some embodiments, user device 2802 will then submit a request to snap server 2804 to have a consolidation process run in order to calculate the relative engagement percentage attributable to the physical merchant(s) and virtual merchant(s) (e.g., through injection into the user mobile device). In so doing, a revenue share amount may be calculated based on the product placement of the product in the physical store 2803 and/or by the placement of the product in various injection responses rendered on the user's device, e.g., 2822. In some embodiments, this capability of the SIS allows entities that are corollary to the user's purchase decision to share in the revenue associated with the purchase. Further details regarding product placement revenue share processing 2822 may be found herein and particularly with reference to FIGS. 32A-B, e.g., PPR Component 3200. The snap server 2804 may then send a confirmation that the consolidation request has been processed, e.g., verified purchase consolidation response 2823.

Figure 29A:
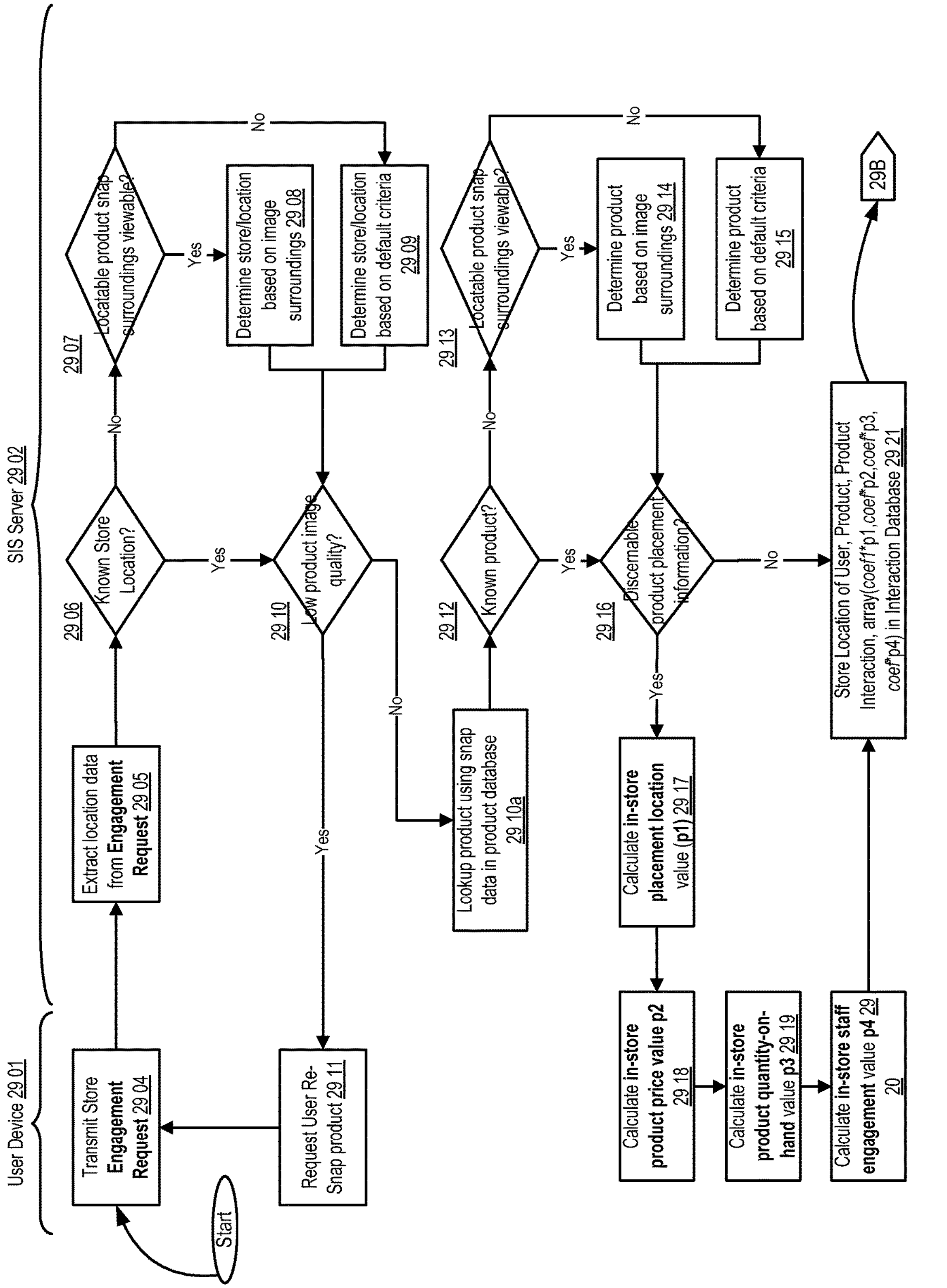
FIGS. 29A-B illustrate an example logic flow depicting aspects of user location engagement processing, e.g., an example ULEP Component, in one embodiment of a SIS.
Figure 29B:
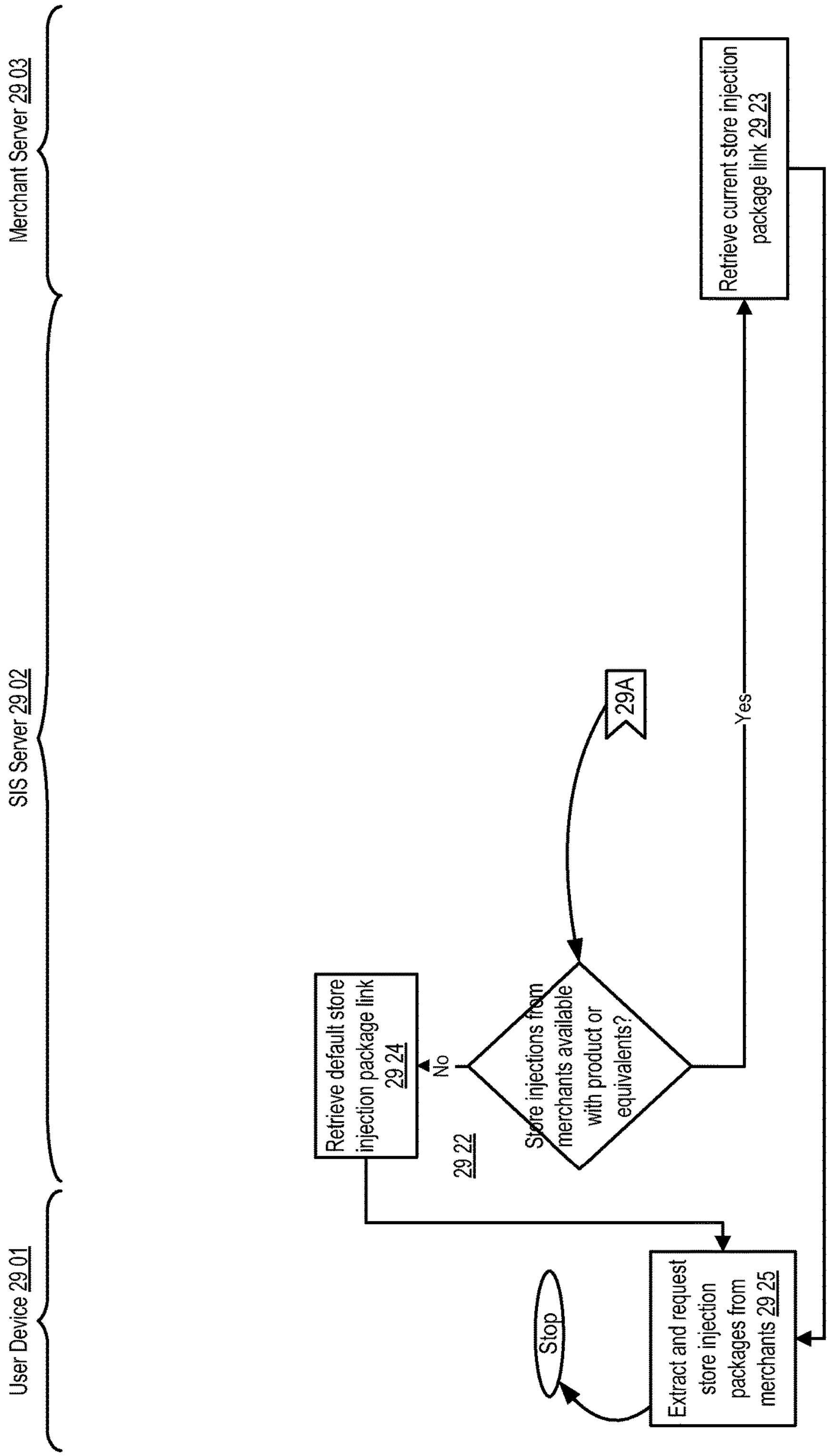

FIGS. 29A-B illustrate an example logic flow depicting aspects of user location engagement processing, e.g., an example ULEP Component, in one embodiment of a SIS. In one embodiment, user device 2901 may transmit a store engagement request to snap server 2902, e.g., 2904. The snap server may then extract location information from the engagement request, e.g., 2905. If the store location is not known, e.g., 2906, such as not being associated with a publically accessible record stored at a search engine (e.g., Google Maps), or not ascertainable by other means, image data contained in the engagement request may be examined. In other embodiments, other data in the engagement request such as nearby WiFi or Cellular signals, nearby friends of the user who have devices with a known location, and/or the like may be employed to determine a store and/or location. In one embodiment, locatable product snap surroundings may be viewable in the snapped image, e.g., 2907. For example, a store logo may be viewable on the price sticker of an item, store colors may be ascertainable, and/or the like. If such ascertainable details are present, the store/location may be determined based on them, e.g., 2908. Alternatively, default criteria may be used to determine location, e.g., 2909, such as prompting the user to manually enter the store location on their mobile device.

In one embodiment, if the snap image is of low quality, e.g., 2910, the user may be prompted to re-snap the product, e.g., 2911, to enable better location or product resolution. In one embodiment, the product may be looked up in a product database, e.g., 2910*a*. Lookup may be accomplished by using a publically available similar photo finder, such as TinEye, to find product descriptions matching the product photo. Alternatively, in some embodiments, a local database of product photography may be used. If the product is not discernable after processing, e.g., 2912, the non-product portion of the image(s) may be examined to determine if product surroundings are viewable (e.g. the area surrounding the product), e.g., 2913. If surroundings are available, that image area may be analyzed in order to determine the product. For example, in one embodiment, other products in the view that are viewable may be searched in order to find the identity of the desired product. This feature may take advantage of the fact that many merchants stock their physical products based on areas of similarities (e.g., a nearby DVD may enable a search for a product to be restricted to "Media" using facilities described herein). In one embodiment, the product is determined based on its surroundings 2914. If surroundings data is not sufficient, default criteria may be used to determine the product, e.g., 2915, such as prompting the user to manually enter the product description.

In one embodiment, additional information regarding the snapped product may be determined from the snap, e.g., 2916. For example, the in-store placement location of the product (such as near front of store) may be determined from a combination of interior-GPS, a physical store mapping service, and/or the product snap. In some embodiments, a value p1 is given to the placement of the product within the store, e.g., 2917. Other criteria that may be derived from the engagement request, location/lookup product data include in-store product price values p2 (e.g., by detecting price via NFC and/or viewable in product snap contained in engagement request, and/or the like) 2918, in-store quantity on hand value p3 (e.g., by detecting the amount of total stock a retailer has of a product by viewing image surroundings, NFC connection, polling a merchant's inventory server, and/or the like) 2919, and/or in-store staff engagement value p4 (e.g., by determining how long a consumer was in a given proximity to a store clerk, the relative movement of clerks and/or consumers, and/or the like) 2920. Values p1-p4 may be, in some embodiments, modified by a coefficient based on business rules (e.g., a weighting factor representing perceived or calculated importance of a given factor). In some embodiments, the store location, user information, product information, and calculated data may be stored in an interaction database 2921.

The logic flow continues with respect to FIG. 29B. In one embodiment, snap server 2902 determines if any store injection links merchants are available for delivery to the user's device, e.g., 2922. The determination of applicable store injections may be made with respect to the product snap and/or the like. If no merchants have relevant store injections available, a default store injection may be used, e.g., 2924. In other embodiments, merchant server(s) 2903 may be polled to retrieve current store injection content (such as an injection link or actual injection content), e.g., 2923. The store injection link may be sent to user device 2901. Individual store injection links may then be extracted and requested from merchants, e.g., 2925. In other embodiments, the snap server 2902 also contains the store injection links and store injection content.

FIG. 30 is an example logic flow illustrating aspects of rendering injection responses with interaction tracking, e.g., an example RIR Component, in one embodiment of a SIS. In one embodiment, a merchant injection server 3001 may transmit an injection response 3003. A user device 3002 may receive the injection response 3004. A suitable injection response parser may be available (e.g., an application binary, open source HTML parser such as WebKit, and/or the like), e.g., 3005. If no injection parser is available, a default local or a remote injection parser (such as one contained on the snap server itself), may be selected, e.g., 3006. In one embodiment, the user device will then load a local or remote parser and parse the injection response. A current view may be selected (e.g., a user consuming injection content that requests updated content and/or requests non-pre-loaded content), e.g., 3008. If no current view is selected a default view may be chosen, e.g., 3009. The user device may, in some embodiments, then modify the injection view(s) to include tracking information to facilitate the product placement revenue sharing capabilities of the SIS, e.g., 3010. In other embodiments, the tracking information may have been inserted by a third-party such as the merchant or by the snap server itself. Device triggers may be set on the user device, e.g., 3011, in order to monitor a user's engagement with the injected content and the user's locations and/or surroundings. The view may then be rendered for use by the user, e.g., 3012.

Figure 31:
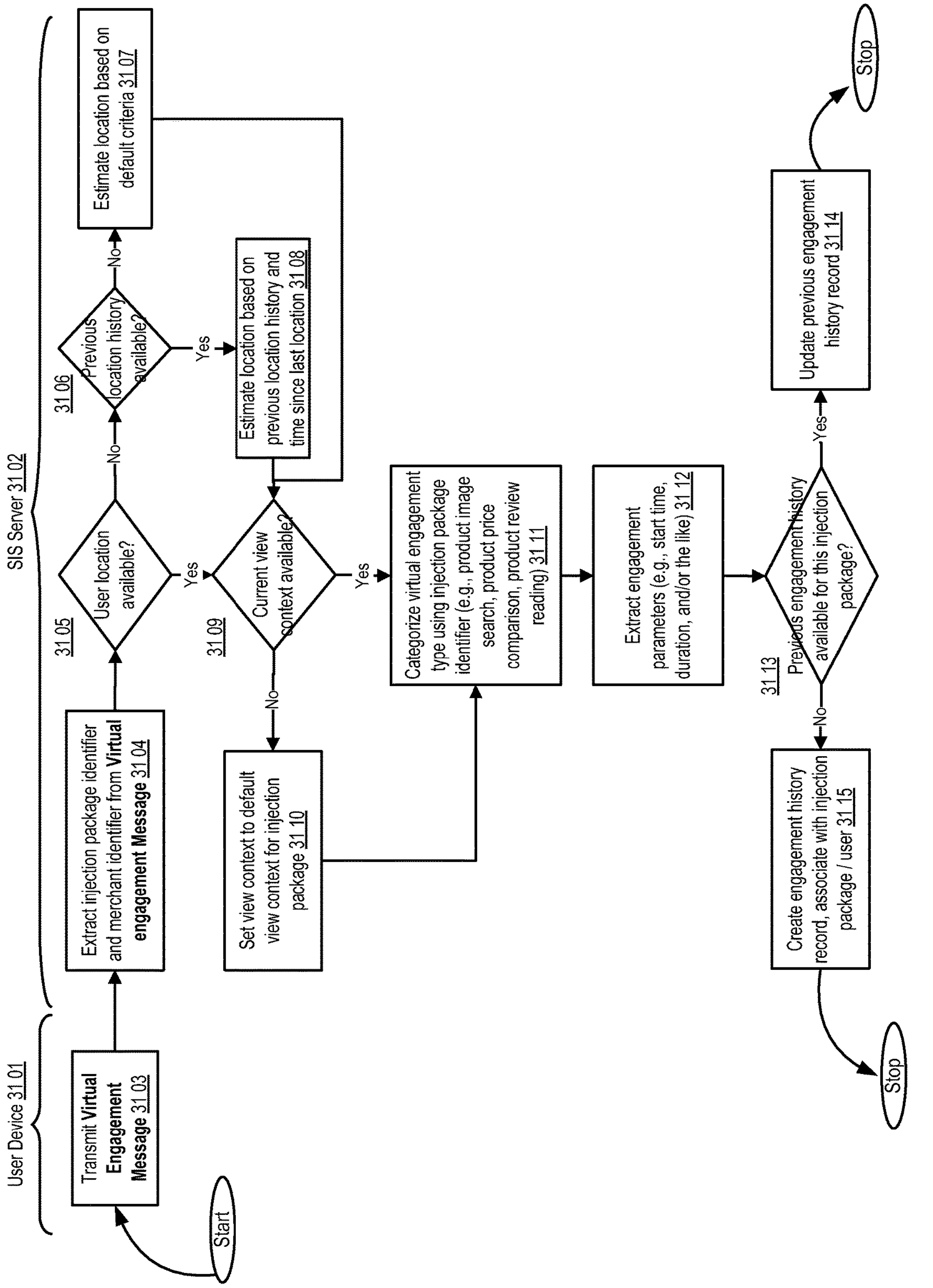
FIG. 31 shows an example logic flow illustrating aspects of processing virtual engagement messages, e.g., an example PVE Component, in one embodiment of a SIS.

FIG. 31 shows an example logic flow illustrating aspects of processing virtual engagement messages, e.g., an example PVE Component, in one embodiment of a SIS. In one embodiment, a user device 701 may transmit a virtual engagement message to snap server 3102, e.g., 3103. A virtual engagement may be any interaction the user has with injected content and any information regarding the state of the user, device, or surroundings during that interaction. The snap server may extract injection package and merchant information from the message, e.g., 3104. The message may contain a current user location, e.g., 3105. If no location is available, previous location history may be used, e.g., 3106, and an estimate of the user's location determined based on the last known location of the user, time since the user's last location, user historical movements, and/or the like, e.g., 3108. If no location information can be determined, a default location may be used, e.g., 3107. If no user engagement view context is available, e.g., 3109 (i.e., it cannot be determined which view a user was interacting with at time of engagement action trigger), a default view content for the injection package may be used, e.g., 3110. In one embodiment, the engagement may then be categorized by type, such as a product search, social chat, product price viewing, and/or the like, e.g., 3111. Additional engagement parameters, such as the start time of the interaction, duration of the interaction, and/or the like may be extracted, e.g., 3112. If previous engagement history is available for this user or injection package, e.g., 3113, the previous record may be updated or appended to, e.g., 3114. Alternatively, a new engagement history record may be created and associated with the injection package or user. In so doing, the SIS may store information about a user's interaction and surroundings while in physical settings such as stores or at home and associate or correlate that information with relevant interactions with injected content and/or injected merchants.

Figure 32A:
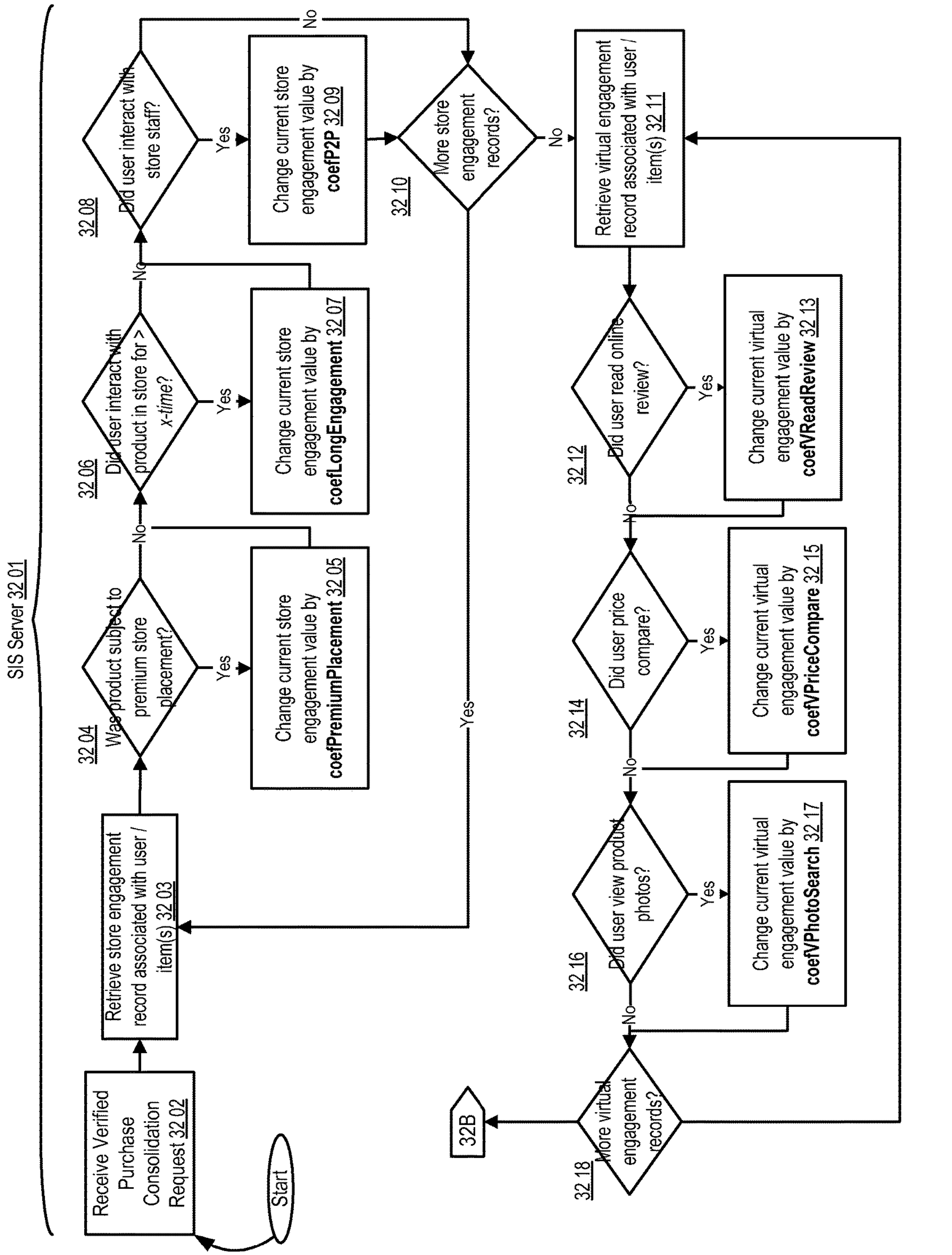
FIGS. 32A-B are example logic flows illustrating aspects of product placement revenue share processing, e.g., an example PPR Component, in one embodiment of a SIS.
Figure 32B:
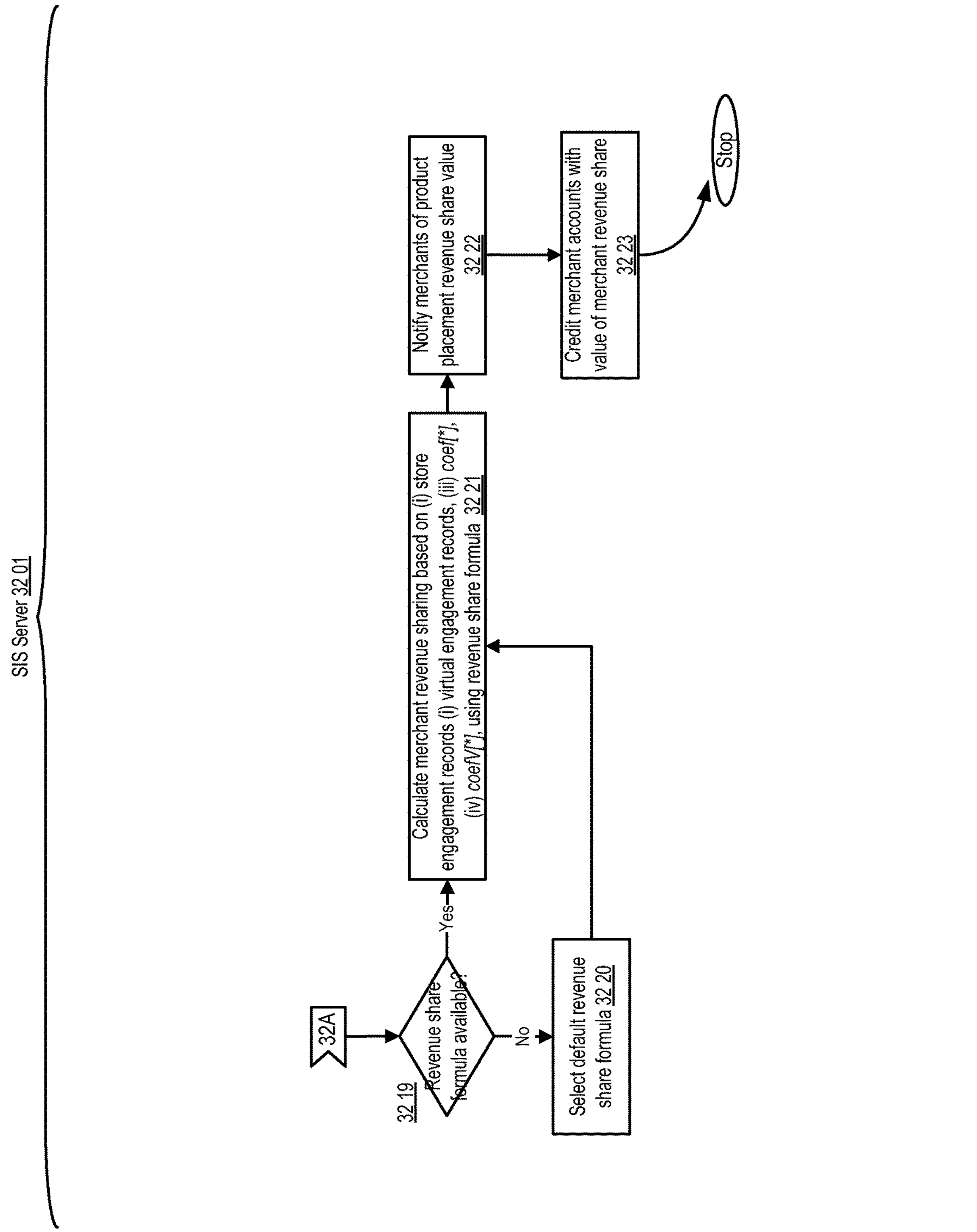

FIGS. 32A-B are example logic flows illustrating aspects of product placement revenue share processing, e.g., an example PPR Component, in one embodiment of a SIS. In one embodiment, a snap server 3201 may receive a verified purchase consolidation request, e.g., 3202. A purchase consolidation request may be a request that indicates that a consumer has purchased a product or service at a merchant (either a physical merchant or a virtual merchant) and that the SIS should perform a revenue share calculation based on the user's relative engagement with various online and offline knowledge sources in order to come up with a revenue apportionment for a transaction. In one embodiment, store engagement records associated with the user, product, item, injection package, and/or the like may be retrieved from a database in communication with snap server 3201. A store engagement record may represent an interaction a user had with a product in a physical store, such as Staples or Home Depot. As such, there may be numerous interaction parameters associated with the interaction, such as the amount of time a user spent with an item, amount of time in store, path through store, surrounding items, and/or the like.

If the product was subject to premium placement in the store (e.g., a featured item on a store aisle cap-end, a sign overhead advertising the item, and/or the like), e.g., 3204, the store engagement value for this interaction may be changed by a coefPremiumPlacement value representing the importance of that particular aspect of the consumer's product interaction, e.g., 3205. Similarly, if a consumer interacts with a product for greater than a given amount of time, e.g., 3206, the store engagement value may be modified by coefLongEngagement, e.g., 3207, representing an increased contribution of the physical store to the consumer's buy decision. If a consumer interacts with staff in the physical store, e.g., 3208, such as by asking for assistance, the store engagement value may be modified by coefP2P to compensate the physical store for the labor of educating the consumer even if they do not receive the ultimate sales order, e.g., 3209. If more store engagement records are available, e.g., 3210, they may then be processed in turn.

In one embodiment, the SIS will retrieve virtual engagement records associated with the user, item, injection package, and/or the like, e.g., 3211. A virtual engagement may represent a consumer's interaction with content injected into their virtual wallet, content on a merchant's web site, peer-to-peer content shared directly from one user's device to another (such as NFC based anonymous recommendations of products transmitted to nearby users or transmitted over a wide area network to subscribed users). If a consumer read an online review about a product, e.g., 7812, the virtual engagement value for an injected merchant may be adjusted by an amount, such as coejVReadReview, to compensate the review provider for their portion of the consumer's decision process. If a consumer price compared, e.g., 3214, value coeJVPriceCompare may be similarly adjusted, e.g., 3215. In one embodiment, if a user views photos of a product, e.g., 3216, a virtual engagement value coeJVPhotoSearch may be increased or decreased in value or importance relative to other factors in the calculation, e.g., 3217. If additional virtual engagement records are available, e.g., 3218, the process may repeat.

The logic flow continues with respect to FIG. 32B. In one embodiment, a revenue share formula database is queried in order to determine an applicable revenue share formula for division of revenue, e.g., 3219. An example revenue share formula would be to award 80% of revenue to the entity that received the actual order, and divide the remaining revenue among any store, physical or virtual interactions that the consumer engaged in within 30 days of purchase. In one embodiment, if no revenue share formula is available for the product, combination of merchants, user, and/or the like, a default formula may be used, e.g., 3220. The calculated values of the store engagement records, virtual engagement records, and the coefficient values discussed herein may then be used to calculate a revenue apportionment based on the selected product placement revenue share formula, e.g., 3221. In one embodiment, merchants are then notified of their portion of the product placement revenue, e.g., 3222. In some embodiments, the SIS may facilitate reconciliation between merchant financial accounts, e.g., 3223, such as by facilitating automated wire transfers from the product selling party to the product placement revenue receiving entities (e.g., from the merchant who collected amount of sale to those persons/entitles/merchants that facilitated the sale by engaging the user in some manner).

Figure 33:
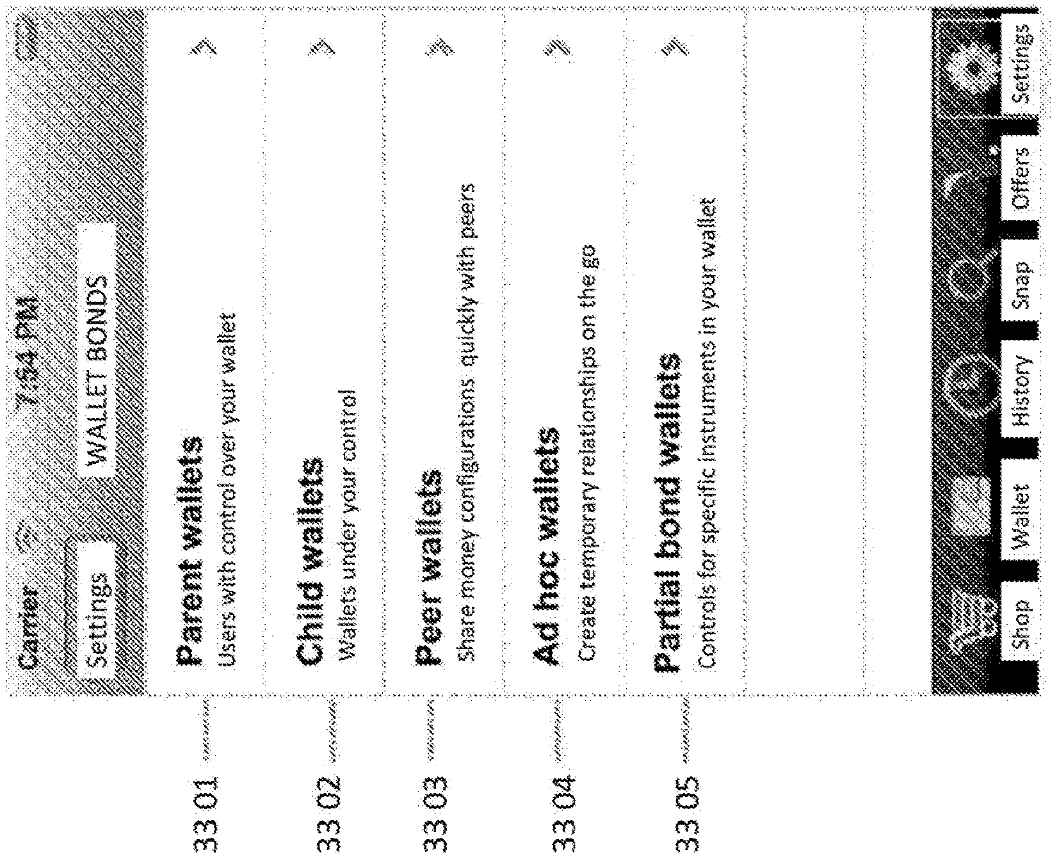
FIG. 33 shows a user interface diagram illustrating example aspects of a wallet bonds settings mode of a virtual wallet application, in one implementation of the SIS operation.

FIG. 33 shows a user interface diagram illustrating example aspects of a wallet bonds settings mode of a virtual wallet application in some embodiments of the SIS. In a category of wallet bonds settings, a user may be able to modify settings such as, but not limited to, settings regarding: parent wallets 3301 (e.g., those that have authorization to place restriction on the user's wallet); child wallets 3302 (e.g., those wallets over which the user has authorization to place restrictions); peer wallets 3303 (e.g., those wallets that have a similar level of control and transparency); ad hoc wallets 3304 (e.g., those wallets that are connected temporarily in real-time, for example, for a one-time funds transfer); partial bond wallets (e.g., such as bonds between corporate employer virtual wallet and an employee's personal wallet, such that an employer wallet may provide limited funds with strings attached for the employee wallet to utilize for business purposes only), and/or the like.

SIS Controller

Figure 34:
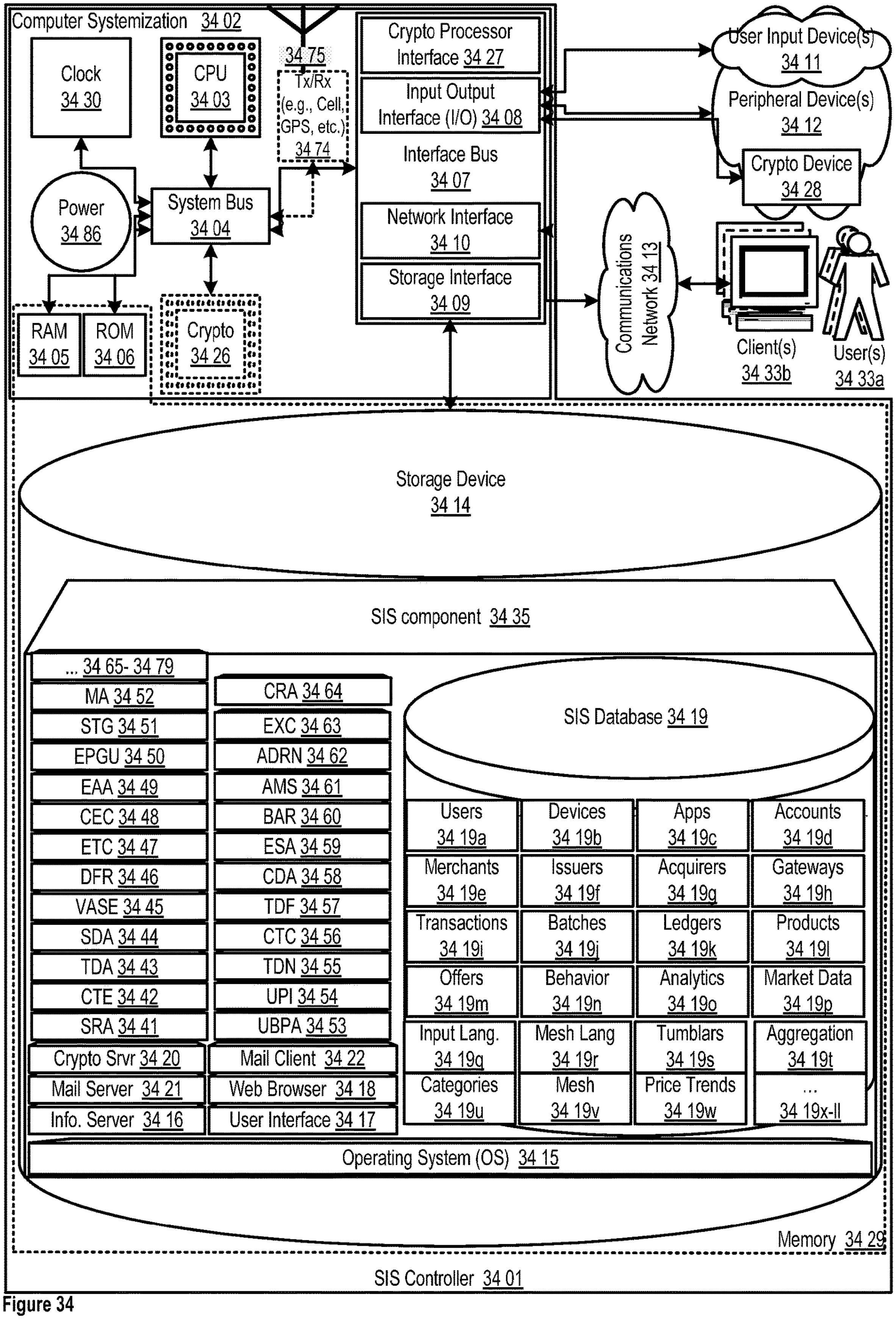
FIG. 34 shows a block diagram illustrating aspects of an exemplary embodiment of a SIS user interface controller, in one implementation of the SIS operation.

FIG. 34 shows a block diagram illustrating embodiments of a SIS controller. In this embodiment, the SIS controller 3401 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 3403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SIS controller 3401 may be connected to and/or communicate with entities such as, but not limited to: one or more users from user input devices 3411; peripheral devices 3412; an optional cryptographic processor device 3428; and/or a communications network 3413.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SIS controller 3401 may be based on computer systems that may comprise, but are not limited to, components such as: a computer systemization 3402 connected to memory 3429.

Computer Systemization

A computer systemization 3402 may comprise a clock 3430, central processing unit ("CPU(s)" and/or "processor(s)" (these terms are used interchangeably throughout the disclosure unless noted to the contrary)) 3403, a memory 3429 (e.g., a read only memory (ROM) 3406, a random access memory (RAM) 3405, etc.), and/or an interface bus 3407, and most frequently, although not necessarily, are all interconnected and/or communicating through a system bus 3404 on one or more (mother)board(s) 3402 having conductive and/or otherwise transportive circuit pathways through which instructions (e.g., binary encoded signals) may travel to effectuate communications, operations, storage, etc. The computer systemization may be connected to a power source 3486; e.g., optionally the power source may be internal. Optionally, a cryptographic processor 3426 and/or transceivers (e.g., ICs) 3474 may be connected to the system bus. In another embodiment, the cryptographic processor and/or transceivers may be connected as either internal and/or external peripheral devices 3412 via the interface bus I/O. In turn, the transceivers may be connected to antenna(s) 3475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SIS controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SIS controller and beyond through various interfaces. Should processing requirements dictate a greater amount speed and/or capacity, distributed processors (e.g., Distributed SIS), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SIS may be achieved by implementing a microcontroller such as CAST's R8051XC2 microcontroller; Intel's MCS 51 (i.e., 8051 microcontroller); and/or the like. Also, to implement certain features of the SIS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SIS component collection (distributed or otherwise) and/or features may be implemented via the microprocessor and/or via embedded components; e.g., via ASIC, coprocessor, DSP, FPGA, and/or the like. Alternately, some implementations of the SIS may be implemented with embedded components that are configured and used to achieve a variety of features or signal processing.

Depending on the particular implementation, the embedded components may include software solutions, hardware solutions, and/or some combination of both hardware/software solutions. For example, SIS features discussed herein may be achieved through implementing FPGAs, which are semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SIS features. A hierarchy of programmable interconnects allow logic blocks to be interconnected as needed by the SIS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SIS may be developed on regular FPGAs and then migrated into a fixed version that more resembles ASIC implementations. Alternate or coordinating implementations may migrate SIS controller features to a final ASIC instead of or in addition to FPGAs. Depending on the implementation all of the aforementioned embedded components and microprocessors may be considered the "CPU" and/or "processor" for the SIS.

Power Source

The power source 3486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3486 is connected to at least one of the interconnected subsequent components of the SIS thereby providing an electric current to all subsequent components. In one example, the power source 3486 is connected to the system bus component 3404. In an alternative embodiment, an outside power source 3486 is provided through a connection across the I/O 3408 interface. For example, a USB and/or IEEE 1394 connection carries both data and power across the connection and is therefore a suitable source of power.

Interface Adapters

Interface bus(ses) 3407 may accept, connect, and/or communicate to a number of interface adapters, conventionally although not necessarily in the form of adapter cards, such as but not limited to: input output interfaces (I/O) 3408, storage interfaces 3409, network interfaces 3410, and/or the like. Optionally, cryptographic processor interfaces 3427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3409 may accept, communicate, and/or connect to a number of storage devices such as, but not limited to: storage devices 3414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3410 may accept, communicate, and/or connect to a communications network 3413. Through a communications network 3413, the SIS controller is accessible through remote clients 3433*b* (e.g., computers with web browsers) by users 3433*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SIS), architectures may similarly be employed to pool, load balance, and/or otherwise increase the communicative bandwidth required by the SIS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3410 may be used to engage with various communications network types 3413. For example, multiple network interfaces may be employed to allow for the communication over broadcast, multicast, and/or unicast networks.

Input Output interfaces (I/O) 3408 may accept, communicate, and/or connect to user input devices 3411, peripheral devices 3412, cryptographic processor devices 3428, and/or the like. I/O may employ connection protocols such as, but not limited to: audio: analog, digital, monaural, RCA, stereo, and/or the like; data: Apple Desktop Bus (ADB), IEEE I394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3411 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 3412 may be connected and/or communicate to I/O and/or other facilities of the like such as network interfaces, storage interfaces, directly to the interface bus, system bus, the CPU, and/or the like. Peripheral devices may be external, internal and/or part of the SIS controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SIS controller may be embodied as an embedded, dedicated, and/or monitorless (i.e., headless) device, wherein access would be provided over a network interface connection.

Cryptographic units such as, but not limited to, microcontrollers, processors 3426, interfaces 3427, and/or devices 3428 may be attached, and/or communicate with the SIS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3429. However, memory is a fungible technology and resource, thus, any number of memory embodiments may be employed in lieu of or in concert with one another. It is to be understood that the SIS controller and/or a computer systemization may employ various forms of memory 3429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3429 will include ROM 3406, RAM 3405, and a storage device 3414. A storage device 3414 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3429 may contain a collection of program and/or database components and/or data such as, but not limited to: operating system component(s) 3415 (operating system); information server component(s) 3416 (information server); user interface component(s) 3417 (user interface); Web browser component(s) 3418 (Web browser); database(s) 3419; mail server component(s) 3421; mail client component(s) 3422; cryptographic server component(s) 3420 (cryptographic server); the SIS component(s) 3435; SRA 3441, CTE 3442, TDA 3443, SDA 3444, VASE 3445, DPR 3446, ETC 3447, CEC 3448, EAA 3449, EPGU 3450, STG 3451, MA 3452, UBPA 3453, UPI 3454, TDN 3455, CTC 3456, TDF 3457, CDA 3458, ESA 3459, BAR 3460, AMS 3461, ADRN 3462, EXC 3463, CRA 3464, PPR 3465, PVE 3466, RIR 3467, ULEP 3468, Transaction Authorization 3469, Registration 3470, Advertisement Trigger 3471, Predictive Shopping List Generator Component 3472, Receipt Processing Component 3473, External Receipt Retrieval Component 3474, Checkout Scan Processing Component 3475, Snap Purchase Processing Component 3476, Smart Cart Checkout Processing Component 3477, Feedback Processing Component 3478, Merchant Proximity Component 3479, Automated Shopping Item Availability AAP Component 3480; and/or the like (i.e., collectively a component collection). These components may be stored and accessed from the storage devices and/or from storage devices accessible through an interface bus. Although non-conventional program components such as those in the component collection, typically, are stored in a local storage device 3414, they may also be loaded and/or stored in memory such as: peripheral devices, RAM, remote storage facilities through a communications network, ROM, various forms of memory, and/or the like.

Operating System

The operating system component 3415 is an executable program component facilitating the operation of the SIS controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.i/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SIS controller to communicate with other entities through a communications network 3413. Various communication protocols may be used by the SIS controller as a subcarrier transport mechanism for interaction, such as, but not limited to: multicast, TCP/IP, UDP, unicast, and/or the like.

Information Server

An information server component 3416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SIS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SIS database 3419, operating systems, other program components, user interfaces, Web browsers, and/or the like.

Access to the SIS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SIS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SIS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/qs/qS/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 3417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SIS enabled nodes. The combined application may be nugatory on systems employing standard Web browsers.

Mail Server

A mail server component 3421 is a stored program component that is executed by a CPU 3403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SIS.

Access to the SIS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3422 is a stored program component that is executed by a CPU 3403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3420 is a stored program component that is executed by a CPU 3403, cryptographic processor 3426, cryptographic processor interface 3427, cryptographic processor device 3428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SIS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the SIS component to engage in secure transactions if so desired. The cryptographic component facilitates the secure accessing of resources on the SIS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SIS Database

The SIS database component 3419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SIS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SIS database is implemented as a data-structure, the use of the SIS database 3419 may be integrated into another component such as the SIS component 3435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3419 includes several tables **3419*a*-11. A Users table 3419*a* may include fields such as, but not limited to: user_id, ssn, dob, first_name, last_name, age, state, address_firstline, address_secondline, zipcode, devices_list, contact_info, contact_type, alt_contact_info, alt_contact_type, user_shopping_lists, user_product_frequency_hash, and/or the like. The Users table may support and/or track multiple entity accounts on a SIS. A Devices table 3419*b* may include fields such as, but not limited to: device_id, user_id, client_ip, client_type, client_model, operating_system, os_version, app_installed_flag, device_GPS, device_MAC, device_serial, device_ECID, device_UDID, device_browser, device_apps_list, device_securekey, and/or the like. An Apps table 3419*c* may include fields such as, but not limited to: app_id, app_name, app_type, OS_compatibilities_list, version, timestamp, developer_id, and/or the like. An Accounts table 3419*d* may include fields such as, but not limited to: account_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Merchants table 3419*e* may include fields such as, but not limited to: merchant_id, merchant_name, provi merchant_address, ip_address, mac_address, auth_key, port_num, security_settings_list, merchant_store_injection_package, merchant_email, merchant_products, and/or the like. An Issuers table 3419*f* may include fields such as, but not limited to: issuer_id, issuer_name, issuer_address, ip_address, mac_address, auth_key, port_num, security_settings_list, and/or the like. An Acquirers table 3419*g* may include fields such as, but not limited to: acquirer_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Gateways table 3419*h* may include fields such as, but not limited to: gateway_id, gateway_name, merchant_id, issuer_id, acquirer_id, user_id, and/or the like. A Transactions table 3419*i* may include fields such as, but not limited to: transaction_id, order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, billingaddress_liner, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 3419***j* may include fields such as, but not limited to: batch_id, parent_batch_id, transaction_id, account_id, user_id, app_id, batch_rules, and/or the like. A Ledgers table 3419*k* may include fields such as, but not limited to: ledger_id, transaction_id, user_id, merchant_id, issuer_id, acquirer_id, aggregation_id, ledger_name, ledger_value, and/or the like. A Products table 34191 may include fields such as, but not limited to: product_id, product_name, sku, price, inventory_level, stores_carrying, unit_of_measure, product_attributes_list, tax_info_list, related_products_list, offers_list, discounts_list, rewards_list, merchants_list, merchant_availability_list, product_weight, product_brand, product_aisle, product_shelf, product_note, product_expiration_date, product_code, product_lot_id, and/or the like. A Offers table 3419*m* may include fields such as, but not limited to: offer_id, merchant_id, offered_to_user_id, offer_type, offer_description, start_date, end_date, num_times_redeemed, offer_attributes_list, offer_price, offer_expiry, related_products_list, discounts_list, rewards_list, merchants_list, merchant_availability_list, and/or the like. A Behavior table 3419*n* may include fields such as, but not limited to: behavior_id, user_id, behavior_description, behavior_type, behavior_value, date_time_behavior, activity_type, activity_location, activity_attribute_list, activity_attribute_values_list, and/or the like. An Analytics table 34190 may include fields such as, but not limited to: analytics_id, batch_id, user_id, transaction_id, generated_graph, generated_results_set, generated_results_set_json, input_data_set, date_time_generated, report_type, report_algorithm_id, report_destination_address, and/or the like. A Market Data table 3419*p* may include fields such as, but not limited to: market_data_id, index_name, index_value, last_updated_index_datetime, asset_id, asset_symbol, asset_name, spot_price, bid_price, ask_price, and/or the like. An Input Languages table 3419*q* may include fields such as, but not limited to: input_language_id, fimction_name, function_definition, parent_input_language_id, mesh_language_id, user_id, tumbler_id, aggregation_id, and/or the like. A Mesh Language table 3419*r* may include fields such as, but not limited to: mesh_language_id, operation_name, operation_min_test_case, operation_max_test_case, operation_custom_test_case, mesh_language_version, mesh_language_updated_date, and/or the like. A Tumblars table 3419*s* may include fields such as, but not limited to: tumbler_id, user_visible_model_commands, non_user_visible_model_commands, input_key, output_key, and/or the like. An Aggregation table 3419*t* may include fields such as, but not limited to: aggregation_id, aggregation_data_source, key, value, parent_aggregation_id, and/or the like. A Category table 3419*u* may include fields such as, but not limited to: category_id, mesh_id, user_id, category_name, category_type, entity_name, is_present in mesh, and/or the like. A Mesh table 3419*v* may include fields such as, but not limited to: mesh_id, mesh_node, mesh_node_value, mesh_edge, mesh_edge_value, mesh_link, mesh_link_value, attributes, tags, keywords, and/or the like. A Price Trends table 3419*w* may include fields such as, but not limited to: price_trends_id, merchant_id, date_price_observed, number_observations, observed_price, next_check_date, inventory_quantity, and/or the like. A Revenue Share Formulas table 3419*x* may include fields such as, but not limited to: revenue_share_id, merchant_id, share_percentage, associated_merchant_id, account_id, and/or the like. A Interactions table 3419*y* may include fields such as, but not limited to: interaction_id, interaction_type, interaction_name, device_type, user_type, and/or the like. A Product Placements table 3419*z* may include fields such as, but not limited to: product_placement_id, product_id, merchant_id, placement_location, store_location, injection_id, and/or the like. An Engagements table 3419*aa* may include fields such as, but not limited to: engagement_id, engagement_type, user_id, start_time, duration, and/or the like. An Injection Content table 3419*bb* may include fields such as, but not limited to: injection_id, injection_type, merchant_id, product_id, interaction_id, injection_permissions, and/or the like. An ads table 3419*cc* may include fields such as, but not limited to: ad_id, ad_name, ad_template, ad_data, ad_product_id, ad_merchant_id ad_complementary_product_id, ad_complementary_merchant_id, and/or the like. A correlation rule table 3419*dd* may include fields such as, but not limited to: rule_id, rule_name, rule_sponsor, rule_merchant_id, rule_product_id, rule_termination, rule_period, rule fee_percentage, rule_weekly_purchase, rule_purchase_interval, rule_event, and/or the like. A shopping list table 3419*ee* includes fields such as, but not limited to: shopping_list_id, shopping_list_name, shopping_list_products, shopping_list_date_created, and/or the like. A receipts table 3419*ff* includes fields such as, but not limited to: receipts_id, receipts_merchant_id, receipts_user_id, receipts_date_generated, recepts_products, receipts_trans_total, receipts_original, receipts_orig_source, and/or the like. A feedback table 3419*gg* includes fields such as, but not limited to: feedback_id, feedback_product_id, feedback_user_id, feedback_rating, feedback_comment, feedback_image, and/or the like. A product history table 3419*hh* includes fields such as, but not limited to: ph_id, ph_products, ph_date_initiated, ph_user_id, and/or the like. A wallet table 3419*ii* includes fields such as, but not limited to: wallet_id, wallet_user_id, wallet_user_password, wallet_user_username, wallet_type, and/or the like. A Shop Sessions table 3419*jj* may include fields such as, but not limited to: user_id, session_id, alerts_URL, timestamp, expiry_lapse, merchant_id, store_id, device_type, device_id, device_IP, device_MAC, device_browser, device_serial, device_ECID, device_model, device_OS, wallet_app_installed, total_cost, cart_id_list, product_params_list, social_flag, social_message, social_networks_list, coupon_lists, accounts_list, CW2_lists, charge_ratio_list, charge_priority_list, value_exchange_symbols_list, bill_address, ship_address, cloak_flag, pay_mode, alerts_rules_list, and/or the like. An automated shopping lists data table 3419*kk* may include fields such as, but not limited to: automated_shopping_list_id, user_id, list_items, last_updated_lists, devices_authorized, users_authorized, groups_authorized, and/or the like. A merchant shopping devices table 3419*ll* may include fields such as, but not limited to: merchant_shopping_device_id, merchant_id, device_model, devices_can_be_paired_with, device_capabilities, last_used_datetime, current_battery_power level, and/or the like.

In one embodiment, the SIS database may interact with other database systems. For example, employing a distributed database system, queries and data access by search SIS component may treat the combination of the SIS database, an integrated data security layer database as a single database entity.

In one embodiment, user programs may contain various user interface primitives, which may serve to update the SIS. Also, various accounts may require custom database tables depending upon the environments and the types of clients the SIS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3419*a-ll*. The SIS may be configured to keep track of various settings, inputs, and parameters via database controllers.

The SIS database may communicate to and/or with other components in a component collection, including itself, and/or facilities of the like. Most frequently, the SIS database communicates with the SIS component, other program components, and/or the like. The database may contain, retain, and provide information regarding other nodes and data.

The SISs

The SIS component 3435 is a stored program component that is executed by a CPU. In one embodiment, the SIS component incorporates any and/or all combinations of the aspects of the SIS that were discussed in the previous figures. As such, the SIS affects accessing, obtaining and the provision of information, services, transactions, and/or the like across various communications networks. The features and embodiments of the SIS discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SIS's features and facilities, and in many cases reduce the costs, energy consumption/requirements, and extend the life of SIS's underlying infrastructure; this has the added benefit of making the SIS more reliable. Similarly, many of the features and mechanisms are designed to be easier for users to use and access, thereby broadening the audience that may enjoy/employ and exploit the feature sets of the SIS; such ease of use also helps to increase the reliability of the SIS. In addition, the feature sets include heightened security as noted via the Cryptographic components 3420, 3426, 3428 and throughout, making access to the features and data more reliable and secure.

The SIS component may transform aggregated automated shopping lists inputs and user location data, and/or the like and use the SIS. In one embodiment, the SIS component 3435 takes inputs (e.g., such as aggregated data from various computer resources, automated shopping list input 204, aggregated automated shopping list update request 205, store injection package aggregation update request 211*a-b*, consumer location update 207, merchant location navigation request 212, and/or the like) etc., and transforms the inputs via various components (e.g., SRA 3441, CTE 3442, TDA 3443, SDA 3444, VASE 3445, DPR 3446, ETC 3447, CEC 3448, EAA 3449, EPGU 3450, STG 3451, MA 3452, UBPA 3453, UPI 3454, TDN 3455, CTC 3456, TDF 3457, CDA 3458, ESA 3459, BAR 3460, AMS 3461, ADRN 3462, EXC 3463, CRA 3464, PPR 3465, PVE 3466, RIR 3467, ULEP 3468, Transaction Authorization 3469, Registration 3470, Advertisement Trigger 3471, Predictive Shopping List Generator Component 3472, Receipt Processing Component 3473, External Receipt Retrieval Component 3474, Checkout Scan Processing Component 3475, Snap Purchase Processing Component 3476, Smart Cart Checkout Processing Component 3477, Feedback Processing Component 3478, Merchant Proximity Component 3479, Automated Shopping Item Availability AAP Component 3480 and/or the like), into outputs (e.g., updated entity profiles, social graphs, aggregated automated shopping availability message 209, merchant location navigation response 213, store injection package aggregation update response 212*a-b*, and/or the like).

The SIS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SIS server employs a cryptographic server to encrypt and decrypt communications. The SIS component may communicate to and/or with other components in a component collection, including itself, and/or facilities of the like. Most frequently, the SIS component communicates with the SIS database, operating systems, other program components, and/or the like. The SIS may contain, communicate, generate, obtain, and/or provide program component, system, user, and/or data communications, requests, and/or responses.

Distributed SISs

The structure and/or operation of any of the SIS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SIS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SIS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
Header ('Content-Type: text/plain');
//set ip address and port to listen to for incoming data
$address= '192.168.0.100';
$port = 255;
//create a server-side SSL socket, listen
//for/accept incoming communication
$sock = socket_create (AF_INET, SOCK_STREAM, 0);
socket_bind ($sock, $address, $port)
    or die ('Could not bind to address');
    socket_listen ($sock);
$client = socket_accept ($sock) ;
//read input data from client device in 1024 byte
//blocks until end of message
do {
        $input = " ";
        $input = socket_read ($client, 1024);
        $data .= $input;
} while ($input != " ");
// parse data to extract variables
$obj = json_decode ($data, true);
// store input data in a database
mysql_connect ("10.1.1.1", $srvr,$pass); // access database server
mysql_select ("CLIENTDB.SQL"); // select database to append
mysql_query ("INSERT INTO UserTable (transmission) VALUES
($data)"); // add data to UserTable table in a CLIENT database
Mysql_close ("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?
topic=/com.ibm.IBMDI.doc/referenceguide295.htm and other parser implementations:

http://publib.boulder.ibm.com/infocenter/tivihelp/v2r1/index.jsp?
topic=/com.ibm.IBMDI.doc/referenceguide259.htm all of which are hereby expressly incorporated by reference.

Exemplary embodiments of an SIS may include:

1. A processor-implemented product placement revenue sharing method, comprising:

obtaining consumer activity information indicative of consumer informational exposure to a product;

receiving a plurality of indications of the consumer initiating a purchase transaction for the product and associated product purchase quantities;

determining a shopping cart automatic population lag time based on the received plurality of indications;

pre-populating the consumer's wallet based shopping cart with a quantity of the product when the shopping cart automatic population lag time is expiring;

receiving an indication that the consumer has purchased the pre-populated product; and calculating a product placement revenue sharing percentage based on the obtained consumer activity information.

2. The method of embodiment 1, wherein the pre-populated quantity of the product is determined using the time between the plurality of indications of the consumer initiating a purchase transaction and the associated product purchase quantities.

3. The method of embodiment 1, wherein pre-populating the consumer's wallet based shopping cart is based on the consumer activity information.

4. The method of embodiment 3, wherein the consumer activity information is engaging with a product subject to premium store placement.

5. The method of embodiment 3, wherein the consumer activity information is an indication that the consumer spent greater than an amount of time interacting with the product in a physical store.

6. The method of embodiment 3, wherein the consumer activity information is an indication that the consumer spent greater than an amount of time interacting with a store clerk.

7. The method of embodiment 3, wherein the consumer activity information is an indication that the consumer read an online review of the product.

8. The method of embodiment 3, wherein the consumer activity information is an indication that the consumer performed a price comparison for the product.

9. The method of embodiment 3, wherein the consumer activity information is an indication that the consumer viewed photos of the product online.

In order to address various issues and advance the art, the entirety of this application for SIS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SIS individual and/or enterprise user, database configuration and/or relational model, data type, data transmission and/or network framework, syntax structure, and/or the like, various embodiments of the SIS, may be implemented that enable a great deal of flexibility and customization. For example, aspects of the SIS may be adapted for restaurant dining, online shopping, brick-and-mortar shopping, secured information processing, and/or the like. While various embodiments and discussions of the SIS have been directed to electronic purchase transactions, however, it is to be understood that the embodiments described herein may be readily configured and/or customized for a wide variety of other applications and/or implementations.

What is claimed is:

1. A smart shopping cart for accepting items to be purchased comprising:

- a processor that is physically configured according to computer executable instructions;
- an input output circuit in communication with the processor;
- a reader in communication with the input output circuit which reads an identification code of each item placed in the smart shopping cart associated with the merchant;
- a communication circuit which communicated with outside servers to receive updated prices and facilitate purchases;
- a memory in communication with the processor which stores the identification code of each item and related prices offered by the merchant and a store injection package for the merchant, which includes the merchant's inventory;
- wherein the computer executable instructions comprise instruction for:
  - connecting with a mobile wallet for a consumer, wherein the mobile wallet comprises one or more payment accounts;
  - receiving a copy of the consumer's shopping list containing one or more items;
  - parsing the store injection package to determine if the one or more items are available at the merchant;
  - determining that at least one item in the consumer's shopping list is unavailable in the merchant's inventory;
  - in response to the determination that the at least one item in the consumer's shopping list is unavailable,
    - receiving a second store injection package for a second merchant based on the consumer's location, wherein the second store injection package includes the second merchant's inventory;

determining that the at least one item is available in the second merchant's inventory; and providing a notification to a device of the consumer that the at least one item is available at the second merchant;

determining that a consumer is ready to pay for the items in the smart shopping cart;

determining a total price of the items in the smart shopping cart;

presenting the one or more payment accounts in the mobile wallet to be used to purchase the items in the smart shopping cart;

in response to a selection of a payment account from the one or more payment accounts in the mobile wallet, receiving a purchase request from the mobile wallet for the items in the smart shopping cart;

communicating the purchase request to a mobile wallet payment system;

in response to the purchase request being approved, indicating that a payment transaction is complete.

2. The smart shopping cart of claim 1, wherein determining the total price of the items in the smart shopping cart comprises:

receiving the identification code of each item;

retrieving the price related to the received identification code for each item;

totaling the prices of the items; and adding in any taxes applicable to each item.

3. The smart shopping cart of claim 1, wherein the identification code is received through an RF receiver.

4. The smart shopping cart of claim 1, wherein the identification code is a barcode, QR code, NFC tag, or RFID tag.

5. The smart shopping cart of claim 4, wherein the reader is a barcode reader or a QR code reader.

6. The smart shopping cart of claim 1, wherein the mobile wallet displays the plurality of payment accounts.

7. The smart shopping cart of claim 1, wherein the smart shopping cart creates at least one of indications of:

payment in process;

payment denied; and payment successful.

8. The smart shopping cart of claim 1, wherein the input output circuit communicates with an input device which accepts inputs from a user.

9. The smart shopping cart of claim 8, wherein the inputs comprise letters and numbers representing a user name and a user password.

10. The smart shopping cart of claim 8 wherein the inputs comprise an electronic signal from a computing device controlled by the user.

11. The smart shopping cart of claim 1, wherein the processor communicates with a portable computing device of the consumer having a memory.

12. The smart shopping cart of claim 11, wherein the processor accesses discounts for one or more items on a shopping list stored in the memory of the portable computing device.

13. The smart shopping cart of claim 1, wherein the processor analyzes the consumer's shopping list and directs the consumer to a location in a merchant location to access the items in the consumer's shopping list.

14. The smart shopping cart of claim 1, wherein the processor analyzes the consumer's shopping list and determines a best path to each item in the consumer's shopping list available in a merchant location.

15. The smart shopping cart of claim 14, wherein the processor generates an interactive map to each item on the consumer's shopping list available at the merchant location.

16. The smart shopping cart of claim 15, wherein the interactive map is sent to a portable computing device of the consumer.

17. The smart shopping cart of claim 1, wherein the computer executable instructions comprise further instruction for:

receiving feedback on one or more items on the consumer's shopping list, wherein the feedback includes a ranking for an item on the consumer's shopping list, receiving a threshold for the feedback; and comparing the ranking for the item to the threshold, wherein the item is removed from the consumer's shopping list if the ranking for the item is below the threshold.

18. The smart shopping cart of claim 17, wherein the threshold is received from the consumer.

19. The smart shopping cart of claim 18, wherein the computer executable instructions comprise further instruction for:

providing a link to the consumer's shopping list on a social networking website.

20. The smart shopping cart of claim 19, wherein the feedback is received from users of the social networking website.

* * * * *